United States Patent
Zhang et al.

(10) Patent No.: US 10,256,939 B2
(45) Date of Patent: Apr. 9, 2019

(54) SCHEDULED LIGHT PATH SWITCHING IN OPTICAL NETWORKS AND AUTOMATIC ASSESSMENT OF TRAFFIC IMPAIRMENTS THAT WOULD RESULT FROM ADDING OR DELETING A CHANNEL IN A WAVELENGTH-DIVISION MULTIPLEXED OPTICAL COMMUNICATION NETWORK

(71) Applicant: Massachusetts Institute of Technology, Cambridge, MA (US)

(72) Inventors: Lei Zhang, Lexington, MA (US); Vincent W. S. Chan, Lincoln, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 16/048,961

(22) Filed: Jul. 30, 2018

(65) Prior Publication Data
US 2018/0367236 A1    Dec. 20, 2018

Related U.S. Application Data

(62) Division of application No. 15/572,936, filed as application No. PCT/US2016/035528 on Jun. 2, 2016, now Pat. No. 10,050,740.

(Continued)

(51) Int. Cl.
*H04J 14/00* (2006.01)
*H04J 14/02* (2006.01)

(52) U.S. Cl.
CPC ...... *H04J 14/0271* (2013.01); *H04J 14/0212* (2013.01); *H04J 14/0257* (2013.01)

(58) Field of Classification Search
CPC . H04J 14/0271; H04J 14/0212; H04J 14/0257
(Continued)

(56) References Cited

U.S. PATENT DOCUMENTS 9,608,763 B2 * 3/2017 Hua ............... H04Q 11/0066
2007/0154217 A1 * 7/2007 Kim ................... H04J 14/02
398/72

(Continued)

FOREIGN PATENT DOCUMENTS

WO    WO 2014/121843    8/2014

OTHER PUBLICATIONS

Chan, et al., "Optical Flow Switching," *IEEE, Broadband Communications, Networks and Systems*, 8 pages, 2006.
(Continued)

*Primary Examiner* — Mohammad R Sedighian
(74) *Attorney, Agent, or Firm* — Sunstein Kann Murphy & Timbers LLP

(57) ABSTRACT

A single-wavelength light path is selected between a source access node and a destination access node of a wavelength-division multiplexed optical network, including selecting an illuminated wavelength of the light path and selecting a start time and duration for a data transfer that would not interfere with other data transfers. If no start time/wavelength combination is available with duration sufficient to transport the data, an additional wavelength is automatically selected, based on modeling, that would not impair traffic being carried by other wavelengths in the network, and without a time-consuming manual process of the prior art. The scheduling process may include selecting a set of optical fibers, a wavelength, a start time and an end time to transport proposed traffic. A novel scheduler avoids checking every possible start time, thereby saving significant processing time. The scheduler schedules single-wavelength light (Continued)

paths, rather than relying on complex wavelength shifting schemes.

23 Claims, 59 Drawing Sheets

Related U.S. Application Data

(60) Provisional application No. 62/169,759, filed on Jun. 2, 2015.

(58) Field of Classification Search
USPC .......................................... 398/45, 69, 75, 57
See application file for complete search history.

(56) References Cited

U.S. PATENT DOCUMENTS

| | | | |
|---|---|---|---|
| 2009/0080880 A1 | 3/2009 | Lee et al. | |
| 2009/0110395 A1 | 4/2009 | Lee et al. | |
| 2012/0106958 A1* | 5/2012 | Sakamoto | H04J 14/0282 398/58 |
| 2013/0051798 A1* | 2/2013 | Chen | H04Q 11/0005 398/49 |
| 2014/0016926 A1 | 1/2014 | Soto et al. | |
| 2014/0294392 A1 | 10/2014 | Winzer et al. | |
| 2015/0131988 A1 | 5/2015 | Alfiad et al. | |
| 2016/0112327 A1* | 4/2016 | Morris | H04L 47/127 398/45 |

OTHER PUBLICATIONS

Finisar Corporation, "Introduction to EDFA Technology," 6 pages, Jun. 2009.

Ganguly, et al., "Distributed Algorithms and Architectures for Optical Flow Switching in WDM Networks," *IEEE, Computers and Communications*, 6 pages, 2000.

Ganguly, et al., "A Scheduled Approach to Optical flow Switching in the ONRAMP Optical Access Network Testbed," *IEEE, Optical Fiber Communication Conference and Exhibit*, 1 page, 2002 (abstract only).

International Searching Authority, Korean Intellectual Property Office, International Search Report and Written Opinion, International Application No. PCT/US2016/035528, 10 pages, dated Aug. 24, 2016.

International Bureau of WIPO Authorized Officer Agnés Wittmann-Regis, Notification Concerning Transmittal of International Preliminary Report on Patentability, PCT/US2016/035528, 7 pages, dated Dec. 14, 2017.

Rosberg, et al., "Flow Scheduling in Optical Flow Switched (OFS) Networks under Transient Conditions," *Journal of Lightwave Technology*, vol. 29, No. 21, 15 pages, 2011.

Wong, et al., "Towards a Bufferless Optical Internet," *Journal of Lightwave Technology*, vol. 27, No. 14, pp. 2817-2833, Jul. 15, 2009.

Yin, "Reliable Traffic Control and Resource Provisioning in Multi-Granular Integrated Services Optical Network," Dissertation, 17 pages, 2002.

* cited by examiner

Optical Amplifier Impairment Matrix 1110

1020 →

| | Power Level 1 | Power Level 2 | |
|---|---|---|---|
| 1100 { $\lambda_1$ | Impairment Characteristics | Impairment Characteristics | ... |
| 1102 { $\lambda_1\ \lambda_2$ / $\lambda_1\ \lambda_3$ / $\lambda_1\ \lambda_4$ ⋮ $\lambda_1\ \lambda_n$ | Impairment Characteristics | Impairment Characteristics | ... |
| | Impairment Characteristics | Impairment Characteristics | ... |
| | ⋮ | ⋮ | |

1104 {
$\lambda_1\ \lambda_2\ \lambda_3$
$\lambda_1\ \lambda_2\ \lambda_4$
$\lambda_1\ \lambda_2\ \lambda_5$
⋮
$\lambda_1\ \lambda_2\ \lambda_n$
$\lambda_1\ \lambda_3\ \lambda_4$
$\lambda_1\ \lambda_3\ \lambda_5$
⋮
$\lambda_1\ \lambda_3\ \lambda_n$
⋮
$\lambda_1\ \lambda_{n-1}\ \lambda_n$
$\lambda_2\ \lambda_3\ \lambda_4$
$\lambda_2\ \lambda_3\ \lambda_5$
⋮
$\lambda_2\ \lambda_3\ \lambda_n$
⋮
$\lambda_{n-2}\ \lambda_{n-1}\ \lambda_n$ 1106 { $\lambda_1\ \lambda_2\ \lambda_3\ \lambda_4$ ⋮

1108 { $\lambda_1\ \lambda_2\ \lambda_3\ \cdots\ \lambda_n$

*FIG. 11*

Splitter/Combiner/OXC Information

| |
|---|
| Unit ID — 1202 |
| Type: Splitter/Combiner/OXC — 1204 |
| Node ID — 1206 |
| Number of Inputs — 1208 |
| Number of Outputs — 1210 |
| Input 1 Fiber ID/Amplifer ID/etc. — 1212 |
| Input 2 Fiber ID/Amplifer ID/etc. — 1214 |
| ⋮ |
| Output 1 Fiber ID/Amplifier ID/etc. — 1218 |
| Output 2 Fiber ID/Amplifier ID/etc. — 1220 |
| ⋮ |
| Wavelength 1 Attenuation — 1224 |
| Wavelength 2 Attenuation — 1226 |
| ⋮ — 1228 |

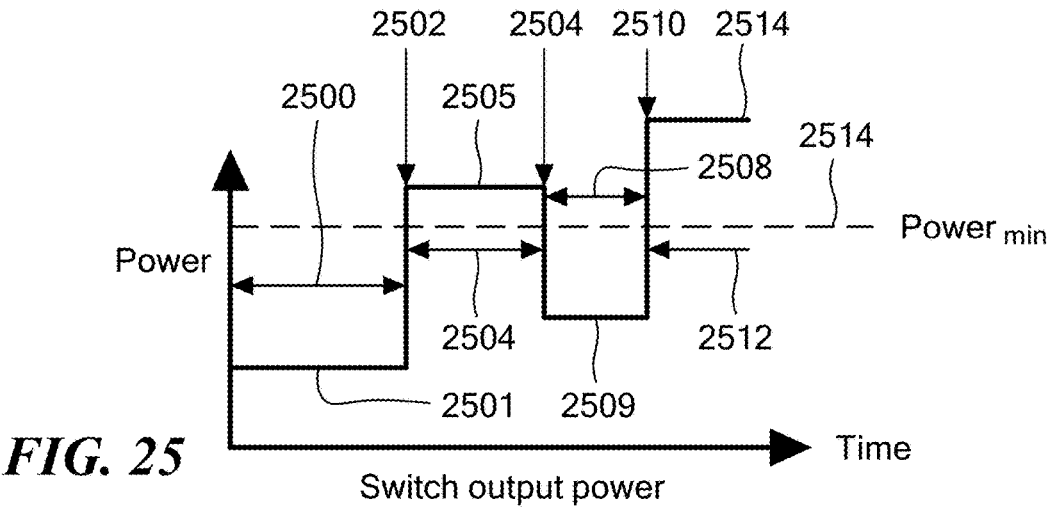
FIG. 25 Switch output power
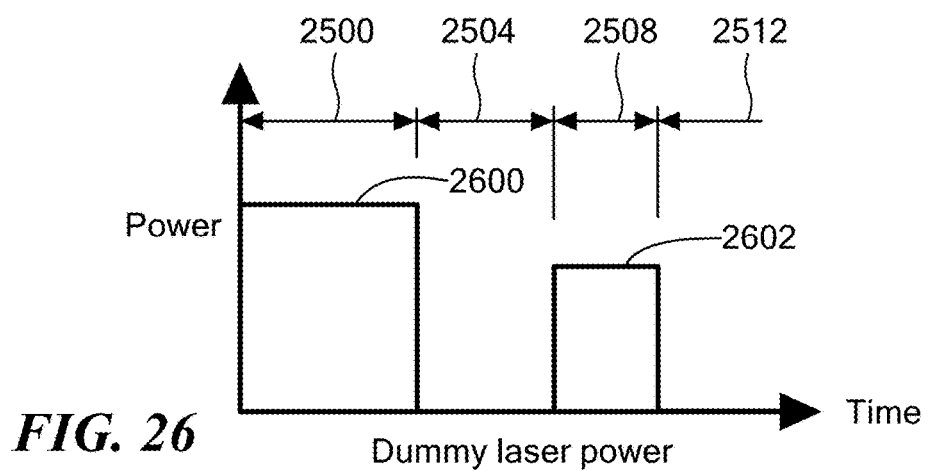
FIG. 26 Dummy laser power
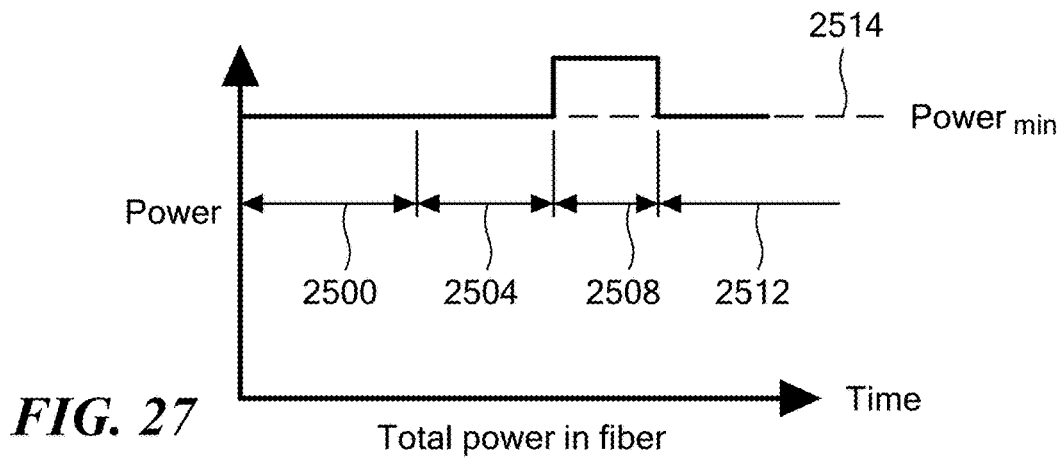
FIG. 27 Total power in fiber Δ : node degree, e.g. $\Delta_j = 6$
$N_V$ : number of nodes
$N_E$ : number of edges
$\overline{H}$ : average number of hops of all paths
Λ : number of wavelength channels

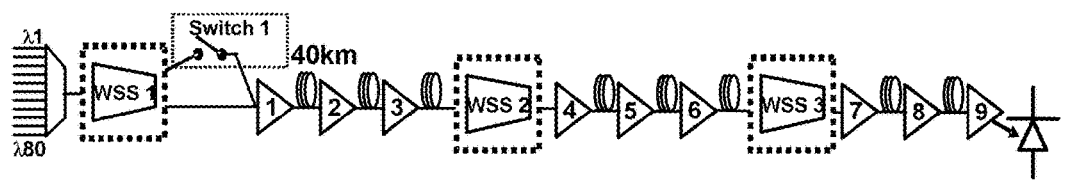
FIG. 55
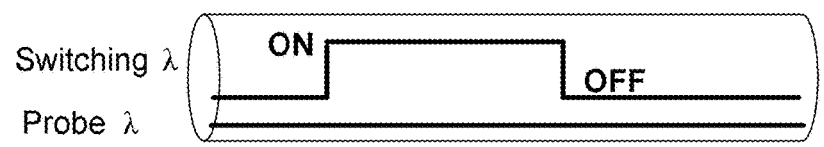
(a)
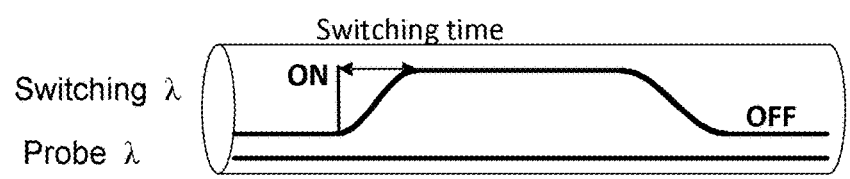
(b)
FIG. 56

SCHEDULED LIGHT PATH SWITCHING IN OPTICAL NETWORKS AND AUTOMATIC ASSESSMENT OF TRAFFIC IMPAIRMENTS THAT WOULD RESULT FROM ADDING OR DELETING A CHANNEL IN A WAVELENGTH-DIVISION MULTIPLEXED OPTICAL COMMUNICATION NETWORK

CROSS REFERENCE TO RELATED APPLICATIONS

This application is a divisional of U.S. patent application Ser. No. 15/572,936, which has a 35 U.S.C. 371(c) date of Nov. 9, 2017 and is titled "Scheduled Light Path Switching in Optical Networks and Automatic Assessment of Traffic Impairments that Would Result from Adding or Deleting a Channel in a Wavelength-Division Multiplexed Optical Communication Network" (now U.S. Pat. No. 10,050,740, issued Aug. 14, 2018), which is a national phase application of PCT/US2016/035528, filed Jun. 2, 2016 and titled "Scheduled Light Path Switching in Optical Networks and Automatic Assessment of Traffic Impairments that Would Result from Adding or Deleting a Channel in a Wavelength-Division Multiplexed Optical Communication Network," which claims the benefit of U.S. Provisional Patent Application No. 62/169,759, filed Jun. 2, 2015 and is titled "Algorithms for Scheduled Light Path Switching in Optical Networks with Channel Impairments," the entire contents of each of which are hereby incorporated by reference herein, for all purposes.

STATEMENT REGARDING FEDERALLY SPONSORED RESEARCH OR DEVELOPMENT

This invention was made with Government support under Grant Number 1111383 awarded by the National Science Foundation. The U.S. Government has certain rights in the invention.

TECHNICAL FIELD

The present invention relates to optical networks and, more particularly, to scheduling lightpaths through such networks based on models that predict channel quality of the lightpaths.

BACKGROUND ART

Optical communication networks employ optical fibers to carry optical data signals. To avoid bottlenecks created by optical-to-electronic and electronic-to-optical conversions at amplifiers, routers, switches, etc., many modern optical communication networks employ end-to-end all-optical connections. Optical splitters divide optical signals from one optical fiber onto multiple optical fibers, which extend in various directions to implement branches of a network. Similarly, optical combiners combine optical signals from multiple optical fibers of various network branches onto single optical fibers. Optical amplifiers compensate for losses experienced by the optical signals traversing the optical fibers, splitter, combiners, etc. In a long-haul network, such as a nation-wide network, an end-to-end connection may include 40 or more optical fibers in tandem and a corresponding number of optical amplifiers.

Erbium-doped fiber amplifiers (EDFAs) are commonly used in optical networks. Many in-band wavelengths of light, each wavelength carrying separate traffic, can be multiplexed and transmitted together over a single optical fiber. Pumped by an out-of-band laser, an EDFA amplifies all in-band wavelengths. Consequently, traffic from many users can be wavelength multiplexed, amplified and simultaneously carried over an optical network as the signal is combined and/or split, as described above. In addition, optical cross-connects (OXCs) and wavelength-selective switches may be used to route traffic through the optical network.

"Optical flow switching" (OFS) is a network architecture that provides end-to-end all-optical connections to users, typically with very large data transactions. Light paths for data flows are scheduled into (possibly future) time slots. However, even using a supercomputer, a prior art scheduler for a wide area mesh optical network with full switchability takes about 12 minutes to compute an assignment for one data transfer request. In addition, to achieve an end-to-end all-optical path, complex wavelength shifting schemes are employed along the path.

Furthermore, in many cases, only a subset of possible wavelengths is illuminated in a given optical fiber, such as to conserve energy or to avoid unnecessary heat generation. If a scheduler cannot schedule a light path between a desired source node and a desired destination node using already-illuminated wavelengths, illuminating an additional wavelength of light in one or more optical fibers may add sufficient bandwidth to accommodate a data transfer request. However, illuminating the wavelength may detrimentally affect traffic being carried by already-illuminated wavelengths in the same branch or in other branches of the network. Similarly, extinguishing an illuminated wavelength may detrimentally affect traffic being carried by other wavelengths in the same branch or other branches of the network.

When a wavelength of light is switched on and off in a meshed network, existing channels (illuminated wavelengths) in the same fiber experience two types of impairments: fast transients and steady-state channel quality variations. Some of these impairments result from a combination of causes, including randomness in EDFA gain, accumulation of amplified spontaneous noise and issues caused by constant-gain control circuits in EDFAs. Cross-channel power coupling may also cause impairments.

EDFAs employ feedback circuits to maintain constant gain or constant power output. However, response times of these feedback circuits are on the order of about 1 ms or longer. As noted, an EDFA amplifies all in-band wavelengths of light. Thus, a sudden change in power to an input of an amplifier, such as due to a channel (wavelength) being added or dropped, causes a large transient of up to several dB in all channels of the amplifier's output, until the feedback circuit restores nominal operation. This transient may cause one or more of the in-use channels to be over-amplified or under-amplified and, therefore, to become out-of-specification downstream, such as at inputs of subsequent amplifiers or optical receivers. At typical optical network speeds, at least tens of millions of data symbols are transmitted in 1 ms. Thus, during the time taken by the feedback circuit to restore nominal operation, much data can be lost.

Prior art methods for adding or deleting a channel (illuminating or extinguishing a wavelength) in an optical communication network involve a time-consuming manual process of gradually adding or deleting the channel, one hop at a time, ramping up or down optical signal levels and manually checking for unacceptable impairment of existing channels in the hop and in other hops that are optically connected to the hop. Currently, this process takes about 17 minutes to add or delete a channel for a coast-to-coast connection. Consequently, in the prior art, once set up, channels are usually left in place for days and handle multiple transactions. Clearly, a faster and more efficient mechanism for adding and deleting wavelengths (channels) is desirable.

SUMMARY OF EMBODIMENTS

An embodiment of the present invention provides a method for scheduling a data transmission via a wavelength-division multiplexed optical communication network. The network includes a plurality of nodes and a plurality of links interconnecting the nodes. Each link includes at least one link-length optical fiber. At least some of the nodes are access nodes.

The method includes storing, in an electronic memory, information about topology of the optical communication network. The method also includes storing, in the electronic memory, information indicating: (i) which wavelengths are illuminated in ones of the link-length optical fibers, (ii) which wavelengths in ones of the link-length optical fibers are assigned to carry traffic and (iii) for each wavelength/link-length optical fiber combination that is assigned to carry traffic, a start time of an assignment and an end time of the assignment.

The method also includes receiving a first electronic signal. The first electronic signal indicates: (a) a request to transport proposed traffic over the optical communication network between a source access node and a destination access node and (b) an amount of the proposed traffic.

The method includes using the amount of the proposed traffic to calculate an assignment duration sufficient to carry the proposed traffic.

The method also includes automatically searching the information in the electronic memory for a set of the link-length optical fibers. The set of link-length optical fibers extends contiguously between the source access node and the destination access node. In addition, at least one wavelength in common among all the link-length optical fibers of the set is illuminated. Furthermore, each combination of the at least one wavelength and a link-length optical fiber of the set is available to carry traffic at some common start time and thereafter for at least the calculated assignment duration.

If the set of link-length optical fibers is found, the method automatically selects a wavelength of the at least one wavelength in common and alters the information stored in the electronic memory so as to indicate, for each link-length optical fiber of the set, the selected wavelength is assigned to carry traffic beginning at the common start time and thereafter for the calculated assignment duration. In addition, a second electronic signal is sent indicating the set of link-length optical fibers, the selected wavelength and the common start time.

Using the amount of the proposed traffic to calculate the assignment duration sufficient to carry the proposed traffic may include calculating the assignment duration as other than an integral multiple of a fixed time slot duration.

Automatically searching the information in the electronic memory for the set of the link-length optical fibers may occur upon receipt of the first electronic signal, without waiting for a next fixed time slot occurrence.

The common start time may be independent of timing of a next fixed time slot occurrence.

Optionally, if the set of optical fibers is not found, the method may include automatically sending a third electronic signal indicating a failure to schedule transport of the proposed traffic.

Automatically searching the information in the electronic memory for the set of the link-length optical fibers may include: (a) automatically determining a path comprising a subset of the plurality of links, such that links of the subset extend contiguously between the source access node and the destination access node; (b) setting a lower limit equal to an initial time; (c) for each link of the path, automatically determining an earliest start time, no earlier than the lower limit, at which at least one link-length optical fiber of the link is available to carry traffic, thereby in aggregate identifying at least one first possible start time; (d) selecting a latest one of the at least one first possible start time, thereby selecting a first candidate start time; (e) for each link of the path, automatically determining an earliest start time, no earlier than the first candidate start time, at which a link-length optical fiber of the link is available to carry traffic, thereby in aggregate identifying at least one second possible start time; (f) selecting a latest one of the at least one second possible start time, thereby selecting a second candidate start time; (g) comparing the first candidate start time to the second candidate start time; (h) if, as a result of the comparing, the first candidate start time is found to be equal to the second candidate start time: (i) selecting the first candidate start time as the common start time; and (ii) for each link of the path, selecting the link-length optical fiber of the link that is available to carry traffic, thereby in aggregate selecting the set of the link-length optical fibers; otherwise, if a predetermined stopping criterion is not met: (i) setting the lower limit equal to the second candidate start time; and (ii) repeating (b) to (h).

Determining an earliest start time, no earlier than the lower limit, may include automatically determining the earliest start time without regard to timing of a next fixed time slot occurrence and determining an earliest start time, no earlier than the first candidate start time, comprises automatically determining the earliest start time without regard to timing of a next fixed time slot occurrence.

Identifying the at least one first possible start time may include, for each link of the path, automatically determining the earliest start time, no earlier than the lower limit, at which the at least one link-length optical fiber of the link is available to carry traffic, including thereafter for at least the calculated assignment duration and identifying the at least one second possible start time comprises, for each link of the path, automatically determining the earliest start time, no earlier than the first candidate start time, at which the at least one link-length optical fiber of the link is available to carry traffic, including thereafter for at least the calculated assignment duration.

The initial time may represent a current time. The initial time may represent a future time.

Determining the path may include automatically finding a lowest cost path between the source access node and the destination access node.

The lowest cost path may include a path having a fewest number of links between the source access node and the destination access node.

Each link of the plurality of links may be associated with a respective link cost. Determining the path may include automatically determining a least cost path that has a lowest total link cost.

Each link cost may be based at least in part on a number of optical amplifiers disposed along the associated link.

Determining the path may include receiving an electronic signal from another system, wherein the electronic signal indicates the links of the path.

Optionally, for each illuminated wavelength of the path, the method includes repeating (b) to (h). Automatically determining the earliest start time may include automatically determining an earliest start time/wavelength combination, no earlier than the lower limit or the first candidate start time as the case may be, at which at least one link-length optical fiber, with the illuminated wavelength, is available to carry traffic. The at least one first possible start time may include an at least one start time/wavelength combination. The at least one second possible start time may include an at least one start time/wavelength combination. Selecting the latest one of the at least one first possible start time may include selecting a latest start time/wavelength combination. The first candidate start time may include a first candidate start time/wavelength combination. The second candidate start time may include a second candidate start time/wavelength combination. Selecting the first candidate start time as the common start time may include selecting the start time of the first candidate start time/wavelength combination as the common start time and selecting the wavelength of the first candidate start time/wavelength combination as the wavelength in common.

The at least one link-length optical fiber of the plurality of links may collectively form a plurality of optical fibers. The wavelength-division multiplexed optical communication network may include a plurality of optical amplifiers. The plurality of optical fibers may interconnect the plurality of optical amplifiers. The method may further include storing, in the electronic memory, information characterizing channel impairments imposed by ones of the plurality of optical amplifiers, and by ones of the plurality of optical fibers, for each wavelength of a plurality of wavelengths. The method may also include receiving a fourth electronic signal indicating a proposed route for the proposed traffic, the fourth electronic signal identifying a subset of the plurality of optical fibers through which the proposed traffic would be carried, wherein carrying the proposed traffic via the proposed route would require illuminating, in at least one optical fiber of the subset of the plurality of optical fibers, a wavelength of light not currently illuminated in the at least one optical fiber.

The information characterizing the channel impairments and the indication of the wavelength of light not currently illuminated may be used to automatically calculate consequential impairments of other traffic carried via other wavelengths by optical fibers and optical amplifiers that would carry the proposed traffic. The consequential impairments would result from illuminating the wavelength of light not currently illuminated.

The consequential impairments are compared to a predetermined limit to determine whether the consequential impairments would exceed the predetermined limit.

If, as a result of the comparing, it is determined the consequential impairments would exceed the predetermined limits, a fifth electronic signal may be sent indicating rejection of the proposed route.

If, as a result of the comparing, it is determined the consequential impairments would not exceed the predetermined limits, a sixth electronic signal may be sent indicating acceptance of the proposed route.

The method may also include, in response to the sixth electronic signal, automatically illuminating, in at least one optical fiber of the subset of the plurality of optical fibers, the wavelength of light not currently illuminated.

The method may also include, in response to the sixth electronic signal, automatically carrying the proposed traffic via the proposed route.

The method may also include receiving the fifth electronic signal and, in response to receiving the fifth electronic signal, automatically selecting a different proposed route for the proposed traffic. Another fourth electronic signal may be sent containing the different proposed route for the proposed traffic.

The method may also include using the selected wavelength to automatically carry the proposed traffic over the set of the link-length optical fibers, between the source access node and the destination access node, beginning at the common start time.

Another embodiment of the present invention provides a traffic scheduler for a wavelength-division multiplexed optical communication network. The network includes a plurality of nodes and a plurality of links interconnecting the nodes. Each link includes at least one link-length optical fiber. At least some of the nodes are access nodes.

The scheduler includes a database storing information about topology of the optical communication network. The database also stores information indicating: (i) which wavelengths are illuminated in ones of the link-length optical fibers, (ii) which wavelengths in ones of the link-length optical fibers are assigned to carry traffic and (iii) for each wavelength/link-length optical fiber combination that is assigned to carry traffic, a start time of an assignment and an end time of the assignment.

A traffic request receiver is configured to receive a first electronic signal indicating: (a) a request to transport proposed traffic over the optical communication network between a source access node and a destination access node and (b) an amount of the proposed traffic.

A duration calculator is configured to automatically calculate a calculated assignment duration based on the amount of the proposed traffic.

A link-length optical fiber search engine is configured to automatically search the information in the database for a set of the link-length optical fibers. The set of link-length optical fibers extends contiguously between the source access node and the destination access node. At least one wavelength in common among all the link-length optical fibers of the set is illuminated. Each combination of the at least one wavelength and a link-length optical fiber of the set is available to carry traffic at some common start time and thereafter for at least the calculated assignment duration.

A wavelength selector is configured to, if the set of link-length optical fibers is found, automatically select a wavelength of the at least one wavelength in common.

A database updater is configured to, if the set of link-length optical fibers is found, alter the information stored in the electronic memory so as to indicate, for each link-length optical fiber of the set, the selected wavelength is assigned to carry traffic beginning at the common start time and thereafter for the calculated assignment duration.

A success/failure signal sender is configured to, if the set of link-length optical fibers is found, send a second electronic signal indicating the set of link-length optical fibers, the selected wavelength and the common start time.

The link-length optical fiber search engine may include a path determinator configured to determine a path comprising a subset of the plurality of links, such that links of the subset extend contiguously between the source access node and the destination access node. A lower limit setter may be configured to set a lower limit equal to an initial time. A first earliest start time finder may be configured to automatically determine, for each link of the path, an earliest start time, no earlier than the lower limit, at which at least one link-length optical fiber of the link is available to carry traffic for the calculated assignment duration, thereby in aggregate identifying at least one first possible start time. A first candidate start time selector may be configured to select a latest one of the at least one first possible start time, thereby selecting a first candidate start time. A second earliest start time finder may be configured to automatically determine, for each link of the path, an earliest start time, no earlier than the first candidate start time, at which at least one link-length optical fiber of the link is available to carry traffic, thereby in aggregate identifying at least one first possible start time. A second candidate start time selector may be configured to select a latest one of the at least one second possible start time, thereby selecting a second candidate start time.

A comparator may be configured to compare the first candidate start time to the second candidate start time. A common start time selector may be configured to, if the first candidate start time equals the second candidate start time, select the first candidate start time as the common start time. A link-length optical fiber selector may be configured to select, for each link of the path, the link-length optical fiber of the link that is available to carry traffic, thereby in aggregate selecting the set of the link-length optical fibers. A loop controller may be configured to, if the first candidate start time does not equal the second candidate start time and a predetermined stopping criterion is not met, return control to the lower limit setter, which is configured to set the lower limit equal to the second candidate start time and pass control to the first earliest start time finder.

Yet another embodiment of the present invention provides a method for managing a wavelength-division multiplexed optical communication network. The network includes a plurality of optical amplifiers and a plurality of optical fibers interconnecting the plurality of optical amplifiers. The method includes storing, in an electronic memory, information characterizing channel impairments. The impairments are imposed by ones of the plurality of optical amplifiers and by ones of the plurality of optical fibers. The impairments are stored for each wavelength of a plurality of wavelengths.

A first electronic signal in received indicating a request to transport proposed traffic over the wavelength-division multiplexed optical communication network. A second electronic signal is received indicating a proposed route for the proposed traffic. The second electronic signal identifies a subset of the plurality of optical fibers through which the proposed traffic would be carried. Carrying the proposed traffic via the proposed route would require illuminating, in at least one optical fiber of the subset of the plurality of optical fibers, a wavelength of light not currently illuminated in the at least one optical fiber.

The information characterizing the channel impairments and the indication of the wavelength of light not currently illuminated is used to automatically calculate consequential impairments of other traffic carried via other wavelengths by optical fibers and optical amplifiers that would carry the proposed traffic. The consequential impairments would result from illuminating the wavelength of light not currently illuminated.

The consequential impairments are compared to a predetermined limit to determine whether the consequential impairments would exceed the predetermined limit. If, as a result of the comparison, it is determined the consequential impairments would exceed the predetermined limits, a third electronic signal is sent indicating rejection of the proposed route. If, as a result of the comparison, it is determined the consequential impairments would not exceed the predetermined limits, a fourth electronic signal is sent indicating acceptance of the proposed route.

Optionally, the third electronic signal may be received and, in response to receiving the third electronic signal, a different proposed route for the proposed traffic may be automatically selected and another second electronic signal containing the different proposed route for the proposed traffic may be sent.

Optionally, the fourth electronic signal may be received and, in response to receiving the fourth electronic signal, the wavelength of light not currently illuminated may be illuminated in the at least one optical fiber and the proposed traffic may be carried via the proposed route.

BRIEF DESCRIPTION OF THE DRAWINGS

The invention will be more fully understood by referring to the following Detailed Description of Specific Embodiments in conjunction with the Drawings, of which:

FIG. 11 is a schematic diagram of an optical amplifier impairment matrix in the information of FIG. 10.

FIG. 12 is a schematic diagram illustrating information that is stored in the database of FIG. 5 for each optical splitter, optical combiner, OXC, etc., of a network, such as the network of FIG. 1, according to an embodiment of the present invention.

FIGS. 25, 26 and 27 schematically illustrate exemplary operation of one of the dummy lasers of FIG. 24, in response to changes in traffic-carrying wavelengths being illuminated and extinguished in an optical fiber, according to an embodiment of the present invention.

FIG. 55 is a schematic block diagram illustrating an experimental setup, according to an embodiment of the present invention.

FIG. 56 is a schematic diagram of: (a) a step switching function and (b) an adiabatic switching function of a raised-cosine function, according to an embodiment of the present invention.

DETAILED DESCRIPTION OF SPECIFIC EMBODIMENTS

In accordance with embodiments of the present invention, methods and apparatus are disclosed for selecting a single-wavelength light path between a source access node and a destination access node of a wavelength-division multiplexed optical network, including selecting an illuminated wavelength of the light path and selecting a start time and duration for a data transfer that would not interfere with other data transfers. The disclosed methods and apparatus can select the light path many times faster than in the prior art, thereby significantly increasing efficiency of the network.

If no start time/wavelength combination is available with sufficient duration, i.e., a request to transport the data over the optical network is blocked, and it is necessary to illuminate an additional wavelength of light to increase bandwidth of the network, embodiments of the present invention provide automatic methods and apparatus to select and illuminate the additional wavelength quickly, within milliseconds, without impairing traffic being carried by other wavelengths in the network, and without the time-consuming manual process of the prior art.

Some embodiments of the present invention utilize a novel process for scheduling wavelength assignments. In some embodiments, the scheduling process includes selecting a set of optical fibers, a wavelength, a start time and an end time to transport proposed traffic. Some embodiments include a novel scheduler that avoids checking every possible start time, thereby saving significant processing time. Furthermore, embodiments of the present invention schedule single-wavelength light paths, whereas prior art schedulers rely on complex wavelength shifting schemes.

Some embodiments of the present invention maintain databases that store information about optical amplifiers, optical fibers, etc. used to implement an optical network. Each such database stores information about wavelengths that are currently illuminated in the optical network, as well as information about impairments to optical signals that the amplifiers, etc. would cause at various combinations of wavelength and power level. This information enables the embodiments to automatically calculate magnitudes of impairments to current traffic that would be caused by illuminating or extinguishing a wavelength in an optical fiber of the network. If the magnitudes of the impairments would be tolerable, the wavelength is automatically illuminated or extinguished, as the case may be, without the prior art manual trial-and-error method. However, if the magnitudes of the impairments would not be tolerable, the wavelength is not illuminated or extinguished, and a failure indication is generated instead. In either case, results are available quickly, within milliseconds, thereby increasing efficiency of the network.

Optical Network

Figure 1:
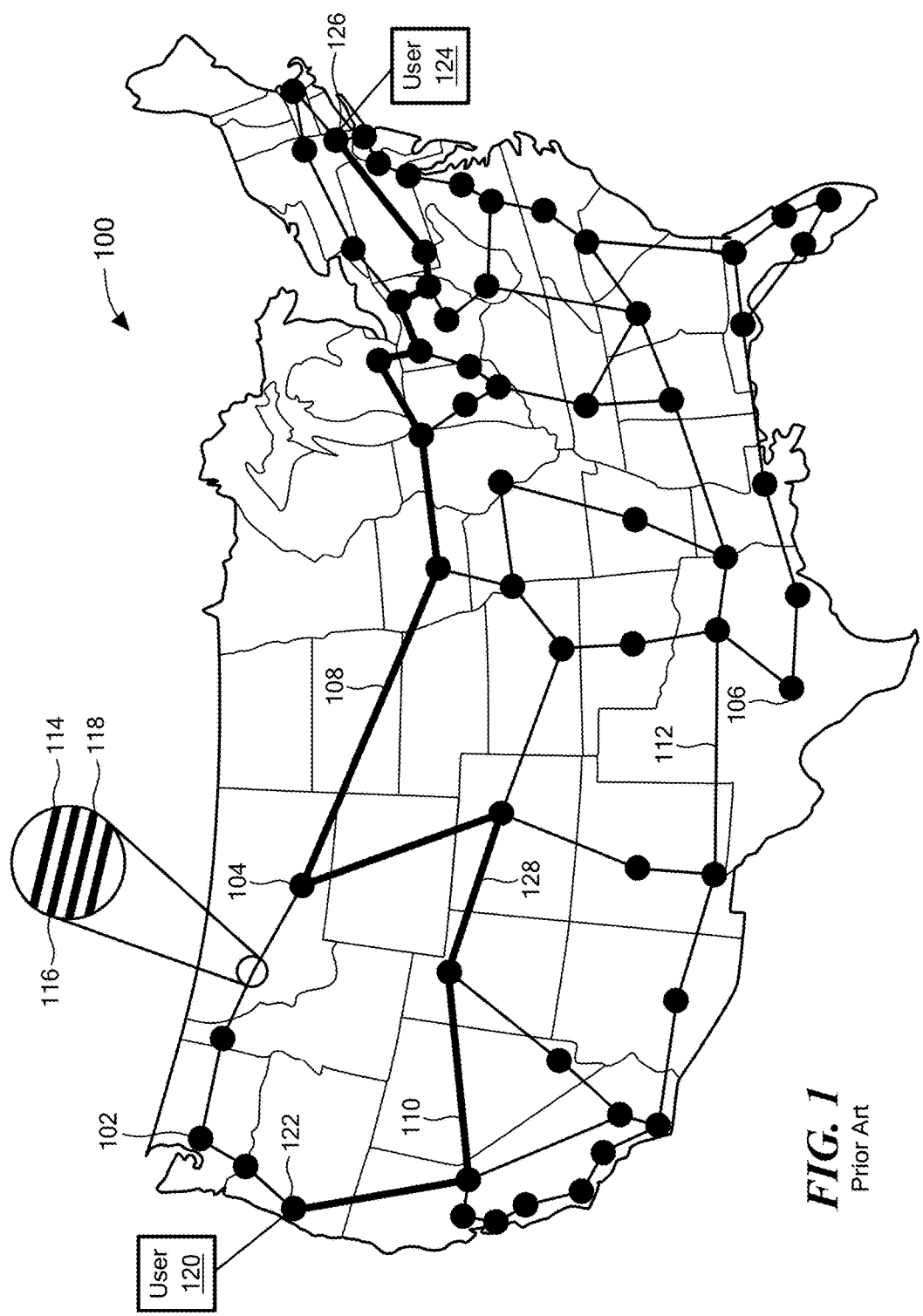
FIG. 1 is a map of the United States showing a representative U.S. carrier backbone wavelength-division multiplexed optical network, according to the prior art. Embodiments of the present invention may be deployed within, and used to manage and schedule data transmissions through, such a network.

FIG. 1 is a map of the United States showing a representative U.S. carrier backbone wavelength-division multiplexed optical network 100. The network 100 has 60 nodes, represented by nodes 102, 104 and 106. As used herein, a "node" includes a location within a network where two or more optical fibers join or split, such as via an optical combiner, optical splitter or OXC. Embodiments of the present invention may be deployed within, and used to manage and schedule data transmissions through, the optical network 100 or another optical network. To facilitate explanation, exemplary embodiments are described with reference to the optical network 100; however, these and other embodiments may be used with other optical networks.

The nodes 102-106 are interconnected by 77 links, represented by links 108, 110 and 112. Each link 108-112 extends between two adjacent nodes 102-106. The average link length is about 450 km. Each link includes at least one link-length optical fiber, as schematically exemplified by link-length optical fibers 114, 116 and 118.

As used herein, a "link-length optical fiber" means a single optical fiber that extends between respective ends of a link or a series of two or more contiguous optical fibers, arranged end-to-end, that collectively extend between the respective ends of the link. "Contiguous" means optically coupled end-to-end, optionally with an active or passive optical device, such as an optical amplifier, splitter, combiner or OXC, between adjacent optical fibers. A contiguous set of optical fibers provides an all-optical path through the entire set of optical fibers. To provide sufficient bandwidth, a link may include more than one link-length optical fiber.

All the link-length optical fibers of a given link are essentially parallel, and each link-length optical fiber extends between the respective ends of the link. For simplicity, link-length optical fibers 114-118 are referred to herein simply as optical fibers 114-118.

Optical amplifiers (not shown) may be disposed at some or all of the nodes 102-106. Optionally or alternatively, depending on a link's length, one or more optical amplifiers (not shown) may be disposed along the length of the link. In the network of FIG. 1, the optical amplifiers are spaced about 80 km apart. However, the number of nodes, links, optical amplifiers, distances therebetween, etc., are exemplary of an optical network. Other optical networks, in which embodiments of the present invention may be used, may have other numbers of nodes, links, optical amplifiers, spacings, etc.

Each optical fiber 114-118 is capable of carrying at least one wavelength ("color") of light, referred herein to as a "channel." In the network 100, each optical fiber 114-118 is capable of carrying about 200 channels, although the number of channels is irrelevant, with respect to embodiments of the present invention. In general, the optical fibers 114-118 may be used for unidirectional or bidirectional communication between ends the fibers. Traffic (data, voice, video, etc.) is carried over an optical fiber 114-118 by modulated light. Representative modulation schemes include, but are not limited to, phase-shift keying (PSK), on-off keying (OOK) and quadrature amplitude modulation (QAM) for both direct detection and coherent detection. Exemplary embodiments are described using OOK and direct detection. However, these and other embodiments may be modified to use coherent detection and/or other modulation schemes.

Although smaller networks, such as metropolitan area networks (MANs) (not shown), may be coupled to the network 100, and other networks (not shown) may be implemented by tunneling through the network 100, for simplicity of explanation, end users are assumed to be directly coupled to some or all of the nodes 102-106 of the network 100. A node to which an end user is coupled is referred to as an "access node." Thus, for example, a user computer 120 in Oregon may be coupled to an access node 122 and may request transport of traffic to another user computer 124 coupled to an access node 126 in New York.

To avoid wavelength shifting, a given user's traffic is sent over several hops, from a source node, such as access node 122, to a destination node, such as access node 126, using a single wavelength. Collectively, the links defined by the hops are referred to as a "path." A path extends from a source access node to a destination access node. An exemplary path 128 for the traffic between the user computers 120 and 124, i.e. between the access nodes 122 and 126, is shown by a heavy line.

Sometimes paths are selected based on cost, where each link has an associated cost. In such cases, a least-cost path is selected. Cost of a path may be calculated or assigned, such as by summing costs of the links of the path. Cost may be based on a number of optical amplifiers installed along a link-length fiber of a link, length of the link, actual cost to install and/or maintain the link, traffic capacity and/or demand on the link, time of day, day of week, number of links in the path or other criterion or combinations thereof.

If each link of a path has only one optical fiber, a combination of a path and a single wavelength used along the entire path is referred to as a "lightpath." If at least one of the links of a path has more than one optical fiber, the term lightpath refers to a series of contiguous link-length optical fibers that extends the entire length of the path and a single wavelength used along the entire series of optical fibers.

A lightpath is used to fulfill a single request for data transfer, typically a single large data transfer, which is referred to as a "flow" or "transaction." A lightpath is assigned exclusively to the flow, such as during an entire scheduled transmission time. Once the flow completes, resources of the lightpath are made available for other flows. It should be noted that the other flows may follow other paths. That is, once the flow completes, the links and wavelengths of the lightpath are not necessarily used together again for a subsequent flow.

A single user's traffic may not, however, justify assigning a lightpath to the traffic. In such cases, multiple users' traffic may be aggregated, such as by a MAN or an access network, and presented to the backbone network 100 as a single flow. On the other hand, a single user's traffic may exceed the capacity of a single lightpath. In such cases, multiple lightpaths, not necessarily following identical paths, may be assigned to carry the user's traffic. For simplicity of description, no user aggregation is assumed, and a single lightpath is assumed to be sufficient for a user's traffic.

As noted, optical amplifiers (not shown) are disposed at the nodes 102-106 and/or along the links 108-112 to maintain desired optical signal levels in the optical network 100, particularly where the optical signals enter other optical amplifiers and optical receivers (not shown). In addition, OXCs, optical signal splitters, optical signal combiners, etc. (not shown) may be disposed at the nodes 102-106. Collectively, the optical fibers 114-116, OXCs, optical signal splitters, optical signal combiners, etc. define a topology of the optical network 100.

Figure 2:
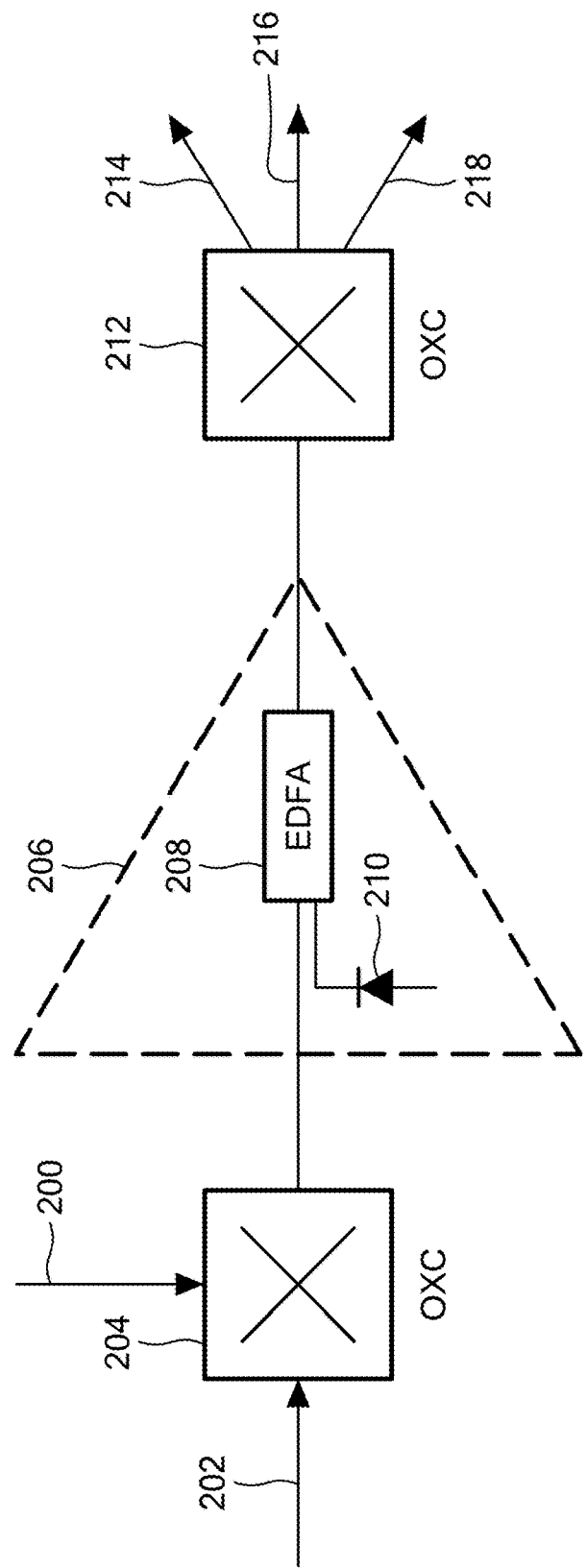
FIG. 2 is a schematic diagram of a hypothetical set of optical components that may be found at a node of the optical network of FIG. 1.

FIG. 2 is a schematic diagram of a hypothetical set of optical components that may be found at a node 102-106 of the network 100. Two optical fibers 200 and 202 from respective links 108-112 terminate at respective input ports of a first OXC 204. An output port of the OXC is optically coupled to an input port of an optical amplifier 206. The optical amplifier 206 may include an EDFA 208 pumped by a laser 210. An output port of the optical amplifier 206 is optically coupled to an input port of a second OXC 212, and respective output ports of the OXC 212 are optically coupled to ends of optical fibers 214, 216 and 218 of respective other links 108-112.

Wavelength Scheduler

Figure 3:
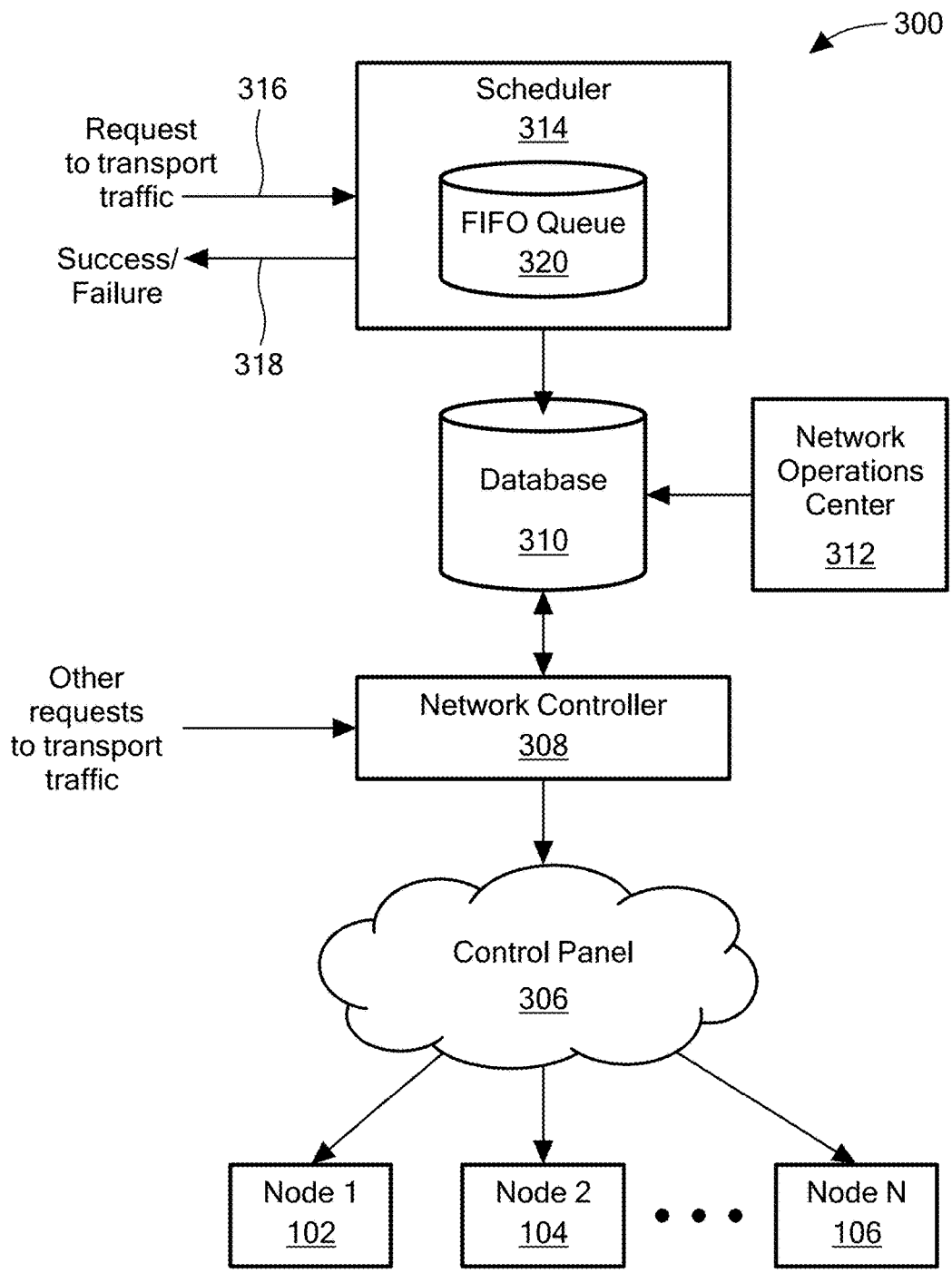
FIG. 3 is a schematic block diagram of a control scheme for an optical network, such as the optical network of FIG. 1, according to an embodiment of the present invention.

FIG. 3 is a schematic block diagram of a control scheme 300 for an optical network, such as the optical network 100. The nodes 102-106 of the optical network 100 are communicatively coupled via a control plane 306 to a network controller 308. The network controller 308 sends commands to the nodes 102-106 to control optical amplifiers, OXCs, etc. of the network 100, such as to set paths through the OXCs and illuminate or extinguish wavelengths of light generated by optical transmitters. The network controller 308 also sends commands to access nodes of the network 100, such as to admit traffic from user computers, MANs coupled to the network 100 and the like. At least some of these operations by the network controller 308 are driven by data in a database 310. Optionally, a network operations center 312 may store information in the database 310, such as to set up long-term optical connections through the network 100. The network controller 308 reads and writes information in the database 310 to change states of components of the network 100 or to reflect current states of the components.

A scheduler 314, according to embodiments of the present invention, receives requests 316 to transport traffic over the optical network 100. The requests 316 are in the form of electronic signals, such as a voltage on a wire, an optical signal on an optical fiber, a message packet received via wire or optical medium or any other suitable way. For example, the message packet may be transported via an IP network. The request may be received via a control plane. The scheduler 314 also sends electronic signals 318, such as success or failure indications.

In some embodiments, the scheduler 314 automatically assigns wavelengths (channels) to traffic. In some embodiments, the scheduler 314 automatically determines whether a wavelength can be illuminated or extinguished, without unacceptably impairing current traffic. In either case, the scheduler 314 reads information stored in the database 310 to ascertain a current state of the optical network 100, and the scheduler writes information in the database 310 to command changes be made to the state of the network 100. As noted, the network controller 308 uses information in the database 310, including information written by the scheduler 314, to control operation of components of the network 100.

In some embodiments, the scheduler 314 queues requests to transport traffic, such as if multiple requests to transport traffic arrive within a relatively short period of time, such as while the scheduler 314 is attempting to schedule one such request. For this purpose, the scheduler 314 maintains a FIFO queue 320. Optionally, the scheduler 314 may take urgent requests to transport traffic, so identified by a flag or other appropriate indicator, out of turn, preempting other requests, such as requests that are enqueued on the FIFO queue 320.

In some embodiments, the scheduler 314 is implemented as a central scheduling system, and in other embodiments, the scheduler 314 is implemented as a distributed scheduling system. For example, in a distributed scheduling system, each node may include a local distributed scheduler and a local version of the database 310 or a portion of the database 310. The local distributed schedulers cooperate to collectively schedule traffic on the optical network 100. The local databases may be synchronized by any conventional distributed database synchronizing mechanism.

Figure 4:
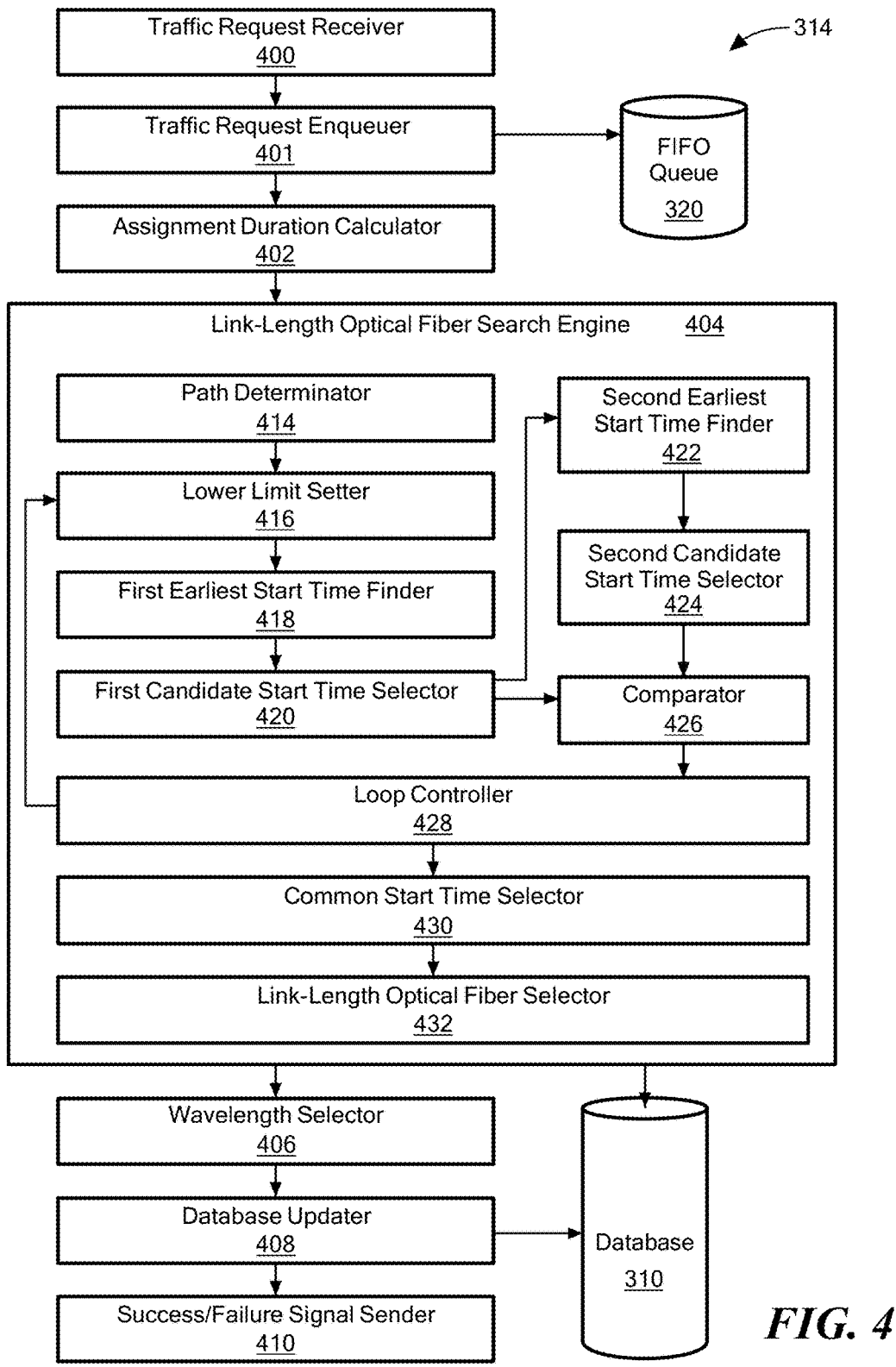
FIG. 4 is a schematic block diagram of a scheduler of FIG. 3, according to an embodiment of the present invention.

In either case, by writing in the database 310, the scheduler 314 causes the network controller 308 to send signals, via the control plane 306, to instruct the nodes 102-106. These instructions may include instructions to configure optical components, such as OXCs (such as OXC 204 or 212 in FIG. 2), at the nodes 102-106. For example, these instructions may specify switching paths through the OXCs. As a result of executing the instructions, the nodes 102-106 accept data from source user computers, such as the user computer 120 (FIG. 1), and transport the data beginning at specified start times, for specified durations, using specified wavelengths, over specified optical fibers 114-118 in specified links 108-112, to destination user computers, such as the user computer 124. FIG. 4 is a schematic block diagram of the scheduler 314. Components of the scheduler 314 are described in more detail herein.

Database

The database 310 stores information about the optical network 100 that enables the scheduler 314 to automatically assign wavelengths (channels) to traffic and/or to automatically determine whether a wavelength can be illuminated or extinguished, without unacceptably impairing current traffic.

Figure 5:
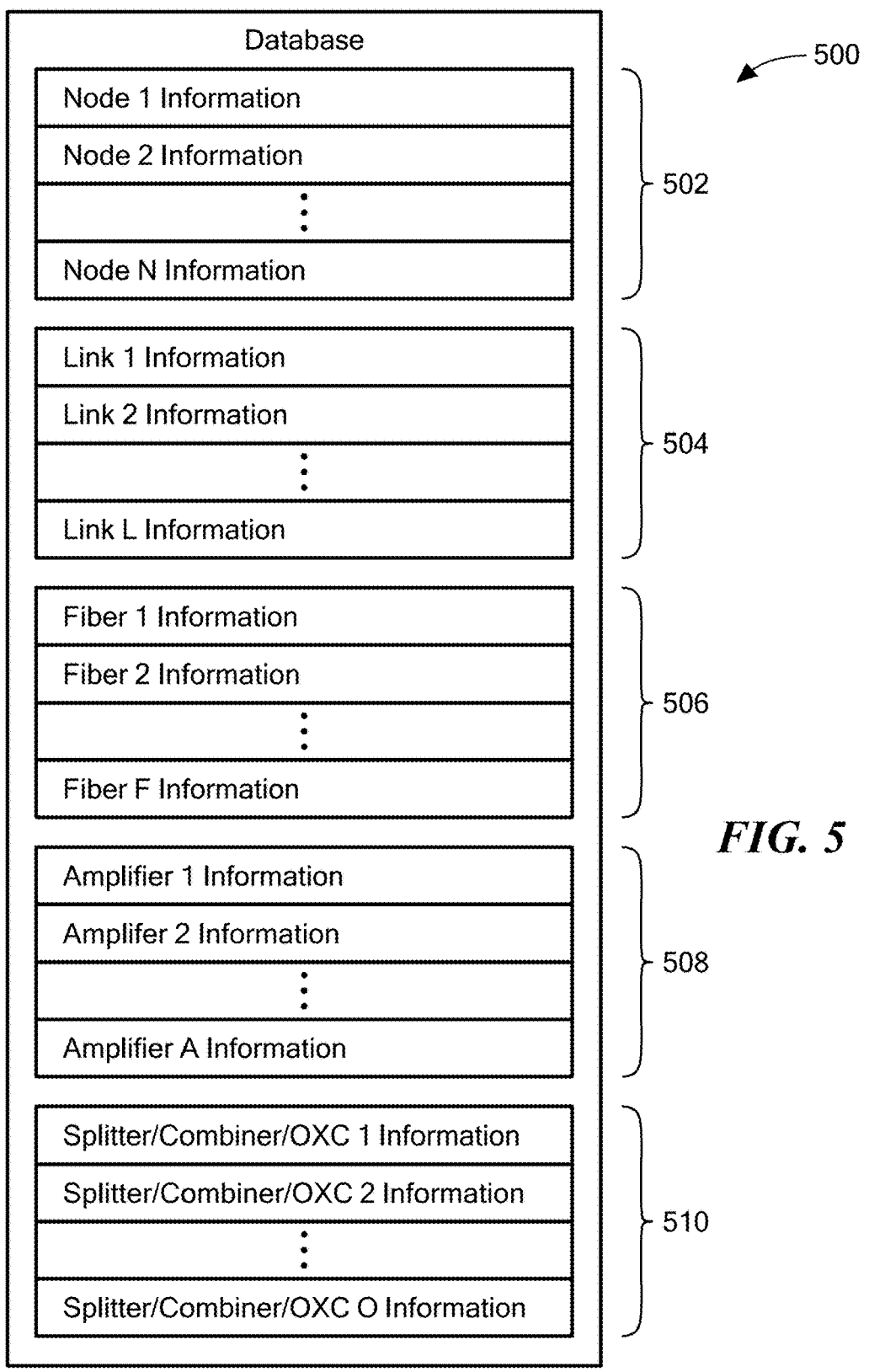
FIG. 5 is a schematic diagram illustrating information stored in a database of FIG. 3 or 4, according to an embodiment of the present invention.

FIG. 5 is a schematic diagram illustrating information 500 stored in the database 310, according to an embodiment of the present invention. The information 500 includes information 502 about the nodes 102-106 of the network 100, information 504 about the links 108-112 of the network 100, information 506 about the optical fibers 114-118 of the network 100, information 508 about the optical amplifiers, such as amplifier 206, of the network 100 and information 510 about the other optical components, such as optical splitters, optical combiners, OXCs, such as OXCs 204 and 212, etc., of the network 100.

The information 502 about the nodes 102-106 includes information about each node 102-106 of the optical network 100. Although FIG. 5 shows a separate entry in the database 310 for each node, the information 502 may be organized differently, as long as information about each node can be automatically ascertained from the information 502. For example, entries for nodes that are similarly configured may all refer to a single area that describes common aspects of the nodes.

Figure 6:
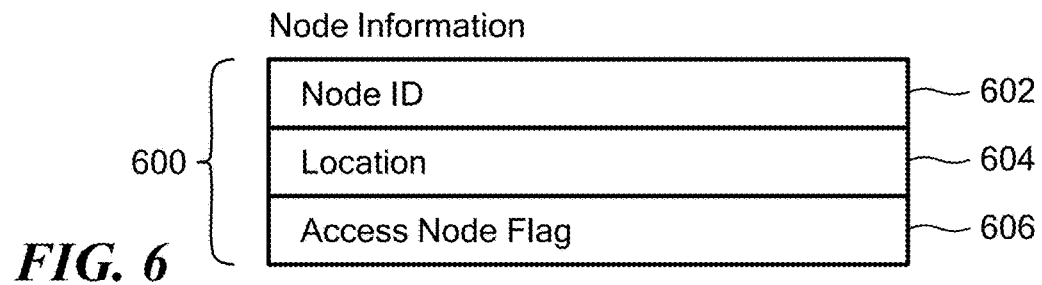
FIG. 6 is a schematic diagram illustrating information that is stored in the database of FIG. 5 for each node of a network, such as the network of FIG. 1, according to an embodiment of the present invention.

FIG. 6 is a schematic diagram illustrating information 600 that is stored in the database 310 for each node 102-106, according to an embodiment of the present invention. The information 600 of FIG. 6 corresponds to information about one node in the information 502 of FIG. 5. A node identifier 602 uniquely identifies the node 102-106. A node location 604 contains a geographic location of physical equipment that implements the node 102-106, such as city, street address, floor, isle, server, etc. A binary access node flag 606 indicates whether the node 102-106 is an access node.

The information 504 (FIG. 5) about the links 108-112 includes information about each link 108-112 of the optical network 100. Although FIG. 5 shows a separate entry in the database 310 for each link, the information 504 may be organized differently, as long as information about each link can be automatically ascertained from the information 504. For example, entries for links that are similarly configured may all refer to a single area that describes common aspects of the links.

Figure 7:
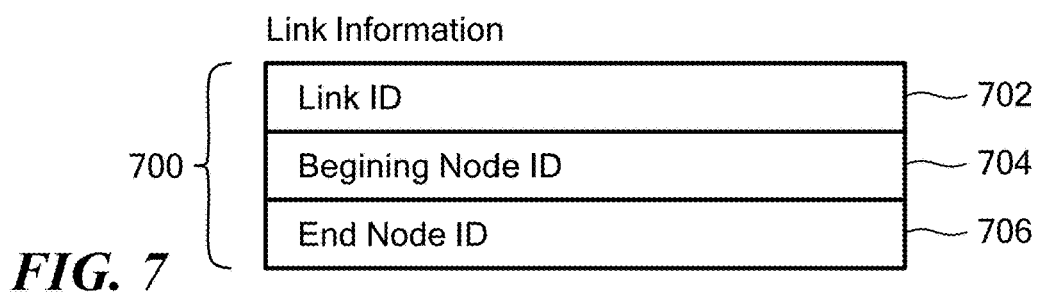
FIG. 7 is a schematic diagram illustrating information that is stored in the database of FIG. 5 for each link of a network, such as the network of FIG. 1, according to an embodiment of the present invention.

FIG. 7 is a schematic diagram illustrating information 700 that is stored in the database 310 for each link 108-112, according to an embodiment of the present invention. A link identifier 702 uniquely identifies the link 108-112. A beginning node identifier 704 identifies the node 102-106 where the link begins, and an end node identifier identifies the node 102-106 where the link ends. Collectively, the information 502 and 504 (FIG. 5) defines the topology of the optical network 100, down to a link level of granularity.

The information 506 about the fibers 114-118 includes information about each optical fiber 114-118. Although FIG. 5 shows a separate entry in the database 310 for each optical fiber, the information 506 may be organized differently, as long as information about each optical fiber can be automatically ascertained from the information 506. For example, entries for fibers that have similar characteristics may all refer to a single area that describes common aspects of the optical fibers.

Figure 8:
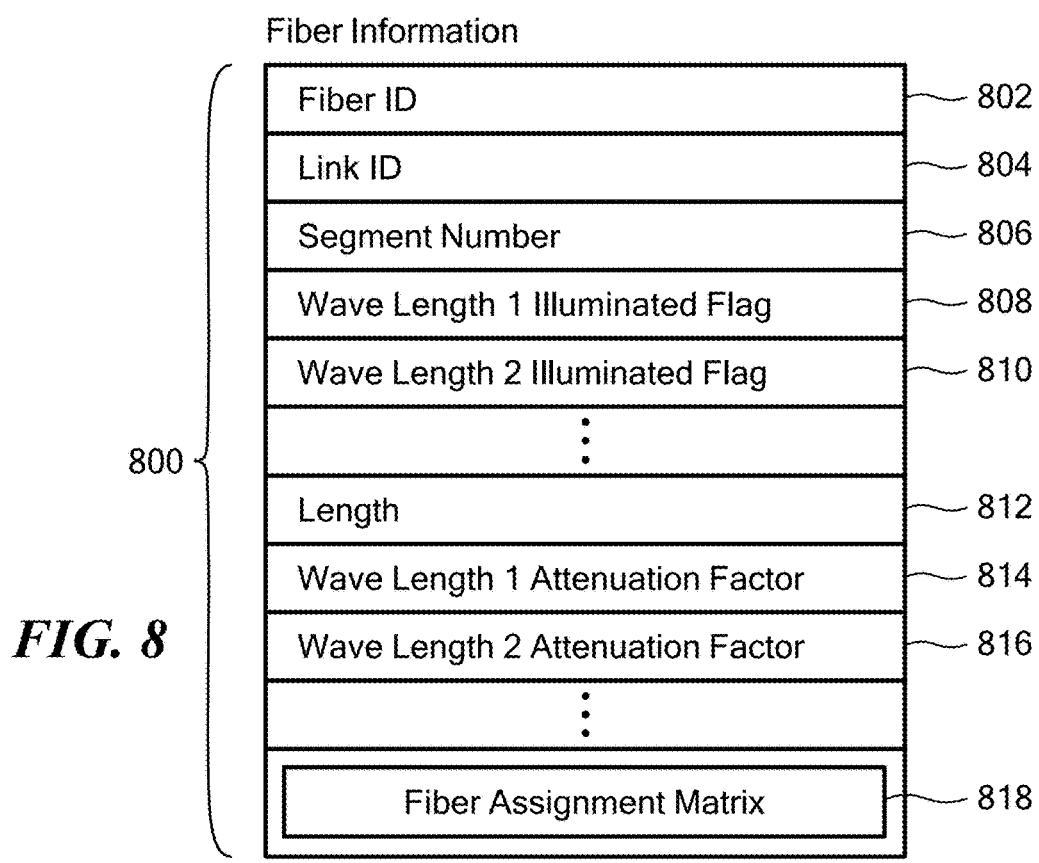
FIG. 8 is a schematic diagram illustrating information that is stored in the database of FIG. 5 for each optical fiber of a network, such as the network of FIG. 1, according to an embodiment of the present invention.

FIG. 8 is a schematic diagram illustrating information 800 that is stored in the database 310 for each optical fiber 114-118, according to an embodiment of the present invention. An optical fiber identifier 802 uniquely identifies the optical fiber 114-118. A link identifier 804 identifies a link, of which this optical fiber is a part. In some cases, several optical fibers are connected in series to extend from one end of the link to the other end of the link, i.e., to form one link-length optical fiber, possibly with an optical amplifier installed between adjacent optical fibers. In these cases, each optical fiber is assigned a segment number 806.

For each wavelength that can be illuminated in the optical fiber 114-118, the information 800 includes a binary wavelength illuminated flag, exemplified by flags 808 and 810. Each flag has a current state, and the state of each flag indicates whether the corresponding wavelength is illuminated in the optical fiber. The length of the optical fiber 114-118 is stored at 812. For each wavelength that can be illuminated in the optical fiber 114-118, the information 800 includes a wavelength attenuation factor, exemplified by factors 814 and 816. If the attenuation factors for all wavelengths that can be illuminated in the optical fiber 114-118 are equal or similar, only one attenuation factor may be stored. Similarly, if ranges of wavelengths have equal or similar attenuation factors, one attenuation factor may be stored for each such range of wavelengths. Thus, the attenuation of an optical signal traversing a given fiber 114-118 can be calculated by the scheduler 314 by multiplying the length 812 of the fiber 114-118 by the appropriate attenuation factor 814-816, depending on the wavelength of the optical signal.

The scheduler 314 assigns optical network resources to flows to enable the optical network to carry the flows. Thus, the scheduler 314 schedules optical fibers 114-118 of a path. Implicitly, scheduling these optical fibers includes scheduling optical amplifiers, OXCs, etc., along the path. This scheduling also includes configuring any components, such as the OXCs, that require configuration. Configuring an OXC includes defining which wavelength on a given input port of the OXC is switched to a given output port.

Because each optical fiber 114-118 can simultaneously carry more than one wavelength of light, the scheduler 314 schedules individual wavelengths on each optical fiber 114-118. Because each flow represents a finite amount of data, each flow requires a finite amount of time to be transported across the optical network 100. The amount of time depends at least in part on signaling speed of the network. Thus, the scheduler 314 schedules each optical fiber/wavelength combination for an amount of time (duration) sufficient to transport the flow.

For example, the scheduler 314 may calculate the duration, such as in milliseconds, by dividing the amount of data to be transported, such as in kilobytes, by the speed of the network, such as in bytes per second. Optionally, the scheduler 314 may round up the duration to any desired level of granularity, such as to a nearest 5 milliseconds. Optionally, a predetermined amount of time, or a predetermined faction of the calculated duration, may be added to the duration. Such rounding or adding may be used to include sufficient time (a safety margin) to resend some of the data, such as in case of a transmission error.

Because a given optical fiber/wavelength combination cannot be shared by two flows at the same time, the scheduler 314 assigns a start time and a duration to each flow. The scheduler 314 ensures that no two flows simultaneously use the same optical fiber/wavelength combination, i.e., that no two flows partially or completely overlap. It should be noted that the start times are not necessarily synchronized to any clock, and the durations are not necessarily integral multiples of any fixed-size time slot. Thus, the assignments may be asynchronous, with respect to each other. In addition, some assignments may be longer, i.e., their durations may be greater, than other assignments.

Figure 9:
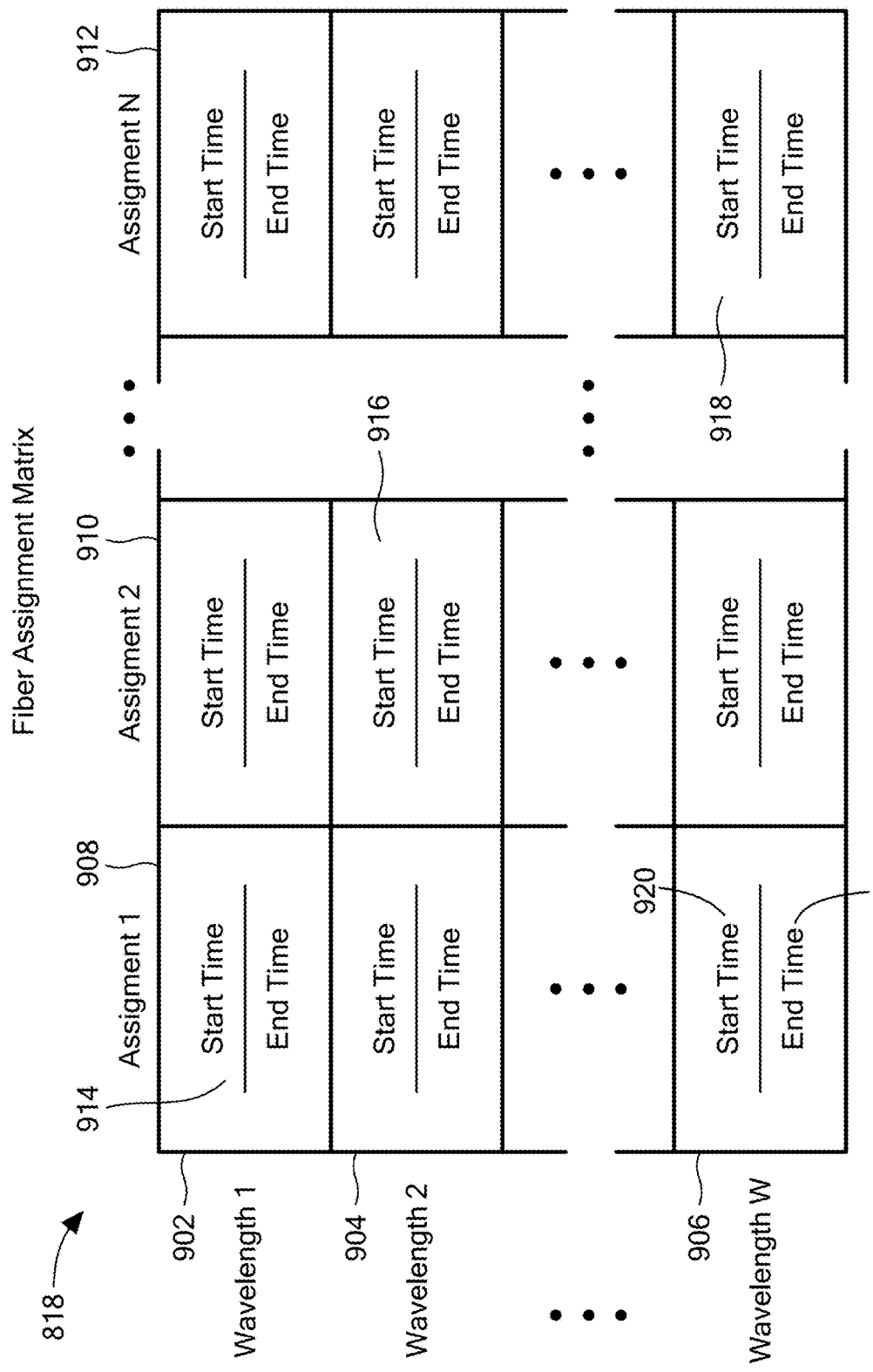
FIG. 9 is a schematic diagram of an optical fiber assignment matrix in the information of FIG. 8.

A fiber assignment matrix 818 stores information identifying which wavelengths are assigned to carry traffic and, in particular, a start time and an end time for each such assignment. A duration of the assignment may be calculated by subtracting the start time from the end time. FIG. 9 is a schematic diagram of the fiber assignment matrix 818. In the embodiment shown in FIG. 9, the fiber assignment matrix 818 has room to store information about a fixed number (N) of assignments. However, in other embodiments, the size of the fiber assignment matrix 818 may be dynamic, so as to facilitate storing information about a variable number of assignments.

As shown in FIG. 9, each wavelength the optical fiber is capable of carrying is represented by a row, exemplified by rows 902, 904 and 906, and the number of possible assignments is represented by a number (N) of columns, represented by columns 908, 910 and 912. The rows 902-906 intersect the columns 908-912 at respective cells, represented by cells 914, 916 and 918. Each cell 914-918 represents an assignment. Each cell 914-918 has room to store a start time, represented by start time 920, of the assignment and an end time, represented by end time 922, of the assignment.

Once an assignment expires, i.e., at a time later than the end time 922 of the assignment, the cell representing the assignment can be cleared to indicate the cell no longer represents an assignment, or the cell can be immediately reused to represent another assignment. Thus, times that are represented by entries in the fiber assignment matrix 818 are times the respective wavelength of the optical fiber is not available to carry other traffic, and times that are not represented by any entry in the fiber assignment matrix 818 are times the respective wavelength of the optical fiber is available to carry traffic. In other embodiments, each cell includes a flag that indicates whether the corresponding time period is: (a) assigned to a flow or (b) available to be assigned to a flow.

Although the rows 902-906 are schematically illustrated as contiguous cells, each row 902-906 of assignments may be implemented as a linked list of separate elements, with a head (not shown) for each row. A pointer may be used to access an element of the linked list. Optionally or alternatively, each row 902-906 may be implemented as an array, and an index may be used to access individual elements of the array. Any other suitable data structure, as would be known to those of skill in the art, may also be used to implement the rows 902-906.

The start time 920 and the end time 922 may be represented using any suitable system time and/or duration representations. For example, the start time 920 may be represented by a number of milliseconds since an arbitrary start date, such as 00:00:00.000 Jan. 1, 1970. These representations may have any suitable granularity, such as 1 millisecond.

Note that not all wavelengths represented by rows 902-906 may be currently illuminated in the optical fiber. However, a currently unilluminated wavelength may be scheduled to be illuminated in the future. In this case, the fiber information (FIG. 8) also includes a time (not shown) at which each wavelength is scheduled to be illuminated. An unilluminated wavelength may not be assigned to carry traffic, at least not with a start time 920 prior to when the wavelength will be illuminated. Thus, a currently unilluminated wavelength may be scheduled to carry traffic in the future.

Optionally or alternatively, the information indicating which wavelengths are assigned to carry traffic, and the corresponding start times, may be stored as indications of which wavelengths are available and corresponding start and end times, and/or durations, of the available times, rather than of assigned times. In other words, the fiber assignment matrix 818 may store information about when fibers are available, rather than information about when fibers are in assigned. Optionally or alternatively, for each scheduled flow, the database may store information indicating which optical fibers and which wavelength are assigned to carry the flow. Optionally or alternatively, information about which wavelengths are assigned to carry traffic and start times for the assignments may be combined in the database.

The indication of the duration of the assignment can be stored as, for example, an amount of time the assignment will last, a time at which the assignment ends or an amount of data in the proposed traffic, from which the time duration of the assignment can be calculated by dividing by an expected data rate. Regardless of how this information is stored in the database, the information indicates a start time of an assignment and an end time of the assignment, as long as these data can be read directly from the database or calculated from information directly read from the database. Similarly, other information in the database that is said to "indicate" something may be directly stored in the database or calculated from information that is stored in the database.

Collectively, the information 502, 504 and 506 (FIG. 5) defines the topology of the optical network 100, down to a wavelength level of granularity.

The information 508 about the optical amplifiers includes information about each optical amplifier, such as the optical amplifier 206 discussed with respect to FIG. 2. Although FIG. 5 shows a separate entry in the database 310 for each optical amplifier, the information 508 may be organized differently, as long as information about each optical amplifier can be automatically ascertained from the information 508. For example, entries for optical amplifiers that have similar characteristics may all refer to a single area that describes common aspects of the optical amplifiers. Typically, optical amplifier instances of a given make-model combination have similar characteristics.

Figure 10:
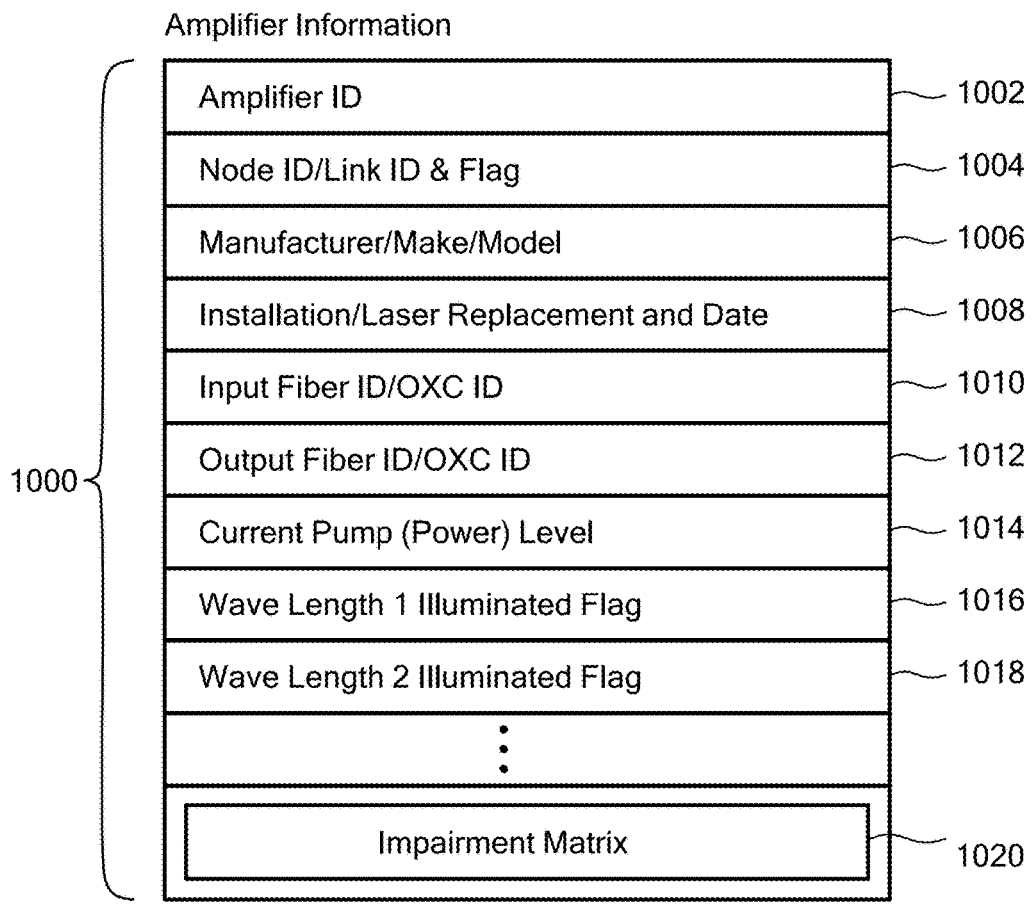
FIG. 10 is a schematic diagram illustrating information that is stored in the database of FIG. 5 for each optical amplifier of a network, such as the network of FIG. 1, according to an embodiment of the present invention.

FIG. 10 is a schematic diagram illustrating information 1000 that is stored in the database 310 for each optical amplifier, according to an embodiment of the present invention. An optical amplifier identifier 1002 uniquely identifies the optical amplifier. A node/link identifier and flag 1004 identify a node or link, of which this optical amplifier is a part. If the optical amplifier is disposed in a node, the node/link identifier 1004 stores the node's identifier, and the flag is set to indicate the identifier 1004 is of a node. On the other hand, if the optical amplifier is disposed in a link, i.e., between two nodes, the node/link identifier 1004 stores the link's identifier, and the flag is set to indicate the identifier 1004 is of a link.

A manufacturer/make/model field 1006 stores information about the optical amplifier. As noted, optical amplifiers of a given manufacturer/maker-model combination generally have similar characteristics. However, these characteristics may change over time, for example, as the pump laser 210 ages. If so, a field 1008 stores a date on which the optical amplifier was installed or on which the pump laser was most recently replaced, whichever is later. Optionally, a rate (not shown) at which the power of the pump laser 210 decreases over time may be stored in the information 1000. Thus, the scheduler 314 can calculate or estimate an expected power output of the pump laser 210 and, therefore, power output of the optical amplifier. A current laser pump power level is stored in a field 1014.

Each optical amplifier is coupled between two optical fibers 114-118, although one or more OXCs, optical splitters, optical combiners, etc., may be coupled between the optical fibers and the optical amplifier, as discussed with respect to FIG. 2. The network topological location of the optical amplifier is indicated by fields 1010 and 1012, which contain identifiers of the two optical components, i.e., optical fiber, OXC, etc., that are coupled, respectively, to the input and output of the optical amplifier.

For each wavelength that can be illuminated at the input to the optical amplifier, the information 1000 includes a binary wavelength illuminated flag, exemplified by flags 1016 and 1018. Each flag indicates whether the corresponding wavelength is currently illuminated at the input of the optical amplifier. As noted, an amount of gain provided by the optical amplifier at each wavelength depends on several factors, including which and/or how many wavelengths are illuminated at the input to the optical amplifier, a power level of each illuminated wavelength and a power level of the pump laser. The information 1000 includes an impairment matrix 1020 that summarizes this information.

As shown schematically in FIG. 11, the impairment matrix 1020 stores information about combinations of wavelengths and power levels. Rows of the impairment matrix 1020 represent combinations of wavelengths that may be illuminated at the input of the optical amplifier. For example, the first row 1100 represents wavelength 1 ($\lambda 1$) being illuminated. Subsequent rows 1102 represent wavelength 1 ($\lambda 1$) being illuminated in combination with each of wavelength 2 ($\lambda 2$) through wavelength n ($\lambda n$). Subsequent rows 1104 represent all combinations of three wavelengths being illuminated. Subsequent rows 1106 represent all combinations of four wavelengths being illuminated, etc., until row 1108, which represents all wavelengths being illuminated.

All possible combinations of power levels of the wavelengths illuminated at the input to the optical amplifier are represented by columns 1110 of the impairment matrix 1020. Each cell of the impairment matrix 1010 stores impairment characteristics for the corresponding combination of illuminated wavelength(s) and power level(s). The impairment characteristics may be in the form of power output levels for the illuminated wavelengths, as seen at the output of the optical amplifier.

In some cases, the impairment matrix 1020 may be compressed or simplified, such as if several combinations of wavelengths 1100-1108 and/or power levels 1110 have similar impairment characteristics. In these cases, rows, columns and/or cells of the impairment matrix 1020 may be combined. Thus, the information stored in the database may be for only one or a few wavelengths, as long as impairments for other wavelengths can be derived from the information. Optionally or alternatively, in some embodiments, one or more formulas are stored in the impairment matrix 1020, and the formulas are used to calculate the impairment characteristics, rather than looking them up in a table.

Values for the impairment characteristics may be empirically determined, such as by measuring output power levels for various combinations of input wavelength and/or power levels. These measurements may be carried out for a representative sample of optical amplifier makes and models expected to be used in the optical network 100. Instead of measuring output power levels for all combinations of input wavelength and power level, measurements of outputs resulting from representative combinations of inputs may be measured, and impairment characteristics of other combinations may be extrapolated or estimated from the measured values. Optionally, this information may be obtained from manufacturers of the optical amplifiers. Similarly, if formulas are used, the formulas may be empirically determined, estimated, extrapolated and/or obtained from the manufacturers.

In some cases, one housing encloses several optical amplifiers. Each such optical amplifier should be treated as a separate optical amplifier in the database 500.

The information 510 about the optical splitters, optical combiners, OXCs, etc. includes information about each optical splitter, optical combiner, OXC, etc., such as the OXCs 204 and 212 described with respect to FIG. 2. Although FIG. 5 shows a separate entry in the database 310 for each optical splitter, optical combiner, OXC, etc., the information 510 may be organized differently, as long as information about each optical splitter, optical combiner, OXC, etc., can be automatically ascertained from the information 510. For example, entries for optical splitters, optical combiners, OXCs, etc., that are similarly configured or disposed may all refer to a single area that describes common aspects of the optical splitters, optical combiners, OXCs, etc.

FIG. 12 is a schematic diagram illustrating information 1200 that is stored in the database 310 for each optical splitter, optical combiner, OXC, etc., according to an embodiment of the present invention. A unit identifier 1202 uniquely identifies the optical splitter, optical combiner, OXC, etc. A coded type field 1204 indicate what kind of device, i.e., optical splitter, optical combiner, OXC, etc., is represented by the information 1200. A node identifier 1204 identifies a node in which the unit is disposed.

Fields 1208 and 1210, respectively, store a number of inputs and a number of outputs the unit has. For each input to the unit, a respective field, exemplified by fields 1212 and 1214, stores an identifier of the optically closest optical fiber, optical amplifier, OXC, etc. that is coupled to the input of the unit. Similarly, for each output of the unit, a respective field, exemplified by fields 1218 and 1220, stores an identifier of the optically closest optical fiber, optical amplifier, OXC, etc. that is coupled to the output of the unit. For each wavelength that may traverse the unit, a respective field, represented by fields 1224 and 1226, stores an attenuation factor attributable to the unit. If all or several wavelengths would be similarly attenuated, all or several of the fields 1224-1226 may be combined.

Wavelength Scheduler Operation

Figure 13:
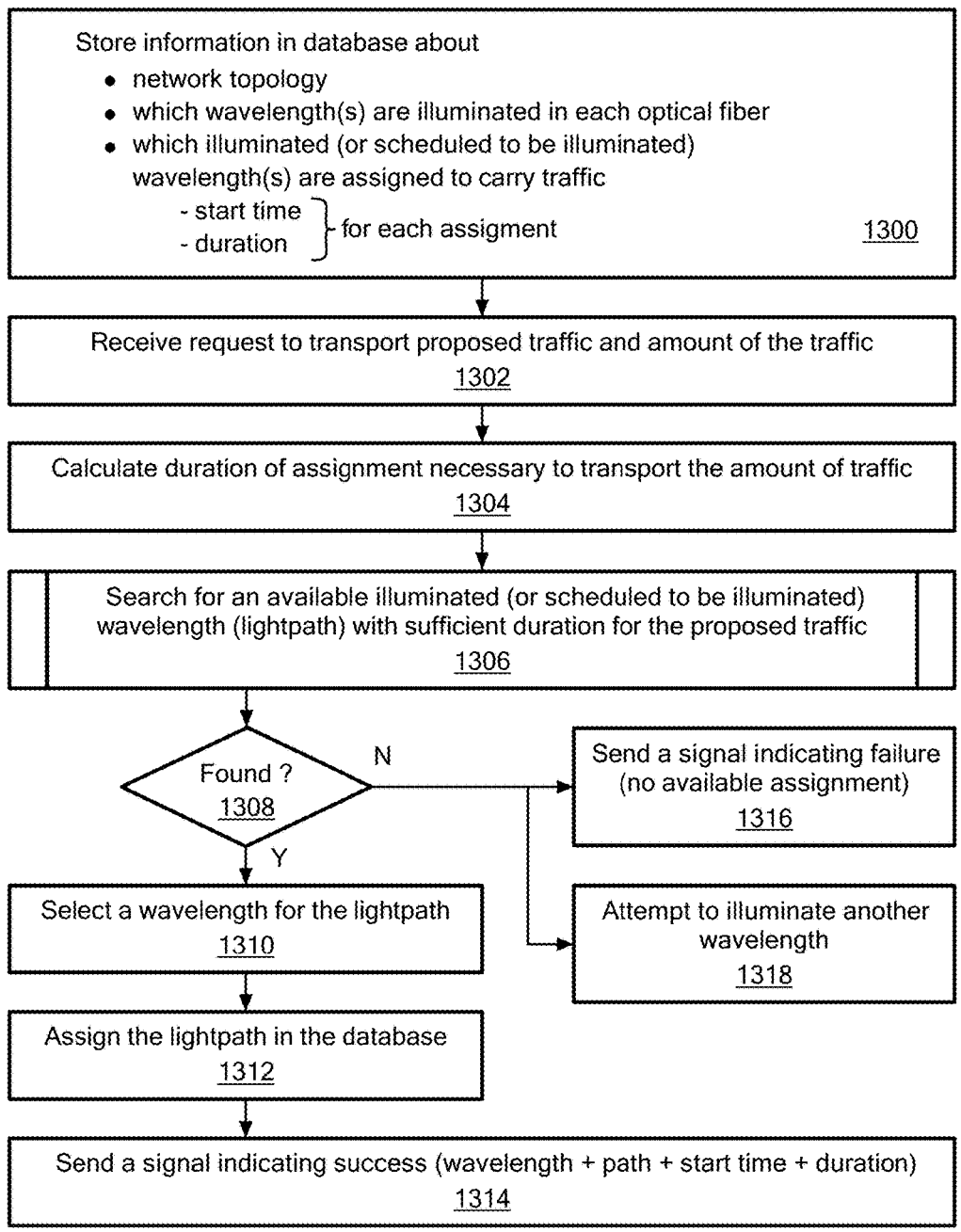
FIG. 13 is a flowchart schematically illustrating operations performed by the schedulers of FIGS. 3 and 4, according to an embodiment of the present invention.

As noted, FIG. 4 is a schematic block diagram of the scheduler 314, according to an embodiment of the present invention. FIG. 13 is a flowchart schematically illustrating operations performed by the scheduler 314 to schedule a data transmission via a wavelength-division multiplexed optical communication network, such as the optical network 100, according to an embodiment of the present invention. The scheduler 314 or components of the scheduler 314 may be implemented in, and the operations may be performed by, combinatorial logic, by field-programmable gate arrays (FPGAs), a microcontroller, a special-purpose processor or a general-purpose processor executing instructions (software) stored in a memory. At 1300, information about topology of the optical network is stored in a database, such as the database 310 (FIGS. 4-12). The information includes information about which wavelength(s) are illuminated in each optical fiber and which illuminated wavelength(s) are assigned to carry traffic. For each assignment, the database 310 stores a start time and an end time, as discussed with respect to FIG. 9.

Optionally, information may be stored in the database about wavelengths that are currently not illuminated, but that are scheduled to be illuminated in the future. This information includes information about which optical fiber will have the wavelength illuminated and when the wavelength will be illuminated. If such future illumination information is stored in the database, the information about assignments may include information about future assignments that will require the future illuminated wavelengths.

At 1302, a request to transport proposed traffic is received, such as by a traffic request receiver 400 (FIG. 4). The request may be received via an electronic signal, such as a voltage on a wire, an optical signal on an optical fiber, a message packet received via wire or optical medium or any other suitable way. For example, the message packet may be transported via an IP network. The request may be received via a control plane.

The request indicates a source access node and a destination access node, between which the traffic is to be carried, and an amount of data to be transported. The amount of data to be transported may be represented by an amount of time required to transport the data or an amount of time a user requests, regardless of how much data the user wishes to transport. Each indication may be by way of a field or flag in a message, a voltage on a particular wire or combination of wires or by any other suitable mechanism. If the scheduler 314 is busy, a traffic request enqueuer 401 may enqueue the traffic request in the FIFO queue 320.

At 1304, an assignment duration calculator 402 (FIG. 4) calculates a duration for the proposed transmission (proposed assignment). As noted, the duration may be calculated by dividing the transmission size by the network signaling rate, optionally rounding up and/or adding a safety margin.

At 1306, a link-length optical fiber search engine 404 searches for a first, i.e., earliest, available illuminated lightpath (wavelength/set of optical fibers combination) that is available for a sufficiently long period of time to accommodate the calculated duration of the proposed traffic. The lightpath includes a series of optical fibers that extend contiguously from the source access node to the destination access node and that all have at least one common wavelength illuminated, but that are not currently assigned to carry traffic for at least the calculated duration. If such an available lightpath is found, its start time is noted.

"Common" means the same in all the optical fibers. Thus, if the lightpath is found, the common wavelength is currently illuminated in all the optical fibers of the lightpath. It is possible more than one common wavelength is illuminated in the optical fibers of the lightpath. Optical amplifiers, OXCs, optical splitters, optical combiners, etc. interposed between ends of the optical fibers are not considered to break contiguity of the optical fibers, as long as the common wavelength can pass through the optical amplifier, OXC, optical splitter, optical combiner, etc. onto the next optical fiber.

Optionally, the scheduler may also search for a lightpath that is scheduled to be illuminated in the future and that will be able to accommodate the calculated duration.

At 1308, if the scheduler finds at least one such lightpath, control passes to 1310. At 1310, if one wavelength is illuminated in all the optical fibers of the optical path and is not currently assigned to carry traffic, the wavelength is selected by a wavelength selector 406 (FIG. 4). If more than one such wavelength is found, one of the wavelengths is selected by the wavelength selector 406 (FIG. 4). The selection may be arbitrary. Alternatively, the lowest numbered wavelength or the shortest wavelength may be selected, or some other selection criterion may be used. For example, the wavelength may be selected such that the assigned wavelengths are "bunched" together in wavelength to the extent possible, or the wavelengths may be spread apart to minimize cross-talk.

At 1312, information is stored (altered) in the database 310 by a database updater 408 (FIG. 4) to indicate the selected wavelength is assigned to carry the traffic on each optical fiber of the lightpath beginning at the noted start time. An end time for the assignment is calculated by adding the calculated duration of the traffic to the noted start time, and this end time is also stored in the database 310.

At 1314, a success/failure signal sender 410 sends an electronic signal indicating success. The signal indicates which optical fibers were selected, as well as which wavelength was selected, to transport the proposed traffic. The signal may also indicate the start time and duration or end time. As with the signal requesting transport of the traffic, the success signal may be sent as a voltage on a wire, an optical signal on an optical fiber, a message packet sent via wire or optical medium or any other suitable way. The message packet may be transported via an IP network over a control plane.

Returning to 1308, if the scheduler does not find an appropriate lightpath, control passes to 1316 or 1318, depending on how the scheduler 314 is implemented.

In one embodiment, if the scheduler 314 cannot find an appropriate lightpath, at 1316, the success/failure signal sender 410 sends an electronic signal indicating a failure to schedule transport of the proposed traffic. As with the signal requesting transport of the traffic and the success signal, the failure signal may be sent as a voltage on a wire, an optical signal on an optical fiber, a message packet sent via wire or optical medium or any other suitable way. The message packet may be transported via an IP network over a control plane. Indication of the failure may be by way of a field or flag in a message, a voltage on a wire, a response to the request, such as according to a protocol, or any suitable way.

In another embodiment, if the scheduler 314 cannot find an appropriate lightpath, at 1318, it attempts to illuminate another wavelength in the optical network, so as to increase bandwidth of the network sufficiently to transport the proposed traffic. A description of such an embodiment is presented below, in relation to automatically assessing traffic impairments that would result from adding or deleting a channel in a wavelength-division multiplexed optical communication network.

Figure 14:
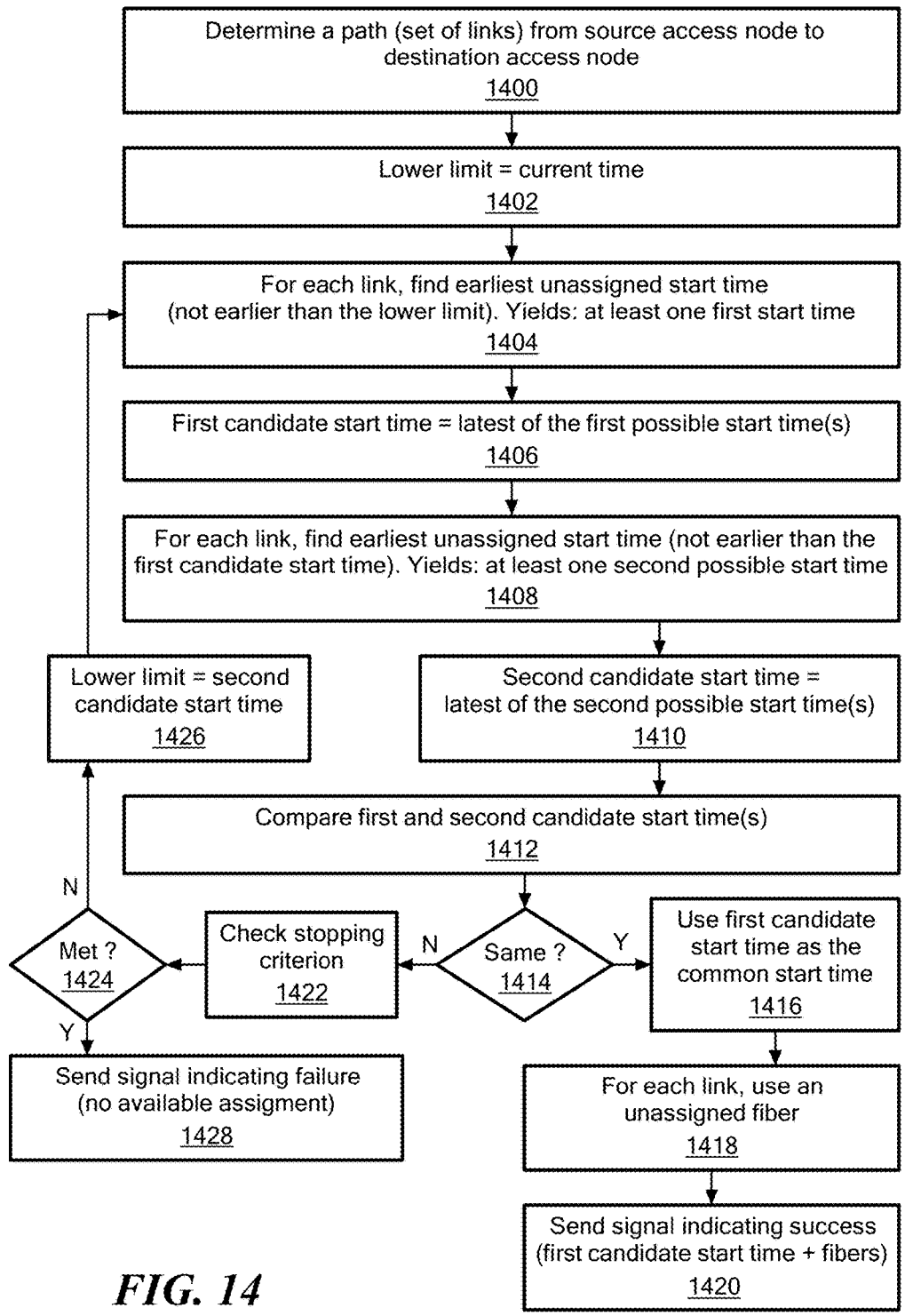
FIG. 14 is a flowchart schematically illustrating operations performed by the schedulers of FIGS. 3 and 4, in particular to efficiently search for an available assignment, during which all links of a path have an available, i.e., not scheduled to carry other traffic, common wavelength to carry proposed traffic on the path, according to an embodiment of the present invention.

According to an embodiment of the present invention, at least parts of the search for possible lightpaths, i.e., operation 1306, may be performed according to a flowchart in FIG. 14. The process summarized by the flowchart of FIG. 14 efficiently finds a wavelength and a start time, without checking all available wavelength-start time combinations of a proposed path, thereby improving efficiency of computer systems that schedule traffic in the optical network, compared to the prior art.

At 1400, a path for the lightpath is determined by a path determinator 414 (FIG. 4). As noted, the path extends contiguously from a source access node to a destination access node. The path includes a contiguous series of links extending from the source access node to the destination access node. In particular, the path links include optical fibers that are coupled or switched, or can be switched such as by altering settings of one or more OXCs, to form a contiguous optical path from the source access node to the destination access node.

Figure 15:
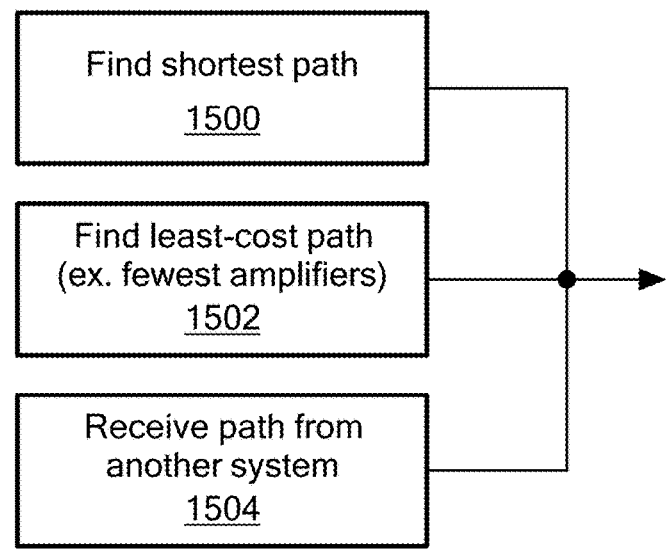
FIG. 15 is a flowchart schematically illustrating possible operations performed in a portion of FIG. 14 to determine a path, according to an embodiment of the present invention.

As shown in a flowchart in FIG. 15, the determination of the path may be made by selecting a shortest path 1500, i.e., a path having a fewest number of links between the source access node and the destination access node. Optionally or alternatively, the determination may be made by selecting a least cost path 1502, i.e., a path that has a lowest total link cost, where each link is associated with a respective cost. Link cost may reflect: monetary cost of transporting data over the link, such as an amortized cost to install, operate and maintain the link; average demand to carry traffic over the link; scarcity of resources associated with the link; physical length of the link; number of EDFAs disposed along the link; an arbitrary value; another metric; or a combination thereof. Optionally or alternatively, the determination may be made by receiving an electronic signal 1504, such as an IP message, from another system or subsystem, where the electronic signal indicates the links of the path. Optionally or alternatively, the determination may be made by some other selection criterion.

In any case, in an embodiment, one path is considered. In other embodiments, if a suitable assignment cannot be made using the path determined according to FIG. 15, another potential path is automatically selected, and the scheduler attempts to find a suitable assignment in the other potential path. This process may repeat for a predetermined number of paths or for all potential paths or until some other stopping criterion is met. Optionally or alternatively, more than one path may be simultaneously considered by the scheduler as it attempts to find a suitable assignment for proposed traffic.

Returning to FIG. 14, at 1402, a lower limit is set for the start time by a lower limit setter 416 (FIG. 4). The lower limit is set to an earliest start time to be considered, such as the current time or a time in the future. The scheduler then enters a loop. The loop searches for a start time at which the path is available to transport the proposed traffic, including being available for the required duration or until a calculated end time (start time plus duration). However, the scheduler does not exhaustively check each wavelength/start time combination. Instead, the loop includes two stages (1404-1406 and 1408-1410) that enable one traversal of the loop to skip over several start times that cannot be used to carry the proposed traffic. These two stages contribute to the efficiency of the disclosed system and method and constitute a significant improvement over the prior art.

For simplicity, in the following description, it is assumed the optical network 100 operates at only one wavelength, although each link 108-112 may include one or more optical fibers 114-118. However, subsequently, the description is expanded to cover multiple wavelengths.

At 1404, for each link of the path, a first earliest start time finder 418 finds the earliest, but not earlier than the lower limit, any link-length optical fiber of the link is available to carry the proposed traffic. That is, for each link of the path, the scheduler finds the earliest start time when an optical fiber in that link is not assigned to carry traffic and is available for the required duration. As noted, a link 108-112 may include more than one optical fiber 114-118. Thus, the search finds the earliest possible start time for the flow in each link. The search may yield a different earliest possible start time for each link of the path. The set of earliest possible start times is referred to as a "first set of start times."

The flow cannot begin earlier that the earliest link becomes available. Furthermore, the entire path cannot become available any earlier than the latest link becomes available, because until the last link is available, the entire path cannot be available. At 1406, the latest start time of the first set of start times is deemed to be a "first candidate start time" by a first candidate start time selector 420 (FIG. 4). This is the earliest the path can be available. There is, however, no assurance that the entire path will be available at the first candidate start time.

The scheduler 314 seeks a start time when all the links of the path are available. Thus, the scheduler 314 can resume searching with the first candidate start time. That is, the scheduler can safely ignore start times earlier than the first candidate start time. The insight that lead to the way the first candidate start time is selected enables the scheduler to quickly skip over start times that cannot be used to carry the proposed traffic and constitutes a significant improvement in scheduler efficiency over the prior art.

At 1408, the scheduler 314 again finds the earliest unassigned start time for each link of the path, this time finding the earliest unassigned start times that are no earlier than the first candidate start time by a second earliest start time finder 422 (FIG. 4). This effectively skips over start times that cannot be used to carry the proposed traffic. For each link of the path, the scheduler finds the earliest start time (no earlier than the first candidate start time) when an optical fiber in that link is not assigned to carry traffic and is available for the required duration. Again, the search may yield a different earliest possible start time for each link of the path. The set of earliest possible start times found during this stage is referred to as a "second set of start times."

As in the first stage, the flow cannot begin earlier that the earliest link becomes available, and the entire path cannot be available any earlier than the latest link becomes available. Thus, at 1410, the latest of the second set of start times is deemed to be a "second candidate start time" by a second candidate start time selector 424 (FIG. 4). This is the earliest the path can be available. There is, however, no assurance that the entire path will be available at the second candidate start time, unless the first and second start times are equal. If the second stage finds the same start time as the first stage found, the first candidate start time is both the earliest any link in the path is available and the latest any link in the path is available, meaning the path is available at that start time, and the scheduler succeeded.

Thus, at 1412, the first candidate start time is compared to the second candidate start time by a comparator 426 (FIG. 4). At 1414, if the candidate start times are the same, control passes to 1416, where the first candidate start time is selected by a common start time selector 430 (FIG. 4) for carrying the proposed traffic.

At 1418, for each link of the path, an optical fiber that is available at the selected start time, and for the calculated duration, is selected by a link-length optical fiber selector 432 (FIG. 4), thereby in aggregate selecting a set of optical fibers that extends contiguously from the source access node to the destination access node. The selection of an available optical fiber, from among the one or more available optical fibers in each link, may be arbitrary, inasmuch as the available optical fibers in each link are essentially fungible. However, selection of the optical fiber may include considerations, such as how many and/or which wavelengths (channels) are illuminated in the available fibers, so as to equally distribute, or alternatively group together, traffic among the available optical fibers.

At 1420, the scheduler sends an electronic signal indicating success, including indicating the selected start time, duration and the selected set of optical fibers. As with the other signals, the success signal may be sent as a voltage on a wire, an optical signal on an optical fiber, a message packet sent via wire or optical medium or any other suitable way. The message packet may be transported via an IP network over a control plane.

If, however, at 1414, the first and second candidate start times are not equal, control passes to 1422, where a loop controller 428 (FIG. 4) checks for a stopping criterion. At 1424, if the stopping criterion is not met, control passes to 1426, where the lower limit is set by the lower limit setter 416 (FIG. 4) to the second candidate start time, and then control returns to 1404. Operations 1404-1414 and 1422-1426 form the loop. The stopping criterion (1422) may include a maximum number of iterations through the loop. Optionally or alternatively, the stopping criterion (1422) may be met when the second candidate start time reaches a predetermined maximum value, such as a predetermined amount of time in the future.

At 1414, if the stopping criterion is met, control passes to 1428, where the success/failure signal sender 410 (FIG. 4) sends an electronic signal indicating failure, i.e., no available assignment could be found. As with the other signals, the failure signal may be sent as a voltage on a wire, an optical signal on an optical fiber, a message packet sent via wire or optical medium or any other suitable way. The message packet may be transported via an IP network over a control plane.

Figure 16:
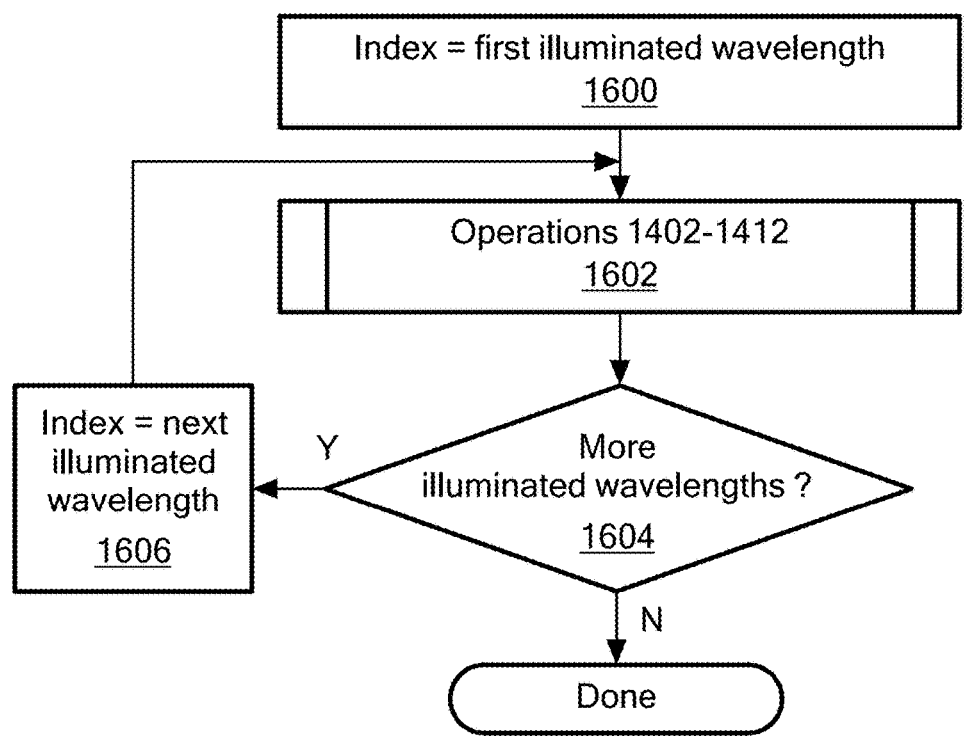
FIG. 16 is a flowchart schematically illustrating how operations of FIG. 14 may be modified to loop through all illuminated wavelengths, according to an embodiment of the present invention.

As noted, for simplicity, the description of FIG. 14 assumes the optical network 100 operates at only one wavelength. However, the operations described with respect to FIG. 14 may be repeated for each possible wavelength, for each illuminated wavelength or for each wavelength that is scheduled to be illuminated, in the optical network 100. FIG. 16 is a flowchart illustrating how the operations in FIG. 14 may be modified to loop through all illuminated wavelengths, according to an embodiment of the present invention. At 1600, an index is set to represent the first illuminated wavelength. At 1602, operations 1402-1412 of FIG. 14 are performed. At 1604, if more illuminated wavelengths remain, control passes to 1606, where the index is increased to represent the next illuminated wavelength, and then control returns to 1602.

The flowchart of FIG. 16 may be modified to repeat operations 1402-1412 for each possible wavelength or for each wavelength that is illuminated or scheduled to be illuminated. In the latter case, operations 1404 and 1408 are modified to find earliest unassigned start times when the wavelength is illuminated or scheduled to be illuminated.

Optionally or alternatively, operations 1404 and 1408 may be modified to also loop through all possible wavelengths or wavelengths that are scheduled to be illuminated.

Figure 17:
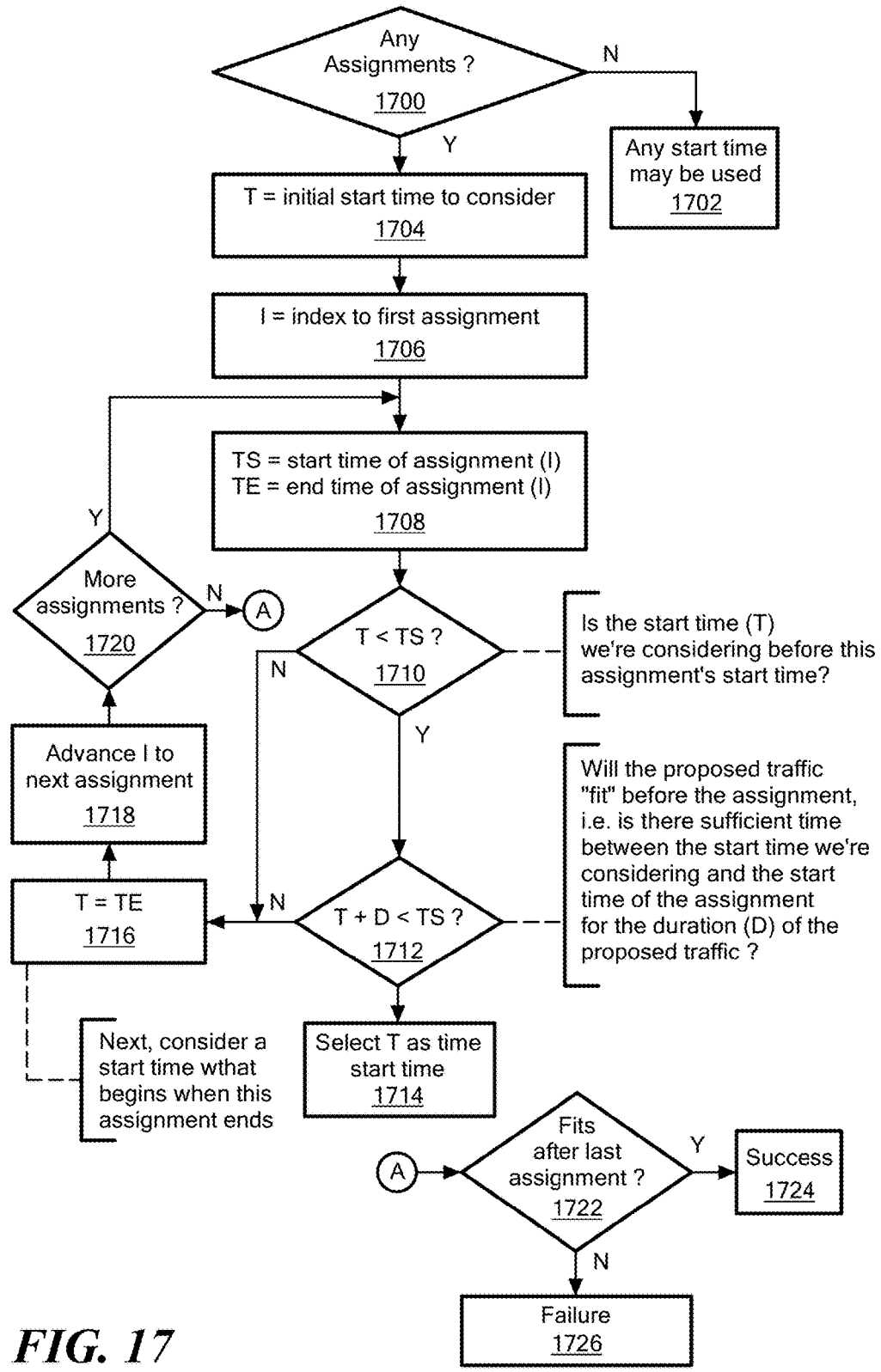
FIG. 17 is a flowchart schematically illustrating operations performed in a portion of FIG. 14 to find an available start time for a proposed flow, according to an embodiment of the present invention.

FIG. 17 is a flowchart schematically illustrating operations performed by the scheduler 314 to find an available start time for a proposed flow, according to an embodiment of the present invention. Operations 1404 and 1408 (FIG. 14) may include operations depicted in FIG. 17.

At 1700, if the wavelength/optical fiber combination has no current assignments, control passes to 1702, where an indication is returned that any start time may be used. On the other hand, if at 1700 the wavelength/optical fiber combination has at least one current assignment, control passes to 1704.

The flowchart of FIG. 17 shows a loop. Each traversal of the loop examines an existing assignment checking for a "gap" between assignments sufficiently large to accommodate the proposed traffic. A variable T is used during traversals of the loop to represent a start time being considered. Another variable I is used to index or point to one of the existing assignments of a wavelength/optical fiber combination, such as one of the cells 914-918 described with respect to FIG. 9. D represents duration of an assignment that would be necessary to accommodate the proposed traffic. At 1704, T is set equal to an initial start time to be considered, such as the current time. At 1706, I is set to index or point to the first assignment.

At 1708, a variable TS is set to the start time of the assignment being examined, and another variable TE is set to the end time of the assignment being examined. At 1710, T is compared to TS. If T is less than TS, i.e., if the start time being considered (T) is before the start time (TS) of the assignment being examined, control passes to 1712. At 1712, if (T+D) is less than TS, i.e., if the proposed traffic duration (D) would fit before the assignment being examined, control passes to 1714. The proposed traffic duration (D) would fit before the assignment being examined if there is sufficient time (D) between the start time being considered (T) and the start time (TS) of the assignment being examined. At 1714, the proposed start time (T) is selected as the start time for the proposed traffic.

On the other hand, if either decision operation 1710 or 1712 results in a negative, control passes to 1716, where the next start time (T) to be considered is calculated. The next start time to be considered (T) is set equal to TE, i.e., the end time of the assignment being examined. Control then advances to 1718, where the index (I) is advanced to the next assignment to be examined, if any. At 1720, if there is at least one more assignment to be considered, control returns to 1708, otherwise control passes to 1722.

At 1722, if the proposed traffic would fit after the last assignment, control passes to 1724, where the most recent proposed start time (T), which at 1716 was set to the end time (TE) of the last assignment, is selected as the start time for the proposed traffic. On the other hand, if the proposed traffic would not fit after the last assignment, control passes to 1726, where a failure indication is returned.

Example: Scheduling a Wavelength

Figure 18:
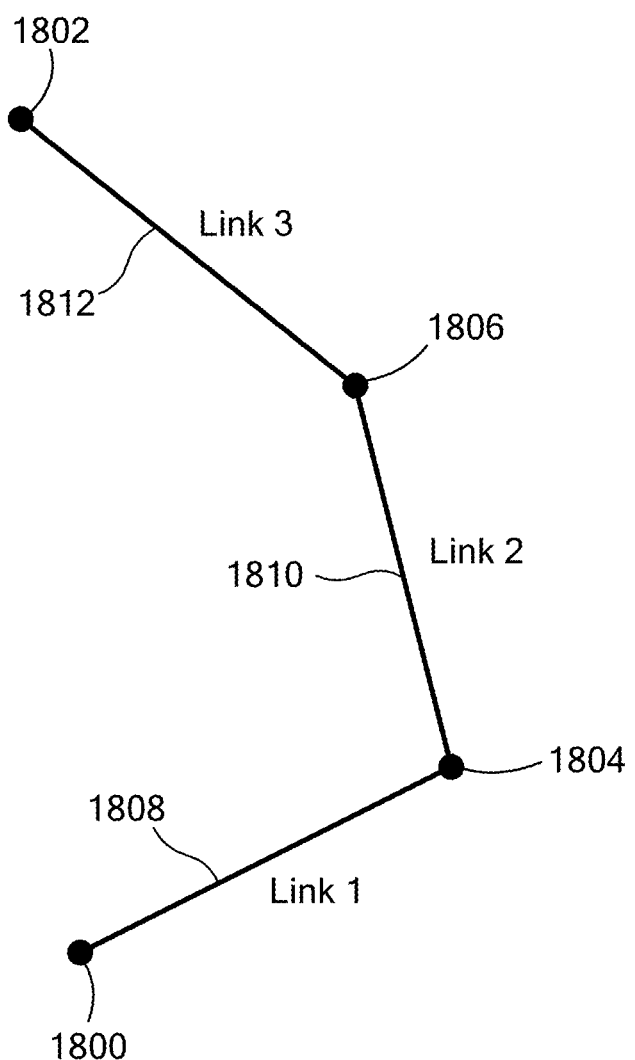
FIGS. 18, 19 and 20 schematically illustrate wavelength scheduling, as described with respect to FIGS. 14-17, for a hypothetical exemplary request to transport traffic from a source access node to a destination access node, in the context of a hypothetical set of existing assignments.
Figure 19:
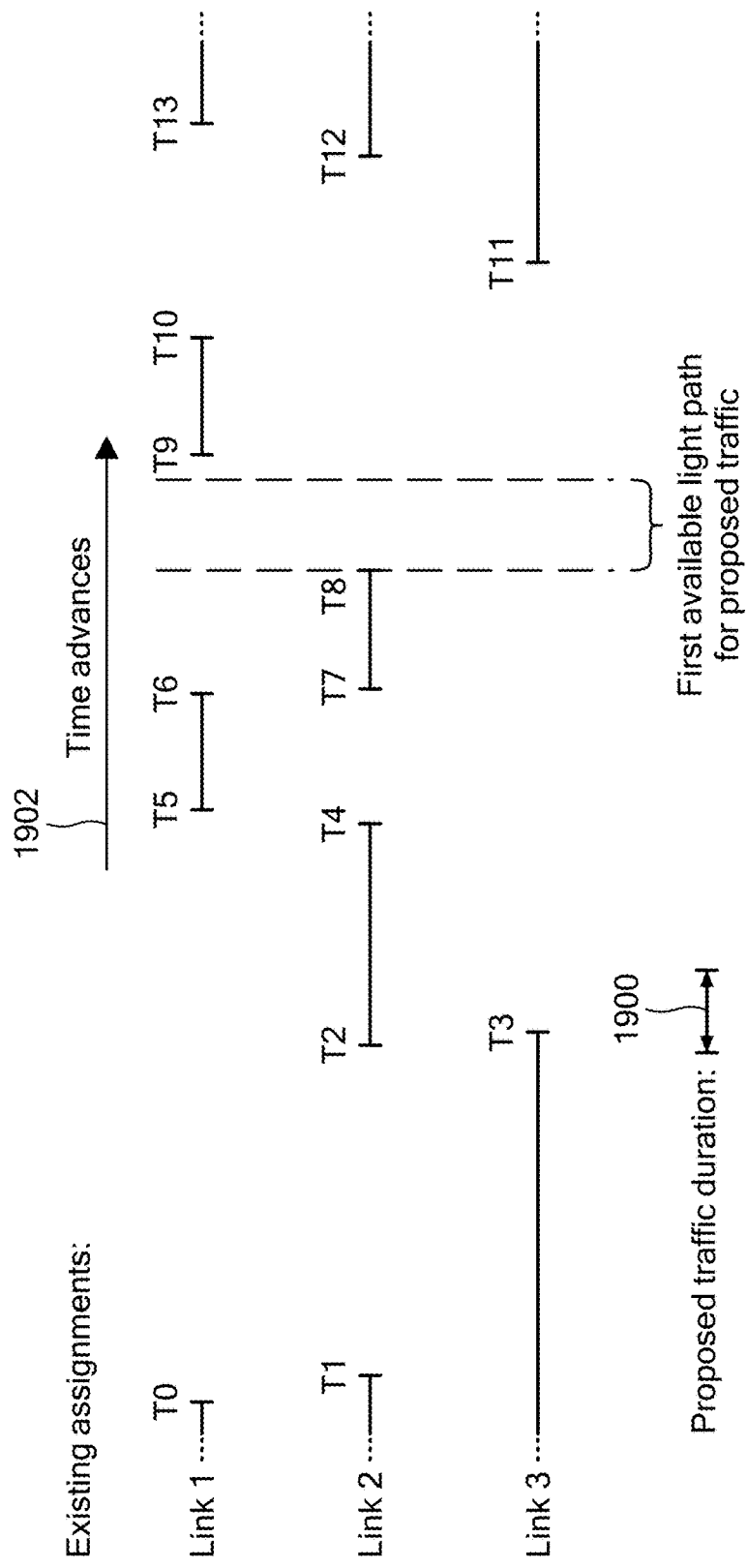

FIGS. 18, 19 and 20 schematically illustrate wavelength scheduling, as described with respect to FIGS. 14-16, for a hypothetical exemplary request to transport traffic from a source access node 1800 (FIG. 18) to a destination access node 1802 over a hypothetical path that consists of three links 1808, 1810 and 1812, in the context of a hypothetical set of exiting assignments (FIG. 19). Assume the traffic would require a lightpath for a duration indicated by length of a line 1900. Of course, embodiments of the present invention are capable of handling longer and shorter paths and other durations.

In FIG. 19, time advances to the right, as indicated by arrow 1902. For this example, assume optical fibers in the three links 1808-1812 are already assigned to carry traffic, as indicated in FIG. 19. For example, Link 1 (1808, FIG. 18) is assigned to carry traffic between T5 and T6, between T9 and 10 and starting at T13. Link 2 (1810, FIG. 18) is assigned to carry traffic between T2 and T4, between T7 and T8 and starting at T12. As before, for simplicity, this example assumes the network operates with only one wavelength and only one optical fiber per link, and the stopping criterion, i.e., operations 1422 and 1424, are ignored.

Figure 20A:
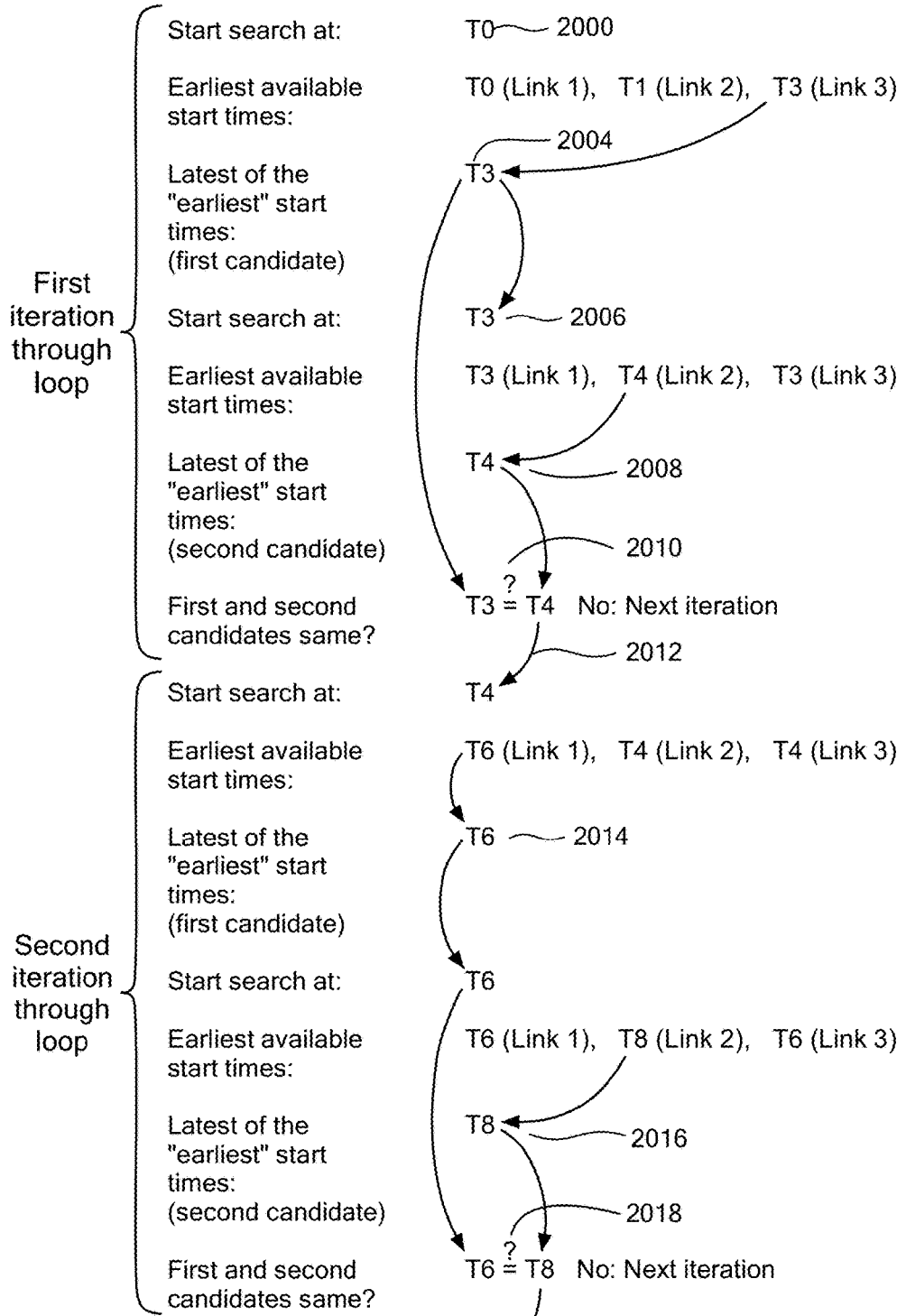
Figure 20B:
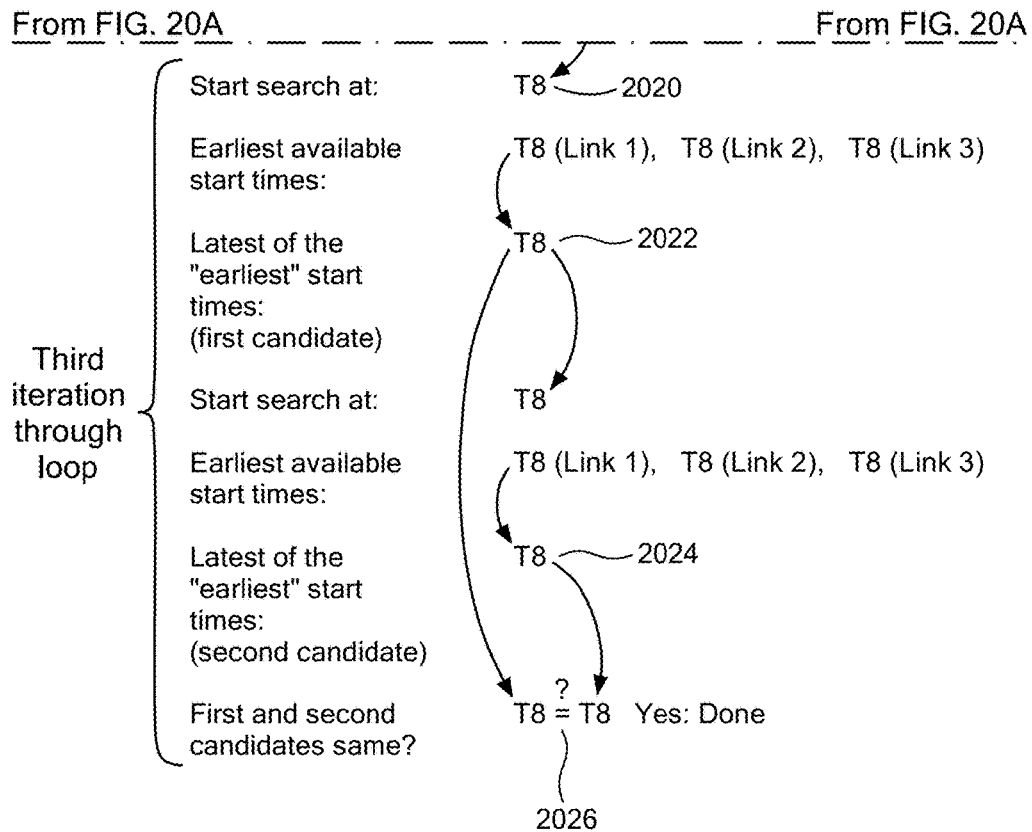

FIG. 20 (FIGS. 20A and 20B) summarize the status of key variables at various stages of the operations of FIG. 14. Assume at the beginning of the loop, i.e., operations 1404-1414 and 1422-1426 (FIG. 14), the lower limit is T0 (2000, FIG. 20). Results of operation 1404 are as follows: The earliest start times found 2002 are: T0 (for Link 1), T0 (for Link 2) and T3 (for Link 3). Therefore, according to operation 1406, the latest 2004 of these "earliest" start times is T3, so the first candidate start time is T3.

In operation 1408, the search starts at the first candidate start time (T3) 2006. Results of operation 1408 are as follows: The earliest start times found are: T3 (for Link 1), T4 (for Link 2) and T3 (for Link 3). Therefore, according to operation 1410, the latest 2008 of these "earliest" start times is T4, so the second candidate start time is T4.

In operation 1412, the first and second start times are compared 2010. Here, T3 and T4 are not the same, so control passes to 1426. The lower limit is set 2012 to the second candidate start time (T4), and operations 1404-1412 are repeated. Note that two possible start times, i.e., T1 and T3 are skipped, as an example of how the scheduler efficiently searches for a start time during which all the links 1708-1712 are available.

At the beginning of the second time through the loop, the lower limit is T4. Results of operation 1404 are as follows: The earliest start times found are: T6 (for Link 1), T4 (for Link 2) and T4 (for Link 3). Therefore, according to operation 1406, the latest 2014 of these "earliest" start times is T6, so the first candidate start time is T6.

In operation 1408, the search starts at the first candidate start time (T6). Results of operation 1408 are as follows: The earliest start times found are: T6 (for Link 1), T8 (for Link 2) and T6 (for Link 3). Therefore, according to operation 1410, the latest 2016 of these "earliest" start times is T8, so the second candidate start time is T8.

In operation 1412, the first and second start times are compared 2018. Here, T6 and T8 are not the same, so control passes to 1426. The lower limit is set 2020 to the second candidate start time (T8), and operations 1404-1412 are repeated. Note that two start times, i.e., T4 and T6 are skipped, as an example of how the scheduler efficiently searches for a start time during which all the links 1708-1712 are available.

At the beginning of the third time through the loop, the lower limit is T8. Results of operation 1404 are as follows: The earliest start times found are: T8 (for Link 1), T8 (for Link 2) and T8 (for Link 3). Therefore, according to operation 1406, the latest 2022 of these "earliest" start times is T8, so the first candidate start time is T8.

In operation 1408, the search starts at the first candidate start time (T8). Results of operation 1408 are as follows: The earliest start times found are: T8 (for Link 1), T8 (for Link 2) and T8 (for Link 3). Therefore, according to operation 1410, the latest 2024 of these "earliest" start times is T8, so the second candidate start time is T8.

In operation 1412, the first and second start times are compared 2026. Here, T8 and T8 are equal, so control passes to 1416. Thus, the scheduler required only three traversals of the loop to ascertain that T8 is the earliest start time when which all the links 1708-1712 are available for at least the required duration.

Additional description of the above-referenced embodiments is provided in subsequent text.

Traffic Impairments Resulting from Adding or Deleting an Optical Channel

As noted, if the scheduler 314 (FIG. 3) cannot find an appropriate lightpath for proposed traffic, at 1318 (FIG. 13) the scheduler attempts to illuminate another wavelength (a "proposed wavelength") in the optical network, so as to increase bandwidth of the network to transport the proposed traffic. However, illuminating the proposed wavelength may detrimentally affect other traffic currently being carried, or scheduled to be carried in the future, by already-illuminated wavelengths and/or by wavelengths that are scheduled to be illuminated in the future. This other traffic may traverse the same branch as the proposed traffic or other branches of the network that are optically connected to the branch over which the proposed traffic would be carried. Illuminating the proposed wavelength in one optical fiber may detrimentally affect traffic in other optically connected fibers. Similarly, extinguishing an illuminated wavelength may detrimentally affect other traffic being carried by other wavelengths in the same branch or other branches of the network. These detrimental effects are referred to herein as "impairments" or "consequential impairments."

Embodiments of the present invention automatically calculate impairments that would be imposed on two categories of traffic: (a) the proposed new traffic and (b) current or already-scheduled traffic. Embodiments of the present invention automatically calculate an extent of consequential impairments of other traffic that would result from illuminating the proposed wavelength for the proposed traffic and then extinguishing the wavelength, i.e., setting up and tearing down the proposed channel. In addition, these embodiments automatically calculate an extent of impairment of the proposed traffic that would be caused by the other traffic, including other traffic that is scheduled to be handled in the future. Note that the other traffic scheduled to be handled in the future may involve illuminating, and then possibly extinguishing, yet another wavelength at scheduled times.

The impairments are calculated for a proposed lightpath for carrying the proposed traffic, based on the lightpath selected by the scheduler 314 (FIG. 3) and information in the database 500 (FIG. 5) about the selected lightpath. Similarly, impairments of current or future scheduled traffic are calculated based on their respective lightpaths and information about these lightpaths. As noted, the database 500 includes information about optical fibers, optical amplifiers, OXCs, etc. disposed along the lightpaths, including attenuation factors and impairments imposed by various components, based on which wavelengths are illuminated. Thus, a bit error rate (BER), and/or any other suitable measure of channel quality, is calculated for the proposed lightpath and for lightpaths that carry, or are scheduled to carry, the other traffic. The channel quality may be calculated as a function of attenuations and/or gains of components, such as optical fibers 114-118 and EDFAs, disposed along each lightpath.

The extent of the calculated consequential impairments is automatically compared to an acceptable threshold value. The threshold value is selected such that impairments at or below the threshold value would not adversely affect network operation. For example, with impairments that do not exceed the threshold value, optical signal levels at all optical detectors remain within acceptable ranges. However, impairments that exceed the threshold value cause at least one of these optical signal levels to become out-of-specification thereby, for example, unacceptably increasing an expected bit error rate on some link. An optical path with no, or acceptably low, impairments is referred to as being "qualified," whereas an optical path with unacceptable impairments is referred to as being "not qualified" or "unqualified."

If the consequential impairments would not exceed the acceptable threshold value, the wavelength is illuminated or scheduled to be illuminated (for simplicity of explanation, collectively referred to as "is illuminated"). That is, if: (a) the proposed lightpath (with the wavelength illuminated to carry the proposed traffic) would be qualified for its entire proposed duration, despite current and scheduled other traffic and (b) setting up and tearing down the proposed lightpath, at respective scheduled times, would not disqualify any other current or future scheduled lightpath, then the wavelength is illuminated. However, if any consequential impairment would exceed the acceptable threshold value, the wavelength is not illuminated and, in some embodiments, a different proposed wavelength to illuminate is checked and/or a different proposed lightpath is checked, or the proposed traffic may be declined or deferred.

These calculations and comparisons can be performed by a computer very quickly, in tens of milliseconds or less, much more quickly than the prior art trial-and-error process of adding or deleting a channel, and certainly much faster than they could be performed by a human. As noted, the prior art process involves manually ramping up or down optical signal levels in hops and manually checking for unacceptable impairment of existing channels of a proposed route and in other hops that are optically connected to the proposed route. "Ramping" means gradually monotonically changing the optical signal level.

Currently, this prior art process takes about 17 minutes to add or delete a channel for a coast-to-coast connection. One reason for this length of time is the level of impairments needs to be tested several times during each ramp to ascertain whether any of the impairments is approaching a threshold. If the threshold is approached, the ramp is aborted, so as to avoid unacceptably impairing any ongoing traffic. Thus, embodiments of the present invention dramatically improve efficiency of optical communication networks to carry traffic, including responsiveness of the networks add channels to carry proposed new traffic. In fact, embodiments of the present invention make possible network operations that are impossible using the prior art manual process. For example, embodiments of the present invention make it possible to automatically illuminate an additional wavelength when needed and extinguish the wavelength when it is no longer needed, i.e., embodiments of the present invention make it possible to automatically dynamically manage bandwidth in an optical network.

The calculations and comparisons necessary to add or delete an illuminated wavelength cannot be performed by a human within the timeframe required. Scheduled start and end times for many of the lightpaths involved are specified in units of tens or hundreds of milliseconds, and each scheduled traffic transmission typically involves on the order of ten links, possibly more. By the time a human could calculate impairments of even one link, the other traffic would already have been carried by the network, making the human's calculation too late to be of any value in determining whether the proposed wavelength can be illuminated without impacting the other traffic. Thus, the calculation and comparisons, and subsequent set up and tear down of channels (wavelengths), can only be done automatically, such as by a computer.

Furthermore, these embodiments operate differently than the prior art process. These embodiments do not simply automate the steps of the prior art. Instead, these embodiments calculate whether adding or deleting a channel (wavelength) would unacceptably impair other traffic, without actually making any changes to optical signal levels in the network. Optical signal levels are changed, ex., a wavelength is illuminated, only if it is determined that doing so would not unacceptably impair the other traffic in the network and that other network traffic would not unacceptably impair the proposed traffic.

In addition, if the wavelength is illuminated, the wavelength may be initially illuminated at its final power level. The power level need not be ramped, as in the prior art.

The scheduler 314 and the processing described with respect to FIG. 13 may be modified to make them "impairment aware." Assuming each OXC introduces less than about 1 dB of loss, OXC losses can be ignored, compared to a total expected path loss of about 20 dB or more. With this assumption, the EDFAs are the major sources of gain noise in the network. The number of EDFAs along a link is generally proportional to the link's length. Thus, a physically shorter link is likely to include fewer EDFAs than a physically longer link. Consequently, the physically shorter link is likely to have less gain noise than the physically longer link. In a network logical topology map, each edge of the map may be weighted according to the number of EDFAs disposed along a corresponding link of the network. Such a map may be used in selecting a path, such as in operation 1500, 1502 or 1504 (FIG. 15).

Figure 21:
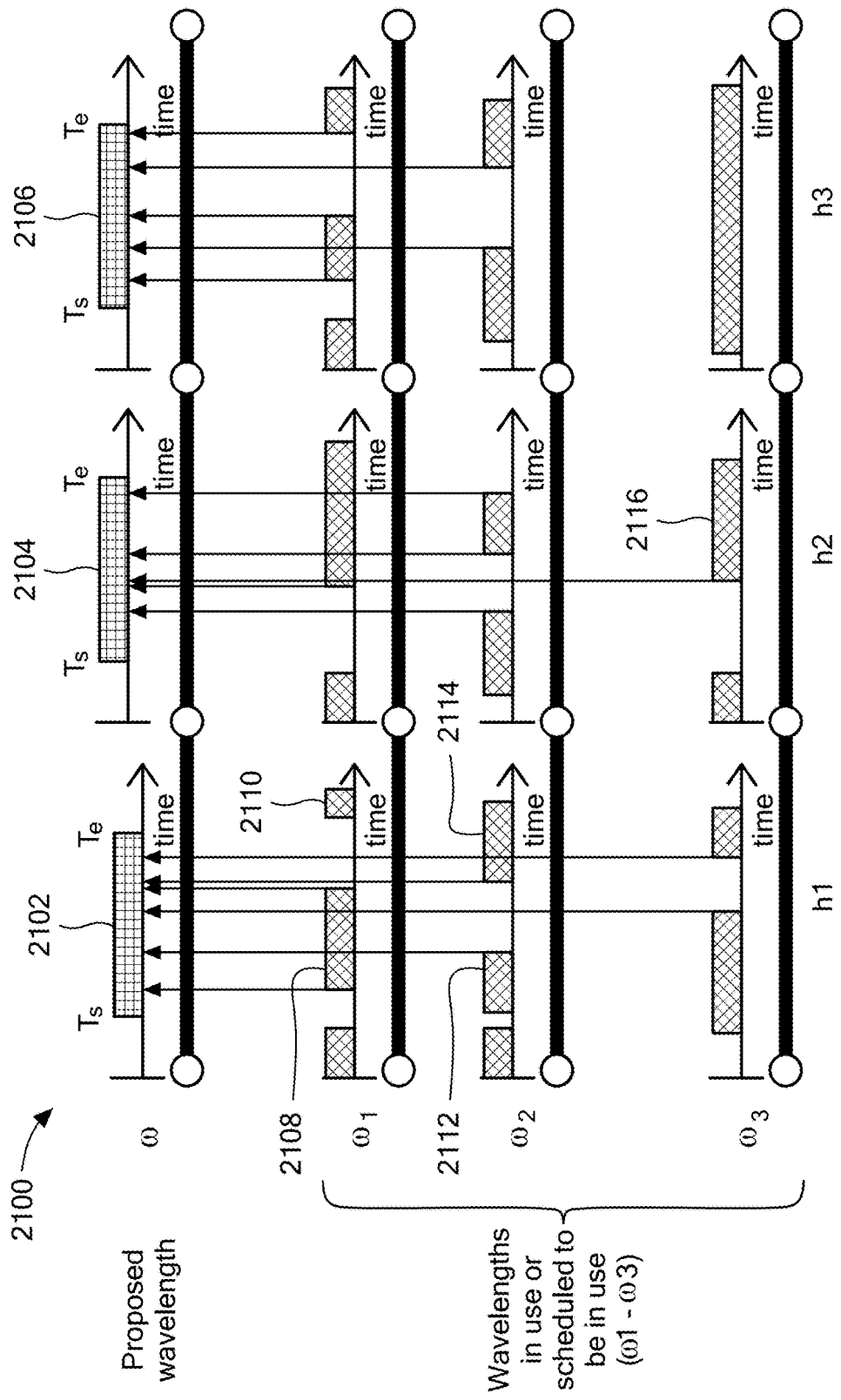
FIG. 21 is a schematic timing diagram illustrating a hypothetical situation involving a wavelength proposed to be illuminated in three hops to carry proposed traffic, as well as three other wavelengths already scheduled to carry other traffic, according to an embodiment of the present invention.

As noted, avoiding unacceptable impairments requires the proposed lightpath to be qualified for its entire proposed duration, despite other current traffic and scheduled future traffic, i.e., the first category of traffic must not be unacceptably impaired. FIG. 21 is used to explain a process for determining whether the proposed lightpath is qualified. FIG. 21 includes a schematic timing diagram 2100 illustrating a hypothetical situation involving a wavelength $\omega$ proposed to be illuminated in three hops h1, h2 and h3 to carry proposed traffic. An amount of time the wavelength would be illuminated in each hop is indicated by length of a respective bar 2102, 2104 and 2106.

Each bar 2102-2106 has a respective start time Ts, when the wavelength $\omega$ is proposed to be turned on, and a respective end time Te, when the wavelength $\omega$ is proposed to be turned off. As a practical matter, given the speed of light and the amount of time taken for light to traverse a typical network 100 (FIG. 1), all the start times Ts for the bars 2102-2106 may be identical and all the end times Te for these bars 2102-2106 may be identical. However, in large optical networks, the start and end times Ts and Te may be staggered for the successive hops h1-h3. For purposes of explanation simplicity, identical start times Ts, and identical end times Te, are assumed.

Assume three other wavelengths $\omega 1$, $\omega 2$ and $\omega 3$ are currently in use carrying traffic and/or are scheduled to carry traffic along optical paths the same as, or at least optically coupled to, the optical path of the proposed traffic. For simplicity, assume the three other wavelengths $\omega 1$, $\omega 2$ and $\omega 3$ are used in the same three hops h1-h3 as the proposed traffic. Bars, such as bars 2108, 2110, 2112, 2114 and 2116, represent time spans during which the wavelengths $\omega 1$-$\omega 3$ are illuminated, or scheduled to be illuminated, in the three hops h1-h3. For example, wavelength $\omega 1$ is scheduled to be turned on at the beginning (left end) of bar 2108 and turned off at the end (right end) of the bar 2108. Note, however, that all the bars of a given wavelength $\omega 1$-$\omega 3$ need not be associated with a single traffic transaction (flow), i.e., all the bars of a given wavelength $\omega 1$-$\omega 3$ need not represent times during which traffic is flowing between two given access nodes. For example, bar 2108 may represent one flow involving a pair of access nodes, and bar 2110 may represent a completely different flow involving a different pair of access nodes.

From FIG. 21, it can be seen that wavelength $\omega 1$, represented by bar 2108, will be both illuminated and extinguished between times Ts and Te, i.e., wavelength $\omega 1$ will be set up and torn down while wavelength $\omega$ is on and the proposed traffic would be carried. In other words, traffic carried by wavelength $\omega 1$ over hop h1, represented by bar 2108, overlaps with the proposed traffic. Turning on wavelength $\omega 1$, or turning off wavelength $\omega 1$, could, therefore, impact the qualification of the optical path for the proposed traffic. Therefore, impairments to the proposed traffic, caused by setting up and tearing down wavelength $\omega 1$ on hop 1, i.e., at the beginning and end of bar 2108, should be calculated.

Wavelength $\omega 2$, represented by bar 2112, will be extinguished between times Ts and Te. Tear down of wavelength $\omega 2$ at the end of bar 2112 may, therefore, impair the proposed traffic carried by wavelength $\omega$. The impairment caused by this tear down should be calculated.

Wavelength $\omega 2$, represented by bar 2114, will be turned on between times Ts and Te. Set up of wavelength $\omega 2$ at the beginning of bar 2114 may, therefore, impair the proposed traffic carried by wavelength $\omega$. The impairment caused by this set up should be calculated.

Wavelength $\omega 1$, represented by bar 2110, will be turned on after time Te. Therefore, setting up wavelength $\omega 1$ at the beginning of bar 2110 cannot cause any impairment to the proposed traffic carried by wavelength $\omega$. Thus, no impairment calculation related to this set up is necessary.

Wavelength $\omega 3$, represented by bar 2116, will be turned on between times Ts and Te. Set up of wavelength $\omega 3$ at the beginning of bar 2116 may, therefore, impair the proposed traffic carried by wavelength $\omega$. The impairment caused by this set up should be calculated.

Thus, the first condition stated above, i.e., the lightpath for the proposed traffic is qualified for its entire proposed duration, despite current and scheduled other traffic, can be checked by checking channel quality of the wavelength $\omega$: (a) at the start of the proposed traffic, i.e., at Ts, and (b) at every time between Ts and Te when the configuration changes due to a status change of another wavelength (ex., $\omega 3$) in the same fiber or in a fiber that is optically coupled to the fiber. A "configuration change" means the combination of wavelengths illuminated in the fiber changes or a power level of one of the wavelengths changes. A "status change" means the wavelength (ex., $\omega 1$-$\omega 3$) is turned on or turned off.

The second condition stated above, i.e., setting up and tearing down the proposed lightpath would not disqualify any other current or future scheduled lightpath, can be checked by verifying that, for each current or future scheduled lightpath that overlaps the proposed lightpath, i.e., that is on between Ts and Te, the current or future scheduled lightpath is qualified at each change in configuration of the lightpath. In other words, for each current or future scheduled lightpath that overlaps the proposed lightpath, check the quality at each point in time when the proposed lightpath or another current or future scheduled lightpath is illuminated or extinguished.

Impairment-Aware Wavelength Scheduler Operation

Figure 22A:
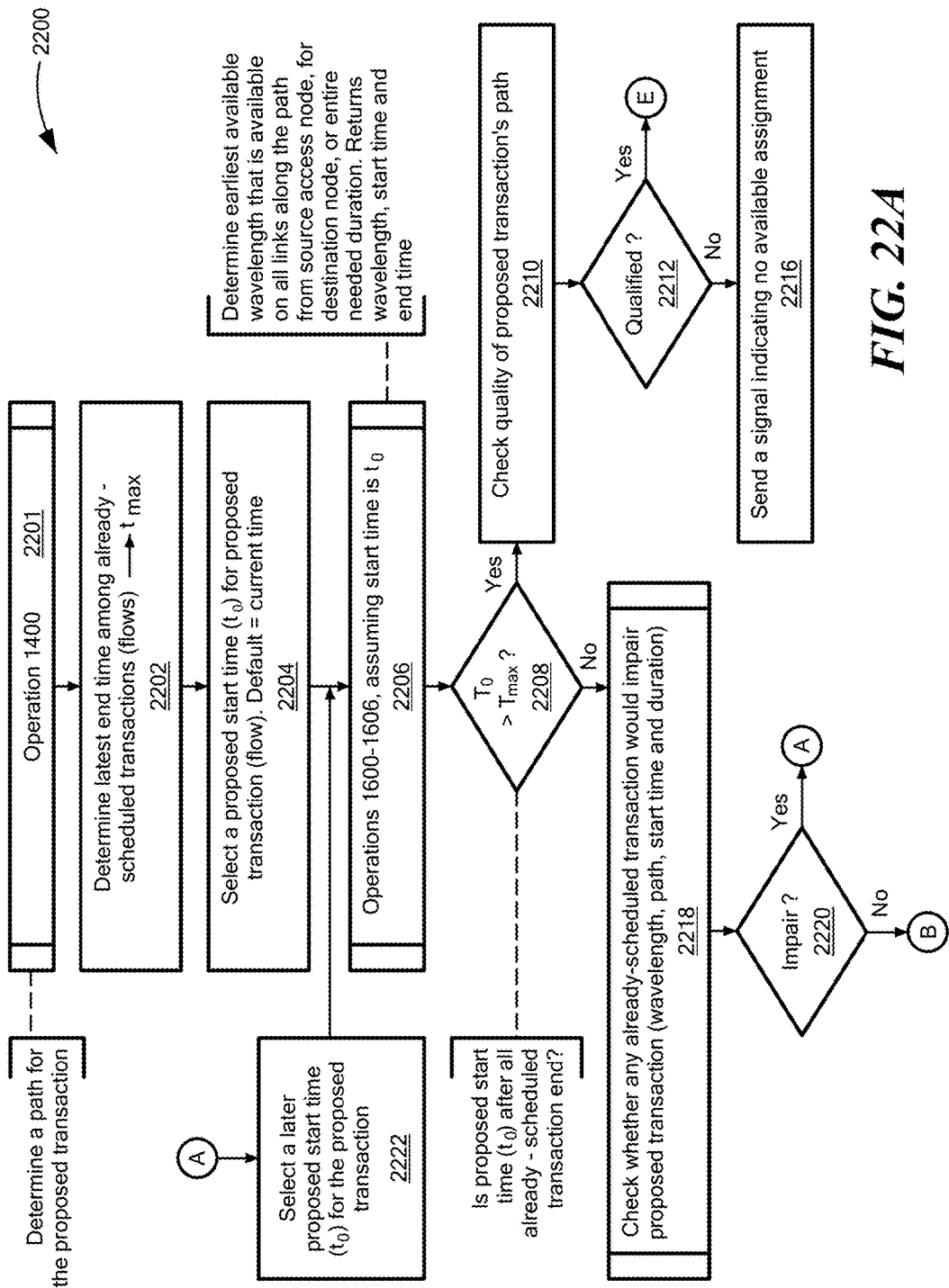
FIGS. 22A, 22B and 22C (collectively FIG. 22) contain a schematic flowchart illustrating modifications to operations performed by the schedulers of FIGS. 3 and 4 to search for an available assignment, while considering possible impairments to traffic, according to another embodiment of the present invention.
Figure 22B:
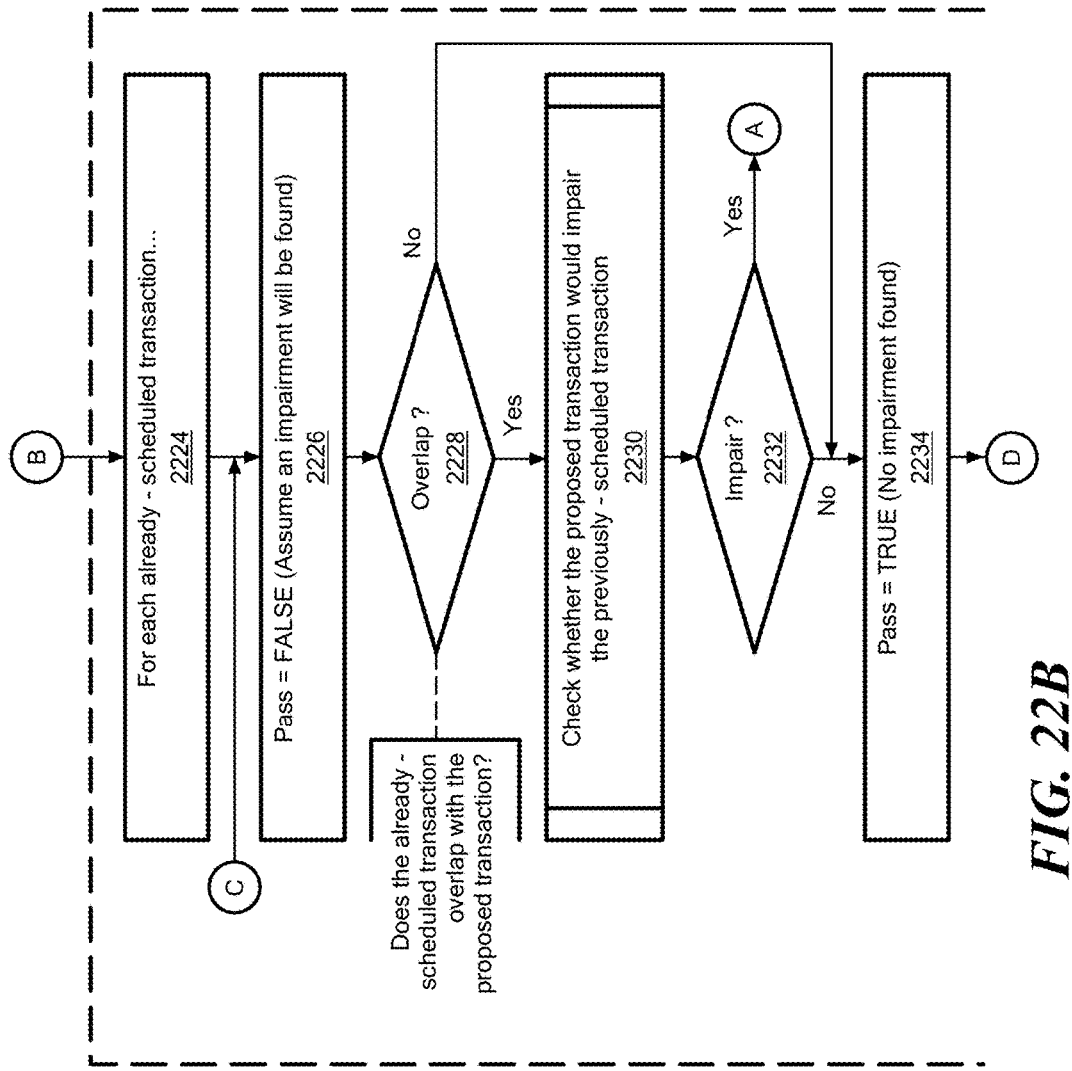
Figure 22C:
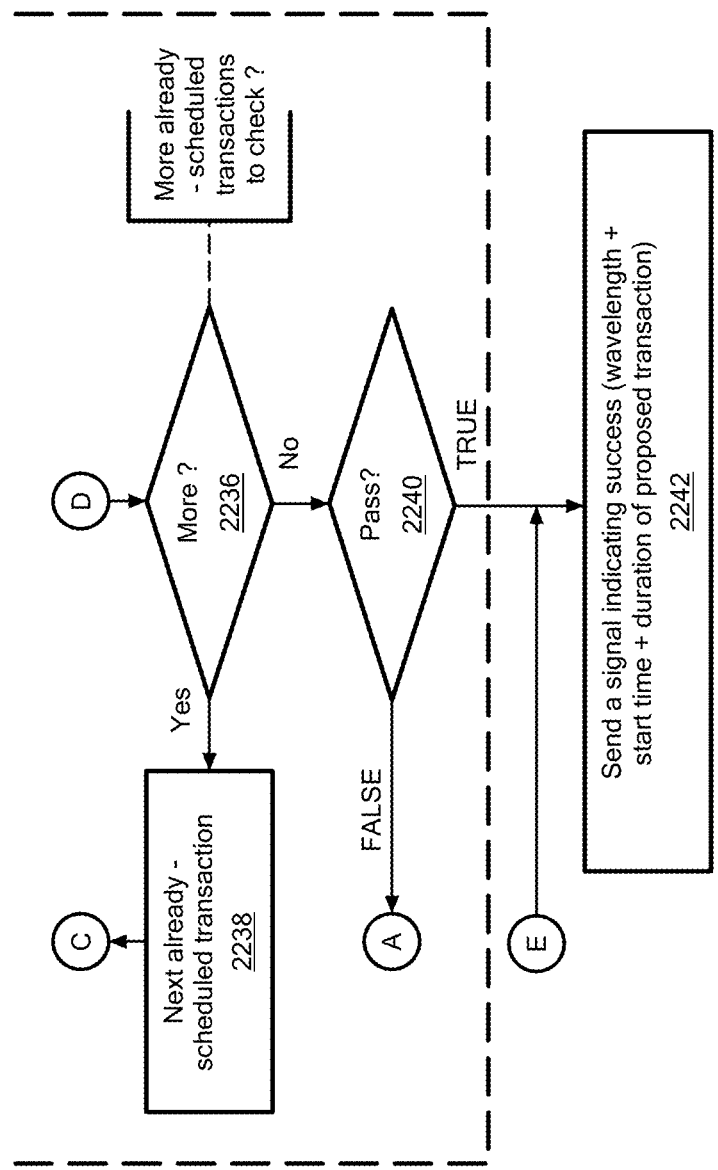

Operations described with respect to FIGS. 14-16 may be modified to make these operations impairment aware. FIG. 22 contains a flowchart schematically illustrating an impairment-aware process 2200 for determining a lightpath for proposed traffic. The process 2200 of FIG. 22 invokes at least some of the processes described with respect to FIGS. 14-16.

At 2201, the path determinator 414 (FIG. 4) automatically determines a possible path for a lightpath for the proposed traffic, from a source access node to a destination access node. Operation 2201 is essentially the same as operation 1400, previously described with respect to FIG. 14.

At 2202, the path determinator 414 (FIG. 4) consults the database 310, including the fiber assignment matrix 818 (FIG. 9), to automatically determine the time at which the last already-scheduled traffic (flow) will end, i.e., the latest end time among the already-scheduled transactions. The last end time is stored in a variable named $t_{max}$.

At 2204, the path determinator 414 selects an initial candidate start time ($t_0$) for the proposed traffic (flow). The initial candidate start time ($t_0$) may be, for example, the current time. Control passes to the beginning of a loop involving operations 2206 through 2238. In each traversal of the loop, the processes consider a successive candidate (proposed) start time ($t_0$) for the proposed traffic, until a suitable lightpath, i.e., a lightpath with no impairment, is found or no suitable lightpath is found. Variable $t_0$ is advanced prior to each traversal of the loop.

At 2206, operations 1600-1606 of FIG. 16 are performed. Operations 1600-1606 are performed as previously described with respect to FIG. 16. Operation 1602 performs operations 1402-1412 of FIG. 14. Operations 1402-1412 are performed as previously described with respect to FIG. 14. Operations 1600-1606 and 1402-1412 are performed with an assumption that the proposed traffic will be sent starting at time $t_0$. Operations 1600-1606 and 1402-1412 automatically determine an earliest available wavelength, if any, that is available to handle the proposed traffic on all links along the lightpath determined in operation 2201, for the entire duration required to handle the proposed traffic. If operations 1600-1606 and 1402-1412 succeed, these operations return the wavelength, the start time and an end time of a transaction that can handle the proposed traffic, otherwise these operations return a failure indication.

At 2208, the proposed start time ($t_0$) for the proposed traffic is compared to the end time ($t_{max}$) of the last already-scheduled transaction. If the proposed start time for the proposed traffic is after all the already-scheduled transactions have ended, i.e. if $t_0$ is greater than $t_{max}$, control passes to 2210, otherwise control passes to 2218. If the proposed start time for the proposed traffic is after all the already-scheduled transactions have ended, no further checks need to be performed, because the proposed traffic could not impair any other traffic, and no other traffic could impair the proposed traffic. Thus, if the lightpath is qualified at the proposed start time ($t_0$), the lightpath would be qualified for the duration of the proposed transaction.

At 2210, the quality of the proposed transaction's path is checked. Checking the quality of the lightpath may involve calculating a bit error rate for each optical fiber of the lightpath, given the combination of wavelengths that are, or will be, lit at the start of the proposed traffic, i.e., at time $t_0$. Other quality metrics may be used, as described herein.

As noted, the database 500 (FIG. 5) includes information 506 about optical fibers in the network 100 (FIG. 1). The fiber information 800 (FIG. 8) includes attenuation factors for the fibers 814-816, as well as the fiber assignment matrix 818, discussed with respect to FIGS. 8 and 9. The fiber assignment matrix 818 stores information identifying which wavelengths are assigned to carry traffic in which fibers and, in particular, a start time and an end time for each such assignment. The amplifier information 1000 (FIG. 10) includes the impairment matrix 1020 (FIG. 11). The splitter/combiner OXC information 510 (FIGS. 5 and 12) contain attenuation and other information about other optical components disposed along the path.

Calculating the quality of the lightpath includes accessing the database 500 to ascertain which wavelength, fibers, amplifiers, etc. are or would be involved in a lightpath, and then fetching and using the attenuation and impairment information about this wavelength and these components to calculate the bit error rate or other quality metric. For example, the bit error rate or other quality metric of each link or optical fiber of the path may be calculated, and then these values may be summed to ascertain an overall path quality metric.

At 2212, if the lightpath is qualified, ex., the bit error rate of no optical fiber of the lightpath exceeds the predetermined threshold, control passes to 2242, otherwise control passes to 2216.

At 2242, the success/failure signal sender 410 sends an electronic signal indicating success, as discussed with respect to operation 1314 (FIG. 13). On the other hand, at 2216, the success/failure signal sender 410 sends an electronic signal indicating a failure to schedule transport of the proposed traffic, as discussed with respect to operation 1316 (FIG. 16).

Operation 2218 is performed if the proposed start time ($t_0$) is not later than all already-scheduled transactions have ended ($t_{max}$). At 2218, checks are performed to ascertain whether any already-scheduled transaction would impair the proposed transaction, given the proposed wavelength for the proposed transaction, the proposed path, start time, end time and duration. Operation 2218 returns an indication whether the proposed wavelength would be unacceptably impaired and a start time. If the wavelength would not be unacceptably impaired, the start time is the start time of a transaction that may proceed without unacceptable impairment. On the other hand, if the wavelength would be unacceptably impaired, the start time returned by operation 2218 is a later start time of an as yet not checked transaction. A more detailed description of operation 2218 is provided herein, with respect to FIG. 23. Operation 2218 may be implemented as a subroutine.

At 2220, if the indication returned by operation 2218 is that the wavelength would be impaired, control passes to 2222, where a later proposed start time ($t_0$) for the proposed transaction is selected. The later proposed start time (t0) may be the start time returned by operation 2218. Control then returns to 2206 for another iteration through the loop.

On the other hand, if at 2220, no unacceptable impairment of the proposed wavelength would occur, control passes to 2224. At 2224, the process 2200 begins a loop that performs operations 2226-2238 for each already-scheduled transaction. At 2226, a temporary variable (Pass) is set to FALSE, on the assumption that an unacceptable impairment will be found.

At 2228, a check is performed to ascertain whether the already-scheduled transaction, i.e., the subject of the current iteration of the loop, overlaps in time with the proposed transaction. The already-scheduled transaction starts at $T'_s$ and ends at $T'_e$. The proposed transaction would start at $T_s$ and would end at $T_e$. If any portion of the already-scheduled transaction overlaps any portion of the proposed transaction, control passes to 2230. However, if the already-scheduled transaction does not overlap the proposed transaction, operations 2230 and 2232 are skipped, and control passes to 2234.

At 2230, checks are performed to ascertain whether the proposed transaction would impair any already-scheduled transaction, given the proposed wavelength for the proposed transaction, the proposed path, start time, end time and duration. Operation 2230 returns an indication whether the proposed transaction would unacceptably impair a wavelength of an already-scheduled transaction and a start time. If the wavelength would not be unacceptably impaired, the start time is the start time of a transaction that may proceed without unacceptably impair any already-scheduled transaction. On the other hand, if the proposed wavelength would unacceptably impair an already-scheduled transaction, the start time returned by operation 2230 is a later start time. Operation 2230 may be implemented as a subroutine. In particular, the subroutine may be the same as called in operation 2218. Thus, a more detailed description of operation 2230 is provided herein, with respect to FIG. 23.

At 2232, if the indication returned by operation 2230 is that an already-scheduled transaction would be impaired, control passes to 2222, where a later proposed start time ($t_0$) for the proposed transaction is selected. The later proposed start time (t0) may be the start time returned by operation 2230. Control then returns to 2206 for another iteration through the loop.

On the other hand, if at 2232, no unacceptable impairment of an already-scheduled transaction would occur, control passes to 2234. At 2234, the variable Pass is set to TRUE, indicating no impairment was found, with respect to the current already-scheduled transaction, and control passes to 2236. At 2236, a check is made to ascertain whether more already-scheduled transactions remain to be checked. If at least one more already-scheduled transactions remains to be checked, control passes to 2238, which indexes to the next already-scheduled transaction to be checked, and then passes control back to 2226. However, if no more already-scheduled transactions remain to be checked, control passes to 2240.

At 2240, the variable Pass is checked. If the variable Pass is FALSE, i.e., the variable indicates an unacceptable impairment was found, control returns to 2222, where another proposed start time ($t_0$) is selected. On the other hand, if the variable Pass is TRUE, i.e., the variable indicates no unacceptable impairment was found, control passes to 2242. At 2242, a signal indicating success, i.e., a proposed transaction (wavelength, start time and end time) were found that would not unacceptably impair any already-scheduled transaction, and that would not be unacceptably impaired by any already-scheduled transaction.

Although not shown in FIG. 22, a stopping criterion may be checked, such as in operation 2222. If the stopping criterion is met, the loop may be exited with an error indication. Consequently, the proposed traffic may be declined or delayed.

As noted, operations 2218 and 2230 may call a subroutine to check whether a given wavelength would be impaired, given the proposed wavelength for the proposed transaction, the proposed path, start time, end time and duration. Operations performed by the subroutine are schematically illustrated in a flowchart of FIG. 23.

Figure 23A:
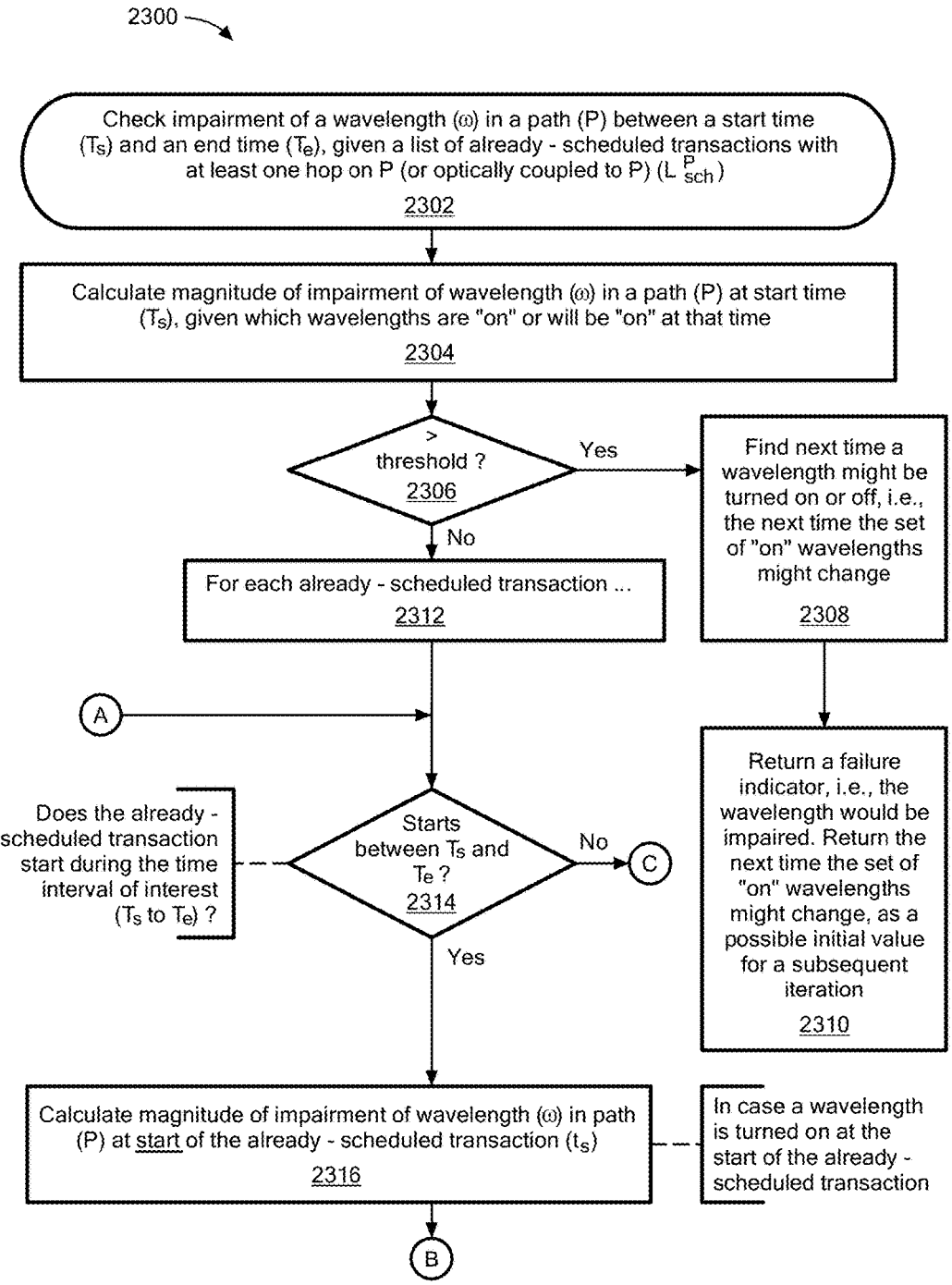
FIGS. 23A and 23B (collectively FIG. 23) contain a schematic flowchart illustrating operations performed in a portion of FIG. 22 to calculate and check magnitude of impairments of a wavelength, according to an embodiment of the present invention.
Figure 23B:
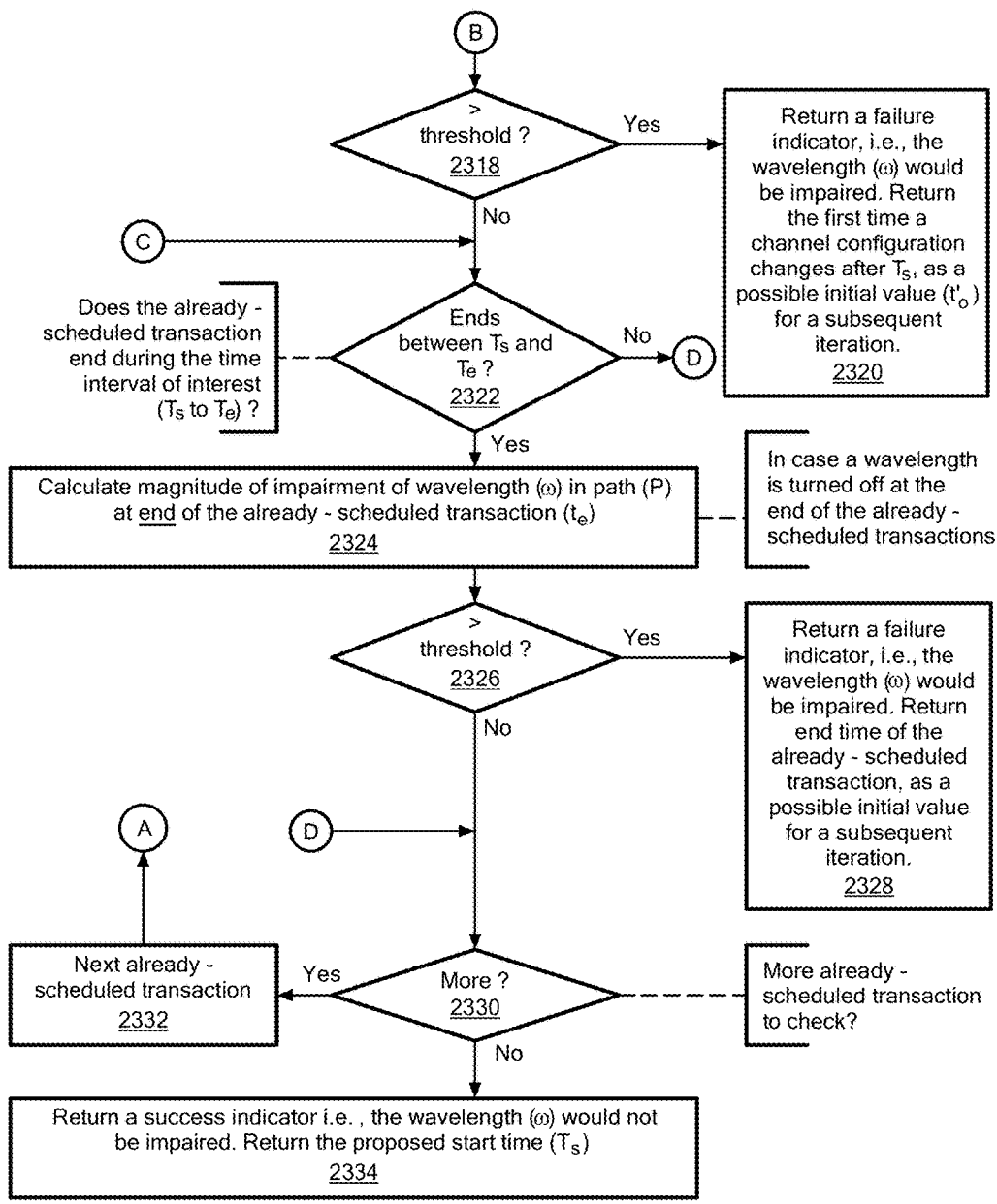

FIG. 23 contains a flowchart schematically illustrating a process 2300 to ascertain whether any already-scheduled transaction or the proposed transaction would impair a specified wavelength ($\omega$), according to an embodiment of the present invention. As indicated at 2302, inputs to the process 2300 include the wavelength ($\omega$) to be checked, a path (P) over which the wavelength would be illuminated, a start time ($T_s$) and an end time ($T_e$) of (proposed) use of the wavelength, and a list of other transactions ($L_p^{sch}$) assumed to be scheduled on at least one hop of the path (P) or a hop optically coupled to the path (P).

As noted, operations 2218 and 2230 (FIG. 22) invoke process 2300. However, operations 2218 and 2230 invoke process 2300 with different wavelengths to be checked. Operation 2218 (FIG. 22) specifies the wavelength of the proposed transaction as the wavelength ($\omega$) to be checked for impairment, whereas operation 2230 specifies a wavelength of an already-scheduled transaction.

At 2304, a magnitude of impairment of the wavelength ($\omega$) being checked is calculated. As noted, the magnitude of the impairment may be calculated as a bit error rate, or any other suitable measure of quality, expected to be experienced by traffic carried by the wavelength ($\omega$) over the path (P) at the start time ($T_s$). At 2306, if the calculated impairment exceeds a predetermined threshold, control passes to 2308. At 2308, the next time a wavelength might be turned on or off is found, i.e., the next time the set of "on" wavelengths in the path changes is found. Because magnitudes of impairments change only when wavelengths are turned on or off, the magnitudes need not be calculated for times when the set of "on" wavelengths remains constant.

Control then passes to 2310, which returns a failure indicator, which indicates the wavelength would be unacceptably impaired. A time ($t'_0$) when the next change in the set of "on" wavelengths occurs is also returned.

On the other hand, at 2306, if the calculated impairment does not exceed the predetermined threshold, control passes to 2312. At 2312, the subroutine enters a loop. The loop checks the list of transactions ($L_p^{sch}$) assumed to be scheduled. The loop is traversed once per transaction in the list ($L_p^{sch}$) and includes operations 2314 to 2332.

At 2314, a check is performed to ascertain whether a transaction in the list ($L_p^{sch}$), i.e., the subject of the current iteration of the loop (the "current transaction"), is scheduled to start between the start ($T_s$) and end ($T_e$) times of the transaction involving the wavelength ($\omega$) being checked. If yes, control passes to 2316, otherwise operations 2316 and 2318 are skipped and control passes to 2322.

At 2316, a magnitude of impairment of the wavelength ($\omega$) in the path (P) at the start ($t_s$) of the current transaction is calculated. This calculation is performed, in case the wavelength ($\omega$) is scheduled, or proposed, to be turned on at the start of the current transaction.

At 2318, if the calculated magnitude of the impairment exceeds the predetermined threshold, control passes to 2320, otherwise control passes to 2322. At 2320, the process 2300 returns a failure indicator, i.e., an indication the wavelength ($\omega$) would be unacceptably impaired. In addition, the process 2300 returns the start time of the current transaction, which may be used as a start time of a subsequent search.

At 2322, a check is performed to ascertain whether the current transaction is scheduled to end between the start ($T_s$) and end ($T_e$) times of the transaction involving the wavelength ($\omega$) being checked. If yes, control passes to 2324, otherwise operations 2324 and 2326 are skipped and control passes to 2330.

At 2324, a magnitude of impairment of the wavelength ($\omega$) in the path (P) at the end ($t_e$) of the current transaction is calculated. This calculation is performed, in case the wavelength ($\omega$) is scheduled, or proposed, to be turned on at the end of the current transaction.

At 2326, if the calculated magnitude of the impairment exceeds the predetermined threshold, control passes to 2328, otherwise control passes to 2330. At 2328, the process 2300 returns a failure indicator, i.e., an indication the wavelength ($\omega$) would be unacceptably impaired. In addition, the process 2300 returns the end time of the current transaction, which may be used as a start time of a subsequent search.

At 2330, a check is performed to ascertain whether at least one more transaction remains in the list ($L_p^{sch}$) to be processed. If yes, control passes to 2332, which advances the current transaction to the next transaction in the list ($L_p^{sch}$), and then returns control to 2314, for another iteration of the loop. On the other hand, at 2330, if no more transactions remain in the list ($L_p^{sch}$), control passes to 2334. At 2334, a success indication is returned, i.e., an indication the wavelength ($\omega$) would not be unacceptably impaired. In addition, the start time ($T_s$) of the transaction involving the wavelength ($\omega$) is returned.

Simplification of Impairment-Aware Wavelength Scheduler

Ignoring nonlinear effects of optical fiber on optical signals, and assuming optical signal noise is dominated by noise generated by EDFAs, our research shows that the worst case channel quality impairment along a given path occurs when a wavelength is first illuminated in an otherwise dark (unilluminated) optical fiber. In other words, impairments caused by turning on a first wavelength in the optical fiber are greater than impairments caused by turning on additional wavelengths in the optical fiber. Based on this insight, the impairment-aware wavelength scheduler operation described herein may be simplified, as follows. If a lightpath is qualified, based on already-scheduled transactions, the lightpath will remain qualified in the future, because it is possible to have only more, not fewer, wavelengths illuminated in the future than were known, or scheduled, to be illuminated when the impairments were calculated. Furthermore, already-scheduled transactions will not be disqualified by scheduling more transactions that overlap with the already-scheduled transaction, also because additional overlapping transactions could not reduce the number of illuminated wavelengths.

The scheduler 314 and the processing described with respect to FIG. 22 may be modified by eliminating operations within a dashed box 2244.

Impairment-Compensation Network

Since the worst case channel quality impairment along a given path occurs when a wavelength is first illuminated in an otherwise dark (unilluminated) optical fiber, some embodiments of the present invention introduce some light into each optical fiber, even if the optical fiber is not scheduled to carry traffic, thereby preventing a transition from no wavelength being illuminated to some wavelength being illuminated.

Figure 24:
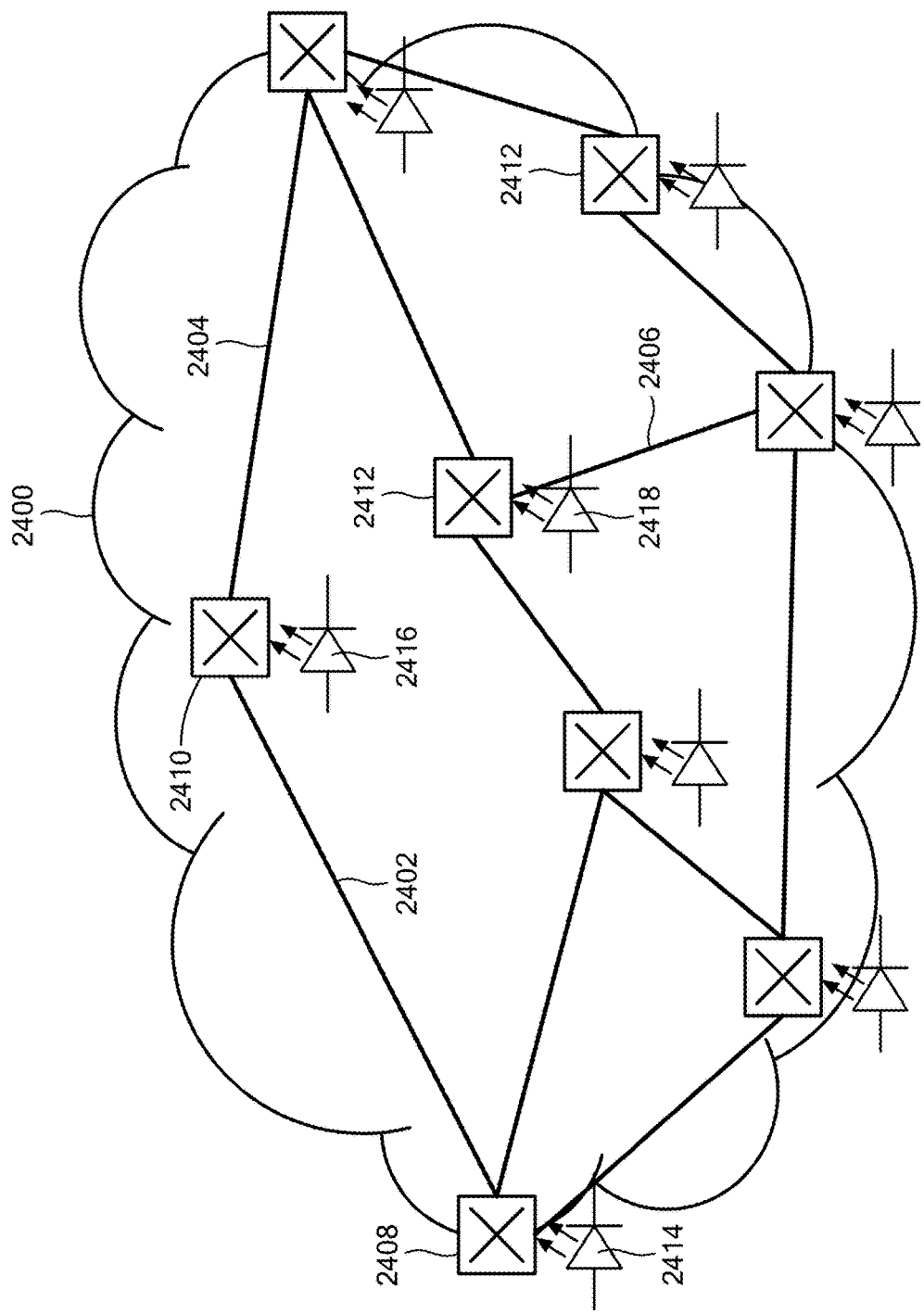
FIG. 24 is a schematic diagram of a hypothetical set of optical switches and dummy lasers that may be found at a node of the optical network of FIG. 1, according to an embodiment of the present invention.

In some embodiments, for each optical fiber of an optical network 2400 coupled to an output of an optical switch, a dummy laser injects optical power into the optical fiber, as schematically illustrated in FIG. 24. "Dummy" here means output of the laser is not used to carry traffic. The wavelength of the dummy laser should be within the bandwidth amplified by the EDFAs of the network. In some embodiments, the wavelength of the dummy laser is not close enough to any wavelength that does or might carry traffic to be confused with traffic or to interfere with the traffic. However, in other embodiments, the wavelength of the dummy laser is that of an unused channel. In the latter case, the dummy laser may be a laser that would otherwise be used to illuminate the wavelength that would carry traffic in the unused channel.

The optical network 2400 includes optical fibers, exemplified by optical fibers 2402, 2404 and 2406. The optical fibers 2402-2406 are coupled to outputs of respective optical switches, exemplified by optical switches 2408, 2410 and 2412. A dummy laser, exemplified by lasers 2414, 2416 and 2418, is optically coupled to each of the optical fibers 2402-2406.

The output power level of each dummy laser may be controlled, such that the total optical power of all wavelengths (within the bandwidth amplified by the EDFAs) remains above a predetermined minimum power level or within a predetermined range of power levels. The minimum power level may be selected or empirically ascertained, such that illuminating one channel wavelength in addition to the dummy laser does not unacceptably impair traffic.

The output power level of each dummy laser may be controlled, over time, in response to a then-current power level in the optical fiber. The power level in the optical fiber may be ascertained by measuring the power level, such as with an optical sensor. Alternatively, the power level in the optical fiber may be calculated from the information in the database 500 indicating which wavelengths are illuminated (ex. 800, 810 in FIG. 8 and/or 1016, 1018 in FIG. 10), power output levels of optical emitters generating the illuminated wavelengths, optical amplifier gains, attenuations caused by optical components (ex., 814, 816 in FIG. 8, 1224, 1226 in FIG. 12), etc.

FIGS. 25, 26 and 27 schematically illustrate exemplary operation of the dummy laser, in response to changes in traffic-carrying wavelengths being illuminated and extinguished in an optical fiber.

FIG. 25 is a graph of hypothetical optical power output by an optical switch, over time. During time period 2500, relatively few traffic-carrying wavelengths are on in the optical fiber. Thus, during the time period 2500, relatively little optical power 2501 is introduced into the optical fiber. At time 2502, several additional wavelengths are turned on. Consequently, during time period 2504, relatively more optical power 2505 is introduced into the optical fiber than during the earlier time period 2500. At time 2506, some wavelengths are turned off. Consequently, during time period 2508, less optical power 2509 is introduced into the optical fiber than during the time period 2504, but more than was introduced during the time period 2500. At time 2510, more wavelengths are turned on, so during time period 2512, yet more power 2513 is introduced into the optical fiber.

Assume the minimum power level, as determined above, is represented by a dashed line 2514. FIG. 26 is a graph of hypothetical optical power output by a dummy laser, over the same time period as represented in FIG. 25, according to operation of an embodiment of the present invention. FIG. 27 is a graph of hypothetical optical power in the optical fiber, i.e., a sum of the power levels of FIGS. 25 and 26.

Because during the time period 2500 the power 2501 (FIG. 25) of traffic wavelength(s) is below the minimum power level 2514, the dummy laser introduces sufficient optical power 2600, such that a sum of the illuminated traffic wavelength(s) 2501 and the dummy laser power 2600 exceeds the minimum power level 2514.

During the time period 2504, the illuminated traffic wavelength(s) power level 2505 exceeds the minimum power level 2514. Thus, the dummy laser need not be on.

During the time period 2508, the illuminated traffic wavelength(s) power level 2509 is below the minimum power level 2514. Consequently, the dummy laser is turned on to introduce sufficient optical power 2602 to at least make up the deficiency between the illuminated traffic wavelength(s) power 2509 and the minimum power level 2514.

During the time period 2512, the illuminated traffic wavelength(s) power level 2513 exceeds the minimum power level 2514. Thus, the dummy laser need not be on.

Additional Details about Disclosed Embodiments

Optical Flow Switching (OF S) that employs agile end-to-end lightpath switching for users with large transactions has been shown to be cost-effective and energy-efficient. However, whether it is possible to coordinate lightpath switching and scheduling at a global scale on a per-session basis, and how the control plane and data plane performance correlate remained un-answered. Here, we have addressed the network management and control aspect of OFS, and designed a network architecture enabling both a scalable control plane and an efficient data plane. We have given an overview of essential network management and control entities and functionalities. We focused on the scheduling problem of OFS because its processing power and generated control traffic increase with traffic demand, network size, and closely correlate with data network architecture, while other routine maintenance type of control plane functionalities contribute either a fixed amount or negligibly to the total efforts.

We considered two possible Wide Area Network architectures: meshed or tunneled, and developed a unified model for data plane performance to provide a common platform for the performance comparison of the control plane. The results showed that with aggregation of at least two wavelengths of traffic and allowing about two transactions per wavelength to be scheduled to the future, the tunneled architecture provides comparable data plane performance as the meshed architecture.

We have developed a framework to analyze the processing complexity and traffic of the control plane as functions of network architecture, and traffic demand. To guarantee lightpath quality in presence of physical-layer impairments, we developed models for quality of erbium doped fiber amplifier (EDFA) amplified optical links and impairment-aware scheduling algorithms for two cases, a) the known worst case of channel quality is when there is no "On" channel in a fiber, and b) detailed channel configuration of a fiber is needed to determine channel quality. Without physical-layer impairments, tunneled architecture reduces control plane traffic and processing complexity by orders of magnitude. With impairment-aware scheduling, detailed channel configuration information reporting leads to heavy control traffic (~250 Gbps/edge); while known worst case and tunneling leads to manageable control traffic (~36 Gbps/edge) and processing power (1-4 i7 CPUs).

1 DATA PLANE PERFORMANCE ANALYSIS

Data plane performance is coupled with control plane performance through network topology and network control algorithms (routing, scheduling, etc). It also depends on the network resources, and network loading (and thus, traffic demand). Assume wavelength continuity constraint is respected by the scheduling algorithm, because the current wavelength converting technology is not cost-efficient and we don't foresee it to be mature soon. In [3], Barry and Humblet studied blocking probability of unscheduled circuit-switched all-optical networks with and without wavelength converters. We name their model the Barry-Humblet Model. They introduced three separate models, investigating the effect of path length, switch size, and interference length, respectively, on blocking probabilities. In their models, a session request between A and B is blocked if, for all-optical network without wavelength converters, all lightpaths (each lightpath is composed of channels of the same wavelength) are blocked, or, for all-optical network with wavelength converters, there exists a hop with all wavelengths used. However, the three parameters they investigated separately are all manifestations of the network topology and lightpath switching mechanism, and are correlated, and the Barry-Humblet Model did not give an analysis of the overall effect of network topology on blocking probability. In this Chapter, we will develop a unified model to investigate the network topology on blocking probability of circuit-switched all-optical networks with no wavelength converters, and extend it to flow-switched optical networks with scheduling.

1.1 OFS Scheduling with Schedule Holders

Figure 28:
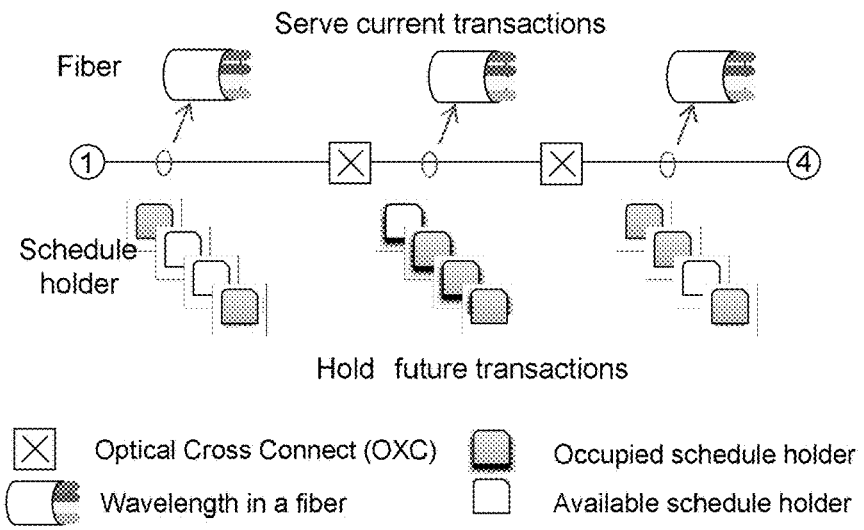
FIG. 28 is an illustration of OFS scheduling with schedule holders, according to an embodiment of the present invention.

As illustrated in FIG. 28, when a request arrives, the Scheduler will first try to accommodate it with network resources that are available at the time of the request along a candidate path (the path here refers to a path in the logical network topology). If there are no available resources at that time, the Scheduler schedules the session to a lightpath with the first available time in the future. A scheduled transaction in the future is stored by "schedule holders" along the link, (a link refers to an edge connecting two nodes in the logical network topology. A link in Architecture M corresponds to all wavelength channels connecting a node pair which are only one-hop away in the physical topology. In Architecture T, a link corresponds to the tunneled lightpaths connecting a node pair which can be one-hop or multi-hop away in the physical topology), between adjacent node pairs. In the case of the tunneled architecture, the schedule holders are located at the Ingress WAN node only. A schedule holder can be considered as a marker to the corresponding wavelength channel specifying the future assignment and time of usage of this wavelength channel, in the form of (wavelength, $t_{start}$, $t_{end}$). It has two states, "available" or "occupied". Only available schedule holder can be assigned with new transactions, and upon assignment its state changes from "available" to "occupied". If there are only finite $N_s$ schedule holders for each link, sessions will not be scheduled into the infinite future. Assume there are $\Lambda$ wavelength channels for each link. Define the scheduling capacity to be the ratio of $N_s/\Lambda$. A lightpath is available for a certain time duration in the future if there is at least one schedule holder that is available for each hop along the lightpath throughout that duration. A request is blocked if there are no currently available network resources and there are no available lightpaths in the future.

FIG. 28 is a schematic diagram illustration of OFS scheduling with schedule holders.

Figure 29:
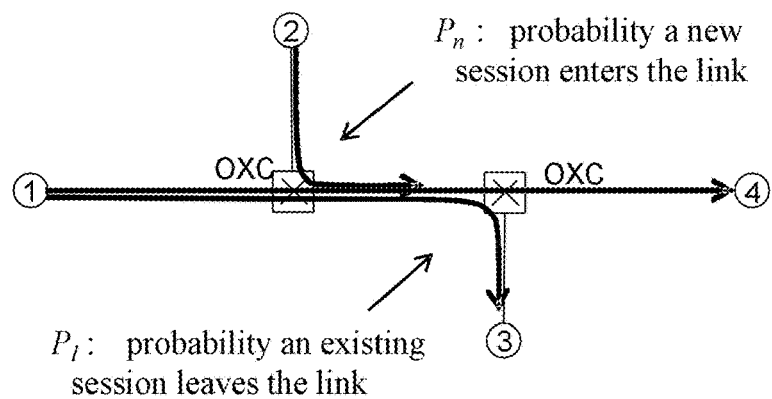
FIG. 29 is an illustration of traffic merging into and diverging from a path, according to an embodiment of the present invention.

FIG. 29 is a schematic diagram illustration of traffic merging into and diverging from a path.

We consider network topologies that are symmetric or close to symmetric, and assume the network is in steady state in the following analysis. Define $\rho$ to be the network link loading. Since the network is in steady state, $\rho$ is also the probability that the link is occupied. Define $P_n$ as the probability that a session enters the link, and $P_l$ as the probability that an existing session leaves the link (FIG. 29). Use a two-state ("available" or "occupied") Markov Chain (FIG. 30) to model the state of the link (the state of a link is usually modeled as a Markov Process, which can be approximated using a sampled Markov Chain). Then the transition probability from state "available" to "occupied" is $P_n$, and the transition probability from the state "occupied" to the state "available" is $P_l(1-P_n)$. Therefore, $$\rho = \frac{P_n}{P_n + P_l - P_n P_l} \tag{1.1}$$

Figure 30:
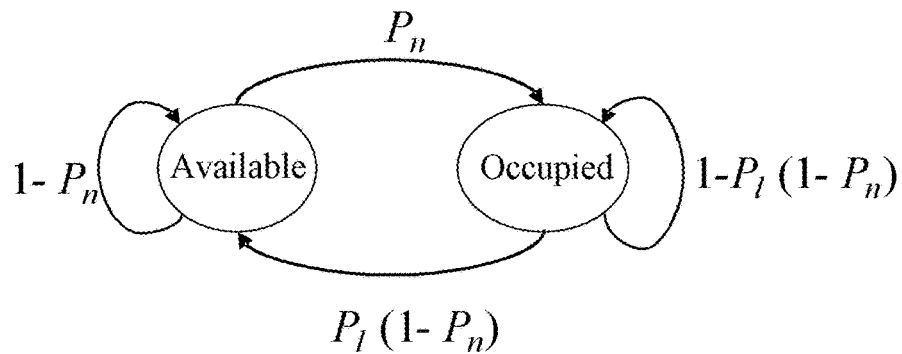
FIG. 30 is a schematic diagram of a Markov Chain model of link state, according to an embodiment of the present invention.

FIG. 30 is a schematic diagram of a Markov Chain model of link state.

Figure 31:
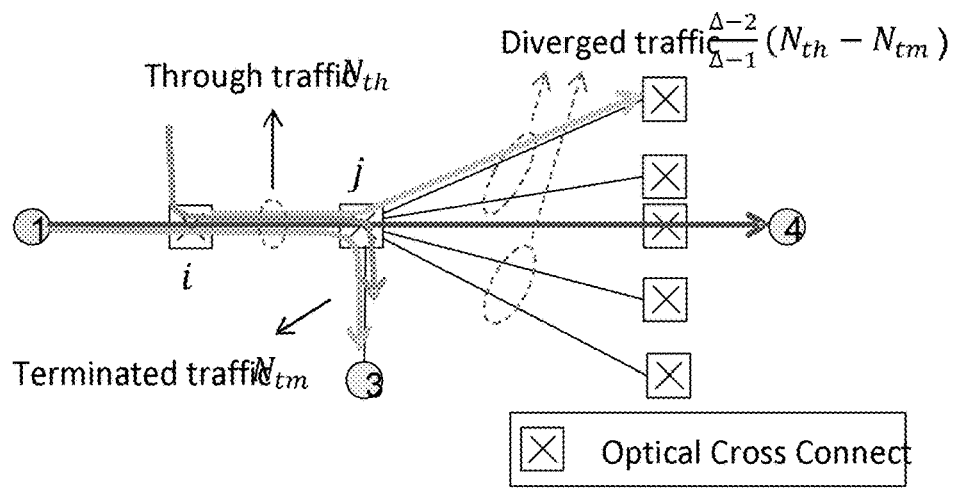
FIG. 31 is a schematic illustration of lightpaths, according to an embodiment of the present invention.

FIG. 31 is a schematic illustration of lightpaths going through link $L_{ij}$, lightpaths terminated at node j, and lightpaths diverging from path 1→i→j→4 at node j. $N_{th}$ is the total number of lightpaths that pass through link $L_{ij}$, $N_{tm}$ is the number of lightpaths terminating at node j, and $$\frac{\Delta-2}{\Delta-1}(N_{th}-N_{tm})$$

is the number of diverging lightpaths at node j. $\Delta=6$ in the figure.]

1.2 Blocking Probability for Architecture M

Consider a mesh network graph with $N_V$ nodes, $N_E$ edges, and $\Delta$ average node degree. At one intermediate node along a lightpath, define $P_{\lambda l}$ as the probability that an transmission leaves this lightpath, and $P_{\lambda n}$ as the probability that a new transaction enters this lightpath ($P_{\lambda n}$ and $P_{\lambda l}$ are special cases of $P_n$ and $P_l$, respectively). To derive $P_{\lambda l}$, consider a link $L_{ij}$ connecting node i to node j on a designated path. Define $N_{th}$ as the number of lightpaths that go through $L_{ij}$, and $N_{tm}$ as the number of lightpaths that enter $L_{ij}$ at node i and terminate at node j. Assume a uniform all-to-all traffic model and that there is one unit of traffic from one node to each other node, and each node employs the same routing policy. Then, $$N_{th}=\frac{N_V(N_V-1)\overline{H}}{2N_E}$$

$$N_{tm}=\frac{N_V-1}{\Delta}$$

where $\overline{H}$ is the average number of hops over all paths. Because on average $P_{\lambda l}$ equals to the ratio of the number of lightpaths terminating or being switched to other paths at node j over the total number of lightpaths that pass through $L_{ij}$, $$P_{\lambda 1}=\frac{N_{tm}+\frac{\Delta-2}{\Delta-1}(N_{th}-N_{tm})}{N_{th}} \quad (1.2)$$

$$=\frac{2N_E}{\Delta(\Delta-1)N_V\overline{H}}+\frac{\Delta-2}{\Delta-1} \quad (1.3)$$

Denote $\rho_\lambda$ as the loading of wavelength channels. Then, Eq. (1.1) becomes $$\rho_\lambda=\frac{P_{\lambda n}}{P_{\lambda n}+P_{\lambda l}-P_{\lambda n}P_{\lambda l}} \quad (1.4)$$

Solving the above equation for $P_{\lambda n}$, we obtain $$P_{\lambda n}=\frac{\rho P_{\lambda l}}{1-\rho(1-P_{\lambda l})}$$

Assume shortest path routing. Define $P_{\lambda B}$ as the probability that a request cannot be served by network resources along the designated path at the time of the request. Define $P_{sB}$ as the conditional probability that a request, which cannot be served by network resources at the time of the request, also cannot be scheduled into the future as all the schedule holders on at least one link are full (FIG. 32).

Figure 32:
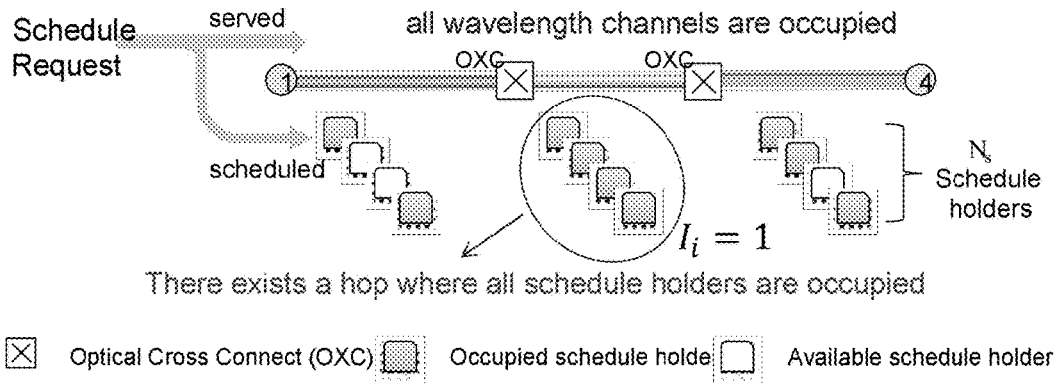
FIG. 32 is a schematic illustration of a scenario where a request can be blocked.

FIG. 32: is a schematic illustration of a scenario where a request can be blocked.

Assume independence among lightpaths along the same path (This is a good assumption when there are many wavelength channels for low to medium loading, which will be the case as predicted in [16]). Because of wavelength continuity constraint, $P_{\lambda B}$ equals the probability that for any lightpath along the designated path, there are interfering sessions. Therefore, $$P_{\lambda B}=Pr\{\text{All } \Lambda \text{ wavelength along the path are not available}\}$$

$$=(Pr\{\text{A given wavelength along the path is not available}\})^\Lambda$$

$$=(1-Pr\{\text{A given wavelength is available on all hops along the path}\})^\Lambda$$

$$=\left[1-(1-P_{\lambda n})^{\overline{H}}\right]^\Lambda$$

where $\Lambda$ is the total number of wavelength on a link. This is a fair approximation of the expected $P_{\lambda_B}$ w.r.t distributions of H. The probability that a session enters a schedule holder is also the probability that a request is scheduled into the future and handled by a particular schedule holder, and, $$P_{sn}=P_{\lambda n}P_{\lambda B}\frac{\Lambda}{N_s} \quad (1.5)$$

Because wavelength continuity is also respected by scheduled sessions, the probability that an existing session leaves the schedule holder of the corresponding wavelength channel is the same as the probability that the scheduled session leaves that lightpath, that is, $P_{sl}=P_{\lambda l}$. Define $\rho_s$ as the loading of schedule holders, from Eq. (1.1), we obtain $$\rho_s=\frac{P_{sn}}{(P_{sn}+P_{sl}-P_{sn}P_{sl})} \quad (1.6)$$

Assume independence among schedule holders on the same link (this assumption is good when loading of schedule holders is low, which is the case with large network demands, see Section 4), and Markovian independence among neighboring hops (same assumption as in [3]) (the state of a designated link, given the state of the first neighboring link before it, is independent of states of all other links before its first neighbor). Define $P_{OB}$ as the overall probability that a request is blocked. Then, $$P_{OB}=P_{\lambda B}P_{sB}$$

To obtain $P_{sB}$, we notice that a request that cannot be served by network resources at the time of the request is only blocked if, along the designated path, there exists a hop where all the schedule holders are occupied. Define an indicator random variable $I_i$ that equals to one if all schedule holders on hop $h_i$ are occupied, and zero otherwise. Then, $$P_{sB}=1-P\{I_1=0\}\Pi_{i=2}^{\overline{H}}\{I_i=0|I_{i-1}=0\} \quad (1.7)$$

Assume a request encounters the steady state at schedule holders of the first hop. Then, $$P\{I_1=0\}=1-\rho_s^{N_s} \quad (1.8)$$

From $$P\{I_i=1\}=P\{I_i=1|I_{i-1}=0\}P\{I_{i-1}=0\}+P\{I_i=1|I_{i-1}=1\}P\{I_{i-1}=1\}$$

we obtain, $$P\{I_i = 0 \mid I_{i-1} = 0\} = 1 - P\{I_i = 1 \mid I_{i-1} = 0\} = \quad (1.9)$$
$$1 - \frac{P\{I_i = 1\} - P\{I_i = 1 \mid I_{i-1} = 1\}P\{I_{i-1} = 1\}}{1 - P\{I_{i-1} = 1\}} =$$
$$1 - \frac{\rho_{si}^{N_s} - \rho_{s(i-1)}^{N_s}(1 - P_{sl} + P_{sl}P_{sn})^{N_s}}{1 - \rho_{s(i-1)}^{N_s}}$$

where $\rho_{si}$ is the loading of schedule holders on hop $h_i$. Substituting Eq. (1.8) and (1.9) into Eq. (1.7) we get, $$P_{sB} = 1 - (1 - \rho_s^{N_s})\prod_{i=2}^{H}\left[1 - \frac{\rho_{si}^{N_s} - \rho_{s(i-1)}^{N_s}(1 - P_{sl} + P_{sl}P_{sn})^{N_s}}{1 - \rho_{s(i-1)}^{N_s}}\right] \quad (1.10)$$

Because a request encounters the steady state loading of schedule holders at hop $h_1$, we will show in the following theorem that it also encounters the steady states of schedule holders at the following hops along the designated path.

Theorem 1 For a $\overline{H}$-hop path in a symmetric network with uniform all-to-all traffic, if the loading of the schedule holders on $h_1$ is $\rho_s$, then the loadings of schedule holders of $h_2, h_3, \ldots, h_{\overline{H}}$ are also $\rho_s$.

Theorem 1 is proved in Appx. 1, and Eq. (1.10) is reduced to $$P_{sB} = 1 - (1 - \rho_s^{N_s})\prod_{i=2}^{H}\left[1 - \frac{\rho_s^{N_s} - \rho_s^{N_s}(1 - P_{sl} + P_{sl}P_{sn})^{N_s}}{1 - \rho_s^{N_s}}\right] \quad (1.11)$$
$$= 1 - (1 - \rho_s^{N_s})\left\{1 - \frac{\rho_s^{N_s}[1 - (1 - P_{sl} + P_{sl}P_{sn})^{N_s}]}{(1 - \rho_s^{N_s})^{H-1}}\right\}^{H-1}$$

$$P_{sl} = P_{\lambda l}$$

$$P_{sn} = P_{\lambda n}P_{\lambda B}\frac{\Lambda}{N_s}$$

Then, the overall blocking probability $P_{OB}$ can be written as:

$$P_{OB}=P_{\lambda B} \cdot P_{sB}. \quad (1.12)$$

Since the above derivation is based on a meshed network, to distinguish with the tunneled case, we denote the overall blocking probability of a network of Architecture M as, $P_{OBM}$ (subscript M or T is used to identify Architecture M or T), then $$P_{OBM}=P_{\lambda B} \cdot P_{sB} \quad (1.13)$$

Figure 33:
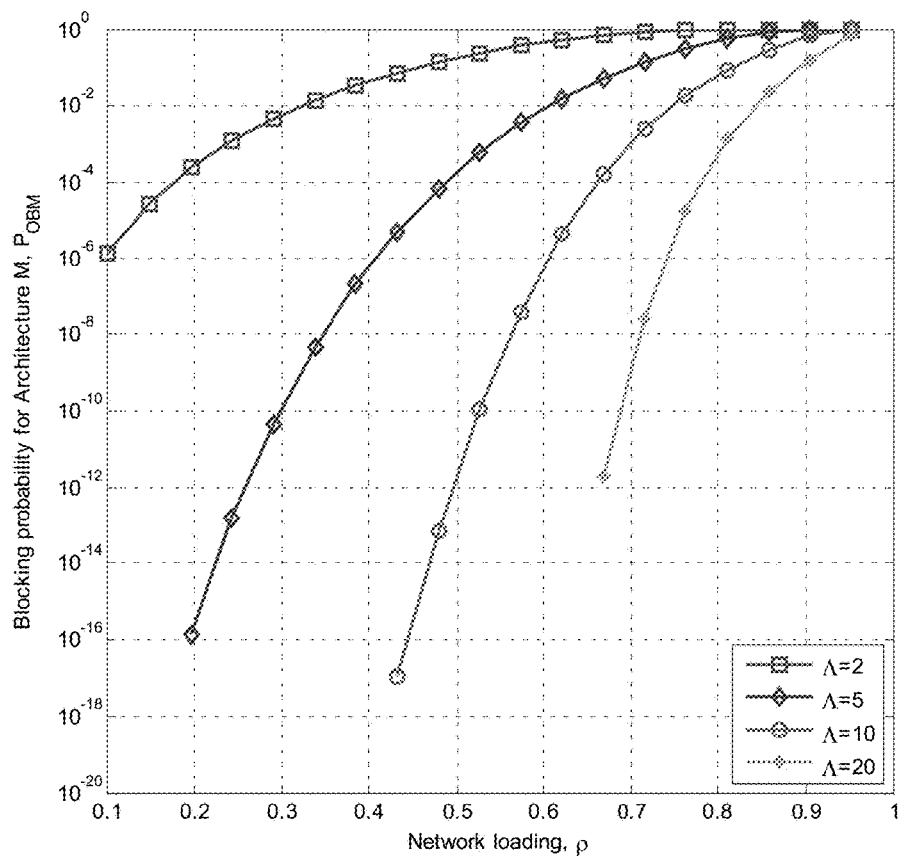
FIG. 33 is a plot of blocking probability for Architecture M, according to an embodiment of the present invention.

FIG. 33 plots $P_{OBM}$ as a function of network loading $\rho$ with $N_s/\Lambda=1$.

FIG. 33 is a plot of blocking probability for Architecture M, $P_{OBM}$, with respect to network loading $\rho$ with $N_s/\Lambda=1$, for different values of $\Lambda$. $N_s$ is the total number of schedule holders per link, and $\Lambda$ is the number of wavelengths per link.

1.3 Blocking Probability for Architecture T

For Architecture T, since connections between any two nodes are tunneled, the hop count is one for all WAN paths, and schedule holders locates at the Ingress node of WAN (in the case of the tunneled architecture, since there is only one hop, all requests scheduled into the future in the same wavelength tunnel can be aligned back to back. Therefore, the queuing delay of a request can be approximated by the product of the average number of occupied schedule-holders-per-wavelength times the average transaction-time). Therefore, we have $$H=1$$

$$N_E=N_V(N_V-1)$$

$$\Delta=N_V-1$$

Therefore, $$P_{\lambda l}=1$$

$$P_{\lambda n}=\rho$$

$$P_{\lambda B}=\rho^{\Lambda T}$$

$$P_{sl}=1$$

Define D as the average number of source-destination sessions over one link in the physical network topology. Then, $$D = \frac{N_V(N_V - 1)\overline{H}}{2N_E} \quad (1.14)$$

Assume wavelength channels over one link in the physical network topology are shared evenly among all source-destination sessions that pass through that link using shortest path routing, then, $$N_{sT} = \frac{N_s}{D}$$

$$\Lambda_T = \frac{\Lambda}{D}$$

where $N_{sT}$ is the number of schedule holders per tunnel, and $\Lambda_T$ is the number of wavelengths per tunnel.

Substituting the above equations into Eq. (1.5), (1.6), and (1.11), we obtain $$P_{sn} = \frac{\Lambda_T}{N_{sT}}\rho^{\Lambda_T+1} \quad (1.15)$$

$$\rho_s = \frac{\Lambda_T}{N_{sT}}\rho^{\Lambda_T+1}$$

$$P_{sB} = \left(\frac{\Lambda_T}{N_{sT}}\right)^{N_{sT}}\rho^{N_{sT}(\Lambda_T+1)}$$

Denote $P_{OBT}$ as the overall blocking probability of Architecture T, then, $$P_{OBT} = \left(\frac{\Lambda_T}{N_{sT}}\right)^{N_{sT}} \rho^{N_{sT}(\Lambda_T+1)+\Lambda_T} \quad (1.16)$$

FIG. 33 plots $P_{OBT}$ as a function of network loading μ with $N_s/\Lambda=2$.

Figure 34:
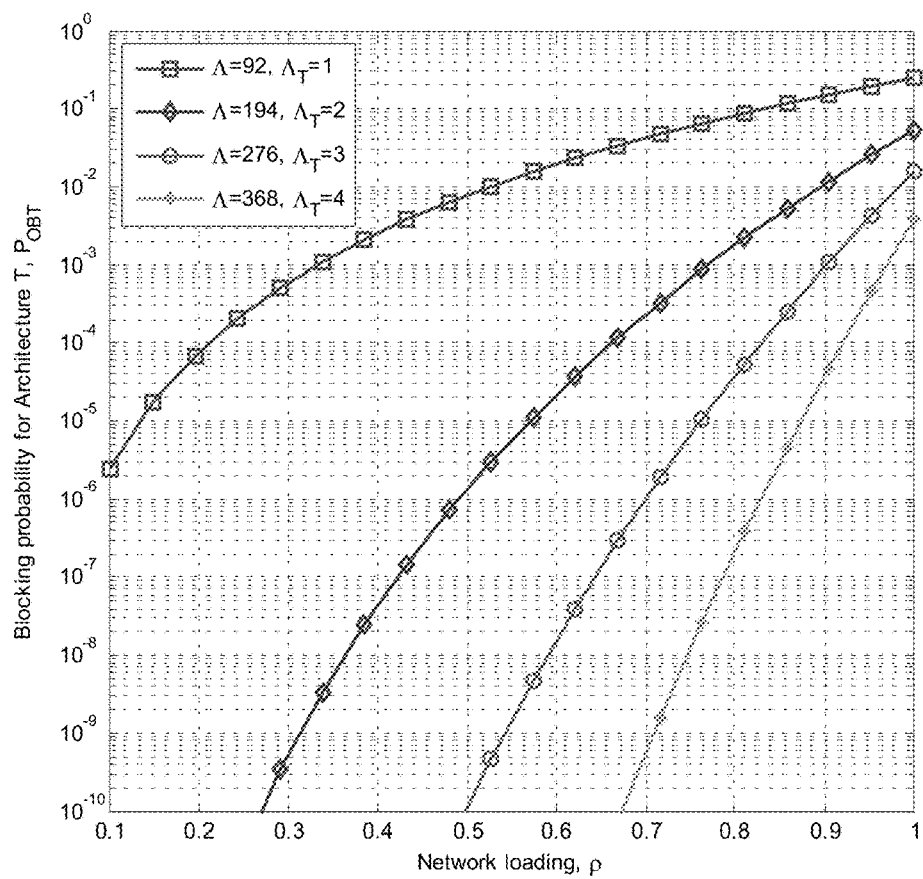
FIG. 34 is graph of blocking probability for Architecture M, according to an embodiment of the present invention.

FIG. 34 is graph of blocking probability for Architecture M, $P_{OBT}$, with respect to network loading ρ with $N_s/\Lambda=2$, for different values of $\Lambda_T$. $N_S$ is the total number of schedule holders per link, $\Lambda$ is the number of wavelengths per link, and $\Lambda_T=\Lambda/92$ is the number of wavelengths per tunnel for the case where there are 92 tunnels per edge.

1.4 Performance Comparison of Architecture M and T

To compare data network performance of Architecture M and T, we consider the US backbone network and analyze the effects of network resources and schedule holders. FIG. 1 [22, FIG. 8.1] shows the physical topology of the US backbone network and Table 1.1 summarizes its parameters. The US backbone network is a mesh network composed of 60 nodes. Each link in the figure represents about 100 fiber links, and for each fiber link there are about 200 wavelength channels. The average number of hops of an end-to-end connection is four. The average node degree is 2.6, while the largest node degree is five and the least node degree is two. Therefore, a typical path in the backbone network comprises four links on the average, and there are interconnections at the connecting nodes, which introduce traffic merging and diverging.

As noted, FIG. 1 is map of an optical backbone network of the United States. Reproduced from [22, FIG. 8.1].]

TABLE 1.1

Important parameters for the US backbone network and their values, adopted from [22, Tbls. 8.1 and 8.2].

| Parameter | Value |
|---|---|
| Number of nodes | 60 |
| Number of links | 77 |
| Average node degree | 2.6 |
| Largest node degree | 5 |
| Least node degree | 2 |
| Average link length | 450 km |
| Number of wavelength channels per fiber link | 200 |
| Average number of hops of an end-to-end connection | 4 |

For Architecture M, we have $N_V=60$ $N_E=77$ $\overline{\Delta}=2.6$ $\overline{H}=4$ For Architecture T, since $$D = \frac{N_V(N_V-1)\overline{H}}{2N_E} \approx 92$$

Wavelength channels on each link of the physical topology are assigned equally to tunnels of 92 source-destination pairs. Therefore, $$\Lambda_T = \frac{\Lambda}{92}$$

Figure 35:
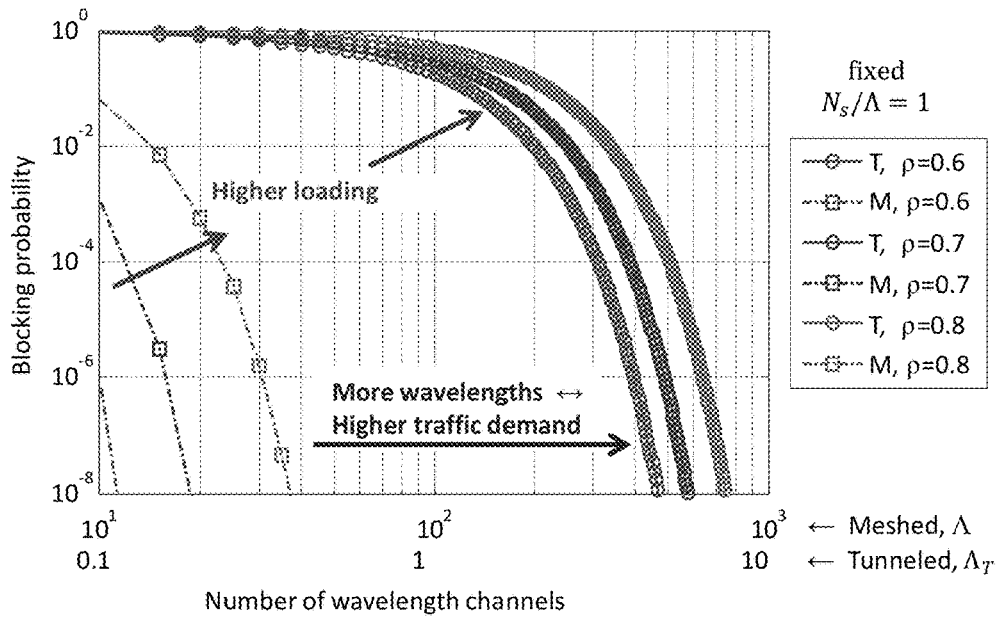
FIG. 35 is graph of blocking probability with respect to number of wavelength, according to an embodiment of the present invention

Using Eq. (1.13) and (1.16), and the above numerical values, we plot the blocking probabilities, throughput w.r.t. traffic demand, scheduling capacity and network loading. FIG. 35 plots blocking probabilities w.r.t. number of wavelength channels, for a fixed scheduling capacity of $N_S/\Lambda=1$, and three different network loading conditions (ρ=0.6, ρ=0.7, and ρ=0.8), for both the Meshed and Tunneled Architectures. For each fixed network loading (0.6, 0.7 or 0.8), when traffic demand increases, network resources (wavelength channels) also increase correspondingly. FIG. 35 shows that, even with medium to high loading, blocking probabilities for both architecture decreases quickly when traffic demand increases. When there are about three wavelength channels, with $N_s/V=1$, both architecture can achieve a blocking probability that is less than $10^{-4}$.

Figure 36:
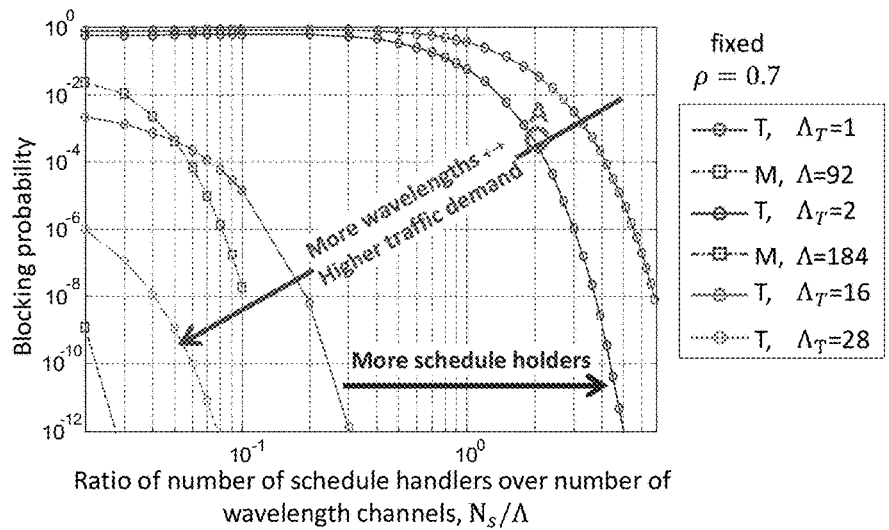
FIG. 36 is graph of blocking probability with respect to ratio of number of schedule holders and wavelength channels, according to an embodiment of the present invention

FIG. 36, for a fixed network loading ρ=0.7, plots the blocking probabilities for both architectures w.r.t. scheduling capacity for various traffic demands. It shows that network blocking probability decreases with more schedule capacity for both architectures. In particular, with high traffic demand ($\Lambda_T=16$), blocking probability sharply decreases even when the $N_s/\Lambda$ is as small as 0.1. In fact, when $N_s/\Lambda\approx 1$, log $P_{OBT}$ decreases approximately linearly w.r.t. $N_{sT}\Lambda_T$. Consider point A (in red font color) in FIG. 36. At point A, we have $\Lambda=194$ $\Lambda_T=2$ $N_S/\Lambda=2$

ρ=0.7

With the above values, we obtain $N_{sT}\rho_s<1$. Therefore, with 0.7 network loading, and two wavelength channel of network resources per source-destination pair, the tunneled architecture achieves a blocking probability less than $10^{-3}$ and a network delay less than one transaction time (the amount of time a session spends in the schedule holder is proportional to the average delay by Little's Theorem. For most applications it is reasonable to have a delay of one transmission time and therefore the acceptable value of $N_s/\Lambda$ is from 1 to 4. When $N_s/\Lambda=1$, the average delay is less than one transaction time).

Figure 37:
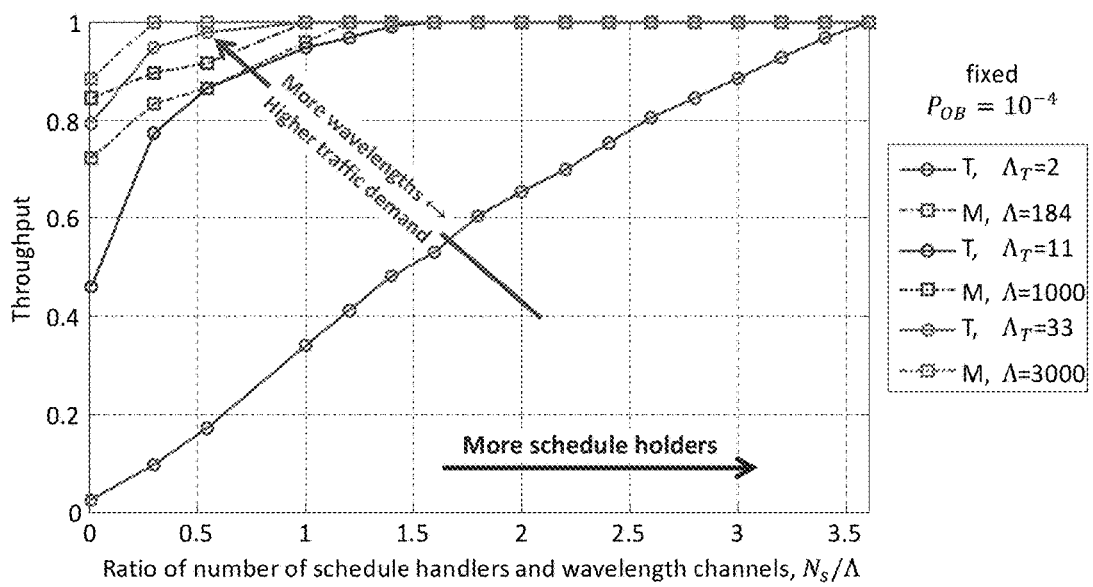
FIG. 37 is graph of throughput with respect to ratio of number of schedule holders and, according to an embodiment of the present invention.

For a fixed blocking probability of $10^{-4}$, FIG. 37 plots throughput w.r.t. the scheduling capacity $N_s/\Lambda$ for three different $\Lambda$ values (network resources). Throughput of Architecture T can be quickly increased when allowing more schedule holders in the system, and, when traffic demand is high (e.g. $\Lambda=1000$ or 3000), both architectures can achieve high loading with little scheduling capacity (<1). Therefore, when traffic demand is high, with medium to high loading, the blocking probabilities of both architectures with the same amount of network resources, are much less than $10^{-4}$, which is a good target blocking probability of user agreement. And the performance of Architecture T can be greatly improved by allowing more schedule holders in the system.

FIG. 35 is a plot of blocking probability with respect to number of wavelength channels with $N_s/\Lambda=1$, where $N_s$ is the total number of schedule holders per link, $\Lambda$ is the total number wavelengths per link in a meshed network topology, "M" is for Architecture M, and "T" is for Architecture T. Because in the tunneled logical network topology, wavelengths on one link are divided equally to all D source-destination tunnels going through that link, the average number of wavelengths for each source-destination tunnel is $\Lambda_T=\Lambda/D$. Therefore, two x-axis are used, with one for the number of wavelengths per link in Architecture M, and the other for the number of wavelengths per tunnel for Architecture T.

FIG. 36 is a plot of blocking probability with respect to ratio of number of schedule holders and wavelength channels with network loading $\rho=0.7$ for cases where the number of wavelengths per tunnel for Architecture T $\Lambda_T=1, 2, 16$ and 28, and the number of wavelengths per link for Architecture M $\Lambda=92, 184, 1472$ and 2600, respectively. The blocking probability for the meshed case with $\Lambda=1472$ and $\Lambda=2600$ are below $10^{-12}$ and are not shown in the figure. The meshed counterpart of the orange solid curve (T, $\Lambda_T=28$) corresponds to $\Lambda=2600$, the projected traffic demand per WAN node in [16].

FIG. 37 is a plot of throughput with respect to ratio of number of schedule holders and wavelengths with $P_{OB}=10^{-4}$ for cases where the number of wavelengths per tunnel for Architecture T $\Lambda_T=2, 11$, and 33, and the number of wavelengths per link for Architecture M $\Lambda=184, 1000$, and 3000, respectively. Note that not all number of wavelengths per link can be divided to be assigned to tunnels, the number of wavelengths in the figure were chosen in a way such that real number of throughput can be obtained.

2 THE SCHEDULING ALGORITHM

When a request arrives at a Scheduler, the Scheduler runs the scheduling algorithm to decide when, along which path, in which wavelength channel the request is going to be transmitted. We assume there are no wavelength converters along a transmission path and the same wavelength is used on all hops along the path. The scheduling therefore is done in a way such that there is no collision of transmission using the same wavelength channel in the network. In Section 2, we briefly discuss the related literature in Section 2.1. We introduce scheduling of optical flow switching in Section 2.2 and 2.3, discuss the optimal scheduled wavelength assignment problem in Section 2.4, and propose a heuristic algorithm for scheduled wavelength assignment in Section 2.6. We then analyze the control traffic in Section 2.7.

2.1 Routing and Wavelength Assignment in All-Optical Networks

The Routing and Wavelength Assignment (RWA) problem in all-optical networks arose when emerging applications requiring higher bandwidth called for a more efficient use of the network resources in the 1990's [5], and RWA is a network optimization formulation to provide lightpath connection for traffic demand while minimizing network cost for a given set of constraints. Given a network topology and a set of traffic demands (in the unit of lightpath), the RWA problem determines a path and a wavelength channel for each traffic demand in the network. If there is no wavelength converters, there is a wavelength continuity constraint for lightpath set-ups, that is, along a path from the source node to the destination node, the same wavelength needs to be assigned to the lightpath on all the links. If for a certain request, no lightpath can be set up along candidate paths between the source and the destination nodes, the request is said to be blocked. Numerous studies formulated the RWA problem into Integer Linear Programming (ILP) problems with variants of objectives, such as, to minimize the number of wavelength channels used to meet a target blocking probability, or to minimize the blocking probability with limited network resources [19, 28, etc.]. However, the ILP problems are generally NP-hard [10] and take too much time to solve. Therefore, the RWA problem in many studies was decomposed to into a lightpath routing problem and a wavelength assignment problem. The former problem of lightpath routing, depending on the objectives, had often been formulated into network flow problems. Network flow problems with integer constraints are again NP-hard, and various heuristic algorithms have been developed, see for example, [20, 14]. The wavelength assignment problem, when being formulated to either minimize the number of wavelength channels or to minimize the blocking probabilities, is NP-complete [6]. Therefore, for medium to large networks, heuristics have been studied [2, 28]. A large portion of the literature on RWA studied the problem for the network planning phase, that is, the lightpath demands are known beforehand, and the computation usually can be done off-line during network planning phase. This type of RWA problem was named the static RWA problem. In a situation when lightpath requests arrive randomly, the RWA problem computes lightpath assignment on-the-fly, and if there is no network resource available at the time of the request, the request is blocked. This later case is often named as the dynamic lightpath establishment problem [30]. For readers who are interested in learning more about the literature of RWA, [30] and [9] both provided comprehensive literature reviews on this topic.

Most of the literature dealt with lightpath demands with known transmission time (the lightpath request comes with information when the lightpath needs to be set up and when it can be torn down). Gagnaire et al. in [9] studied the lightpath establishment problem for mixed traffic of three types: Permanent Lightpath Demands (PLD), Scheduled Lightpath Demands (SLD), and Random Lightpath Demands (RLD). The PLD refers to lightpath connections that are permanent and is computed off-line during network planning phase. The SLD refers to connection requests with known set-up and tear-down times. Heuristics algorithms have been studied to either compute the SLD off-line in a global optimization problem formulation, or to compute the SLD sequentially ranked by the start-time of each SLD. RLD refers to requests that comes up randomly and the arrival time is not known beforehand, but once an RLD traffic arrives at the network, the duration is known. Therefore, once an RLD arrival occurs, the RWA problem needs to compute a lightpath assignment on-the-fly that can accommodate this request from the time of arrival to the declared life time. Note that although, Gagnaire et al. named the lightpath demand as scheduled or random lightpath demand, the problem they formulated are different from the scheduling problem in optical flow switching. Because in their formulation, the traffic transmission time is declared in the request, and therefore is fixed (this tends to cause high blocking probability at all loading levels due to inflexibility of the start time). In our scheduling problem, in terms of transmission time, a user request only declare the file size (or, equivalently, the transmission duration), and it is up to the Scheduler to assign a lightpath and ALSO a scheduled transmission time (start time and end time) to each request. Therefore, the variants of RWA problems in the literature are different from what we are studying here for optical flow switching.

2.2 The Scheduling Problem for Optical Flow Switching

In [26], Weichenberg et al. first studied the scheduling algorithm for optical flow switching where a user request can tolerate a certain amount of delay and a request is scheduled to sometime in the future if it can not be served at the time of the request. Recognizing the complexity of an optimal scheduling algorithm, Weichenberg et al. proposed a heuristic scheduling algorithm over a network topology with tunneled WAN and broadcast MAN and Access Network. Requests are queued at the ingress WAN node and processed on a first-in-first-out basis in two stages, that is, WAN resources were considered first, and then MAN and Access Network. Due to the higher cost of WAN resources, resources in the WAN were designed to be used more efficiently (with high loading) and their availability dictates which wavelength channel can be selected. The scheduling algorithm then check and wait for the availability of the same wavelength channel in the source and destination MANs and Access Networks, and reserve the channel once it becomes available for the request.

Here, we focus on OFS scheduling in the wide area network and investigate the algorithm complexity and control traffic efforts with respect to not only traffic demand, network resources, but also network topology. In particular, we will analyze the impact of two example topologies, the Meshed topology and the Tunneled topology, on scheduling complexity and control traffic efforts.

2.3 The Shortest Path Routing Algorithm

As in the literature where the RWA problem is decomposed into the routing problem and the wavelength assignment problem to make the problem tractable, in our heuristic algorithms, we also decompose the OFS scheduling problem into the routing problem and the scheduled wavelength assignment problem.

For the routing problem, we use shortest-path routing (SPR), where the shortest path is the path with the least number of hops (we choose the shortest path to be the path of the least number of hops because this will result in minimum amount of control traffic for lightpath set-ups and tear-downs as the number of switches that need to be configured is minimized). We choose shortest path routing algorithm for its simplicity, and we argue that with adaptive-to-traffic-demand network resources deployment or lighting-up new fibers, shortest-path routing is also energy and cost-efficient. For the short term when traffic increases unpredictably quickly and if new network resources cannot be deployed immediately, the second shortest-path can be used to route the incremental traffic. Note that with careful planning and traffic monitoring, this unpredicted rapid traffic increase should be a rare situation. Because the WAN topology does not change frequently, the SPR algorithm only runs when there are changes to the logical network topology and all pair shortest paths are stored either centrally when the algorithm is centralized or, otherwise, at each node. We use the Floyd-Warshall algorithm [8, Chap. 25.2] to calculate all-pair shortest paths for a graph G (V, E) with running time $\Theta(N_V^3)$, where $N_V$ is the number of nodes in V.

2.4 The Scheduled Wavelength Assignment Problem

With lightpath routing determined by the Floyd-Warshall Algorithm in Section 3, what remains to be solved is the scheduled wavelength assignment problem (SWA). The scheduling wavelength assignment problem for optical flow switching must satisfy the following constraints:

1. Two requests with overlapping transmission time must not be assigned the same wavelength on a given link.

2. With no wavelength conversation, the same wavelength must be assigned to a lightpath on all links along its path.

The wavelength assignment problem in the literature, when being formulated to minimize the number of total wavelengths required, has been shown to be NP-complete [14]. We briefly outline the proof here. The essence of proof lies on the equivalence between The $\omega$-wavelength-assignment problem, i.e., whether wavelength assignment for a set of routed lightpath over a network topology graph G can be achieved using $\leq \omega$ wavelengths, and, The n-graph-colorability problem, i.e., whether a graph (name it the path graph $G_P$) can be colored using $\leq n$ colors so that no two vertices sharing an edge are assigned the same color.

The proof includes two parts:

(a) The $\omega$-wavelength-assignment problem can be reduced, in polynomial time, into a $\omega$-graph-colorability problem, and therefore, solving the $\omega$-graph-colorability problem solves the $\omega$-wavelength-assignment problem. This is achieved by, for a given list of routed lightpath L over a network topology G, creating a path graph $G_P(V_P, E_P)$ in a way as:

For each lightpath l in L, create a corresponding vertex $v_l$ in $V_P$.

For two vertices $v_i$ and $v_j$ in $V_P$, create an edge $e_{i-j}$ in $E_P$ if the corresponding lightpath i and j in L share some link over G.

(b) The n-graph-colorability problem can be reduced, in polynomial time, into an n-wavelength-assignment problem, and therefore, solving the n-wavelength-assignment problem solves the n-graph-colorability problem.

Therefore, after parts (a) and (b), the equivalence between the $\omega$-wavelength-assignment problem and the n-graph-colorability problem has been proven. Since the n-graph-colorability problem is NP-complete [18, 15], so is the $\omega$-wavelength-assignment problem.

Define the optimal scheduled wavelength assignment to be the assignment that minimizes the total number of wavelengths required for a set of requests that arrive during the interested time horizon $T_h$. In optical flow switching, since user requests arrive randomly in the form of $\langle v_s, v_d, t_d \rangle$ with different arrival times, $t_a$. Therefore, a request can be specified by the quadruple $\langle v_s, v_d, t_d, t_a \rangle$. Define R to be the list of all request arrivals during time $T_h$. In practice, any on-line scheduled wavelength assignment algorithm cannot be optimal for all possible instances of the stochastic arrivals. In theory we assume the optimal algorithm performs wavelength assignment with full knowledge of future traffic arrivals, i.e., the list of arrivals, R. Define list $T_t=[\langle t_{s_1}, t_{e_1} \rangle, \langle t_{s_2}, t_{e_2} \rangle, \ldots, \langle t_{s_{|L|}}, t_{e_{|L|}} \rangle]$ to be the list of scheduled transmission times of the result of the optimal schedule, where |L| is the total number request arrivals during $T_h$. Notice that if the optimal $T_t$ is known, then we can also establish an equivalence between the scheduled wavelength assignment problem and the graph coloring problem. The proof is similar to the proof above with two differences:

(a) The scheduled $\omega$-wavelength-assignment problem with known $T_t$ can be reduced, in polynomial time, into a $\omega$-graph-colorability problem, in a way as:

For each lightpath l in L, create a corresponding vertex $v_l$ in $V_P$.

For two vertices $v_i$ and $v_j$ in $V_P$, create an edge $e_{i-j}$ in $E_P$ if the corresponding lightpath i and j in L share some link over G and do not overlap in transmission times.

(b) The n-graph-colorability problem can be reduced, in polynomial time, into an scheduled n-WA problem. Notice that the WA problem is a special case of the scheduled WA problem where the transmission time of all lightpath overlaps.

Therefore, the scheduled ω-wavelength-assignment problem with known $T_t$ is NP-complete. Hence we have the theorem below.

Theorem 2 The optimal scheduled wavelength assignment problem with known future traffic arrivals is at least NP-complete.

2.4.1 Complexity of the Optimal Scheduled Wavelength Assignment Algorithm with Known Future Traffic Arrivals Although the optimal Scheduled WA problem is NP-complete, we can approximate the magnitude of the complexity to solve this problem. Define Λ to be the total number of wavelengths in the network, then with |L| request arrivals during $T_h$, the total number of possible wavelength assignments is $\Lambda^{|L|}$. Therefore, an optimal algorithm that computes the optimal over all possible wavelength assignments takes running time $O(\Lambda^{|L|})$. The average processing power over $T_h$ is, therefore, at least $O(\Lambda^{|L|})/T_h$.

For Architecture T, because tunneling results in decoupling of the problem, the complexity is $$O\left(\left(\frac{\Lambda}{D}\right)^{\frac{|L|}{N_V(N_V-1)}}\right),$$

where D is the average number of source-destination tunnels over one link as defined in Eq. (1.14). For the WAN topology in FIG. 1, D≈92, and $N_V$=60. Assume Λ=200, then $$O\left(\left(\frac{\Lambda}{D}\right)^{\frac{|L|}{N_V(N_V-1)}}\right) \approx O(2^{\frac{|L|}{3540}}),$$

which is solvable if |L| is not too large. Therefore, tunneling greatly simplifies the optimal algorithm, by magnitude of $$D^{\frac{|L|}{N_V(N_V-1)}}\left(\Lambda^{1-\frac{1}{N_V(N_V-1)}}\right)^{|L|}.$$

2.5 The Mathematically-Optimal Algorithm for Scheduled Wavelength Assignment When future traffic arrivals are stochastic and unknown, one common way (in both industry and academia) of formulating the scheduled wavelength assignment problem is, for each new request, to minimize the number of wavelengths assigned in the network by searching over all possible routing and wavelength assignments and choosing an optimal schedule assignment. Let's name an algorithm that finds the mathematically-optimal schedule assignment, with the aforementioned formulation, the Mathematically-Optimal (MO) Algorithm. However, because with a meshed graph, even the problem of finding the longest simple path (a path is simple if it does not have any repeated vertices) is NP-hard [33], the problem of searching over all possible routing and wavelength assignment to find the mathematically-optimal schedule assignment is at least NP-hard.

2.5.1 Complexity of the Mathematically-Optimal Algorithm

With the Meshed Architecture which has a network logical topology graph G (V, E), there are in total $2^{N_E}$ possible paths between a source and a destination node, where $N_E$ is the number of edges in G (V, E). Therefore, the running time of the Mathematically-Optimal Algorithm with Architecture M is $O(2^{N_E}F_M\Lambda_M)$, where $F_M$ and $\Lambda_M$ are the numbers of fibers and wavelengths per edge. However, with the Tunneled Architecture, the scheduling of traffic for one source-destination pair is decoupled with traffic for the other source-destination pairs, the routing and wavelength-assignment problem degenerates and the Mathematically-Optimal Algorithm only needs to search over wavelength tunnels assigned to that specific source-destination pair. Therefore, the running time of the Mathematically-Optimal Algorithm with Architecture T is $O(F_T\Lambda_T)$ where $F_T$ and $\Lambda_T$ are the numbers of fibers and wavelengths per tunnel.

2.6 the FIFO-EA Algorithm for Scheduled Wavelength Assignment

The scheduled wavelength assignment problem selects a wavelength channel that is available on all the links along the shortest path during the whole period of the scheduled transmission time. For simplicity, we adopt the first-in-first-out (FIFO) principle, and selects the smallest number-ed wavelength channel with the earliest available time. Name this wavelength assignment algorithm the First In First Out Earliest Available (FIFO-EA) Algorithm, and the overall scheduling algorithm the SPR-FIFO-EA Algorithm.

---
Algorithm 2.1 The FIFO-EA Algorithm
---

```
FIFO - EA(R,P,t_d)
1   for ω ← 1 to Λ_0
2       Sch(ω) ← COLORPATH - EA(P,R,t_d,ω,t_0)
        // Select the Schedule with the earliest available time
        // among those of all wavelengths.
3   SCH ← min(Sch.T_s)
4   if SCH.t_s = ∞
5       return Null
6   else return SCH
```

G (V, E) represents the logical topology of the WAN. Request R is in the form of $\langle v_s, v_d, t_d \rangle$, where $v_s$ is the source node, $v_d$ is the destination node, and $t_d$ is the requested duration of the connection. P is the shortest path from $v_s$ to $v_d$, and is composed of H hops including $\langle h_P^1, h_P^2, \ldots, h_P^H \rangle$. Let $\Lambda_0$ be the number of wavelength channels along one path ($\Lambda_{0M}$, the $\Lambda_0$ in Architecture M, is the same as Λ, the number of wavelengths per edge; while $\Lambda_{0T}$, the $\Lambda_0$ in Architecture T, is the same as $\Lambda_T$, the number of wavelengths per tunnel). Let $f_{P\omega}^k$, be the number of fibers on link $l_P^k$ with wavelength ω, and let F be the total number of fibers on a link. Time usage with S segments (S≤$N_S$) on a particular wavelength on a particular fiber on a link is in the form of $\langle (t_s^1, t_e^1), (t_s^2, t_e^2), \ldots, (t_s^s, t_e^s) \rangle$. Pseudo-code of the FIFO-EA Algorithm is given in Algorithm 2.1.

---
Algorithm 2.2 The COLORPATH-EA Subroutine
---

```
COLORPATH - EA(P,R,t_d,ω,t_0)
1   Sch_1 ← LATESTMIN - OALINKS(P,R,t_d,ω,t_0)
2   Sch_2 ← LATESTMIN - OALINKS(P,R,t_d,ω,Sch_1.T_s)
3   if Sch_1.T_s = Sch_2.T_s
```

-continued

Algorithm 2.2 The COLORPATH-EA Subroutine 4     return $Sch_2$
5     else return COLORPATH - EA(P,R,$t_d$,ω,$Sch_2.T_s$)

Algorithm 2.3 The LATESTMIN-OALINKS Subroutine

Figure 38:
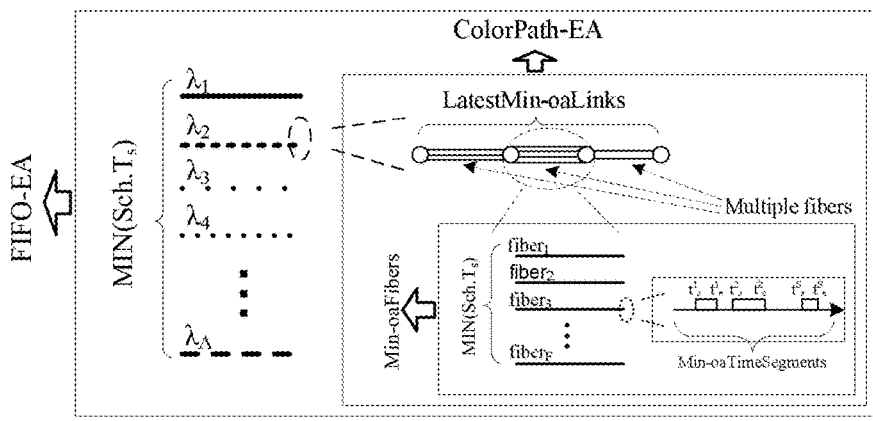
FIG. 38 is a flowchart schematically illustrating operation of algorithm FIFO-EA, according to an embodiment of the present invention.

LATESTMIN - OALINKS(P,R,$t_d$,ω,$t_0$)
1   Link ← P.Link
2   $v_d$ ← P.$v_d$
3   for h ← 1 to Link.Hops
4     lSch(h) ← MIN - OAFIBERS(
        P,R,$t_d$,Link(h).Fibers,$t_0$)
5     $v_d$Sch ← MIN - OATIMESEGMENTS ($v_d$.Usage,$t_d$,$t_0$)
6   $Sch.T_s$ ← max(lSch.$T_s$,$v_d$Sch.$T_s$)
7   Sch.FiberIndex ← lSch.FiberIndex
8   return Sch Algorithm 2.4 The MIN-OAFIBERS Subroutine MIN - OAFIBERS (P,R,$t_d$,Fibers,$t_0$)
1   for f ← 1 to Fibers.Size
2     fSch(f) ← MIN - OATIMESEGMENTS(
        Fibers(f).usage,$t_d$,$t_0$)
3   $Sch.T_s$ ← min(fSch.$T_s$)
4   Sch.FiberIndex ← min(fSch.$T_s$).Index
5   return Sch Algorithm 2.5 The MIN-OATIMESEGMENTS Subroutine MIN-OATIMESEGMENTS(usage,$t_d$,$t_0$)
1   if usage.size < $N_s$
2     usgPnt ← usage.Headead
    // Initialize usgPnt to point to head of usage.
3     while usgPnt NOT usage.End
4       ($t_s$,$t_e$) ← usage(usgPnt).segment
5       if $t_0$ < $t_s$
6         if $t_0$ + $t_d$ < $t_s$
7           $Sch.T_s$ ← $t_0$
8           return Sch
9       usgPnt ← usage(usgPnt).next
10      $t_0$ ← $t_e$
11    $Sch.T_s$ ← $t_0$
12    usage ← Null
13   else $Sch.T_s$ ← ∞
14   return Sch FIG. 38 is a flowchart schematically illustrating operation of algorithm FIFO-EA.

Figure 39:
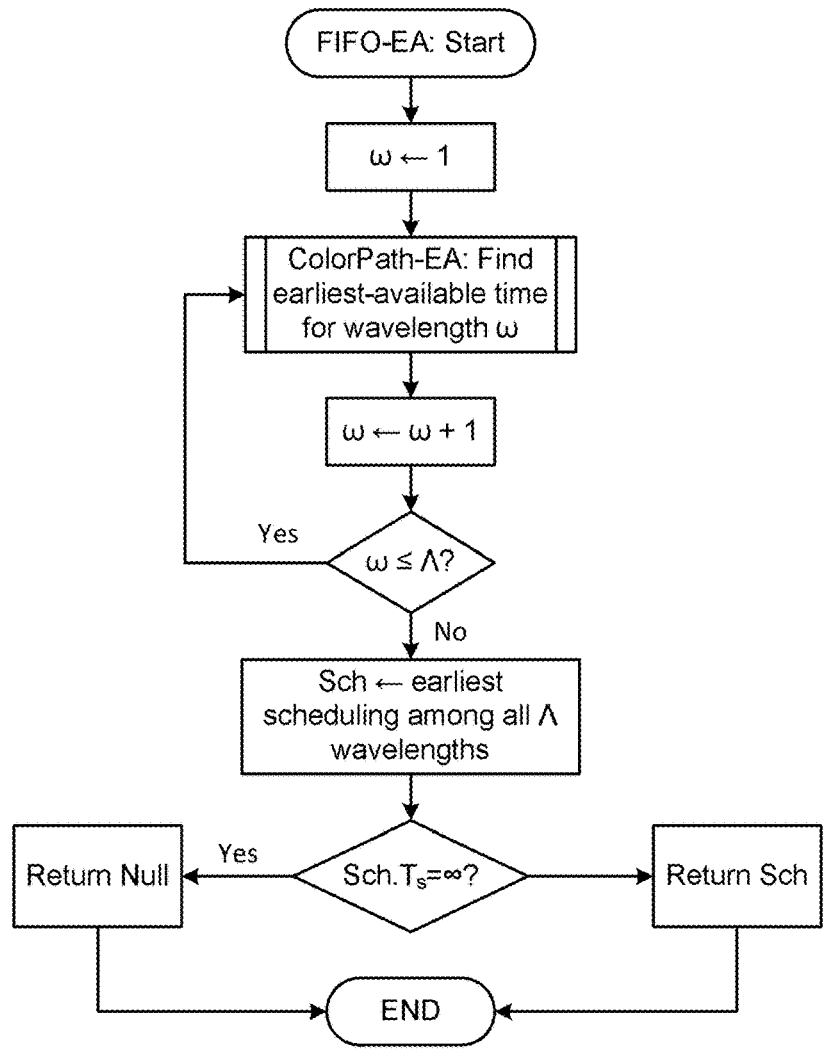
FIG. 39 is a flowchart schematically illustrating operation of algorithm FIFO-EA, according to an embodiment of the present invention.

FIG. 39 is a flowchart schematically illustrating operation of algorithm FIFO-EA.

Figure 40:
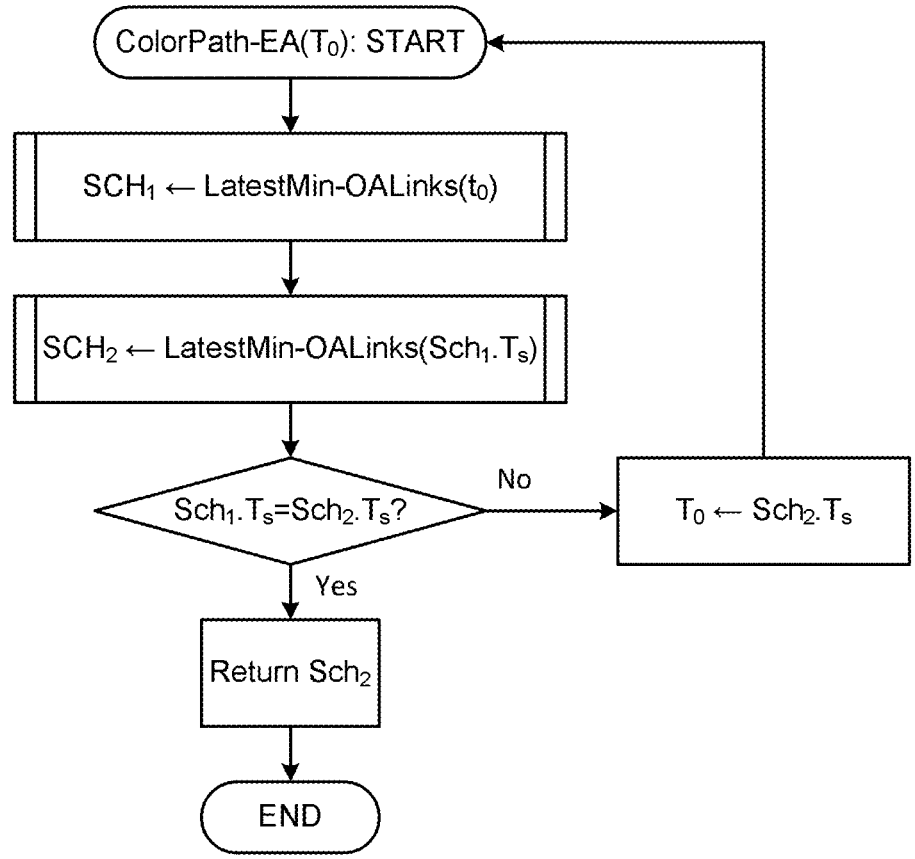
FIG. 40 is a flowchart schematically illustrating operation of subroutine ColorPath-EA, according to an embodiment of the present invention.

FIG. 40 is a flowchart schematically illustrating operation of subroutine ColorPath-EA.

Figure 41:
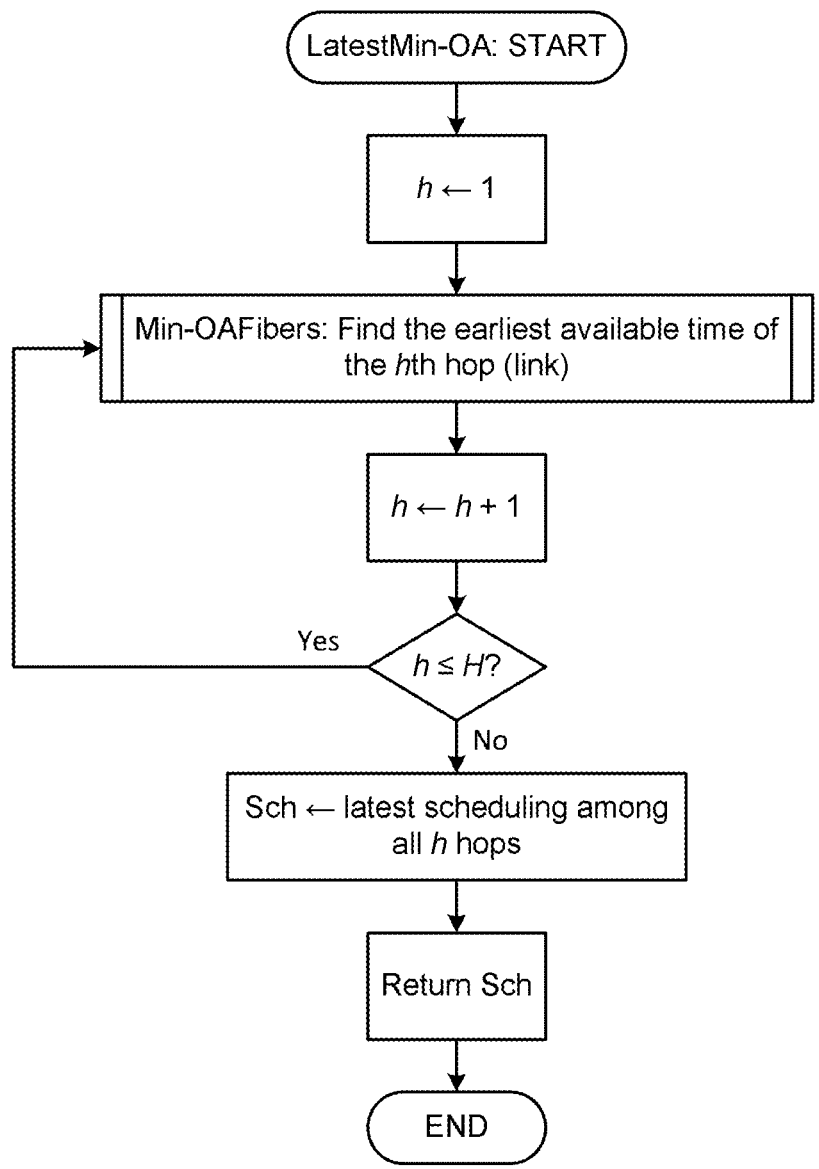
FIG. 41 is a flowchart schematically illustrating operation of subroutine LatestMin-oaLinks, according to an embodiment of the present invention.

FIG. 41 is a flowchart schematically illustrating operation of subroutine LatestMin-oaLinks.

Figure 42:
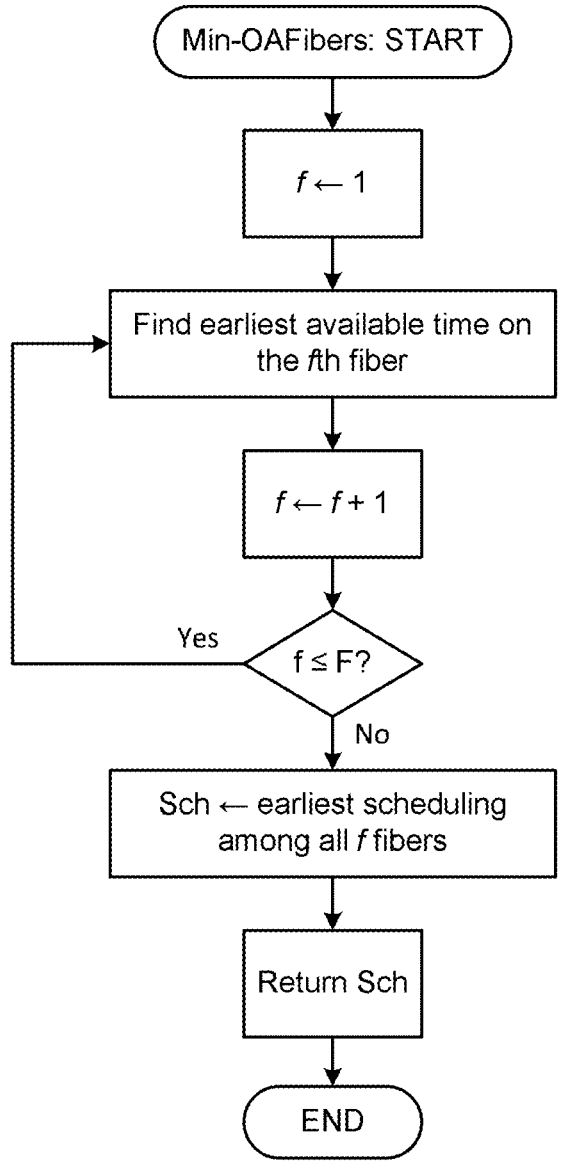
FIG. 42 is a flowchart schematically illustrating operation of subroutine Min-oaFibers, according to an embodiment of the present invention.

FIG. 42 is a flowchart schematically illustrating operation of subroutine Min-oaFibers.

FIG. 38 and flowcharts in FIGS. 39, 40, 41 and 42 illustrate the flow of the FIFO-EA Algorithm. The routine FIFO-EA takes input (R, P, $t_d$), and iterates through all $Λ_0$ wavelengths and outputs (if the request can be accommodated) a schedule with the earliest available time among the individual earliest available time over each wavelength channel or, otherwise, "∞" (the request is blocked). The earliest available time on one wavelength is determined by the subroutine COLORPATH-EA (Algorithm 2.2). The intuition behind COLORPATH-EA is that if the ith link of path P is not available until time τ then path P is not available until time τ. In other words, the earliest available time of path P cannot be earlier than the earliest available time of any link on the path. If link i is not available until time τ, to examine the available time of any other link, we only need to examine usages from time τ onwards. On the other hand, if τ is the earliest available time of path P, τ is also the earliest available time of at least one link on the path, and the earliest available time of any links over path P starting from τ is τ. Therefore, in COLORPATH-EA, the latest of the earliest available time on each link over the path starting from the time at the request is first determined (let it be $Sch_1·T_s$); then the latest of the earliest available time on each link over the path starting from $Sch_1·T_s$ is determined (let it be $Sch_2·T_a$). If $Sch_1·T_s$ is the same as $Sch_2·T_s$, then all links are available starting from $Sch_1·T_s$ and it is the earliest available time of the path. Otherwise, the path cannot be available before $Sch_2·T_s$, and COLORPATH-EA is called recursively starting from $Sch_2$.

Subroutine LATESTMIN-OALINKS (Algorithm 2.3) first calculates the earliest available time over each individual link, the earliest available time at the destination node, and then outputs the latest of the earliest available times over all links and at the destination node. The earliest available time over an individual link is determined by subroutine MIN-OAFIBERS (Algorithm 2.4), where the earliest available time is determined for each fiber on the link for the corresponding wavelength, and the earliest among the earliest available times for each fiber is output. The earliest available time over one fiber on a link for a corresponding wavelength is determined by MIN-OATIME-SEGMENTS (Algorithm 2.5), where the usage is checked to output the earliest available time when the channel on that fiber is available for the duration $t_d$.

2.6.1 Running Time Analysis of the FIFO-EA Algorithm

Let $T_1(S)$ be the running time of FIFO-EA, $T_2(S)$ be the running time of COLORPATH-EA, $T_3(S)$ be the running time of LATESTMIN-OALINKS, $T_4(S)$ be the running time of MIN-OAFIBERS, and $T_5(S)$ be the running time of MIN-OATIMESEGMENTS. The worst case happens when every time segment on the path is checked. Thus, for the worst case, $$T_1(S) = Λ_0 T_2(S) + Λ_0 \tag{2.1}$$

$$T_2(S) \leq 2T_3(S) + T_2(S-\delta) \tag{2.2}$$

$$T_3(S) = HT_4(S) + T_5(S_{v_d}) + H + 1 \tag{2.3}$$

$$T_4(S) = FT_5(S) + F \tag{2.4}$$

where δ is the number of time segments that have already been checked. Substituting Eq. (2.3) and (2.4) into (2.2), we obtain $T_2(S) = O(SHF)$. Hence, $$T_1(S) = O(SHFΛ_0) \tag{2.5}$$

Define $R_{FIFO-EA}^X$ as the running time of the FIFO-EA algorithm for Architecture X (X can be M or T). For Architecture M, $$R_{FIFO-EA}^M = O(S\tilde{H}FΛ_{0_M})$$

For Architecture T, because WAN node-pairs are tunneled, there are no gaps between consecutive time segments, and the FIFO-EA Algorithm only need to find the earliest time among the end time $t_s$'s of the last assignment on each wavelength channels. Therefore, $$R_{FIFO-EA}^T = O(F\Lambda_{0_T})$$

Table 2.1 lists running time results of the Shortest-Parth-Routing Algorithm, the Mathematically-Optimal Algorithm, and the FIFO-EA Algorithm. $N_V$ is the number of nodes in the WAN. $N_E$ is the number of edges in the WAN. S is the number of time segments for transactions scheduled over one wavelength on a link (S≤$N_S$ for Architecture M). $\overline{H}$ is the average number of hops for all paths. F is the number of fibers per link. $\Lambda_{0_M}$ is the number of wavelengths per fiber for Architecture M, and $\Lambda_{0_T} = \Lambda_{0_M}/D$ is the number of wavelengths per tunnel per fiber for Architecture T.

TABLE 2.1

Running time results

| Running Time | Architecture M | Architecture T |
|---|---|---|
| SPR | $O(N_V^3)$ | $O(1)$ |
| MO | $O(2^{N_E}F\Lambda_{0_M})$ | $O(F\Lambda_{0_T})$ |
| FIFO-EA | $O(S\overline{H}F\Lambda_{0_M})$ | $O(F\Lambda_{0_T})$ |

Analysis of Coefficients of the Running Time

As discussed in [16, Chap. 25.2], the constant hidden in the Θ-notation for the running time of the Floyd-Warshall Algorithm, $\Theta(N_V^3)$, is small. If only considering comparison, summation, and assignment operations, the coefficient of $\Theta(N_V^3)$ for the Floyd-Warshall Algorithm, including both computing the shortest-path weights and constructing the shortest path, is six.

In the derivation of the running time of the FIFO-EA Algorithm, the omitted constant in $\Theta(SHF\Lambda)$ is three, and, $2SHF\Lambda < T_1(S) < 3SHF\Lambda$. During the execution of the worst case of algorithm FIFO-EA, for each time segment, there are four instructions involved, storing, loading, comparison, and discarding; as a result, $R_{FIFO-EA}^X \leq 4T_1(S)$.

2.6.2 Processing Power Analysis of the FIFO-EA Algorithm

The SPR algorithm is run only when there is a change in the network topology, much less frequently than the FIFO-EA algorithm. Hence, we focus on the processing power requirements of the FIFO-EA algorithm.

$N_V$ is the number of nodes in the WAN, ρ is the average loading factor of each link, and Δ is the average node degree in the WAN. Let $N_p$ be the average population size connected to one WAN node, λ be the request arrival rate at end user, and $T_d$ be the average transmission time. Then the required processing power for Architecture X is $\lambda N_p N_V R_{FIFO-EA}^X$ for centralized scheduling, and $\lambda N_p R_{FIFO-EA}^X$ for distributed scheduling. For ρ less than one, from Little's Theorem, $$\rho = \frac{\lambda N_p \overline{T}_d}{\Delta F \Lambda_0} \quad (2.6)$$

Therefore, $$\lambda N_p = \frac{\rho \Delta F \Lambda_0}{\overline{T}_d} \quad (2.7)$$

The total processing power for Architecture X can then be re-expressed as, with centralized scheduling, $$P_{cen}^X = \frac{\rho \Delta F \Lambda_0 N_V R_{FIFO-EA}^X}{\overline{T}_d} \quad (2.8)$$

and, with distributed scheduling, $$P_{dis}^X = \frac{\rho \Delta F \Lambda_0 R_{FIFO-EA}^X}{\overline{T}_d} \quad (2.9)$$

Traffic Model

To obtain numerical values of $P_{cen}^X$ and $P_{dis}^X$, we refer to the traffic model in [26], where the authors estimated the near-future traffic pattern based on the projected US population, and the assumptions that a user is active on the network with probably 0.1, and 10% of the time when a user is active, he/she is sending or receiving data with rate 100 Mbps. From their results, the estimated traffic from one WAN node (Chicago for example) takes up 2526 full wavelengths of 10 Gbps, based on the projected US population and network usage. Therefore, $\rho \Delta F \Lambda_0 \approx 2600$. Furthermore, we choose ρ=0.7, $N_S/F\Lambda^0$=2, Δ=2.6, and $\overline{T}_d$=1 s. From FIG. 36), the blocking probabilities of both Architecture M and T with the above parameters are less than $10^{-3}$. From Eq. (1.6) and (1.15), we obtain the average integer values of S for Architecture M and T are both one.

Average Processing Power

The above traffic model values refer to the network steady state values. Substituting them into Eq. (2.8) and (2.9) we can obtain the average processing power required for the FIFO-EA Algorithm. Substituting $R_{FIFO-EA}^X$ with the running time of the Mathematically-Optimal Algorithm, we can also obtain the average processing power for the Mathematically-Optimal Algorithm. The numerical values are summarized in Table 2.2.

Peak Processing Power

It is a common engineering practice to design a system to be able to sustain not only the average demand, but the peak demand, which corresponds to the peak traffic arrivals in our problem. Define peak traffic arrivals as the rare case situation where more arrivals than average arrive during 1 ms (1 ms is chosen because processing of a request should be finished in ~1 ms) with the probability of occurrence <$10^{-3}$ (traffic arrivals more than peak traffic arrivals are discarded, and the blocking probability due to more traffic arrivals than peak is less than $10^{-3}$, which is a reasonable target blocking probability). Define N to be a Poisson random variable with mean as the average number of traffic arrivals within 1 ms from all users in a MAN. With the average traffic arrival rate, within 1 ms, the average number of traffic arrivals in 1 ms is $\overline{N} = \lambda N_p \cdot 1$ ms=2.6. Define $N_{Peak}$ to be the minimum number of peak arrivals within 1 ms, such that, $$P(N > N_{peak}) < 10^{-3}$$

and $N_{peak}$=9. Letting $\rho \Delta F \Lambda_0$=9 and $\overline{T}_d$=1 ms in Eq. (2.8) and (2.9), we can obtain the peak processing power for both the FIFO-EA Algorithm and the Mathematically-Optimal Algorithm, which are summarized in Table 4.3.

TABLE 2.2

Average processing power for the FIFO - EA Algorithm and the Mathematically Optimal (MO) Algorithm per Scheduler*.

| Average Processing Power | FIFO-EA | | MO | |
|---|---|---|---|---|
| | Meshed | Tunneled | Meshed | Tunneled |
| Centralized Scheduling | 10.7 GIPS† | 29.1 MIPS†† | $3.5 \times 10^{22}$ GIPS | 29.1 MIPS |
| Distributed Scheduling | 178 MIPS | 0.48 MIPS | $5.5 \times 10^{20}$ GIPS | 0.48 MIPS |

In Table 2.2, [*] indicates the values in this table is the processing power per Scheduler. With centralized scheduling, the values are also the total processing power for scheduling. However, with distributed scheduling, the table values need to be multiplied by $N_V$ to obtain the total processing power of all Schedulers for scheduling.

In Table 2.2, † indicates GIPS is short for Giga Instruction per Second.

In Table 2.2, †† indicates MIPS is short for Mega Instructions per Second.

TABLE 2.3

Peak processing power for the FIFO - EA Algorithm and the Mathematically-Optimal (MO) Algorithm per Scheduler*.

| Peak Processing Power | FIFO-EA | | MO | |
|---|---|---|---|---|
| | Meshed | Tunneled | Meshed | Tunneled |
| Centralized Scheduling | 37.2 GIPS† | 0.1 GIPS | $1.2 \times 10^{23}$ GIPS | 0.1 GIPS |
| Distributed Scheduling | 0.6 GIPS | 1.7 MIPS†† | $1.9 \times 10^{21}$ GIPS | 1.7 MIPS |

In Table 2.3, [*] indicates the values in this table is the processing power per Scheduler. With centralized scheduling, the values are also the total processing power for scheduling. However, with distributed scheduling, the table values need to be multiplied by $N_V$ to obtain the total processing power of all Schedulers for scheduling.

In Table 2.3, † indicates GIPS is short for Giga Instruction per Second.

In Table 2.3, †† indicates MIPS is short for Mega Instructions per Second.

From Table 2.3, we observe that by tunneling the WAN node pairs, the peak processing power per Scheduler by the FIFO-EA Algorithm can be reduced by three orders of magnitude for both centralized and distributed scheduling. Taking the processing power of the widely available Intel core processor for PC, i7 Extreme Edition 3960X (Hex core) as a reference, it can perform 177.73 GIPS at 3.33 GHz. The FIFO-EA Algorithm with either centralized or distributed scheduling can be handled by one such CPU per Scheduler for both Architecture M and T. However, with Architecture M, the Mathematically-Optimal Algorithm for distributed scheduling takes a super computer 12 mins to compute the schedule for one request, while with Architecture T, the Mathematically-Optimal Algorithm can be handled by one i7 CPU per Scheduler for both centralized and distributed scheduling.

2.7 Control Traffic Analysis of the Scheduling of Optical Flow Switching

The control traffic analysis for the Scheduling of Optical Flow Switching concerns the control traffic involved for users to request for a connection, for command exchange between a Scheduler and switches to set up or tear down a connection. The control traffic analysis applies to both optimal scheduling algorithms and heuristics algorithms.

2.7.1 Centralized Scheduling

In centralized scheduling, all requests are sent to one Scheduler and the Scheduler decides when and along which lightpath a transmission starts. Therefore, the Scheduler knows every transactions in the network (assuming there is no failure in the network). Reconfiguration commands are sent from the Scheduler to switches and the source and destination nodes that need to be reconfigured to set up an end-to-end lightpath. For a lightpath with $\overline{H}_{dp}$ hops (subscripts dp and cp are used to differentiate $\overline{H}$ of data plane and $\overline{H}$ of control plane. Note that for Architecture M, $\overline{H}_{dp}=\overline{H}_{cp}$ and both equal to the average hop number of all paths over the network logical topology, while for Architecture T, $\overline{H}_{dp}=1$ and $\overline{H}_{op}$ equals to the average hop number of all paths over the network logical topology), there are $\overline{H}_{dp}-1$ switches that need to be reconfigured. The request for connection is in the form of $\langle v_s, v_d, t_d \rangle$, where $v_s$ and $v_d$ are the 128-bit IPv6 addresses of the source and destination nodes. The reconfiguration command is in the form of <$fiber_{in}$, $fiber_{out}$, $\omega$, $T_s$, $T_e$>, where $\omega$ specifies the wavelength of the lightpath, $T_s$ and $T_e$ specify the start and end time of the transmission.

Assume control traffic is carried over the Internet using TCP/IPv6 (IPv6 is used for future-compatibility). The switch reconfiguration command is sent from the Scheduler to the corresponding switch using one TCP session. In one TCP session, at least eight IP packets are sent across the network: three for TCP initialization, three for TCP session close-down, one for the command to the switch, and one for the ACK from the switch to the Scheduler. For TCP session initialization and session close-down, no payload is carried in the IP packets, therefore, the minimum IP packet size is 40 bytes (the header size). To carry the data $\langle fiber_{in}, fiber_{out}, \omega, T_s, T_e \rangle$, $(2L_F+L_{A_0}+|T_s|+|T_e|)(1+\alpha_{FEC})$ bits are needed, where $L_F$ and $L_{A_0}$ are the number of bits taken to specify a fiber and a wavelength, respectively, and $\alpha_{FEC}$ denotes the percentage of overhead from the Forward Error Correction relative to the actual length of payload. Therefore, the minimum size for an IP packet carrying schedule data is $320+(2L_F+L_{\Lambda_0}+|T_s|+|T_e|)(1+\alpha_{FEC})$ bits. Define $L_{sch}^c$ to be the total control traffic for one TCP session with reconfiguration or schedule data, then $$L_{sch}^c = (2L_F+L_{\Lambda_0}+|T_s|+|T_e|)(1+\alpha_{FEC})+320\cdot 8 \text{ bits} \quad (2.10)$$

where 320·8 bits accounts for the bits of IPv6 headers of eight IP packets in one TCP session. Similarly, the total control traffic for one TCP session for a request from the source node to the Scheduler is $$L_{req}^c = (|t_d|+128\cdot 2)(1+\alpha_{FEC})+320\cdot 8 \text{ bits} \quad (2.11)$$

$L_{sch}^c$ and $L_{req}^c$ are the same for both Architecture M and T. Note that after the schedule command is sent to a switch, when the corresponding configuration is set up or torn down, the switch informs the Scheduler that the required configurations have been carried out successfully. Therefore, the total amount of control traffic involved in centralized scheduling of one request is $$L_{req-sch}^{cX} = L_{req}^c + 3\cdot(\overline{H}_{dp}^X+1)\cdot L_{sch}^c \quad (2.12)$$

where the multiplicative factor 3 accounts the traffic for sending the configuration command from the Scheduler to the switch after the scheduling computation, and the feedback traffic from a switch to the Scheduler after a connection is set up and torn down. The superscript X can be either M or T to indicate the specific Architecture M or T under study.

Therefore, the total amount of control traffic in centralized scheduling, $L_{cen}^X$, is $$\lambda N_p N_V \overline{H}_{cp} L_{req-sch}^c,$$

and with Eq. (2.6), $$L_{cen}^X = \frac{\rho \Delta F \Lambda_0 N_V \overline{H}_{cp}^X L_{req-sch}^{cX}}{\overline{T}_d} \quad (2.13)$$

To obtain numerical values of $L_{cen}^X$, we refer to the same traffic model in Section 4.2 and network topology parameters in Section 1.4. Table 2.4 lists the parameters we will use to calculate control traffic for both Architecture M and Architecture T. For Architecture T, because the logical data network topology is tunneled, $\overline{H}_{dp}^T=1$ and the other parameters are the same as in Architecture M (note that $\overline{D}$, F and $\Lambda$ for Architecture M and T are different. However, since they use the same physical topology, $\overline{D}F\Lambda$ is the same for these two different architectures, and the difference in F and $\Lambda$ between these two architectures does not affect the value of $L_{sch}^c$ since a one-byte bit string is used to label different fibers and wavelengths). Substituting the values in Table 2.4 into Eq. (2.10), (2.11), and (2.12), we obtain the per-session control traffic values for Architecture M and Architecture T in Table 2.5.

TABLE 2.4

Numerical values of Architecture M and Architecture T for control traffic volume calculation.

| Parameter | Value |
|---|---|
| $\rho\overline{D}F\Lambda_0/\overline{T}_d$ | 2600 for the case of average traffic arrivals. |
| $\rho\overline{D}F\Lambda_0/\overline{T}_d$ | 9000 for the case of peak traffic arrivals. † |
| $L_f$ | 8 bits |
| $L_{\Lambda_0}$ | 8 bits |
| $N_V$ | 60 |
| $\overline{H}_{dp}^M$ | 4 |

TABLE 2.4-continued

Numerical values of Architecture M and Architecture T for control traffic volume calculation.

| Parameter | Value |
|---|---|
| $\overline{H}_{cp}^M$ | 4 |
| $\overline{H}_{dp}^T$ | 1 |
| $\overline{H}_{cp}^T$ | 4 |
| $|T_s|$ and $|T_e|$ | 80 bits. The Oracle timestamp format with fractional seconds of 6 digit precision (mili-second) is 10 bytes |
| $|t_d|$ | 64 bits. $t_d$ can be expressed as an integer value of unit mili-second using Int64 format which is 8 bytes. 24 hours can be stored using a 37-bit integer. Therefore, using a 64-bit integer, a time duration of 910117 years can be stored. |
| $\alpha_{FEC}$ | 10% |

In Table 2.4, † indicates peak traffic arrivals is defined in Section 2.6.2 as the rare case situation where more arrivals than average arrive during 1 ms with the probability of occurrence $<10^{-3}$.

Since under the centralized scheduling control, the scheduler knows the configuration of the whole network, no link state update on connection setup or tear-down is necessary. Therefore, the control traffic corresponding to link state update is the same as the scheduling control traffic for both Architecture M and T, and hence, we do not need to calculate the link state traffic separately under centralized scheduling control.

TABLE 2.5

Numerical values for per-session control traffic under centralized scheduling for both Architecture M and Architecture T.

| Parameter | Value |
|---|---|
| $L_{sch}^c$ | 2763 bits |
| $L_{req}^c$ | 2912 bits |
| $L_{req-sch}^{cM}$ | 44357 bits |
| $L_{req-sch}^{cT}$ | 19490 bits |

2.7.2 Distributed Scheduling

In the distributed scheduling with Architecture M, when a connection request arrives at a node, the node runs the scheduling algorithm locally, and broadcasts the scheduling result to the whole network immediately, so that every other node gets an updated view of the whole network. Therefore, switch reconfiguration control traffic can be replaced by link state update control traffic. In this case, $L_{req}^d$, the control traffic for requests, is the same as $L_{req}^c$; and, $L_{sch}^d$, the control traffic for scheduling to be sent to one other node is the same as $Lc_{sch}$. The amount of control traffic involved in the distributed scheduling for one request, $L_{req-sch}^{dX}$, is $$L_{req-sch}^{dM} = L_{req}^d + N_V \cdot 3 \cdot L_{sch}^d \text{ for Architecture } M$$

The total amount of control traffic in Architecture M is $$L_{dis}^M = \frac{\rho \Delta F \Lambda_0 N_V \overline{H}_{cp}^M \cdot L_{req-sch}^{dM}}{\overline{T}_d}$$

In Architecture T since WAN node pairs are tunneled, the scheduling information of one request only needs to be broadcast to the source and destination nodes, and, $$L_{req-sch}^{dT} = L_{req}^d + 3\cdot 2L_{sch}^d \text{ for Architecture } T$$

The total amount of control traffic in Architecture T is $$L_{dis}^T = \frac{\rho \Delta F \Lambda_0 N_V \overline{H}_{cp}^T \cdot L_{req-sch}^{dT}}{\overline{T}_d}$$

Similar as the analysis in Section 4.2, we use numerical values in Table 2.4 to calculate control traffic for both the average case ($\rho\overline{DF}\Lambda_0/T_d$=2600) and the case of peak traffic arrivals ($\rho\overline{DV}\Lambda_0/T_d$=9000). Table 2.6 summarizes the average control traffic for Architecture M and T under both centralized scheduling and distributed scheduling, while Table 2.6 summarizes the peak control traffic. To better understand the control traffic burden onto the control plane, we break down the control traffic in Table 2.6 and 2.7 into average edge load and heaviest edge load. The average bidirectional load per edge is obtained by dividing the total traffic by the total number of bidirectional edges in the WAN, which is 77. For the centralized scheduling, the control traffic happens between the central Scheduler with users or switches. Consider the central Scheduler has an average node degree 2.6, then the load on the edges connecting the central Scheduler is the heaviest, and can be obtained from $L_{cen}^X/(\overline{H}_{cp}^X\overline{\Delta})$. For distributed scheduling, the traffic is between all schedulers with users and switches, with the assumption of uniform all-to-all traffic and a symmetric network topology, the average bidirectional load per edge is also the heaviest edge load.

Considering the peak control traffic on the heaviest-edge in Table 2.7 with distributed scheduling, tunneling leads to a two orders of magnitude reduction of the heaviest-edge control traffic.

TABLE 2.6

Average total control traffic of both centralized scheduling and distributed scheduling for both Architecture M and Architecture T.

| Average Control Traffic | | Architecture M | Architecture T |
|---|---|---|---|
| Centralized Scheduling | Total traffic | 27.68 Gbps | 12.16 Gbps |
| | Per-edge | 0.36 Gbps | 0.16 Gbps |
| | Heaviest-edge | 2.66 Gbps | 1.17 Gbps |
| inDistributed Scheduling | Total traffic | 312.16 Gbps | 12.16 Gbps |
| | Per-edge | 4.05 Gbps | 0.16 Gbps |

In Table 2.6, † indicates, with distributed scheduling, in a symmetric WAN topology using shortest path routing, all control traffic is distributed evenly to all links. Therefore, the average bidirectional load per edge is also the heaviest edge load with distributed scheduling.

TABLE 2.7

Peak total control traffic of both centralized scheduling and distributed scheduling for both Architecture M and Architecture T.

| Peak Control Traffic | | Architecture M | Architecture T |
|---|---|---|---|
| Centralized Scheduling | Total traffic | 95.8 Gbps | 42.1 Gbps |
| | Per-edge | 1.24 Gbps | 0.55 Gbps |
| | Heaviest-edge | 9.2 Gbps | 4.1 Gbps |
| inDistributed Scheduling | Total traffic | 1.08 Tbps | 42.1 Gbps |
| | Per-edge | 14 Gbps | 0.54 Gbps |

In Table 2.7, † indicates, with distributed scheduling, in a symmetric WAN topology using shortest path routing, all control traffic is distributed evenly to all links. Therefore, the average bidirectional load per edge is also the heaviest edge load with distributed scheduling.

3 PHYSICAL LAYER IMPAIRMENTS IN EDFA-AMPLIFIED OFS MESH NETWORKS

Current optical networks are operated with predominantly static connections, and lightpaths are changed quasi-statically and may remain unchanged for months. Present methods of setting up a wavelength path result in slow changes to the network (~20 min setups), as each of the network element along the path is gradually tuned to the final settings to avoid instabilities arising from rapidly introducing another optical channel into the network. The link quality of all adjacent links are monitored as the lightpath is turned on in several steps. Optical Flow Switching enables and coordinates per-session end-to-end all optical lightpath switching over an optical network of meshed physical topology. Irrespective to whether the logical topology is Meshed or Tunneled, over the meshed physical topology, merging and diverging traffic in any link, unless the MAN owns an entire fiber tunnel, is unavoidable. Therefore, lightpaths for different source-destination pairs may share common mid-span fiber links, and there are dynamic lightpath-switching over the network, both in the aggregation sites in the MAN and in the long-haul backbone network.

In a long-haul fiber connection in today's optical networks, one common way of amplifying the optical signal before it degrades is to use EDFAs. Pumped by an out-band laser, an EDFA provides amplification to all wavelength channels in-band. To mitigate the long-distance fiber loss in the long-haul network and to avoid frequent regeneration of optical signals, a tandem of 10 s of EDFAs can be used for amplification of the optical signals. However, due to both the fundamental limitations and the gain control of EDFAs, when lightpath is switched on/off dynamically in a meshed network, existing channels in the same fiber experience fast transients and cross-channel power coupling, which is then amplified and controlled by downstream EDFAs, further deteriorating the problem. In [35, 45, 36, 29, 30], the authors have investigated cross-channel power transients and excursions under constant gain control of EDFA in optical networks. However, these work has only investigated the effects on average optical power of each channel, which is not enough to analyze the impact on the channel quality. The pertinent metric for channel quality is Bit Error Rate (BER), which is a result of the detection of the corrupted signal in random noise from the EDFAs and the receiver. In the experiment by Junio [23] done at Bell Lab, fast transients and steady-state channel quality variations were examined. The former impairment can be quenched using "adiabatic" switching and the new Transport Layer Protocol in [21], and from the scheduling perspective we assume the fast transient is totally accounted for by the legal modulation and the transport layer protocol. The second impairment directly impacts channel quality, and is a result of several factors: the randomness in the EDFA gain, accumulation of Amplified Spontaneous Noise (ASE), constant gain control of EDFAs, and the receiver noise. Switching-induced channel-quality variations affect scheduling, i.e., worst case channel quality during the scheduled transmission time needs to be estimated to guarantee performance and reach (for a selected transmission rate if flexible transmission rate is used).

3.1 Detection Model

We assume the signal is On-Off modulated (at 10 Gbits/s in the experiments), and use a matched filter at the receiver to obtain the "sufficient" statistics of the symbol. Let X represent the random variable at the matched filter output. Let Hypothesis "1" ($H_1$) be the case where the received bit is "1", and Hypothesis "0" ($H_0$) be the case where the received bit is "0". The signal fluctuations in the "1" and "0" levels, are randomized by accumulated noise along the link. The accumulated noise and fluctuations of the amplitudes of the signal will be compounded over the cascaded amplifiers. The received output from the matched filter, X, can be modeled as a Gaussian random variable under each hypothesis, and, $$H_1: \text{Gaussian}(\mu_s, \sigma_s^2) \rightarrow f_{X|H_1}(x) = \frac{1}{\sigma_s\sqrt{2\pi}} \exp\left[-\frac{(x-\mu_s)^2}{2\sigma_s^2}\right] \quad (3.1)$$

$$H_0: \text{Gaussian}(\mu_n, \sigma_n^2) \rightarrow f_{X|H_0}(x) = \frac{1}{\sigma_n\sqrt{2\pi}} \exp\left[-\frac{(x-\mu_n)^2}{2\sigma_n^2}\right]$$

Since "1"s and "0"s are assumed to be equally likely, $P(H_1)=P(H_0)=\frac{1}{2}$. For the detected signal, the variance of bit "1" $\sigma_s^2$ is larger than the variance of bit "0" $\sigma_n^2$, and $\mu_n<\mu_s$. Detection of Gaussian Signals in Gaussian Noise has been extensively studied, e.g. in [37]. Using the same techniques in [37], we re-derived the optimal detector for our problem in Appendix B. Appendix B shows the optimal threshold detector is a two-threshold detector, and under most realistic conditions, can be approximated by a single-threshold detector. We summarize the results in Appx. B in the following two propositions.

Proposition 1 The optimal two-threshold detector to detect the hypothesis in Eq. (3.1) is:

$$H_1 \text{ is true, if } X < x_2^*, \text{ or } X > x_1^* \quad (3.2)$$

$$H_0 \text{ is true, if } x_2^* < X < x_1^*$$

$$x_1^* = a + \sqrt{a^2 - b}$$

$$x_2^* = a - \sqrt{a^2 - b}, \text{ where}$$

$$a = \frac{\mu_n \sigma_s^2 - \mu_s \sigma_n^2}{\sigma_s^2 - \sigma_n^2} \quad (3.3)$$

$$b = \frac{\sigma_s^2 \mu_n^2 - \sigma_n^2 \mu_s^2 + 2\sigma_s^2 \sigma_n^2 \log\left(\frac{\sigma_n}{\sigma_s}\right)}{\sigma_s^2 - \sigma_n^2}$$

The minimum error probability with this two-threshold detector is, $$(P_e)_{min} = \quad (3.4)$$
$$\frac{1}{2}\left[Q\left(\frac{\mu_s - x_1^*}{\sigma_s}\right) + Q\left(\frac{x_1^* - \mu_n}{\sigma_n}\right)\right] - \frac{1}{2}\left[Q\left(\frac{\mu_s - x_2^*}{\sigma_s}\right) - Q\left(\frac{\mu_n - x_2^*}{\sigma_n}\right)\right]$$

where Q (x) is the Q-function, and, $$Q(x) = \frac{1}{2}\text{erfc}\left(\frac{x}{\sqrt{2}}\right)$$

Proposition 2 If, $$(\mu_n \sigma_s^2 - \mu_s \sigma_n^2)^2 \gg \sigma_s^2 \mu_n^2 - \sigma_n^2 \mu_s^2 + 2\sigma_s^2 \sigma_n^2 \log\left(\frac{\sigma_n}{\sigma_s}\right)$$

then the two-threshold detector in Eq. (3.2) can be approximated by the single-threshold detector below, $H_1$ is True, if $X>x_1^*$
$H_0$ is True, if $X<x_1^*$ where $x_1^*$ is defined in Eq. (3.3). The error probability of this single-threshold detector is, $$(P_e)_{single-threshold} = \frac{1}{2}\left[Q\left(\frac{\mu_s - x_1^*}{\sigma_s}\right) + Q\left(\frac{x_1^* - \mu_n}{\sigma_n}\right)\right] \quad (3.5)$$

In the literature [3, Chap. 4] of studying BER of optical receivers, single-threshold model was often used. The single-threshold model was further simplified by ignoring the term log $$\left(\frac{\sigma_n}{\sigma_s}\right)$$

in Eq. (3.3), which made sense if $\sigma_n^2$ and $\sigma_s^2$ were comparable. Note that if log $$\left(\frac{\sigma_n}{\sigma_s}\right) \approx 0,$$

then, $$\frac{(x_1^* - \mu_n)^2}{2\sigma_n^2} = \frac{(x_1^* - \mu_s)^2}{2\sigma_s^2}$$

The threshold can be solved explicitly, and is, $$x_1^* = \frac{\sigma_n \mu_s + \sigma_s \mu_n}{\sigma_s + \sigma_n}$$

Define, $$Q \triangleq \frac{x_1^* - \mu_n}{\sigma_n} = \frac{\mu_s - x_1^*}{\sigma_s} \quad (3.6)$$

This parameter Q (different from the Q-function in Proposition 1 and Proposition 2) is often used to indicate BER [3, Chap. 4] as $$BER = \frac{1}{2}\text{erfc}\left(\frac{Q}{\sqrt{2}}\right) \quad (3.7)$$

However, in our analysis, we consider the situation where, in the detector, the variance of "1" bit $\sigma_s^2$ is much larger than the variance of "0" bit $\sigma_n^2$ due to noise accumulation through multiple EDFAs (in the experiment the extinction ratio is not zero (16:1 in dB), but after many amplifiers $\sigma_n^2$ is dominated by accumulated amplifier noise). Therefore, we can not ignore the term log $$\left(\frac{\sigma_n}{\sigma_s}\right),$$

and we can not use Eq. (3.6) and (3.7) for calculating BER.

3.2 Noise Sources in EDFA-Amplified Optical Links

3.2.1 Amplified Spontaneous Emission

Spontaneous emission is a major noise source in both lasers and amplifiers. It is mostly a result of the random de-excitation of the laser ions, which has been understood through quantum mechanics [20, 43]. In an amplifier, the spontaneous emission noise is further amplified when it travels through the rest of the amplification medium, therefore, it is named Amplified Spontaneous Emission (ASE).

For an optical amplifier with optical bandwidth $B_o$, the ASE noise can be written as, $$P_{sp}=2S_{sp}B_o \qquad (3.8)$$

where $B_o$ is bandwidth of the optical filter. The parameter $S_{sp}$ is the spectral density of the ASE noise, which can be considered as nearly constant, and can be written as [3], $$S_{sp}=(G-1)n_{sp}h\nu \qquad (3.9)$$

where $\nu$ is the optical frequency of the incident photons, and h is the Planck constant. The parameter $n_{sp}$ is the spontaneous-emission factor, and $$n_{sp} = \frac{N_2}{N_2 - N_1} \qquad (3.10)$$

where $N_1$ and $N_2$ are the atomic populations for the ground and excited states, respectively. Therefore, the ASE noise in Eq. (3.8) can be re-written as, $$P_{sp} = 2(G-1)n_{sp}h\nu B_o = 2(G-1)\frac{N_2}{N_2-N_1}h\nu B_o \qquad (3.11)$$

3.2.2 Detection Noise

The shot noise and thermal noise are two fundamental noise sources that limit the BER of an optical receiver. For incident optical signal that itself fluctuates because of noise accumulation along the transmission, additional noise including beat noise and intensity noise is generated at the receiver [1]. Expressing them in the form of receiver current, the current of a photo receiver can be written as $$I(t)=I_p+i_s(t)+i_{sig\text{-}sp}(t)+i_{sp\text{-}sp}(t)+i_I(t)+i_T(t) \qquad (3.12)$$

where $i_s(t)$ is the zero-mean current fluctuation from shot noise, $i_{sig\text{-}sp}(t)+i_{sp\text{-}sp}(t)$ is from beat noise, $i_I(t)$ is from incident optical signal intensity noise, and $i_T(t)$ is from Thermal noise. $I_P$ is the average photodiode current, and, $$I_P=R\overline{P}_{in}$$

where $P_{in}$ is the average incident optical power. The parameter R is the photodetector responsivity, and, $$R = \frac{\eta q}{h\nu}$$

where $\eta$ is the quantum efficiency of the photo detector.

Shot Noise

Shot noise is a manifestation of the fact that the electron generation at the receiver constitutes a random process, leading to current fluctuation in the photodiode. The photodiode current generated in response to a constant optical signal $P_{in}$ can be written as, $$I(t)=I_p+i_s(t) \qquad (3.13)$$

where $I_p=RP_{in}$ is the average photodiode current and $i_s(t)$ is the current fluctuation due to shot noise. The noise variance of the shot noise is, $$\sigma_s^2 \triangleq \langle i_s^2(t) \rangle = 2qI_pB_e \qquad (3.14)$$

where $B_e$ is the effective noise bandwidth of the receiver.

Intensity Noise from EDFA Gain Randomness

Intensity fluctuation of incident optical signal leads to intensity noise in the photodetector. In this analysis, we focus on the intensity fluctuation caused by randomness in the gain of the EDFA because a chain of k amplifiers amplifies the intensity noise exponentially (which will be discussed in later sections). Different from the spontaneous emission which is unpolarized, the randomness in the gain of an EDFA refers to the gain fluctuation which is in-phase of the input signal light, and can be best understood from quantum mechanics [25]. We use g to represent the EDFA gain if the gain is approximated as a constant, and use G to represent the EDFA gain if the gain randomness is considered. We quantify the randomness in the gain using $\sigma_G^2/g^2$, where $Y_G^2$ is the variance of G, and g is the mean of G. Randomness in the EDFA gain leads to intensity fluctuation of the amplified optical signal, which is further amplified by downstream EDFAs. Define $\sigma_{IG}^2$ to be the intensity noise variance of the receiver current resulted from the gain randomness, we have, $$\sigma_{IG}^2 = R^2\langle(\Delta P_{in})^2\rangle = R^2\overline{P}_{in}^2\frac{\langle(\Delta P_{in})^2\rangle}{\overline{P}_{in}^2}$$

We will derive $\sigma_{IG}^2$ as a function of $\sigma_G^2/\mu_G^2$ in the later analysis.

Beat Noise

At the photo receiver, the generated photocurrent can be written as [3, Chap. 6], $$I=R|\sqrt{G}E_s+E_{sp}|^2+i_s+i_T \qquad (3.15)$$

where $E_s$ is the signal field and $E_{sp}$ is the optical field associated with the ASE. ASE-induced current noise manifests into beat noise, which is a result of beating of $E_s$ with $E_{sp}$ and $E_{sp}$ with itself [3, Chap. 6]. The ASE field $E_{sp}$ is broadband and can be written as $$E_{sp}=\int\sqrt{S_{sp}}\exp(\phi_n-i\omega_n t)d\omega_n$$

where $\phi_n$ is the phase of the noise-spectral component at the frequency $\omega_n$. Using $E_s=\sqrt{P_s}\exp(\phi_s-i\omega_s t)$, the current of the two beating noise terms can be obtained from Eq. (3.15) as $$i_{sig-sp}=2R\int(gP_sS_{sp})^{1/2}\cos\theta_1 d\omega_n \quad (3.16)$$

$$i_{sp-sp}=2R\int\int S_{sp}\cos\theta_2 d\omega_n d\omega_n' \quad (3.17)$$

where $\theta_1=(\omega_s-\omega_n)t+\phi_n-\phi_s$ and $\theta_2=(\omega_n-\omega'_n)t+\phi_n'-\phi_n$ are two random phases that vary rapidly. Averaging over the random phases, we obtain the noise variance of the two beat noise, $$\sigma_{sig-sp}^2=4R^2gP_sS_{sp}B_e$$

$$\sigma_{sp-sp}^2=4R^2S_{sp}^2B_oB_e$$

Thermal Noise

Thermal noise is a manifestation of random thermal motion of electrons in any conductor. The noise variance due to thermal noise can be written as $$\sigma_T^2 \triangleq \langle i_T^2(t)\rangle = \frac{4k_BT}{R_L}B_e$$

where $k_B$ is the Boltzmann constant, T is the absolute temperature, and $R_L$ is the load resistor. Thermal noise is small relative to the other noise sources and are often ignored in detection models.

3.3 EDFA Architecture

Figure 43:
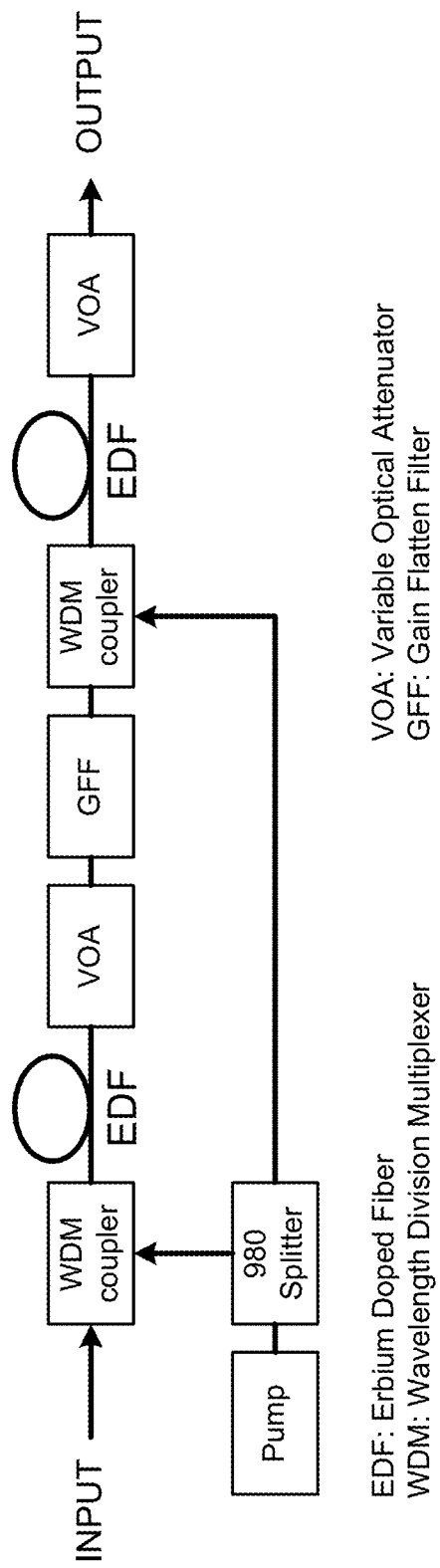
FIG. 43 is a schematic block diagram illustrating architecture of an EDFA used in experiments related to an embodiment of the present invention.
Figure 44:
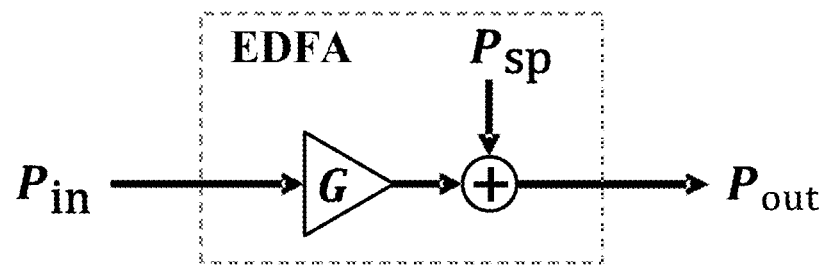
FIG. 44 is a schema of an EDFA with random gain G and ASE noise $P_{sp}$, according to an embodiment of the present invention.

FIG. 43 shows a typical EDFA architecture. This is also the EDFA used in the experiments in [23]. It is a two-stage amplifier with each span of Erbium-Doped Fibers pumped by a 980 nm source. A Gain-Flattening Filter (GFF) is used between them to flatten the gain spectrum. A control system (controlling the mid-stage Variable-Optical Attenuator between the two-stage Erbium-Doped fibers and the pump source) is capable of adjusting the internal gain to within 0.1 dB of the target within milliseconds. Define $P_{in}$ as the input optical power to an EDFA, and $P_{out}$ as the output optical power, and $g=P_{out}/P_{in}$ as the average gain. In practice, there are two common operating modes for EDFA: constant gain mode, and constant power mode. In the constant power mode, the amplifier is controlled to produce a constant output power, regardless of input power variations. In the constant gain mode, the amplifier is controlled to maintain the average of $P_{out}/P_{in}$ to be constant. Denote $P_{sp}$ as the noise of the amplified spontaneous emission (ASE) that is added to the input signal by the EDFA. Under the constant gain control, the ratio of the total output power over the total input power (i.e., $(P_{in}+P_{sp})/P_{in}$, instead of the amplification gain seen by input signal) is controlled to be constant. To avoid misunderstanding, we use quotation signs for the constant gain control of the ratio of the total output power to the input power, i.e., "constant gain mode" or "constant gain control". FIG. 44 shows a simplified schematic representation of and EDFA with random gain G and ASE noise $P_{sp}$.

FIG. 43 is a schematic block diagram illustrating the architecture of the EDFA used for the experiments. It is a two-stage amplifier pumped by a 980 nm pump source. The variable optical attenuator and the pump can be adjusted by the EDFA control system.

FIG. 44 is a schema of an EDFA with random gain G and ASE noise $P_{sp}$.

Define a naming convention, Model A-B, for EDFA-amplified optical links, where,
A refers to the number of cascaded EDFA(s) in the link,
B=g if the amplifier gain intensity noise is ignored, and
B=G if otherwise.

3.4 EDFA-Amplified Optical Link Model 1-g

Figure 45:
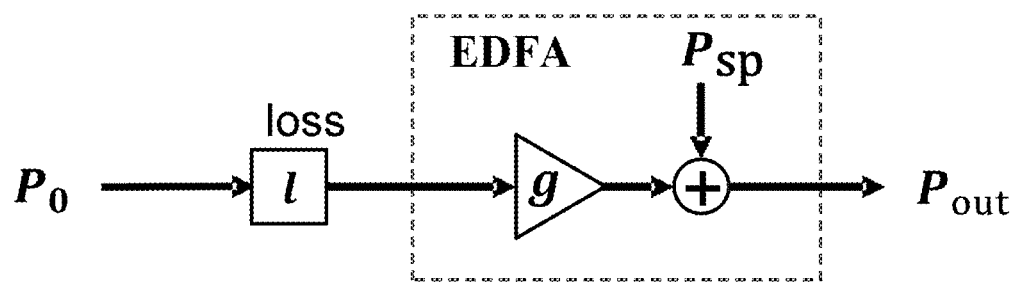
FIG. 45 is a schema Model 1-g with fiber loss l, according to an embodiment of the present invention.

We start with analyzing the simplest EDFA model, Model 1-g as shown in FIG. 45. In the model, an optical attenuation l is applied before the EDFA to simulate the loss the optical signal experiences when propagating in the fiber before being amplified by an amplifier.

FIG. 45 is a schema Model 1-g with fiber loss l.

3.4.1 Optical Signal and Noise of Model 1-g

The output $P_{out}$ includes both signal and noise, and $$P_{out}=P_0lg+P_{sp}$$

where $P_0$ is the initial optical signal power out of a transmitter. $P_{sp}$ is the optical ASE noise from Eq. (3.11), and $P_{sp}=2(g-1)n_{sp}hvB_o$. The optical signal to noise ratio (OSNR) at the output, therefore, is $$OSNR_{1-g} = \frac{P_0lg}{2(g-1)n_{sp}hvB_o}$$

3.4.2 Electrical Signal and Noise of Model 1-g

More noise (shot noise and thermal noise) is added to the signal at the optical receiver when being detected, and ASE noise manifests into beat noise both with the signal field and with itself. Assuming infinite extinction ratio for the On-Off Keying modulation and ignoring thermal noise, from Eq. (3.15), the photocurrent is, $$I_1=R|E_0\sqrt{lg}+E_{sp}|^2+i_{s1}+i_{sig-sp1}+i_{sp-sp1}, \text{ for bit "1"}$$

$$I_0=R|E_{sp}|^2+i_{s0}+i_{sp-sp0}, \text{ for bit "0"}$$

Therefore, for bit "1", we have, $$\bar{I}_1=R(P_0lg+P_{sp})$$

$$\sigma_{s1}^2=2qR(P_0lg+P_{sp})B_e$$

$$\sigma_{sig-sp1}^2=4R^2P_0lg(g-1)n_{sp}hvB_e$$

$$\sigma_{sp-sp1}^2=4R^2[(g-1)n_{sp}hv]^2B_oB_e$$

For bit "0", we have $$\bar{I}_0=RP_{sp}$$

$$\sigma_{s0}^2=2gRP_{sp}B_e$$

$$\sigma_{sp-sp0}^2=4R^2[(g-1)n_{sp}hv]^2B_oB_e$$

The variance of bit "1" is larger than the variance of bit "0". Detecting whether the received bit is "1" or "0" is different from classical formulation where variances of bit "1" and "0" are approximately the same. In [1, Chap. 6], when detection noise is dominated by the signal-spontaneous beat noise, the electrical SNR is defined as $$SNR_{el} = \frac{(\bar{I}_1-\bar{I}_0)^2}{\sigma_{sig-sp}^2}$$

However, in our formulation, accumulated noise increases quickly after a cascade of multiple amplifiers, and the accumulated noise power can be large enough so that other noise factors besides signal-spontaneous beat noise also become significant and can not be ignored. Therefore, we define the electrical SNR (ESNR) to be, $$ESNR \triangleq \frac{(\bar{I}_1 - \bar{I}_0)^2}{\sigma_{s_1}^2 + \sigma_{sig-sp_1}^2 + \sigma_{sp-sp_1}^2} \quad (3.18)$$

For Model 1-g, $$ESNR_{1-g} = \frac{(P_0 lg)^2}{\frac{2q(P_0 lg + P_{sp})B_e}{R} + 4P_0 lg(g-1)n_{sp}hvB_e + 4[(g-1)n_{sp}hv]^2 B_0 B_e}$$

Ignoring the shot noise term, $$ESNR_{1-g} \approx \frac{P_0 lg}{2P_{sp} + \frac{P_{sp}^2}{P_0 lg}} \cdot \frac{B_0}{B_e}$$

If $P_0 lg \gg P_{sp}$, $$ESNR_{1-g} \approx \frac{B_0}{2B_e} \cdot \frac{P_0 lg}{P_{sp}} = \frac{B_0}{2B_e} OSNR_{1-g}$$

Note that the BER defined in Eq. (3.4) or (3.5) depends on statistics of both bit "1" and bit "0", while the ESNR defined in Eq. (3.18) is a function of only bit "1" statistics. Therefore, the ESNR itself is not enough to determine the BER. We included the analysis of the afore-defined ESNR here, because this was similar to the $\sigma_s^2/\mu_s^2$ measured in the experiment by Junio [23].

3.5 EDFA-Amplified Optical Link Model k-g

Figure 46:
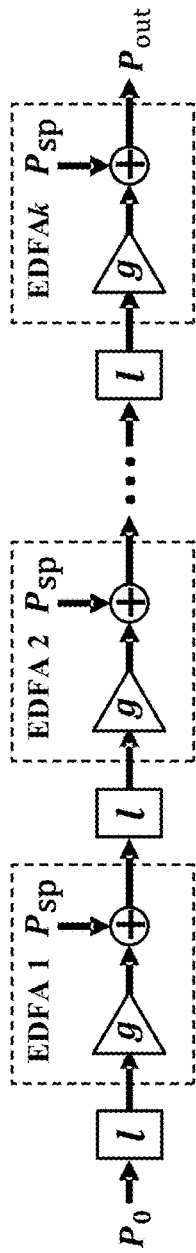
FIG. 46 is a schematic block diagram of a cascade of k amplifiers, each separated by a fiber span with loss l, according to an embodiment of the present invention.

FIG. 46 is a schematic block diagram of a cascade of k amplifiers, each separated by a fiber span with loss l.

3.5.1 Optical Signal and Noise of Model k-g

The optical signal power after k amplifiers $(P_{sig})_k$ is $$(P_{sig})_k = P_0 (lg)^k$$

The accumulated ASE noise after k amplifiers $(P_{sp})_k$ is $$(P_{sp})_k = P_{sp} \sum_{i=0}^{k-1} (lg)^i = \begin{cases} kP_{sp} & \text{if } lg = 1 \\ P_{sp} \frac{1-(lg)^k}{1-lg} & \text{otherwise} \end{cases}$$

The optical signal to noise ratio of Model k-g, therefore, is $$(OSNR)_{k-g} = \begin{cases} \dfrac{P_0}{2k(g-1)n_{sp}hvB_0} & \text{if } lg = 1 \\ \dfrac{P_0 (lg)^k (1-lg)}{2(g-1)n_{sp}hvB_0[1-(lg)^k]} & \text{otherwise} \end{cases} \quad (3.19)$$

From the above equation, we have the following observations:

1. For lg<1, as k increases, $(OSNR)_{k-g}$ decreases at a rate of $$\frac{(lg)^k}{1-(lg)^k}.$$

And for large k, $(OSNR)_{k-g}$ decreases at a rate of $(lg)^k$ asymptotically.

$$lim_{k \to \infty} (OSNR)_{k-g} = 0$$

2. For lg=1, as k increases, $(OSNR)_{k-g}$ decreases at a rate of $$\frac{1}{k}.$$

$$lim_{k \to \infty} (OSNR)_{k-9} = 0$$

3. For lg>1, as k increases, $(OSNR)_{k-g}$ decreases at a rate of $$\frac{1}{1 - \dfrac{1}{(lg)^k}}.$$

$$lim_{k \to \infty} (OSNR)_{k-g} = \frac{P_0(lg-1)}{2(g-1)n_{sp}hvB_0}$$

3.5.2 Electrical Signal and Noise of Model k-g

The photocurrent of bit "1" is, $$(I_1)_k = \begin{cases} R|E_0 + E_{sp}\sqrt{k}|^2 + i_{s_1} + i_{sig-sp_1} + i_{sp-sp_1} & \text{if } lg = 1 \\ R\left|E_0 \sqrt{(lg)^k} + E_{sp}\sqrt{\dfrac{1-(lg)^k}{1-lg}}\right|^2 + i_{s_1} + i_{sig-sp_1} + i_{sp-sp_1} & \text{otherwise} \end{cases}$$

The photocurrent of bit "0" is, $$(I_0)_k = \begin{cases} Rk|E_{sp}|^2 + i_{s_0} + i_{sp-sp_0} & \text{if } lg = 1 \\ R\dfrac{1-(lg)^k}{1-lg}|E_{sp}|^2 + i_{s_0} + i_{sp-sp_0} & \text{otherwise} \end{cases}$$

Therefore, for bit "1", we have, $$(\bar{I}_1)_k = \begin{cases} R(P_0 + kP_{sp}) & \text{if } lg = 1 \\ R\left[R_0(lg)^k + P_{sp}\dfrac{1-(lg)^k}{1-lg}\right] & \text{otherwise} \end{cases}$$

-continued $$(\sigma_{s_1}^2)_k = \begin{cases} 2qR(P_0 + kP_{sp})B_e & \text{if } lg = 1 \\ 2qR\left[R_0(lg)^k + P_{sp}\frac{1-(lg)^k}{1-lg}\right]B_e & \text{otherwise} \end{cases}$$

$$(\sigma_{sig-sp_1}^2)_k = \begin{cases} 4R^2 P_0 k(g-1)n_{sp}h\nu B_e & \text{if } lg = 1 \\ 4R^2 P_0 k(g-1)n_{sp}h\nu B_e \frac{(lg)^k[1-(lg)^k]}{1-lg} & \text{otherwise} \end{cases} \quad (3.20)$$

$$(\sigma_{sp-sp_1}^2)_k = \begin{cases} 4R^2[k(g-1)n_{sp}h\nu]^2 B_0 B_e & \text{if } lg = 1 \\ 4R^2\left[\frac{1-(lg)^k}{1-lg}(g-1)n_{sp}h\nu\right]^2 B_0 B_e & \text{otherwise} \end{cases} \quad (3.21)$$

For bit "0", we have $$(\bar{I}_0)_k = \begin{cases} kRP_{sp} & \text{if } lg = 1 \\ RP_{sp}\frac{1-(lg)^k}{1-lg} & \text{otherwise} \end{cases}$$

$$(\sigma_{s_0}^2)_k = \begin{cases} 2kqRP_{sp}B_e & \text{if } lg = 1 \\ 2qRP_{sq}B_e\frac{1-(lg)^k}{1-lg} & \text{otherwise} \end{cases}$$

$$(\sigma_{sp-sp_0}^2)_k = \begin{cases} 4R^2[k(g-1)n_{sp}h\nu]^2 B_0 B_e & \text{if } lg = 1 \\ 4R^2\left[\frac{1-(lg)^k}{1-lg}(g-1)n_{sp}h\nu\right]^2 B_0 B_e & \text{otherwise} \end{cases}$$

Therefore, the ESNR as defined in Eq. (3.18) for Model k-g is $$ESNR_{k-g} = \qquad (3.22)$$

$$\begin{cases} \dfrac{P_0^2}{\dfrac{2q(P_0+kP_{sp})B_e}{R} + 4P_0 k(g-1)n_{sp}h\nu B_e + 4[k(g-1)n_{sp}h\nu]^2 B_0 B_e} & \text{if } lg = 1 \\[2ex] \dfrac{[P_0(lg)^k]^2}{\dfrac{2q\left[P_0(lg)^k + P_{sp}\frac{1-(lg)^k}{1-lg}\right]B_e}{R} + 4P_0 k(g-1)n_{sp}h\nu B_e \frac{(lg)^k[1-(lg)^k]}{1-lg} + 4\left[\frac{1-(lg)^k}{1-lg}(g-1)n_{sp}h\nu\right]^2 B_0 B_e} & \text{otherwise} \end{cases}$$

Ignoring the shot noise, $$ESNR_{k-g} \approx \begin{cases} \dfrac{P_0}{2kP_{sp}+k^2\dfrac{P_{sp}^2}{P_0}}\cdot\dfrac{B_0}{B_e} & \text{if } lg = 1 \\[2ex] \dfrac{P_0}{2P_{sp}\dfrac{\frac{1}{(lg)^k}-1}{1-lg} + \dfrac{P_{sp}^2}{P_0}\left[\dfrac{\frac{1}{(lg)^k}-1}{1-lg}\right]^2}\cdot\dfrac{B_0}{B_e} & \text{otherwise} \end{cases} \quad (3.23)$$

From the above equation, we have the following observations:

1. For lg<1, as k increases, $(ESNR)_{k-g}$ decreases at a dominating rate of $(lg)^{2k}$.

$lim_{k\to\infty}(ESNR)_{k-g}=0$

Figure 49:
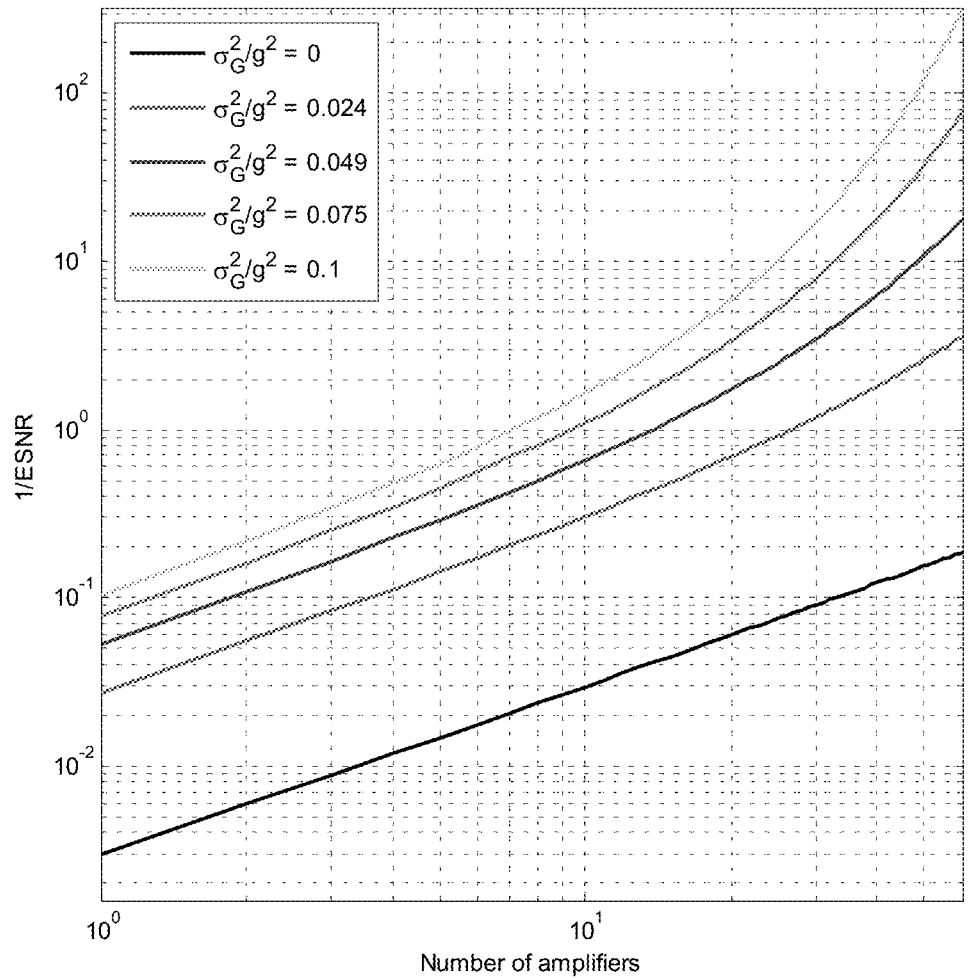
FIG. 49 is a plot of the inverse of ESNR for Model k-G and Model k-g, according to an embodiment of the present invention.

2. For lg=1, as k increases, $(ESNR)_{k-g}$ decreases at a rate of $$\frac{1}{k^2},$$

as shown in FIG. 49.

$lim_{k\to\infty}(ESNR)_{k-g}=0$

3. For lg>1, as k increases, $(ESNR)_{k-g}$ decreases at a rate of $$\frac{1}{1-\dfrac{1}{(lg)^k}}.$$

$$lim_{k\to\infty}(ESNR)_{k-g} = \frac{P_0(lg-1)}{2P_{sp}+\dfrac{P_{sp}^2}{P_0(lg-1)}}\cdot\frac{B_0}{B_e}$$

If $P_0 \gg P_{sp}$, $lim_{k\to\infty}(ESNR)_{k-g} = \dfrac{B_0(lg-1)}{2B_e}\cdot OSNR_{k-g}$ Note that when beat noise of spontaneous emission with itself cannot be ignored, the denominator of ESNR is a quadratic function of the accumulated optical noise power, while the nominator of ESNR is a linear function of the optical signal power, therefore, knowing the ratio of optical signal and optical noise (i.e., the OSNR) is not enough to determine the ESNR. Hence, by knowing the OSNR before the signal is detected is not enough to determine the BER, instead, both exact values of signal power and noise power are needed to derive the BER for both Model k-g and Model k-G.

3.5.3 Special Case of Model k-g when Lg<1 and Lg=β

Define $$\beta = \frac{P_0}{P_0 + P_{sp}}$$

A special case for lg<1 is when $l_i=\beta/g$ for i>1, and $l_1=1/g$. Each fiber span loss is composed of two factors, loss 1/g which is compensated by the amplifier gain g, and an additional loss β. Equivalently, we can interpret the loss β as an attenuation factor from the gain control of the EDFA, and we arrive at the model in FIG. 47.

Figure 47:
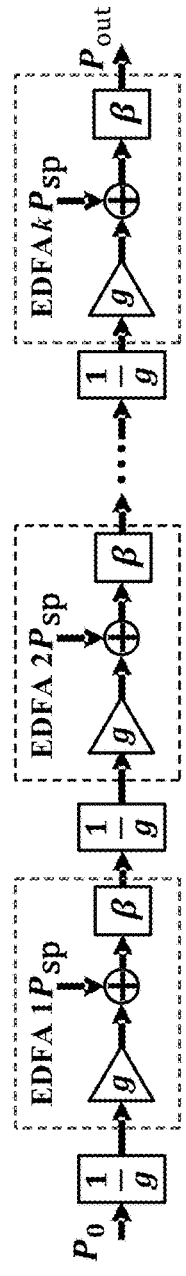
FIG. 47 is a schematic blockdiagram of a special case of Model k-g, when lg=β, according to an embodiment of the present invention.

FIG. 47 is a schematic blockdiagram of a special case of Model k-g, when lg=β.

Let $(P_{out})_i$ be the output optical power of the ith amplifier in FIG. 47. After one amplifier, $$(P_{out})_1 = \left(P_0\frac{1}{g}g + P_{sp}\right)\beta = P_0$$

Therefore, the output power of the first amplifier is controlled to be the same as the original input optical power. Using induction, we can easily prove that $(P_{out})_i = P_0$ Hence, the effect of having lg=β is that the output of each amplifier is controlled to be equal to the initial signal power $P_0$. Note that this is under "constant gain control" that results in equal output power. This is not constant power control, because the output power is controlled to be equal to $P_0$, and if $P_0$ changes, $P_{out}$ also changes accordingly through β. If it was under constant power control, $P_{out}$ would stay the same despite of variations of $P_0$. Therefore, the OSNR, when the signal is on, is, $$(OSNR)_{k-g} = \frac{P_0(1-\beta)}{2(g-1)n_{sp}hvB_0} \cdot \frac{1}{\left(\frac{1}{\beta}\right)^k - 1}$$

For large k, $(OSNR)_{k-g}$ decreases at a rate of $\beta^k$ asymptotically. The ESNR is $$ESNR_{k-g} \approx \frac{P_0}{2P_{sp}\frac{\frac{1}{\beta^k}-1}{1-\beta} + P_{sp}^2\left(\frac{\frac{1}{\beta^k}-1}{1-\beta}\right)^2} \cdot \frac{B_0}{B_e}$$

As k increases, $(ESNR)_{k-g}$ decreases at a rate of $\beta^{2k}$, the same observation as the case of Model k-g with lg<1.

3.6 EDFA-Amplified Optical Link Model k-G

We now include the effect of the EDFA random gain. Model k-G in FIG. 48 includes intensity noise caused by in-phase gain randomness of the EDFA, and this model uses G instead of g.

Figure 48:
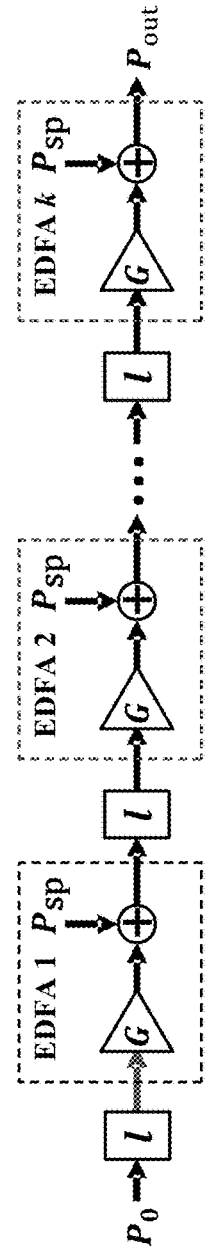
FIG. 48 is a schematic block diagram of Model k-G, according to an embodiment of the present invention.

FIG. 48 is a schematic block diagram of Model k-G.

3.6.1 Optical Signal and Noise of Model k-G

The average optical signal power after k amplifiers $(P_{sig})_k$ is $$(P_{sig})_k = P_0(lg)^k$$

The average accumulated ASE noise after k amplifiers $(P_{sp})_k$ is $$(P_{sp})_k = P_{sp}\sum_{i=0}^{k-1}(lg)^i = \begin{cases} kP_{sp} & \text{if } lg = 1 \\ P_{sp}\frac{1-(lg)^k}{1-lg} & \text{otherwise} \end{cases}$$

Therefore, the optical signal field after k amplifiers $(E_{sig})_k$ is $$(E_{sig})_k = E_0(\Pi_{i=1}^{k} lG_i)^{1/2}$$

The accumulated ASE field after k amplifiers $(E_{sp})_k$ is $$(E_{sp})_k = \Sigma_{i=1}^{k-1} E_{sp}(\Pi_{j=i+1}^{k} lG_j)^{1/2} + E_{sp}$$

The exact calculation of the intensity noise due to gain randomness depends on the distribution of G and is tedious to calculate. We approximate the intensity noise by two extra variance terms, one from the amplified signal and one from the ASE noise (the derivations are in App. C). The random gain intensity noise from the signal is, $$\sigma_{IG_{sig}}^2 = P_0(lg)^k\left[1 - \left(1 - \frac{\text{Var}(\sqrt{G})}{g}\right)^k\right] \quad (3.24)$$

The gain intensity noise from the accumulated ASE is, $$\sigma_{IG_{sp}}^2 = P_{sp}\sum_{i=1}^{k-1}\left((lg)^{k-i} - \left[lg\left(1 - \frac{\text{Var}(\sqrt{G})}{g}\right)\right]^{k-1}\right) \quad (3.25)$$

$$= \begin{cases} P_{sp}\left\{(k-1) - \frac{g}{\text{Var}(\sqrt{G})}\left[1 - \left(1 - \frac{\text{Var}(\sqrt{G})}{g}\right)^{k-1}\right]\right\} & \text{if } lg = 1 \\ P_{sp}\left\{\frac{\frac{lg(1-(lg)^{k-1})}{1-lg} - lg\left(1 - \frac{\text{Var}(\sqrt{G})}{g}\right)\left[1 - \left(lg\left(1 - \frac{\text{Var}(\sqrt{G})}{g}\right)\right)^{k-1}\right]}{1 - lg\left(1 - \frac{\text{Var}(\sqrt{G})}{g}\right)}\right\} & \text{if } lg \neq 1, lg \neq \frac{1}{1 - \frac{\text{Var}(\sqrt{G})}{g}} \\ P_{sp}\left\{\frac{lg[(lg)^{k-1}-1]}{lg-1} - (k-1)\right\} & \text{if } lg = \frac{1}{1 - \frac{\text{Var}(\sqrt{G})}{g}} \end{cases}$$

Note that with random gain intensity noise considered, the optical field of bit "1" is more random than that of bit "0". We approximate the OSNR when the signal is on by, $$(OSNR)_{k-G} \triangleq \frac{(P_{sig})_k}{(P_{sp})_k + \sigma_{IG_{sig}}^2 + \sigma_{IG_{sp}}^2}$$

To see how k and random gain affect OSNR and to make the analysis easier, we look at $$\frac{1}{OSNR_{k-G}}$$

in three cases where lg<1, lg=1, and lg>1. Notice $$\frac{1}{OSNR_{k-G}}$$

that is composed with three parts, and, $$\frac{1}{OSNR_{k-G}} = \frac{(P_{sp})_k}{(P_{sig})_k} + \frac{\sigma^2_{IG_{sig}}}{(P_{sig})_k} + \frac{\sigma^2_{IG_{sp}}}{(P_{sig})_k}$$

1. For lg=1, $$\frac{1}{OSNR_{k-G}} = \frac{P_{sp}}{P_0}(2k-1) + \left[\frac{P_{sp}g}{P_0 \text{Var}(\sqrt{G})} - \left(1 - \frac{\text{Var}(\sqrt{G})}{g}\right)\right] \quad (3.26)$$

$$\left(1 - \frac{\text{Var}(\sqrt{G})}{g}\right)^{k-1} + 1 - \frac{P_{sp}g}{P_0 \text{Var}(\sqrt{G})}$$

Therefore, for large k, $1/OSNR_{k-G}$ increases at a dominating rate of 2 k with increasing k, or, $OSNR_{k-G}$ decreases with a dominating rate of ½k as k increases, and $$\lim_{k \to \infty} OSNR_{k-G} = 0$$

2. For lg<1, $$\frac{1}{OSNR_{k-G}} = \frac{P_{sp}}{P_0(1-lg)}\left[1 - \frac{1}{(lg)^k}\right] + \left[1 - \left(1 - \frac{\text{Var}(\sqrt{G})}{g}\right)^k\right] + \frac{\sigma^2_{IG_{sp}}}{(P_{sig})_k}$$

where $$\frac{\sigma^2_{IG_{sp}}}{(P_{sig})_k} = \frac{P_{sp}}{P_0}\left\{\left[\frac{lg\left(1 - \frac{\text{Var}(\sqrt{G})}{g}\right)}{lg\left(1 - \frac{\text{Var}(\sqrt{G})}{g}\right)} - \frac{lg}{lg-1}\right]\frac{1}{(lg)^k} + \right.$$

$$\left. \frac{lg\left(1 - \frac{\text{Var}(\sqrt{G})}{g}\right)}{lg\left(1 - \frac{\text{Var}(\sqrt{G})}{g}\right) - 1}\left(1 - \frac{\text{Var}(\sqrt{G})}{g}\right)^{k-1} - \frac{lg}{lg-1}\right\}$$

Therefore, for large k, $1/OSNR_{k-G}$ increases at a rate of $$\left(\frac{1}{lg}\right)^k$$

with increasing k, or, $OSNR_{k-G}$ decreases with a rate of $(lg)^k$ as k increases, and $$\lim_{k \to \infty} OSNR_{k-G} = 0$$

3. For lg>1, $$\frac{1}{OSNR_{k-G}} = \frac{P_{sp}}{P_0(1-lg)}\left[\left(\frac{1}{lg}\right)^k - 1\right] + \left[1 - \left(1 - \frac{\text{Var}(\sqrt{G})}{g}\right)^k\right] + \frac{\sigma^2_{IG_{sp}}}{(P_{sig})_k}$$

where $$\frac{\sigma^2_{IG_{sp}}}{(P_{sig})_k} = \frac{P_{sp}}{P_0}\left\{\left[\frac{lg}{1-lg} - \frac{lg\left(1 - \frac{\text{Var}(\sqrt{G})}{g}\right)}{1 - lg\left(1 - \frac{\text{Var}(\sqrt{G})}{g}\right)}\right]\left(\frac{1}{lg}\right)^k + \right.$$

$$\left. \frac{lg\left(1 - \frac{\text{Var}(\sqrt{G})}{g}\right)}{1 - lg\left(1 - \frac{\text{Var}(\sqrt{G})}{g}\right)}\left(1 - \frac{\text{Var}(\sqrt{G})}{g}\right)^{k-1} - \frac{1}{1-lg}\right\}$$

Therefore, for k large, $1/OSNR_{k-G}$ increases at a dominating rate of max $$\left(a - \left(\frac{1}{lg}\right)^k, b - \left(1 - \frac{\text{Var}(\sqrt{G})}{g}\right)^k\right)$$

with increasing k, where a and b are constants. Or, $OSNR_{k-G}$ decreases with a dominating rate of min $$\left(\frac{1}{a - \left(\frac{1}{lg}\right)^k}, \frac{1}{b - \left(1 - \frac{\text{Var}(\sqrt{G})}{g}\right)^k}\right)$$

as k increases. And $$\lim_{k \to \infty} OSNR_{k-G} = \frac{P_0(lg-1)}{2P_{sp}}$$

When considering $OSNR_{k-G}$, for the cases of both lg=1 and lg<1, the key contributor to signal quality degradation in Model k-G is the accumulated ASE noise, while the effect of the random gain can be neglected; for lg larger than 1, the effect of random gain becomes more significant, but the impact is still non-substantial. With Model k-G when amplifier random gain intensity noise is included, optical bit "1" and bit "0" suffers from different noise power, but the OSNR studied here only considers the noise to bit "1". Therefore, even with coherence detection, because the "0" bit also contributes in determining the threshold, the ratio of the afore-defined OSNR is not enough to calculate the exact BER. Instead, both signal power and noise power for bit "1" and "0" are needed.

3.6.2 Electrical Signal and Noise of Model k-G

The photocurrent of bit "1" is, $$(I_1)_k = \begin{cases} R|E_0 + E_{sp}\sqrt{k}|^2 + i_{s_1} + i_{sig-sp_1} + i_{sp-sp_1} + i_{IG_1} & \text{if } lg = 1 \\ R\left|E_0\sqrt{(lg)^k} + E_{sp}\sqrt{\dfrac{1-(lg)^k}{1-lg}}\right|^2 + i_{s_1} + i_{sig-sp_1} + i_{sp-sp_1} + i_{IG_1} & \text{otherwise} \end{cases}$$

The photocurrent of bit "0" is, $$(I_0)_k = \begin{cases} Rk|E_{sp}|^2 + i_{s_0} + i_{sp-sp_0} + i_{IG_0} & \text{if } lg = 1 \\ R\dfrac{1-(lg)^k}{1-lg}|E_{sp}|^2 + i_{s_0} + i_{sp-sp_0} + i_{IG_0} & \text{otherwise} \end{cases}$$

Therefore, for bit "1", we have, $$(\bar{I}_1)_k = \begin{cases} R(P_0 + kP_{sp}) & \text{if } lg = 1 \\ R\left[P_0(lg)^k + P_{sp}\dfrac{1-(lg)^k}{1-lg}\right] & \text{otherwise} \end{cases}$$

$$(\sigma_{s_1}^2)_k = \begin{cases} 2qR(P_0 + kP_{sp})B_e & \text{if } lg = 1 \\ 2qR\left[P_0(lg)^k + P_{sp}\dfrac{1-(lg)^k}{1-lg}\right]B_e & \text{otherwise} \end{cases}$$

For bit "0", we have $$(\bar{I}_0)_k = \begin{cases} kRP_{sp} & \text{if } lg = 1 \\ RP_{sp}\dfrac{1-(lg)^k}{1-lg} & \text{otherwise} \end{cases}$$

$$(\sigma_{s_0}^2) = \begin{cases} 2kqRP_{sp}B_e & \text{if } lg = 1 \\ 2qRP_{sp}B_e\dfrac{1-(lg)^k}{1-lg} & \text{otherwise} \end{cases}$$

$$(\sigma_{sp-sp_0}^2)_k = \begin{cases} 4R^2[k(g-1)n_{sp}h\nu]^2 B_o B_e & \text{if } lg = 1 \\ 4R^2\left[\dfrac{1-(lg)^k}{1-lg}(g-1)n_{sp}h\nu\right]^2 B_o B_e & \text{otherwise} \end{cases}$$

$$(\sigma_{IG_0}^2)_k = \sigma_{IG_{sp-sp}}^2$$

The random gain intensity noise is derived in App. C, and, $$\sigma_{IG_{sig-sig}}^2 = R^2 P_0^2 (lg)^{2k}\left[\left(1 + \dfrac{\sigma_G^2}{g^2}\right)^k - 1\right] \tag{3.29}$$

$$\sigma_{IG_{sig-sp}}^2 \geq 4R^2 P_0 S_{sp} B_e \cdot (lg)^k \cdot \sum_{j=0}^{k-1}\left\{\left[lg\left(1 + \dfrac{\sigma_G^2}{g^2}\right)\right]^j - (lg)^j\right\} \tag{3.30}$$

$$= \begin{cases} 4R^2 P_0 S_{sp} B_e \cdot \left\{\dfrac{g^2}{\sigma_G^2}\left[\left(1 + \dfrac{\sigma_G^2}{g^2}\right)^k - 1\right] - k\right\} & \text{if } lg = 1 \\ 4R^2 P_0 S_{sp} B_e \cdot (lg)^k \cdot \left\{\dfrac{\left[lg\left(1 + \frac{\sigma_G^2}{g^2}\right)\right]^k - 1}{lg\left(1 + \frac{\sigma_G^2}{g^2}\right) - 1} - \dfrac{(lg)^k - 1}{lg - 1}\right\} & \text{otherwise} \end{cases}$$

-continued $$(\sigma_{sig-sp_1}^2)_k = \begin{cases} 4R^2 P_0 k(g-1)n_{sp}h\nu B_e & \text{if } lg = 1 \\ 4R^2 P_0 (g-1)n_{sp}h\nu B_e \dfrac{(lg)^k[1-(lg)^k]}{1-lg} & \text{otherwise} \end{cases} \tag{3.27}$$

$$(\sigma_{sp-sp_1}^2)_k = \begin{cases} 4R^2[k(g-1)n_{sp}h\nu]^2 B_o B_e & \text{if } lg = 1 \\ 4R^2\left[\dfrac{1-(lg)^k}{1-lg}(g-1)n_{sp}h\nu\right]^2 B_o B_e & \text{otherwise} \end{cases} \tag{3.28}$$

$$(\sigma_{IG_1}^2)_k = \sigma_{IG_{sig-sig}}^2 + \sigma_{IG_{sig-sp}}^2 + \sigma_{IG_{sp-sp}}^2$$

where $\sigma_{IG_{sig-sig}}^2$ is the random gain noise from signal power, $\sigma_{IG_{sig-sp}}^2$ is the random gain noise from beat noise of signal with ASE, and $\sigma_{IG_{sig-sp}}^2$ is the random gain noise from the beat noise of ASE with itself.

If $lg \neq 1$, $$\sigma_{IG_{sp-sp}}^2 > 4R^2 S_{sp}^2 B_o B_e \cdot \sum_{i=1}^{k-1}\left\{\dfrac{\left[(lg)^2\left(1 + \frac{\sigma_G^2}{g^2}\right)\right]^{k-i} - 1}{lg\left(1 + \frac{\sigma_G^2}{g^2}\right) - 1} - \dfrac{(lg)^{2(k-i)}}{lg - 1} + \dfrac{lg\frac{\sigma_G^2}{g^2}(lg)^{k-i}}{\left[lg\left(1 + \frac{\sigma_G^2}{g^2}\right) - 1\right](lg - 1)}\right\} \tag{3.31}$$

$$= 4R^2 S_{sp}^2 B_o B_e \cdot \begin{cases} \dfrac{(lg)^2\left(1+\dfrac{\sigma_G^2}{g^2}\right)}{lg\left(1+\dfrac{\sigma_G^2}{g^2}\right)-1} \cdot \\ \dfrac{\left[(lg)^2\left(1+\dfrac{\sigma_G^2}{g^2}\right)\right]^{k-1}-1}{(lg)^2\left(1+\dfrac{\sigma_G^2}{g^2}\right)-1} - \\ \dfrac{(lg)^2}{lg-1} \cdot \dfrac{(lg)^{2(k-1)}-1}{(lg)^2-1} + \\ \dfrac{(lg)^2 \dfrac{\sigma_G^2}{g^2}[(lg)^{k-1}-1]}{\left[lg\left(1+\dfrac{\sigma_G^2}{g^2}\right)-1\right](lg-1)^2} \end{cases}$$

If lg=1, $$\sigma_{IG_{sp-sp}}^2 = 4R^2 S_{sp}^2 B_o B_e \cdot \qquad (3.32)$$

$$\left\{\left(\dfrac{g^2}{\sigma_G^2}\right)^2\left[\left(1+\dfrac{\sigma_G^2}{g^2}\right)^k - \left(1+\dfrac{\sigma_G^2}{g^2}\right)\right] - \dfrac{g^2}{\sigma_G^2}(k-1) - \dfrac{k(k-1)}{2}\right\}$$

Modifying the ESNR defined in Eq. (3.18) to include the random gain intensity noise in Model k-G as (shot noise is ignored), $$(ESNR)_{k-G} \triangleq \dfrac{((\bar{I}_1)_k - (\bar{I}_0)_k)^2}{(\sigma_{sig-sp_1}^2)_k + (\sigma_{sp-sp_1}^2)_k + (\sigma_{IG_1}^2)_k}$$

To make the analysis more straightforward, let's look into $1/(ESNR)_{k-G}$ instead, and, $$\dfrac{1}{(ESNR)_{k-G}} = \dfrac{1}{(ESNR)_{k-g}} + \dfrac{(\sigma_{IG_1}^2)_k}{R^2 P_0^2 (lg)^{2k}}$$

where $(ESNR)_{k-g}$ is defined in Eq. (3.22). Note that $$\dfrac{(\sigma_{IG_1}^2)_k}{R^2 P_0^2 (lg)^{2k}} = \dfrac{\sigma_{IG_{sig-sig}}^2}{R^2 P_0^2 (lg)^{2k}} + \dfrac{\sigma_{IG_{sig-sp}}^2}{R^2 P_0^2 (lg)^{2k}} + \dfrac{\sigma_{IG_{sp-sp}}^2}{R^2 P_0^2 (lg)^{2k}}$$

From Eq. (3.29), we have, $$\dfrac{\sigma_{IG_{sig-sig}}^2}{R^2 P_0^2 (lg)^{2k}} = \left(1+\dfrac{\sigma_G^2}{g^2}\right)^k - 1 \qquad (3.33)$$

From Eq. (3.30), we have, $$\dfrac{\sigma_{IG_{sig-sp}}^2}{R^2 P_0^2 (lg)^{2k}} \geq \qquad (3.34)$$

$$\begin{cases} \dfrac{4S_{sp}B_e}{P_0} \cdot \left\{\dfrac{g^2}{\sigma_G^2}\left[\left(1+\dfrac{\sigma_G^2}{g^2}\right)^k - 1\right] - k\right\} & \text{if } lg=1 \\ \dfrac{4S_{sp}B_e}{P_0} \cdot \left\{\dfrac{\left[\left(1+\dfrac{\sigma_G^2}{g^2}\right)\right]^k - \dfrac{1}{(lg)^k}}{lg\left(1+\dfrac{\sigma_G^2}{g^2}\right)-1} - \dfrac{1-\dfrac{1}{(lg)^k}}{lg-1}\right\} & \text{otherwise} \end{cases}$$

From Eq. (3.31) and (3.32), we have, $$\dfrac{\sigma_{IG_{sp-sp}}^2}{R^2 P_0^2 (lg)^{2k}} \geq \begin{cases} \dfrac{4S_{sp}^2 B_o B_e}{P_0^2} \cdot \left\{\begin{array}{l}\left(\dfrac{g^2}{\sigma_G^2}\right)^2\left[\left(1+\dfrac{\sigma_G^2}{g^2}\right)^k - \left(1+\dfrac{\sigma_G^2}{g^2}\right)\right] - \\ \dfrac{g^2}{\sigma_G^2}(k-1) - \dfrac{k(k-1)}{2}\end{array}\right\} & \text{if } lg=1 \\ \dfrac{4S_{sp}^2 B_o B_e}{P_0^2} \cdot \begin{cases}\dfrac{(lg)^2\left(1+\dfrac{\sigma_G^2}{g^2}\right)}{lg\left(1+\dfrac{\sigma_G^2}{g^2}\right)-1} \cdot \\ \dfrac{\dfrac{1}{(lg)^2}\left[\left(1+\dfrac{\sigma_G^2}{g^2}\right)\right]^{k-1} - \dfrac{1}{(lg)^{2k}}}{(lg)^2\left(1+\dfrac{\sigma_G^2}{g^2}\right)^{-1}} - \\ \dfrac{1 - \dfrac{1}{(lg)^{2(k-1)}}}{(lg-1)[(lg)^2-1]} + \\ \dfrac{(lg)^2 \dfrac{\sigma_G^2}{g^2}\left[\dfrac{1}{(lg)^{k+1}} - \dfrac{1}{(lg)^{2k}}\right]}{\left[lg\left(1+\dfrac{\sigma_G^2}{g^2}\right)-1\right](lg-1)^2}\end{cases} & o.w. \end{cases} \qquad (3.35)$$

From the above equations, we have the following observations:

1. For lg<1, as k increases, $1/(ESNR)_{k-G}$ is dominated by the term max $$\left(\frac{1}{ESNR_{k-g}}, \frac{\sigma^2_{IG_{sig-sig}}}{R^2 P_0^2 (lg)^{2k}}\right),$$

which can be re-expressed as, max $$\left(a\left(\frac{1}{lg}\right)^k, b\left(\frac{1}{lg}\right)^{2k}, c\left(1+\frac{\sigma_G^2}{g^2}\right)^k\right),$$

where a, b, and c are constants w.r.t. k and $$\frac{\sigma_G^2}{g^2}.$$

$lim_{k\to\infty}(ESNR)_{k-G}=0$

2. For lg=1, as k increases, $1/(ESNR)_{k-G}$ increases at a dominating rate of $$\left(1+\frac{4S_{sp}B_e}{P_0}\cdot\frac{g^2}{\sigma_G^2}+\frac{4S_{sp}^2 B_o B_e}{P_0^2}\cdot\left(\frac{g^2}{\sigma_G^2}\right)^2\right)\left(1+\frac{\sigma_G^2}{g^2}\right)^k,$$

as shown in FIG. 49.

$lim_{k\to\infty}(ESNR)_{k-G}=0$

3. For lg>1, as k increases, $1/(ESNR)_{k-G}$ increases at a rate of $$\left(1+\frac{4S_{sp}B_e}{P_0}\cdot\frac{1}{lg\left(1+\frac{\sigma_G^2}{g^2}\right)-1}+\right.$$

$$\left.\frac{4S_{sp}^2 B_o B_e}{P_0^2}\cdot\frac{\left(1+\frac{\sigma_G^2}{g^2}\right)}{\left[lg\left(1+\frac{\sigma_G^2}{g^2}\right)-1\right]\left[(lg)^2\left(1+\frac{\sigma_G^2}{g^2}\right)-1\right]}\right)\left(1+\frac{\sigma_G^2}{g^2}\right)^k.$$

$lim_{k\to\infty}(ESNR)_{k-G}=0$

Note that when amplifier random gain noise cannot be ignored, the denominator of ESNR is a sum of a quadratic function of the accumulated optical noise power and noise components from the random gain noise contribution. Therefore, even if the exact values of both optical signal and total optical noise are known, they are not enough to derive the BER, because the optical noise includes both spontaneous emission noise and the random gain noise and the electrical noise is not a simple linear function of the total optical noise. Therefore, the exact composition of optical noise is needed to derive the BER.

FIG. 49 is a plot of the inverse of ESNR for Model k-G and Model k-g, in log-log scale. Note that $$\frac{1}{ESNR_{k-g}}$$

is plotted by the black curve with $\sigma_G^2/g^2=0$. Parameters used in this plot are: lg=1, signal power $P_0$=5 mW, ASE noise of one amplifier $P_{sp}$=0.01 mW, detector optical bandwidth $B_o$=15 GHz, detector electrical bandwidth $B_e$=11 GHz, and detector responsivity R=3.73 C/J assuming 1542 nm wavelength and 100% efficiency with $\eta$=1.

3.7 Numerical Examples of Model k-g and Model k-G

As discussed in the previous section, with presence of random gain intensity noise, OSNR or ESNR is not enough to determine the BER. Next we look into the dependence of BER on the effect of a chain of amplifiers and the random gain intensity noise using numerical examples for the case of matched loss and gain where lg=1. In the examples, we considered a chain of 60 amplifiers, with parameters: initial signal power $P_0$=5 mW, ASE noise of one amplifier $P_{sp}$=0.01 mW, detector optical bandwidth $B_o$=15 GHz, detector electrical bandwidth $B_e$=11 GHz, and detector responsivity R=3.73 C/J assuming 1542 nm wavelength and 100% efficiency with $\eta$=1.

Figure 50:
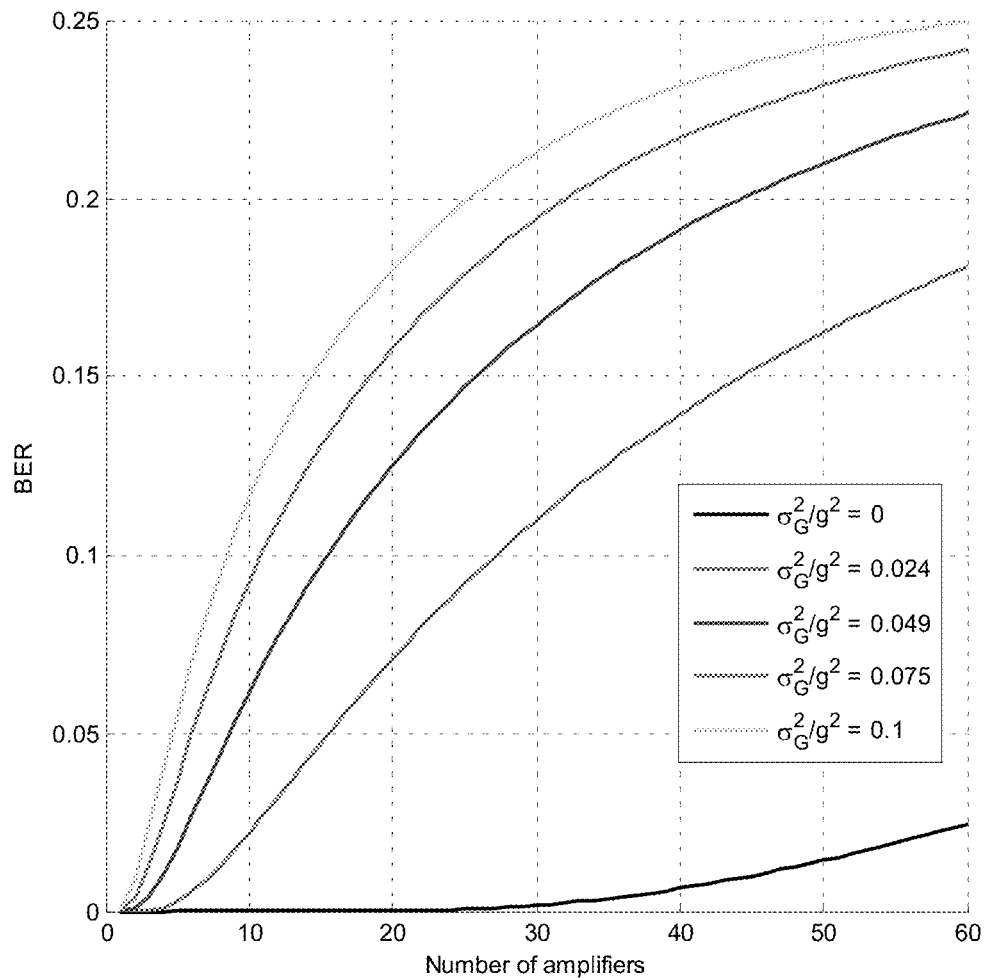
FIGS. 50 and 51 plot bit error rate (RER), as a function of a number of amplifiers, in normal scale and log-log scale, respectively, according to an embodiment of the present invention.
Figure 51:
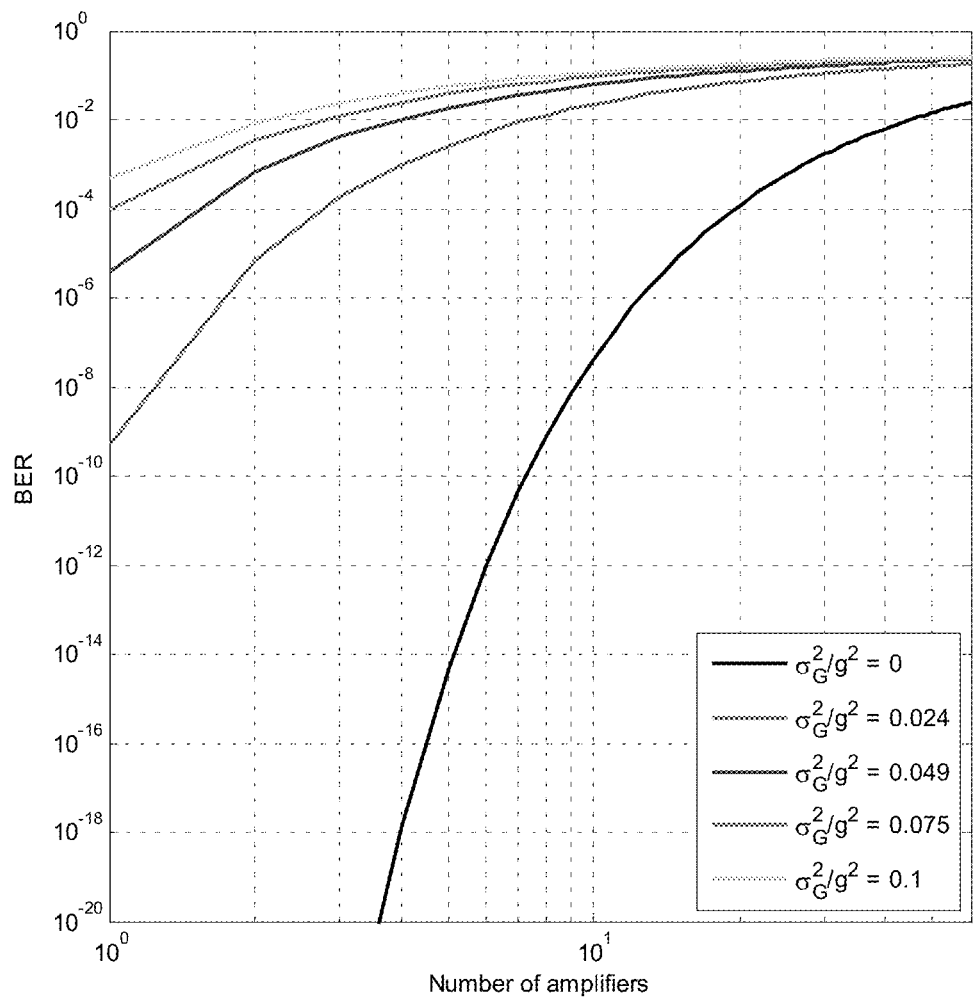

FIGS. 50 and 51 plot the BER as a function of the number of amplifiers in normal scale and log-log scale, respectively. FIG. 50 is a plot of BER of Model k-G (i.e., $BER_{k-G}$) as a function of the number of amplifiers, in normal scale. Note the black curve with $$\frac{\sigma_G^2}{g^2}=0$$

corresponds to the BER of Model k-g. Parameters used in this plot are: lg=1, signal power $P_0$=5 mW, ASE noise of one amplifier $P_{sp}$=0.01 mW, detector optical bandwidth $B_o$=15 GHz, detector electrical bandwidth $B_e$=11 GHz, and detector responsivity R=3.73 C/J assuming 1542 nm wavelength and 100% efficiency with $\eta$=1. FIG. 51 plots BER of Model k-G as a function of number of amplifiers, in log-log scale. Note the black curve with $$\frac{\sigma_G^2}{g^2}=0$$

corresponds to the BER of Model k-g. Parameters used in this plot are: lg=1, signal power $P_0$=5 mW, ASE noise of one amplifier $P_{sp}$=0.01 mW, detector optical bandwidth $B_o$=15 GHz, detector electrical bandwidth $B_e$=11 GHz, and detector responsivity R=3.73 C/J assuming 1542 nm wavelength and 100% efficiency with $\eta$=1.

Clearly, with the presence of random gain intensity noise, BER is higher than when there is no random gain noise. In addition, BER increases faster as a function of the number of amplifiers when the random gain noise is larger.

Figure 52:
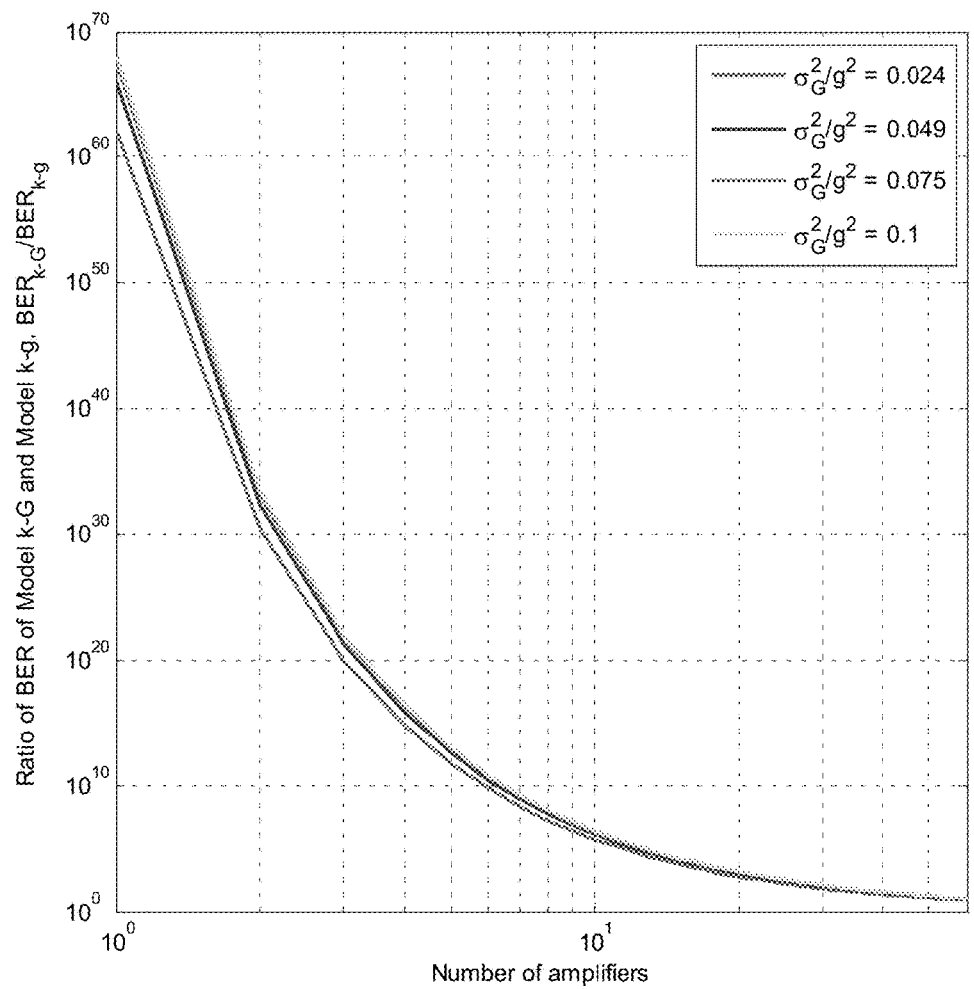
FIG. 52 plots the BER ratio of Model k-G and Model k-g as a function of the number of amplifiers, according to an embodiment of the present invention.

FIG. 52 plots the BER ratio of Model k-G and Model k-g as a function of the number of amplifiers. FIG. 52 plots the ratio of BERs of Model k-G and Model k-g $$\left(i.e., \frac{BER_{k-G}}{BER_{k-g}}\right)$$

as a function of number of amplifiers, in log-log scale. Parameters used in this plot are: lg=1, signal power $P_0$=5 mW, ASE noise of one amplifier $P_{sp}$=0.01 mW, detector optical bandwidth $B_o$=15 GHz, detector electrical bandwidth $B_e$=11 GHz, and detector responsivity R=3.73 C/J assuming 1542 nm wavelength and 100% efficiency with η=1. It shows the ratio $$\frac{BER_{k-G}}{BER_{k-g}}$$

decreases with increase of number of amplifiers, indicating that the effect of random gain noise is more significant with a link of less amplifiers. This is because, although BER increases as noise increases, the rate of increase of the BER decreases with increase of noise, and the BER approaches the horizontal asymptote 0.5 as noise increases. When there are more amplifiers, the BER is already very high due to accumulation of noise, and the increase of the BER becomes slower, therefore, the presence of random gain noise leads to a smaller $$\frac{BER_{k-G}}{BER_{k-g}}$$

with more amplifiers.

Figure 53:
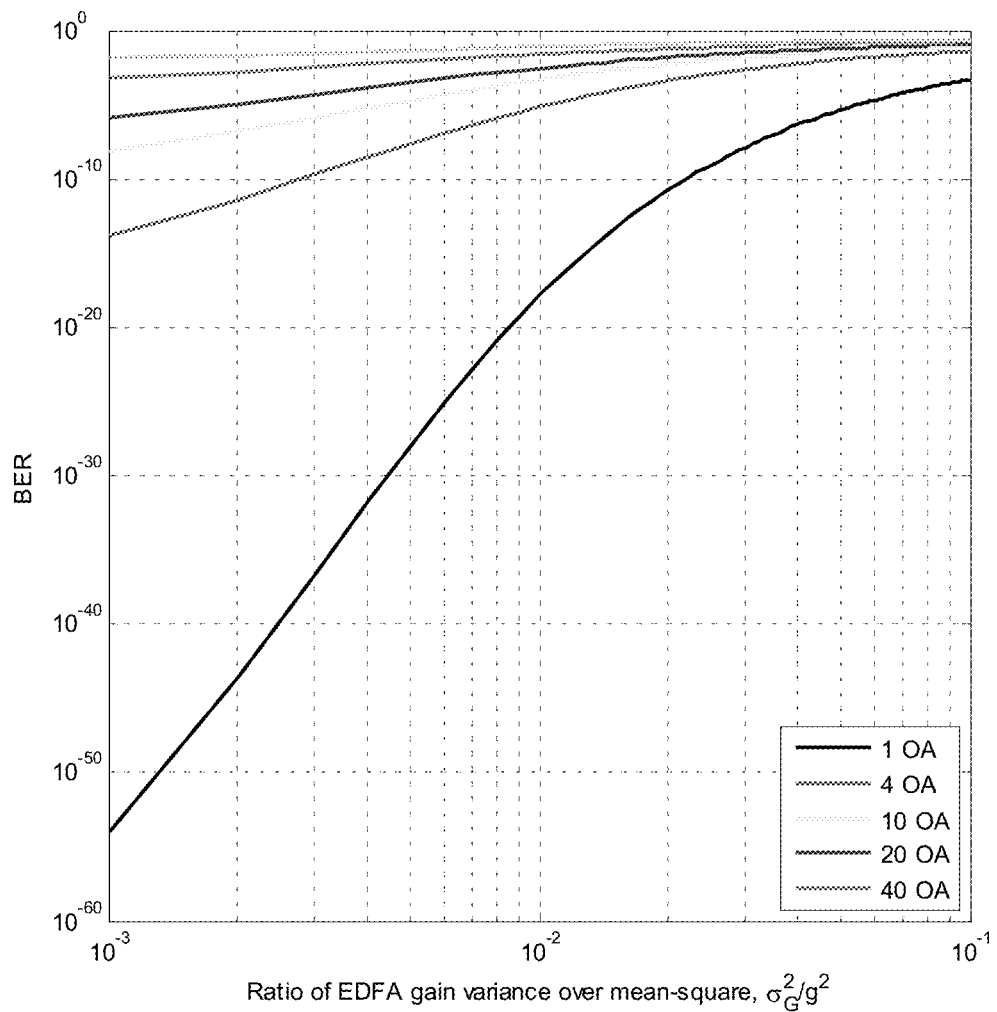
FIG. 53 plots the BER of Model k-G as a function of the ratio of the variance and mean-squared of the amplifier gain, according to an embodiment of the present invention.
Figure 54:
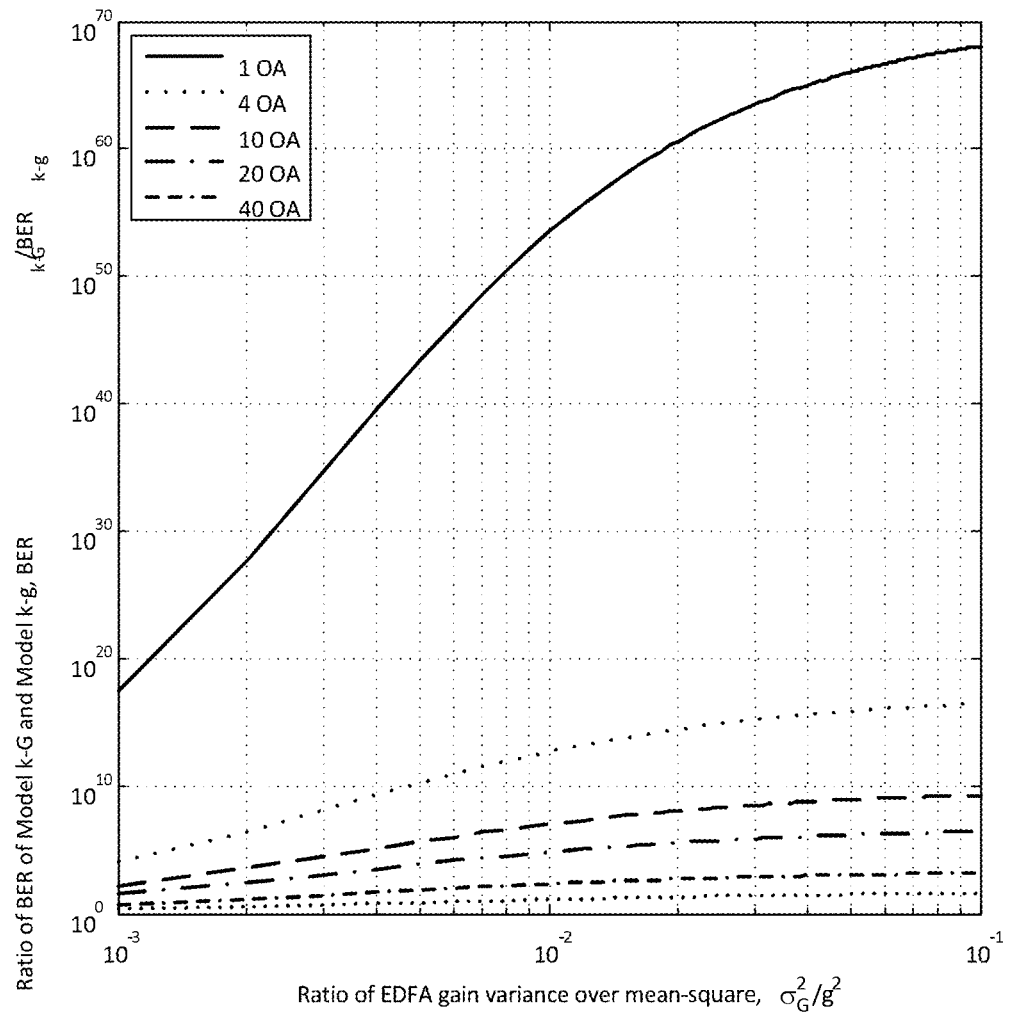
FIG. 54 is a plot of the Ratio of BER of Model k-G and BER of Model k-g, according to an embodiment of the present invention.

FIG. 53 plots the BER of Model k-G as a function of the ratio of the variance and mean-squared of the amplifier gain (i.e., $\sigma_G^2/g^2$). FIG. 54 plots the ratio of BERs of Model k-G and Model k-g $$\left(i.e., \frac{BER_{k-G}}{BER_{k-g}}\right)$$

as a function of $\sigma_G^2/g^2$. Both BER and $$\frac{BER_{k-G}}{BER_{k-g}}$$

increases with more randomness of the gain.

$$\frac{BER_{k-G}}{BER_{k-g}}$$

is larger with less number of amplifiers.

FIG. 54 is a plot of the Ratio of BER of Model k-G and BER of Model k-g $$\left(i.e., \frac{BER_{k-G}}{BER_{k-g}}\right)$$

as a function of the variance and mean-squared of the amplifier gain $$\left(i.e., \frac{\sigma_G^2}{g^2}\right),$$

in log-log scale. Parameters used in this plot are: lg=1, signal power $P_0$=5 mW, ASE noise of one amplifier $P_{sp}$=0.01 mW, detector optical bandwidth $B_o$=15 GHz, detector electrical bandwidth $B_e$=11 GHz, and detector responsivity R=3.73 C/J assuming 1542 nm wavelength and 100% efficiency with η=1.

3.8 Summary and Discussions of Experimental Results

The experiment discussed in this section was carried out by Joseph Junio at Bell Lab with partial experiment results published in [23].

3.8.1 Experiment Setup

As shown in FIG. 55, a testbed consisting of a line network with optical switches at intermediate nodes was set up to represent a segment (an end-to-end path composed of three links) of a large-scale mesh network. Wavelength selective switches (WSS) represent network nodes, with WSS 1 for the source node, and WSS 2 and WSS 3 for intermediate nodes. At each WSS node, attenuators are controlled to ensure equal power across the spectrum is launched into the next link. Each optical link is amplified using three EDFAs, which are separated by a 40 km span of standard single mode fiber for ~21 dB loss per span. Two-stage EDFAs with mid-stage variable optical attenuators and "constant gain" controllers were used and were capable of adjusting the internal gain to within 0.1 dB of the target within milliseconds. Switch 1 can be turned on/off to simulate the on and off of the switched channels. It is driven by a smooth voltage function from a programmable waveform function to control the switching on/off functions of lightpaths.

FIG. 55 is a schematic block diagram illustrating an experimental setup depicting WSS Nodes 1, 2, 3 and EDFAs 1-9, separated by 40 km spans of SSMF. EDFA 9 output is amplified by EDFA 10 and filtered by WSS 4 (both not shown).

3.8.2 Switching-Induced Fast Transients

Two types of switching, step-function switching and adiabatic switching (FIG. 56), were used. For the adiabatic switching, voltage of a raised cosine function was used to drive the switch, and impacts of different switching durations (from 10 ns to 40 ms) were investigated.

FIG. 56 is a schematic diagram of: (a) a step switching function and (b) an adiabatic switching function of a raised-cosine function.

Step-Function Switching

Figure 57:
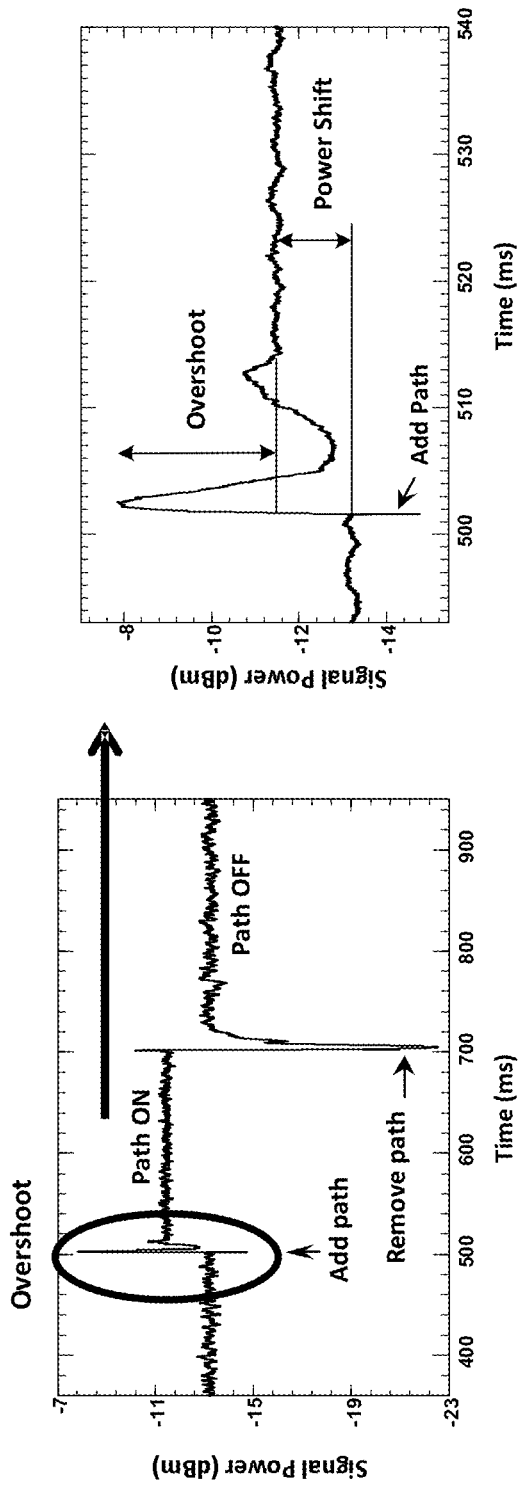
FIG. 57 (left) is a plot of a probe channel output and (right) is a plot of the initial turn-on transient with expanded time, according to an embodiment of the present invention.

When the switching channel is switched on/off abruptly, there is a sudden shortage/excess of upper stage population in the EDFA, and the probe channel output power experiences an abrupt down-shoot/overshoot. This happens faster than the response time of EDFA control. Later (after ~5 ms) the "constant gain control" of EDFA kicks in and brings the gain back to the pre-set value. In FIG. 57, a transient of height >5 dB lasting ~10 ms was observed.

FIG. 57 (left) is a plot of a probe channel output after 9 EDFAs when there are 4 channels present and 4 channels are added and then dropped that corresponds to the worst case channel configurations of adding/dropping 4 channels. FIG.

57 (right) is a plot of the initial turn-on transient with expanded time scale showing the transients subsides after ~5 ms.

Adiabatic Switching

Figure 58:
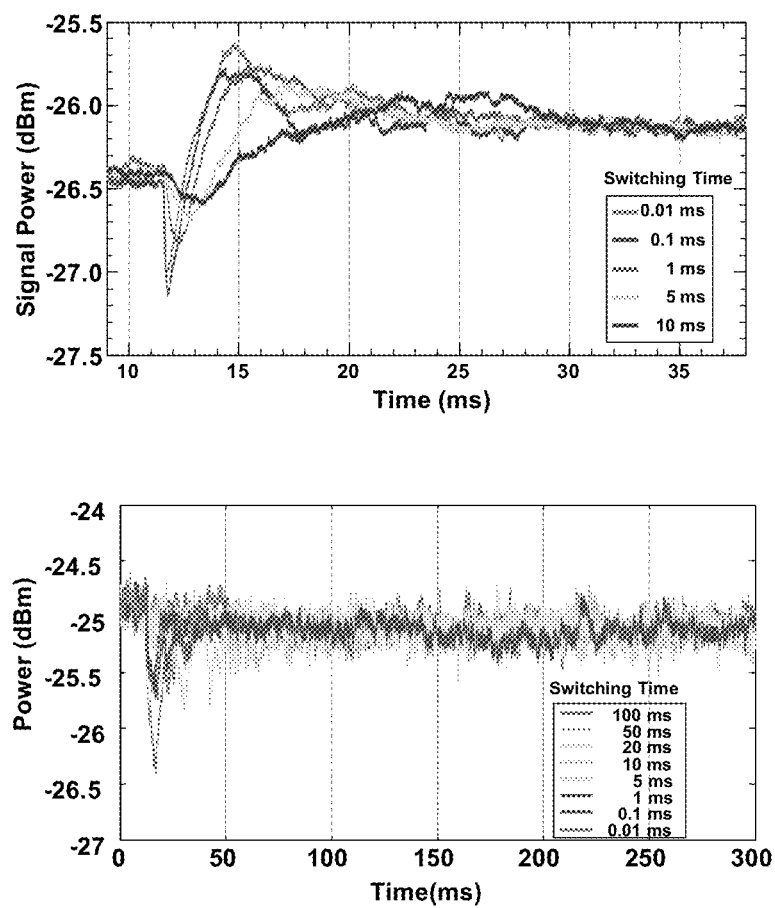
FIGS. 58 and 59 are plots showing transient durations over a chain of many EDFAs, according to an embodiment of the present invention.
Figure 59:
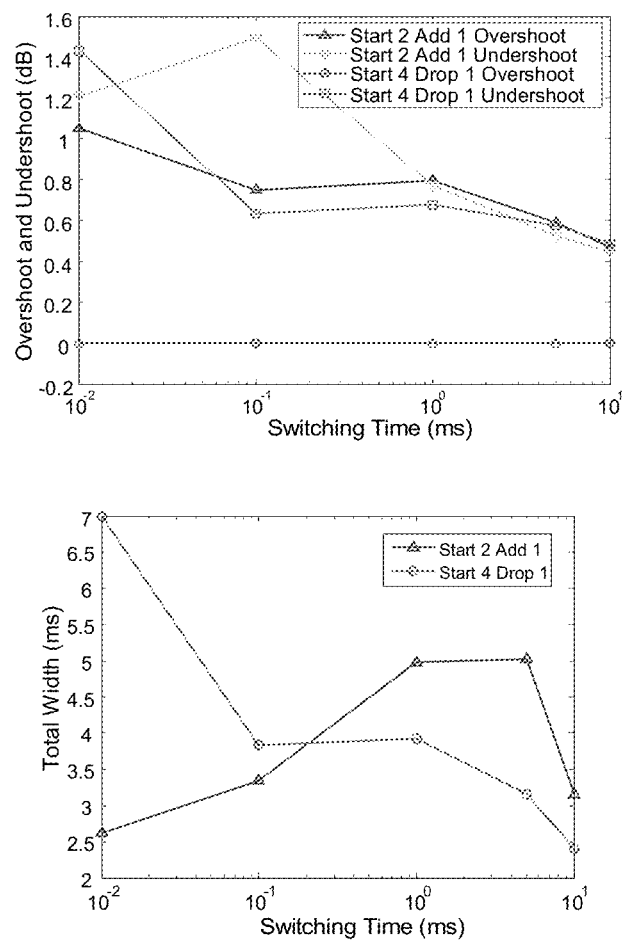

FIGS. 58 and 59 show the transient duration over a chain of many EDFA/s (10) indicating switching times of ~5 ms are long enough to quench transients without detailed sensing of the state of the EDFA physical dynamics and control systems. Since the optical flows in OFS persist for one second or more, we can afford several milliseconds to switch on/off lightpaths without significantly sacrificing throughput performance. By switching wavelengths adiabatically (slowly) within 5 ms, the amplifier dynamics and the EDFA control systems can respond smoothly, reducing the severity of the optical power transients. The adiabatic switching should quench most of the transients except for rare cases such as multiple (>2) switch-on/offs occurring at the same time. A Transport Layer protocol [21] has been designed and will correct the resulting errors in transmission.

FIG. 58 (a) is a plot of transient events on probe channel (1561.01 nm) when 2 channels are present and one channel added for various turn-on times. FIG. 58 (b) is a plot of transient events on probe channel (1561.01 nm) when 4 channels are present and one channel dropped for various turn-off times.

FIG. 59 (top) is a plot of peak value of transients and (bottom) 3 dB width of both turn-on and turn-off transients versus switching on/off times.

3.8.3 Channel Quality Degradations

A 10 Gbps On-Off Keying signal with extinction ratio 16:1 in dB was used in the experiment. Channel quality and BER were investigated w.t.r. stages of amplifications (number of amplifiers) and channel configuration (number of channels that are switched On in the fiber).

Light passing through long-haul fiber experiences noise from numerous sources, and both received "1" and "0" bit can be assumed to have a Gaussian distribution.

Figure 60:
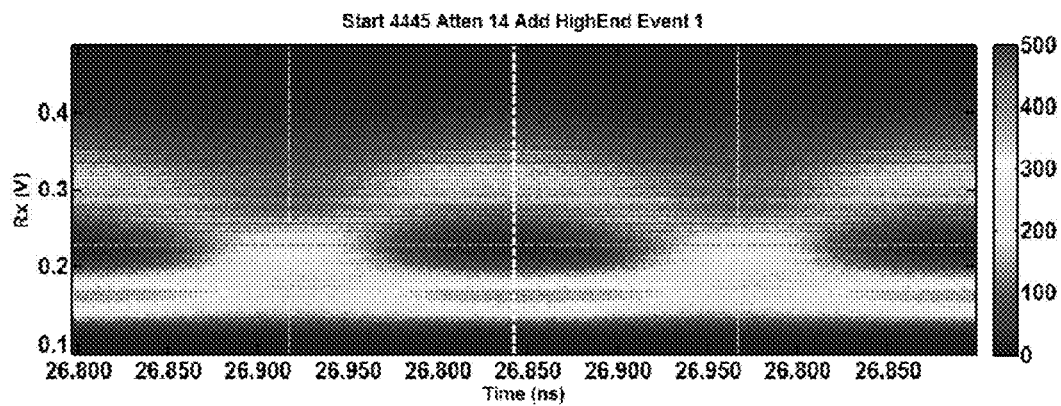
FIG. 60 is an "eye" pattern of a communication link after a chain of 9 EDFAs, showing significant eye closure, according to an embodiment of the present invention.
Figure 61:
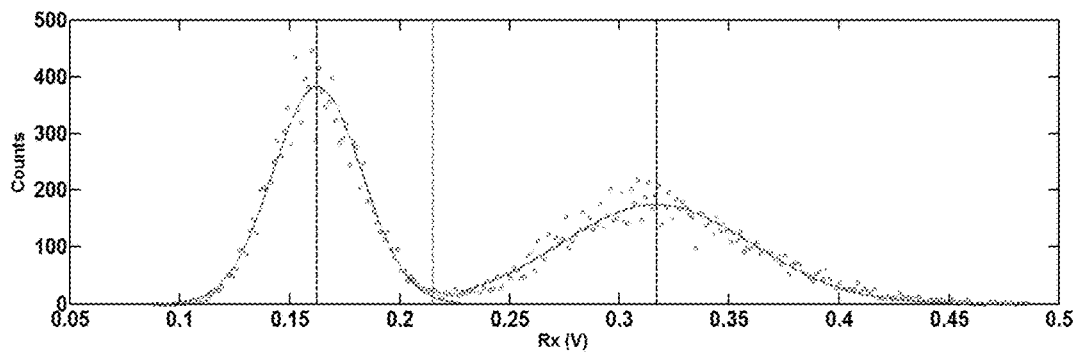
FIG. 61 shows the Gaussian statistics of the "1" and "0" bits, according to an embodiment of the present invention.

FIG. 60 shows the eye pattern of the communication link at the output of the detector. There is a significant closure of the eye due to the noise accumulated over the link of 9 amplifiers. FIG. 61 shows the Gaussian statistics of the "1" and "0" bits. The "0" bit has non-zero mean because of both the non-zero extinction ratio and the accumulated ASE noise. In addition, the variance for the "1" bit is larger than that of the "0" bit.

FIG. 60 is an eye pattern of communication link after a chain of 9 EDFAs, showing significant eye closure.

FIG. 61 is a plot depicting sampled statistics of bit "1" and "0" after a 9-EDFA chain. The mean for bit "0" is non-zero and the variance for bit "0" is less than that for bit "1".

Signal Statistics after a Cascade of Amplifiers

Figure 62:
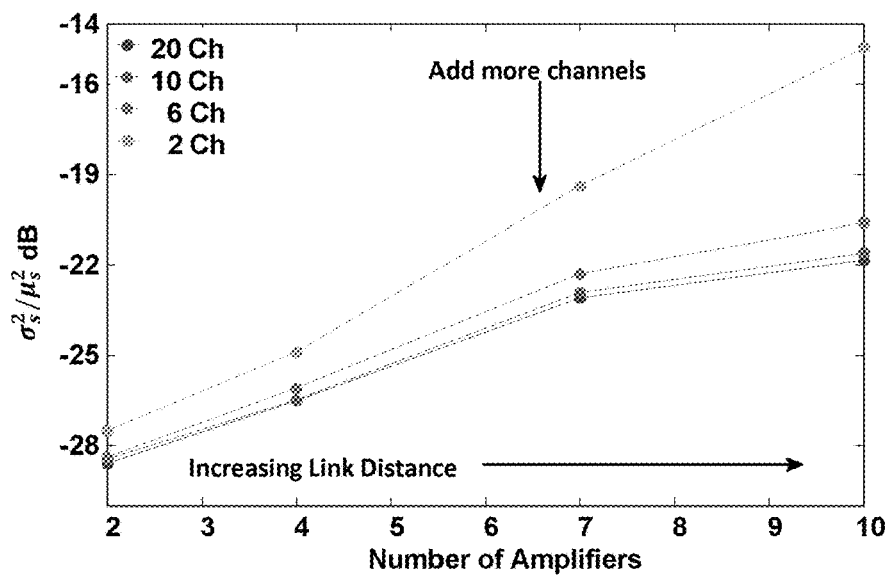
FIG. 62 shows the variance/mean-squared as a function of number of amplifiers, according to an embodiment of the present invention.
Figure 63:
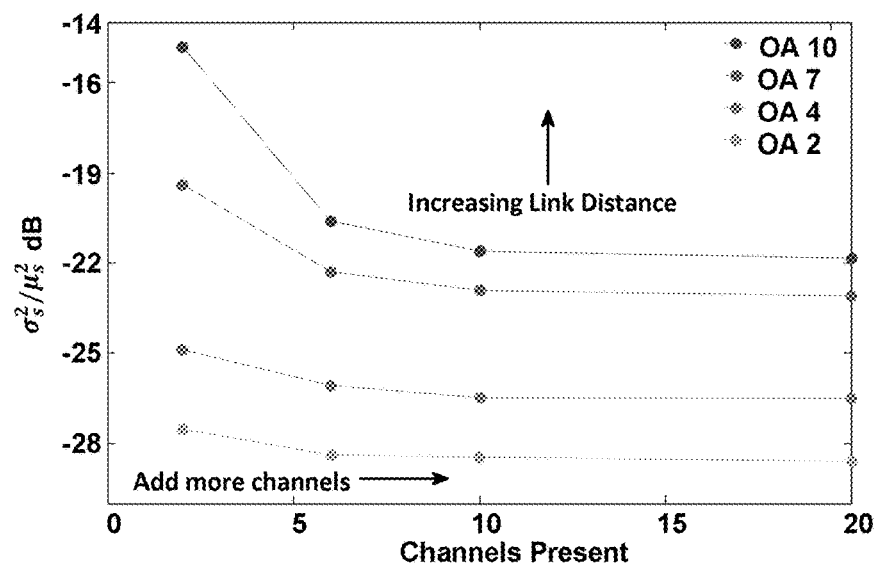
FIG. 63 is a plot of variance/mean-squared of the "1" bit as a function of channel configuration, at each amplifier, according to an embodiment of the present invention.
Figure 64:
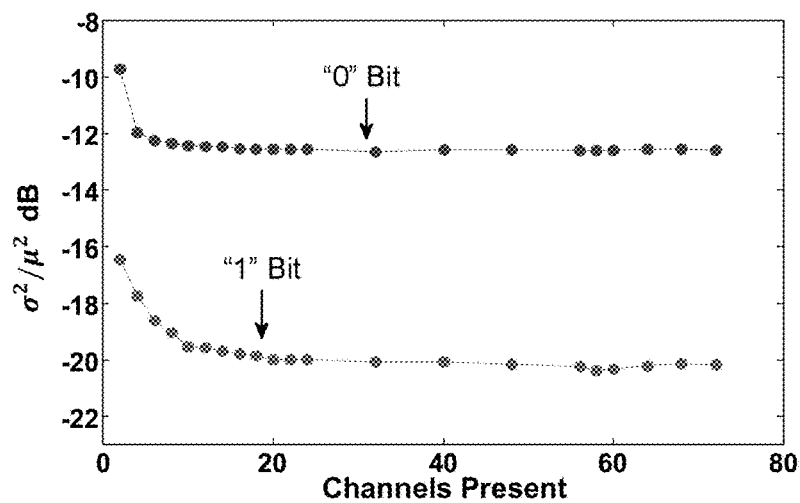
FIG. 64 is a plot of variance/mean squared of the "1" bit and "0" bit measured after 9 amplifiers in the link, plotted in dB scale, according to an embodiment of the present invention.

A standard BER tester (Anritsu) was used to measure the error probability in terms of the bit error rate for a $2^{15}-1$, 10 Gbits/s OOK PRBS bit stream at the link egress. A photo-detector was used to measure the statistics for the "1" and "0" levels as inputs to the model. FIG. 62 shows the variance/mean-squared as a function of number of amplifiers that signal goes through for the "1" bit (signal ON), with channel load of 2, 6, 10, and 20 channels. FIG. 63 shows the variance/mean-squared as a function of channel load for the "1" bit at different locations along the path (after 2, 4, 7, and 10 amplifiers, respectively). FIG. 64 shows the variance/mean-squared of the "1" and "0" levels of the signal channel (measured after 10 amplifiers) as more channels are added into the link. The data in both FIGS. 62 and 63 shows two important observations:

1. Variance/mean-squared decreases with increasing channel load, indicating improving channel performance.
2. Variance/mean-squared increases approximately exponentially with number of amplifiers, indicating channel quality degradation with more amplifiers.

The bit error rate, BER (FIG. 65), as expected, improves as the number of wavelength channels present increases. FIG. 66 plotted BERs predicted by the single-threshold detection model in Section 1 against the BER measured directly, indicating the single-threshold detector is a good approximation of the optimal detector.

FIG. 62 is a plot of variance/mean-squared of the "1" bit as a function of number of amplifiers, at each channel configuration. The slopes increase for more amplifiers, but decrease as more channels are added.

FIG. 63 is a plot of variance/mean-squared of the "1" bit as a function of channel configuration, at each amplifier.

FIG. 64 is a plot of variance/mean squared of the "1" bit and "0" bit measured after 9 amplifiers in the link, plotted in dB scale.

Figure 65:
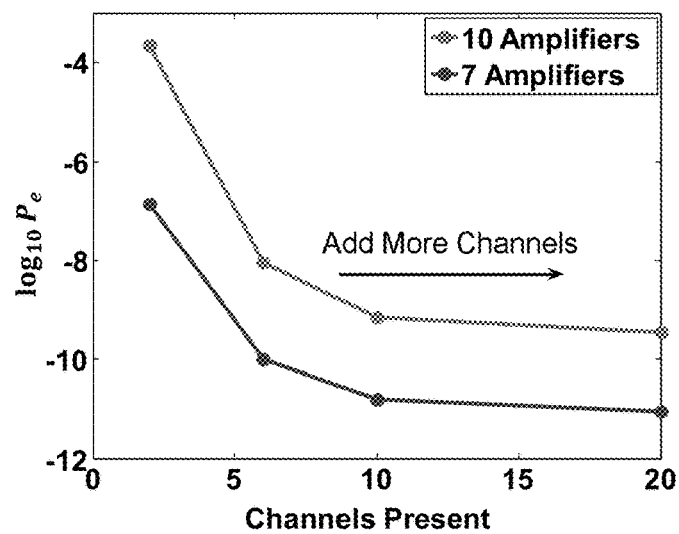
FIG. 65 is a plot of error probability computed from the variances in FIG. 62 at the output of amplifiers 7 and 10, according to an embodiment of the present invention.
Figure 66:
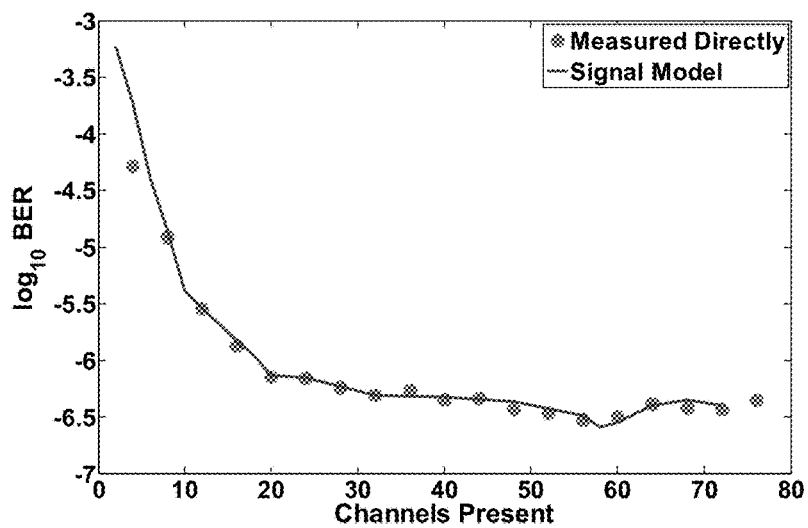
FIG. 66 is a plot of bit error probability, BER as a function of channels present in the link, according to an embodiment of the present invention.

FIG. 65 is a plot of error probability computed from the variances in FIG. 62 at the output of amplifiers 7 and 10.

FIG. 66 is a plot of bit error probability, BER as a function of channels present in the link. Points are experimentally measured (10 Gbits/s, OOK), solid line are calculated using the single-threshold detection model in Section 1 and the measured photocurrents for the one and zero bit levels.

One possible explanation of Obaservation 1 is from Eq. (3.11), and $N_1+N_2=N_t$ where $N_t$ is the total ion density. With these two equations, the ASE noise can be written as, $$P_{sp} = 2h\nu B_o(g-1)\left(\frac{1}{2} + \frac{\frac{1}{2}N_t}{2N_2 - N_t}\right)$$

Figure 67:
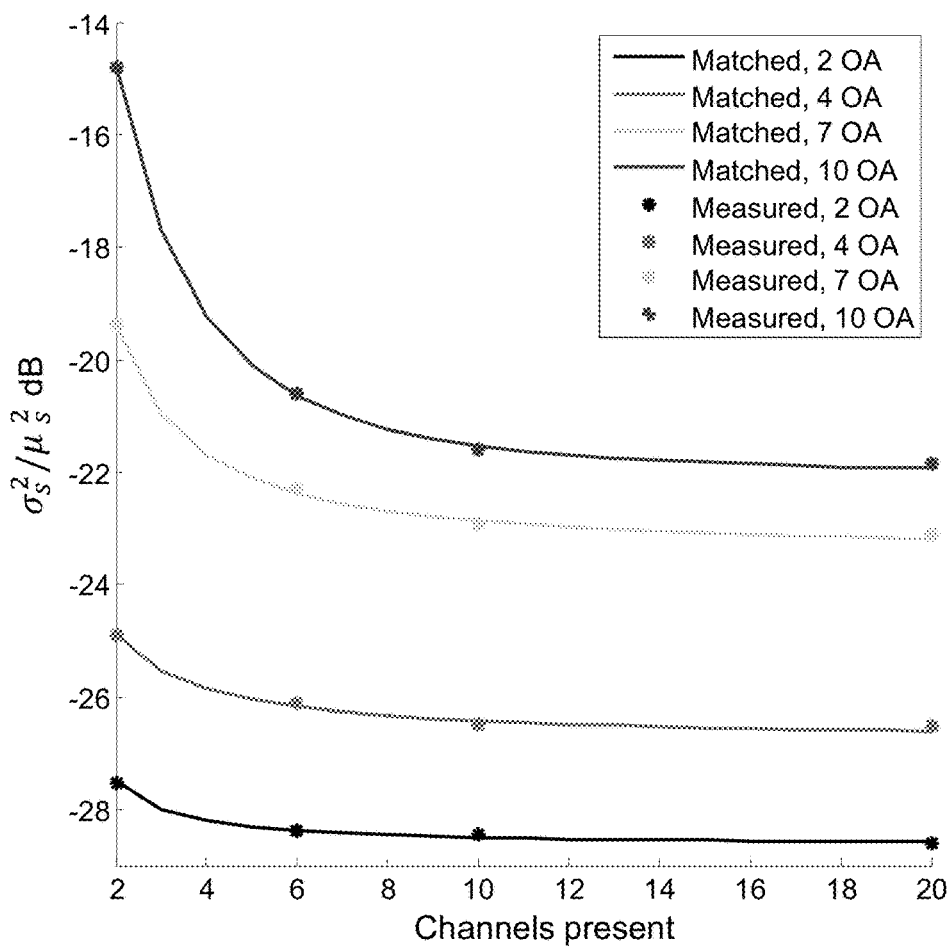
FIG. 67 is a plot of variance/mean-squared of the "1" bit as a function of the channel configuration, according to an embodiment of the present invention.

When there are more channels present in the fiber, to maintain the same gain g, the controller cause the pump to raise the inversion level, promoting more carriers to the upper state. In addition, the increase in signal from the added wavelengths leads to an increase of stimulated emission, draining the gain and reducing spontaneously emitted photons. Thus, as the number of wavelengths in the fiber increases, the spontaneous emission noise in the fiber decreases. From Eq. (3.20), (3.21), (3.27), (3.28), (3.30), and (3.31), for both Model k-g and Model k-G, there are both linear terms of $P_{sp}$ and quadratic terms of $P_{sp}$ in the variance of bit "1". Therefore, $\sigma_s^2/\mu_s^2$ is a quadratic function of $P_{sp}$. Assume there is a linear relationship between the upper state carrier population of the EDFA $N_2$ and the number of "On" channels in a fiber $N_{ch}$, then $\sigma_s^2/\mu_s^2$ can be written as, $$\frac{\sigma_s^2}{\mu_s^2} = \frac{a}{N_{ch}-b} + \frac{c}{(N_{ch}-b)} + d \quad (3.36)$$

where a, b, c and d are fitting parameters. Parameter b is from $N_t$, and parameters a, c and d account for the effects of $P_{sp}$, the EDFA random gain, and the fiber loss, respectively. FIG. 67 plots $\sigma_s^2/\mu_s^2$ as a function of the number of amplifiers using both the experimental data and the matched data using minimum mean-squared estimated parameters a, b, c and d, showing a good agreement between these two data sets. Therefore, our conjecture offers a possible explanation of Observation 1.

FIG. 67 is a plot of variance/mean-squared of the "1" bit as a function of the channel configuration, matched with a quadratic function of $$\frac{1}{N_{ch}-b},$$

where $N_{ch}$ is the number of "On" channels in the fiber, and b is a parameter based on the amount of doping of Erbium in the fiber.

Figure 68:
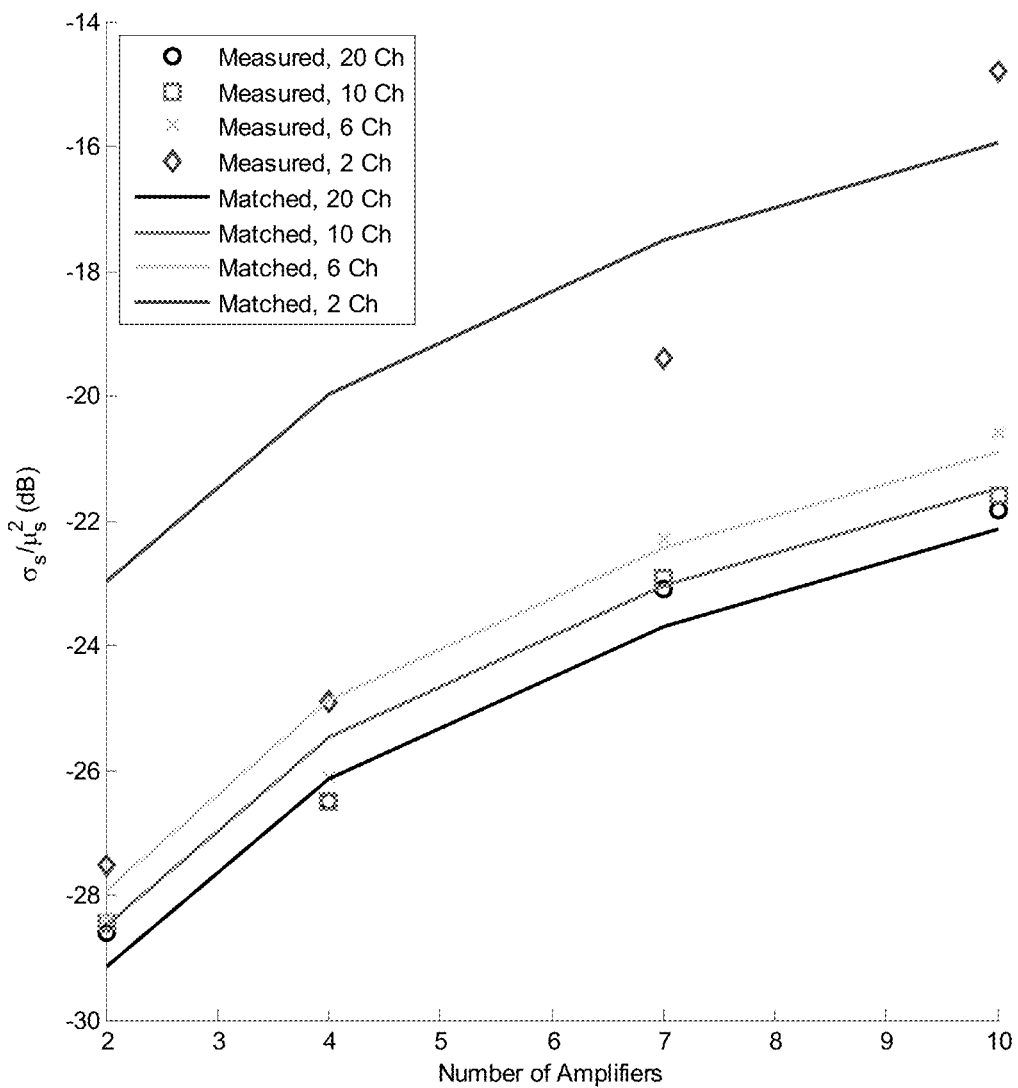
FIGS. 68 and 69 show the matched signal variance/mean-squared using Model k-G, according to an embodiment of the present invention.
Figure 69:
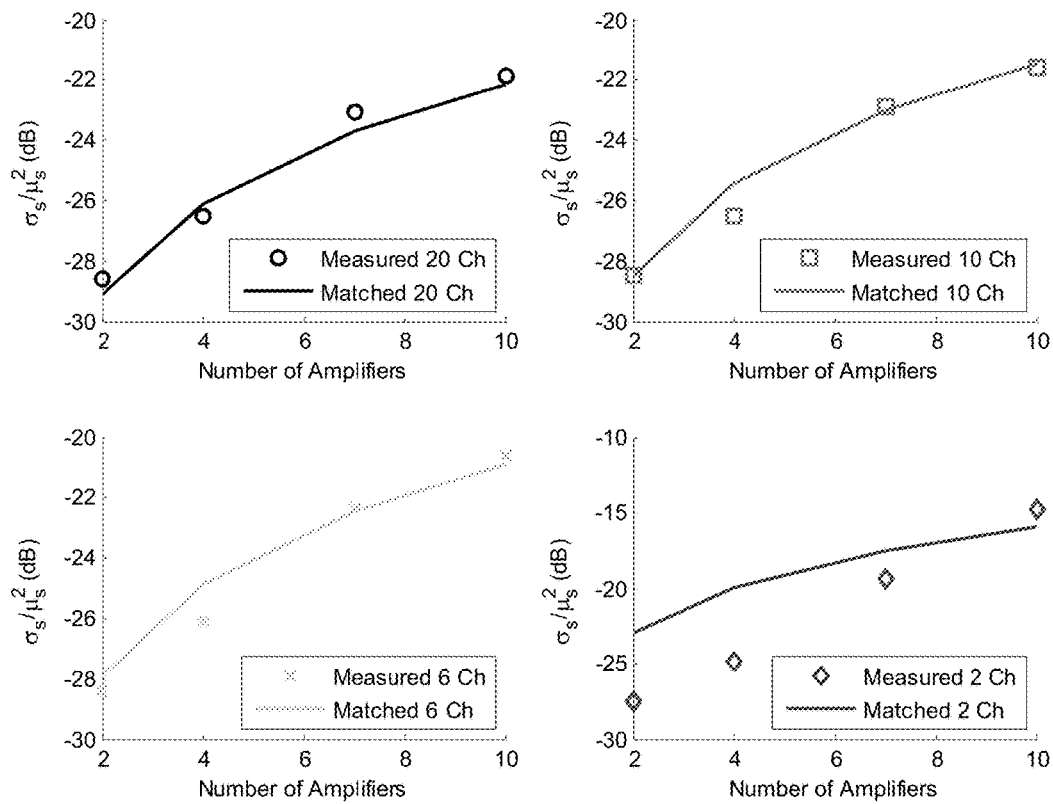

FIGS. 68 and 69 show the matched signal variance/mean-squared using Model k-G with $lg=P_0/(P_0+P_{sp})$, which corresponds to the case when the EDFA is under "constant gain control". Letting $P_0=5$ mW, $B_e=11$ GHz, $B_o=15$ GHz, and k=[2,4,7,10], $\sigma_s^2/\mu_s^2$ can be expressed as a function of fitting parameters $P_{sp}$ and $\sigma_G^2/g^2$. Using the experimental data of $\sigma_s^2/\mu_s^2$, the minimum-mean-square-error estimations of $P_{sp}$ and $\sigma_G^2/g^2$ are $$P_{sp} = 3.5 \times 10^{-8} \text{ Watts}, \frac{\sigma_G^2}{g^2} = 0.0006 \text{ for 20 Channels}$$

$$P_{sp} = 3.6 \times 10^{-8} \text{ Watts}, \frac{\sigma_G^2}{g^2} = 0.0007 \text{ for 10 Channels}$$

$$P_{sp} = 3.7 \times 10^{-8} \text{ Watts}, \frac{\sigma_G^2}{g^2} = 0.0008 \text{ for 6 Channels}$$

$$P_{sp} = 4.1 \times 10^{-8} \text{ Watts}, \frac{\sigma_G^2}{g^2} = 0.0025 \text{ for 2 Channels}$$

The model-matched curves agree well with the experimental data for the case with 20 channels, 10 Channels, and 6 Channels, but with larger deviation for the case of 2 channels. This could be explained by the fact that ASE noise span across all channels, and after several amplifiers, ASE noise get accumulated at other "off" channels resembling "on" channels with small signal power. The effect of the amplified-ASE noise at other channels, i.e., the small signals, is more significant when there are only two "On" channels. However, our models only account for ASE noise, i.e., $P_{sp}$, from the channels that are "On", and does not account for the small signal effect from amplified ASE at other "Off" channels. Therefore, the gap between the matched data and the experiment data is more significant for the case of two channels.

However, from our previous analysis of Model k-g in Section 5 and Model k-G in Section 6, both lg<1 and random gain could result into exponential increase in $\sigma_s^2/\mu_s^2$ with increasing number of amplifiers. The fitting in FIGS. 68 and 69 just offers one possible solution and explanation, and it is not conclusive whether lg<1 or the random gain is the dominating cause. One could investigate the significance of the EDFA random gain by keeping the loss of the fiber span in-between adjacent EDFAs and the average EDFA gain matched, e.g., lg=1, in experiments.

FIG. 68 is a plot of variance/mean-squared of the "1" bit as a function of number of amplifiers, both from experimental data and matched data using Model k-G for the case with constant control, i.e., $lg=P_0/(P_0+P_{sp})$.

FIG. 69 includes four subplots of variance/mean-squared of the "1" bit as a function of number of amplifiers, both from experimental data and matched data using Model k-G for the case with constant control, i.e., $lg=P_0/(P_0+P_{sp})$.

4 IMPAIRMENT-AWARE SCHEDULING ALGORITHM AND IMPAIRMENT-COMPENSATION NETWORK ARCHITECTURE

Both the models and the experiment results in Section 3 show that in EDFA-Amplified all-optical networks, channel quality degrades with amplification of more amplifiers, and lightpath merging and diverging at mid-span network from other transactions can cause channel quality variations during the transmission time of one particular transaction. Because both the Meshed and Tunneled Architectures are network logical topologies built on the same physical topology, this EDFA and fast-switching induced channel quality degradation and variations apply to both Architecture M and Architecture T, and add challenges to the scheduling problem of OFS with both architectures.

4.1 Impairment-Aware Routing

In Section 2, our shortest path algorithm decides the shortest path based on the number of hops of a path to minimize the amount of control traffic to configure switches. With impairment-aware routing, we want to minimize the amount of channel degradation in the shortest path. Assume each optical switch adds ≤1 dB loss which can be ignored comparing tho a total path loss ≥20 dB. With this assumption, EDFA is the major source of noise and in the routing algorithm we choose the shortest path to be the path that has minimum total number of EDFAs. In a well-designed network, the number of EDFAs on a link is highly correlated with the physical link distance, and a longer link usually needs more EDFAs to amplify the signal it carries. Therefore, a path with minimum total number of EDFAs is highly likely to be also the path with the shortest physical distance.

In a network logical topology graph G (V, E), let the weight of each edge W(i→j) to be the number of amplifiers on the edge i→j, then with input G (V, E) and edge weights W, the Floyd-Warshall algorithm solves the all-pair shortest paths with running time $\Theta(N_V^3)$, where $N_V$ is the number of nodes in V.

4.2 Impairment-Aware Scheduled Wavelength Assignment

Section 3 shows the number of channels that are "On" in a fiber affects channel quality. Because an end-to-end lightpath across the WAN typically is composed with multiple hops, and in a meshed physical topology, a lightpath may overlap with other lightpaths on one or several hops. Therefore, the turn-on and turn-off of this lightpath may affect the quality of other lightpaths that share a common hop with it. Since in OFS, lightpaths are set up and torn down dynamically, this dynamic status change of lightpaths poses the following challenges on the Scheduling of OFS:

a. The lightpath quality in the scheduled future can not be determined at the time when the Scheduled Wavelength Assignment is performed, because we do not know whether there will be more transmissions whose requests arrive later but with scheduled transmission times overlapping with the schedule of the current request.

b. A lightpath that is scheduled into the future affects the channel qualities of the lightpaths that have already been scheduled whose transmission time overlap with the transmission time of the newly scheduled lightpath.

Along a shortest path P with number of hops $H_P$, define $C_{h_i}^P$, a vector of size $\Lambda$ which is the total number of wavelength channels in a fiber, to be the channel configuration of the ith hops along path P, and $C_{h_i}^P(j)=1$ if the jth wavelength is "On" on the ith hops along path P. $C_{h_i}^P(j)=0$, otherwise. Define $f_{BER}: \{\omega, P, C_{h_i}^P,$ for $i=1, \ldots H_P\} \to \mathbb{R}$ to be a function that takes into inputs of channels configurations along a shortest path P, and outputs the Bit Error Rate of one wavelength $\omega$. Assume such a function can be found through models of network impairments, then we can verify the channel quality along a scheduled lightpath if the channel configuration is known. Let $th_{BER}$ to be the maximum BER that can be tolerated. A lightpath is said to be qualified during transmission duration T if its BER is no larger than $th_{BER}$ for any time in T.

4.2.1 Impairment-Aware FIFO-EA Algorithm

The Impairment-Aware FIFO-EA Algorithm modifies the FIFO-EA Algorithm to meet the above challenges for the Scheduled Wavelength Assignment Problem along the shortest path. Name this Algorithm the IA-FIFO-EA Algorithm. The IA-FIFO-EA Algorithm still processes the requests in a first-in-first-out manner, and for each request, computes the first available lightpath along the shortest path that satisfies the following conditions: [(a)]

a. During the whole scheduled transmission time, the quality of the scheduled lightpath is qualified with input of known future channel configurations.

b. The set-up and tear-down of this lightpath in the scheduled transmission time will not disqualify any lightpaths that have already been scheduled.

Condition (a) itself does not guarantee the lightpath will be qualified at the scheduled time. This only says that with all that is known about the future at the time of the schedule computation, the lightpath is going to be qualified if there are no future requests that overlap with this schedule. Therefore, together with condition (b) which makes sure scheduling of future requests will not disqualify those that have already been scheduled, we can make sure that a newly scheduled lightpath will be qualified during the scheduled transmission time.

Define $L_{sch}^P$ to be the list of transactions that have already been scheduled with at least one hop on P and whose start time is in the future or are currently under transmission. Algorithm 4.1 gives the pseudo-code of the IA-FIFO-EA Algorithm, and FIG. 70 (A&B) illustrates the process of the IA-FIFO-EA Algorithm using a flow chart. Algorithm IA-FIFO-EA repeatedly calls Algorithm FIFO-EA to look for an earliest available wavelength in a future time window starting from $t_0$. The earliest available wavelength $\omega$ is qualified in a scheduled duration $[T_s, T_e]$ if the following two conditions are satisfied.

a. Immediately after the start time and the end time an already-scheduled transaction that falls into $[T_s, T_e]$, the selected $\omega$ is qualified (we do not concern fast transients in our algorithm, which are quenched by adiabatic switching and any residual transients are taken care of by the transport layer protocol. Because both starting and ending a transmission cause change of the channel configuration, by verifying channel quality immediately after $T_s$ and $T_e$, we verify channel quality at the new channel configuration).

b. For any on-going or already scheduled transactions that overlap with $[T_s, T_e]$, the already scheduled wavelengths will not be disqualified by the new transmission assignment.

Condition (a) can be verified by checking the $\omega$ channel quality at the start of the scheduled transmission time and any other times during the transmission when channel configuration changes due to status change of other wavelengths in the same fiber. FIG. 21 illustrates the possible times when quality of wavelength $\omega$ might change at the change of channel configurations. Condition (b) can be verified by looking into each on-going or already scheduled transaction that overlaps with $[T_s, T_e]$, and checking its quality at times of change of channel configurations during the overlapping time.

Running Time Analysis of the IA-FIFO-EA Algorithm

The exact running time depends on the actual traffic arrivals. In the following analysis, we consider the worst case running time in a network that is in steady state. In other words, we use the average occupancies of schedule holders to calculate the effect of the length of the list of transmissions that have already been scheduled, $L_{sh}^P$, and study the worst case where all already-scheduled transmissions overlap with the newly assigned lightpath in both transmission time and transmission path (at least one hop).

Define $R_{IA\text{-}FIFO\text{-}EA}^X$ to be the running time of the IA-FIFO-EA Algorithm with Architecture X (Architecture X can be Architecture M or Architecture T), $R_{CHECKQUALITY}$ to be the running time of the Sub-routine CHECKQUALITY, and $R_{f_{BER}}$ to be the running time of calculating the BER. Define $N_{FIFO\text{-}EA}^X$ to be the average times that a new schedule needs to be searched by calling FIFO-EA with Architecture X. Because both the start time and end time of a transaction can trigger change of the channel configuration and hence possible channel degradation, in the worst case:

$$R_{IA\text{-}FIFO\text{-}EA}^X = N_{FIFO\text{-}EA}^X R_{FIFO\text{-}EA}^X + (|L_{sch}^P|+1) \\ (R_{CHECKQUALITY}+\alpha) + R_{f_{BER}} + \beta \text{ operations} \quad (4.1)$$

FIG. 21 is a schematic illustration of times of channel configuration change during $[T_c, T_e]$

---

Algorithm 4.1: The IA-FIFO-EA Algorithm

```
IA - FIFO - EA(R,P,t_d,L_sch^P,t_0)
1    t_max ← the latest time among all end times of schedules in L_sch^P starting from t_0
2    while True
3        ⟨ω,T_s,T_e⟩ ← FIFO - EA(R,P,t_d,t_0)
4        if T_s ≥ t_max
5            if f_BER (ω,P,C_hi^P(T_s)) < th_BER
6                return ⟨ω,T_s,T_e⟩
7            else
8                return False
```

-continued

Algorithm 4.1: The IA-FIFO-EA Algorithm

```
        //check the quality of ω
9       ⟨IsQualified,t_newSearchStart⟩ ← CHECKQUALITY(ω,P,L_sch^P,T_s,T_e)
10      if IsQualified is TRUE
            //check the quality of all on-going or already-scheduled wavelengths with
            //transactions overlapping with [T_s,T_e]
11          for each sch ∈ L_sh^P
12              IsPassed ← False
13              if sch overlaps with [T_s,T_e] from T_s' to T_e'
14                  ⟨IsQualified,t_newSearchStart⟩ CHECKQUALITY(sch.ω,P,L_sch^P,T_s',T_e')
15                  if IsQualified is False
16                      t_0' ← t_newSearchStart
17                      break
18              IsPassed ← True
19          if IsPassed = True
20              return⟨ω,T_s,T_e⟩
21      else
22          t_0' ← t_newSearchStart
```

Figure 70A:
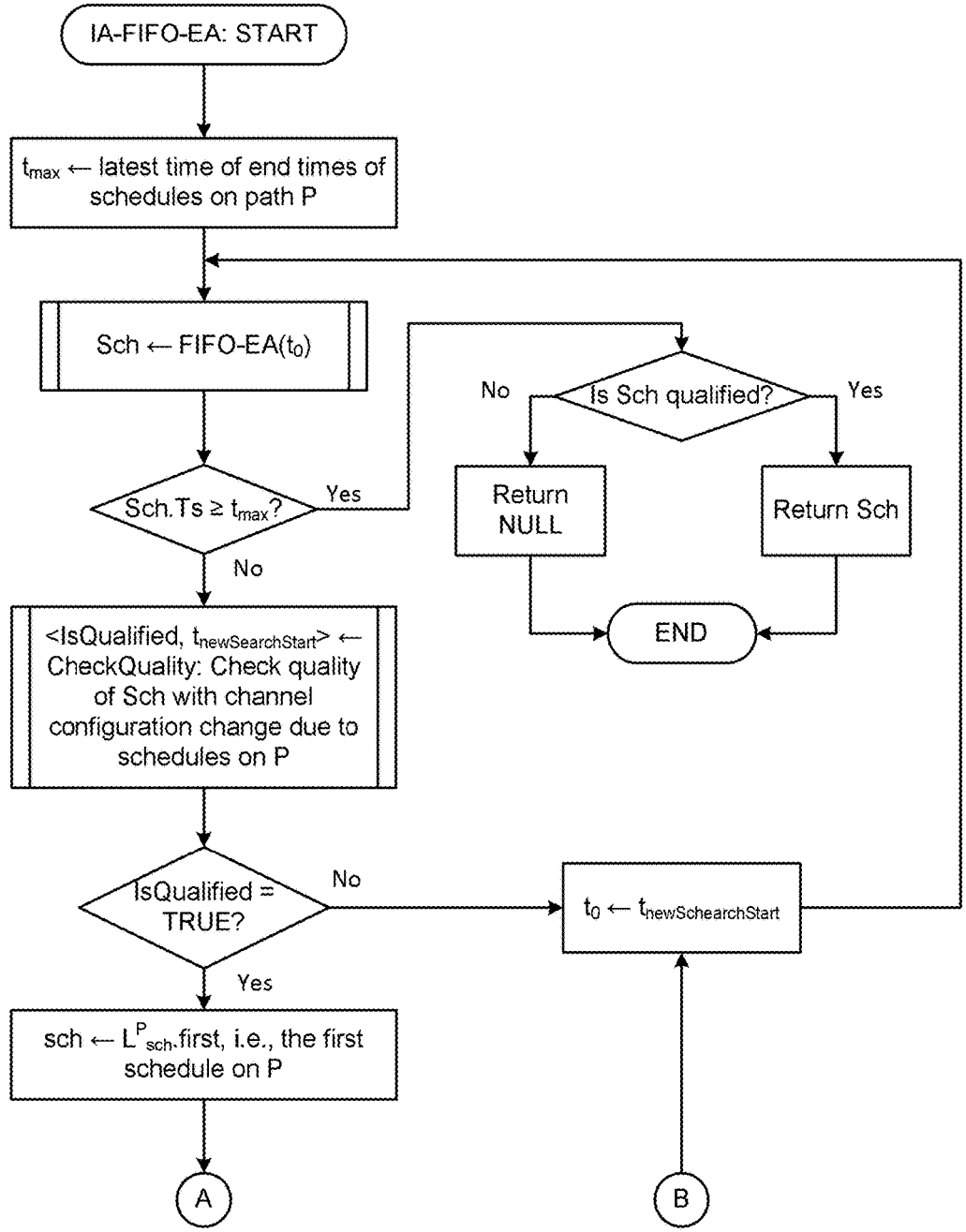
FIGS. 70A and 70B (collectively) are a flow chart for the IA-FIFO-EA Algorithm with pseudo-code given by Algorithm 4.1, according to an embodiment of the present invention.
Figure 70B:
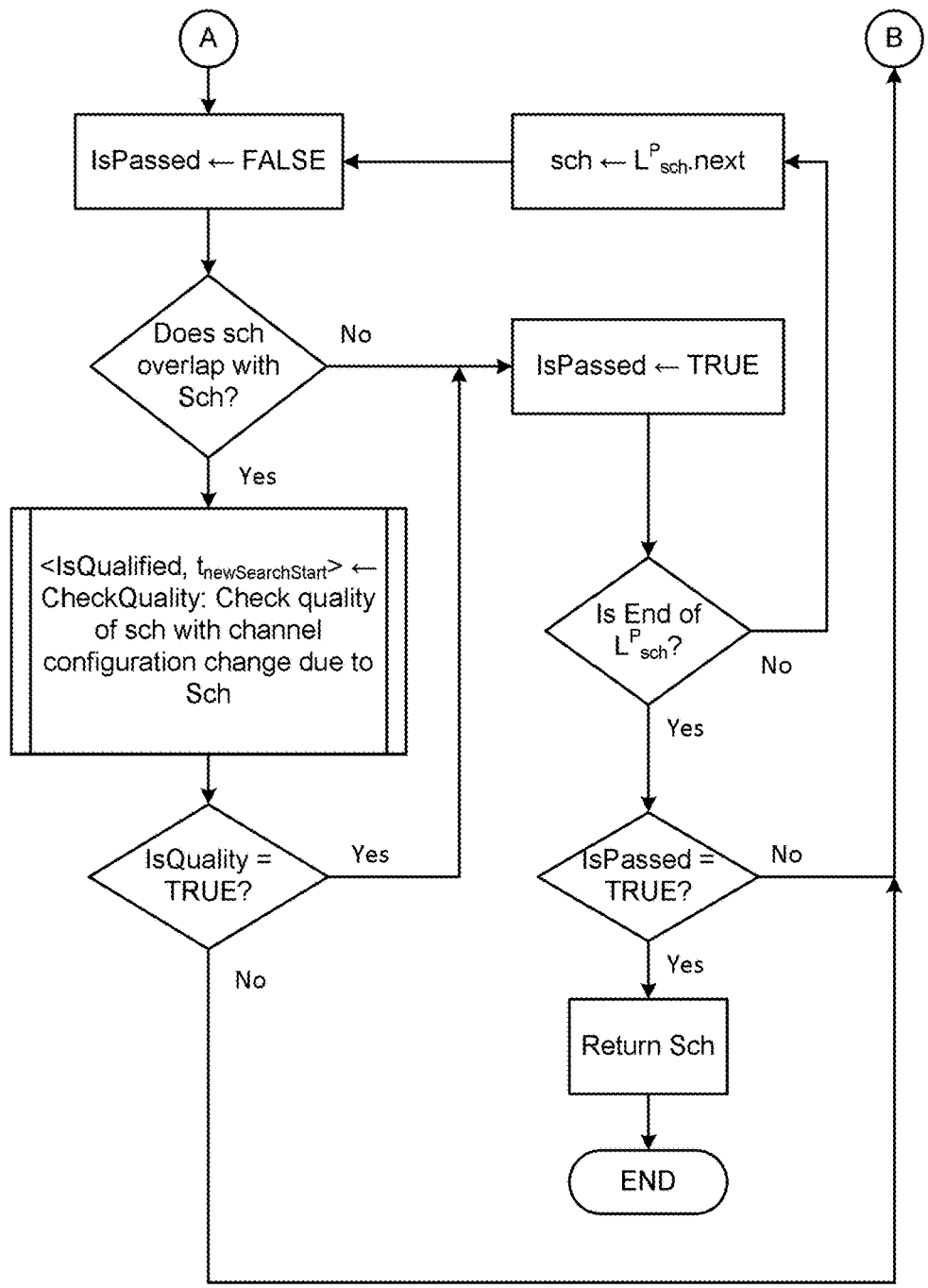

FIG. 70 (A&B) is a flow chart for the IA-FIFO-EA Algorithm with pseudo-code given by Algorithm 4.1.

Algorithm 4.2: The CHECKQUALITYU Sub-routine

```
CHECKQUALITY(ω,P,L_sch^P,T_s,T_e)
1.  if f_BER(ω,P,C_hi^P(T_s)) > th_BER
2       t_0' ← min{t_s,t_e of sch ∈ L_sh^P|t_s > T_s,t_e > T_s}
3       return⟨False,t'_0⟩
4   for each sch ∈L_sh^P
5       if T_s < sch.t_s < T_e        //the start time of sch falls into the newly scheduled
                                       //transmission time
6           if f_BER(ω,P,C_hi^P(sch.t_s)) > th_BER    //wavelength ω at time sch.t_s
                                                       //is not qualified
7               t_0' ← sch.t_s
8               return⟨False,t_0'⟩
9       if T_s < sch.t_e < T_e        //the end time of sch falls into the newly scheduled
                                       //transmission time
10          if f_BER(ω,P,C_hi^P(sch.t_e)) > th_BER    //wavelength ω at time sch.t_e
                                                       //is not qualified
11              t_0' ← sch.t_e
12              return⟨False,t_0'⟩.
13  return⟨True,T_s⟩
``` where α and β capture the running time by comparisons and value assignment operations (in lines 13-17 and 3-6) in the while loop of Algorithm 4.1 (the running time of line 1 in Algorithm 4.1 can be ignored comparing to the other operations) and, $$R_{CHECKQUALITY} = (2|L_{sch}^P|+1)(R_{f_{BER}}+\gamma) \text{ operations} \quad (4.2)$$

where γ captures the running time by comparisons and value assignment operations in lines 5-12 in the while loop of Algorithm 4.2 (the running time of line 1 in Algorithm 4.2 can be ignored comparing to the other operations). Because on average, $$|L_{sch}^P| = \overline{H}_P S_X \quad (4.3)$$

where $\overline{H}_P$ is the average number of hops of a path (note that $\overline{H}_P$ refers to the average number of hops of all source-destination paths in the physical network topology, which is the same as the Meshed logical network topology, and therefore, $\overline{H}_P$ is the same as $\overline{H}_{cp}^M$ and $\overline{H}_{cp}^T$ in Chap. 2), $S_X$ is the average number of occupied schedule holders per hop with Architecture X, and, $$S_M = N_s \rho_{s_M}$$

$$S_T = N_s \rho_{s_T}$$

where $N_s$ is the number of schedule holders per link per fiber. Notice that α, β and γ all include approximately five operations, including comparison, value assignment and returning values or breaking a loop, we use one parameter α to represent all three of them, and α≈5. Substituting Eq. (4.3) and (4.2) into Eq. (4.1) leads to, $$R_{IA-FIFO-EA}^X = N_{FIFO-EA}^X R_{FIFO-EA}^X + \left[2(\overline{H}_P S_X)^2 + 3\overline{H}_P S_X + 2\right]$$

$$R_{f_{BER}} + \left[2(\overline{H}_P S_X)^2 + 4\overline{H}_P S_X + 3\right]\alpha \text{ operations}$$

From Section 2, $R_{FIFO-EA}^X$ can be approximated as, $$R_{FIFO-EA}^X \leq 12 SF \Lambda_0 \overline{H}_{dp}^X \text{ operations}$$

where $\overline{H}_{dp}^X$ is the average number of hops of paths over the data plane with $\overline{H}_{dp}^M = 4$ for Architecture M and $\overline{H}_{dp}^T = 1$ for Architecture T. Therefore, $$R_{IA-FIFO-EA}^X = N_{FIFO-EA}^X \cdot 12 SF \Lambda_0 \overline{H}_{dp}^X + \left[2(\overline{H}_P S_X)^2 + 3\overline{H}_P S_X + 2\right] \quad (4.4)$$

$$R_{f_{BER}} + \left[2(\overline{H}_P S_X)^2 + 4\overline{H}_P S_X + 3\right]\alpha \text{ operations}$$

4.2.2 Impairment with Known Worst Case

If we assume the nonlinear effects of fiber on the signal can be ignored, and the fiber noise is dominated by noise generated from the EDFAs, then from the experiment results in Section 2, the worst case in terms of channel quality along a given path happens when there is zero wavelength that is "On" in a fiber. With this assumption, the IA-FIFO-EA Algorithm can be simplified and the $f_{BER}$ can be calculated using models in Section 4. If the worst case is when there is no "On" wavelength in a fiber, the major change to the IA-FIFO-EA Algorithm is:

- If a lightpath is qualified based on the condition of the known future of already-scheduled transactions, it is going to stay qualified because during the future transmission along the lightpath, it is only possible to have more "On" wavelengths in the same fiber than the number of wavelengths that were known to be "On" at the time of the schedule computation.
- The already scheduled transactions will not be disqualified by scheduling more transactions that overlap with them in the future.

Therefore, in the new IA-FIFO-EA Algorithm, only the quality of the newly scheduled earliest-available wavelength needs to be verified. Name this Algorithm as the KWC-FIFO-EA Algorithm, with KWC short for "Known Worst Case". The pseudo-code of the KWC-FIFO-EA Algorithm is given in Algorithm 4.3, and its process is illustrated using a flow chart in FIG. 71.

---

Algorithm 4.3 The KWC-FIFO-EA Algorithm

KWC - FIFO - EA(R,P,$t_d$,$L_{sch}^P$,$t_0$)
1    $t_{max}$ ← the latest time among all end times of schedules in $L_{sch}$ starting from $t_0$
2    while True
3        ⟨ω,$T_s$,$T_e$⟩ ← FIFO - EA(R,P,$t_d$,$t_0$)
4        if $T_s$ ≥ $t_{max}$
5            if $f_{BER}(\omega, P, C_{hi}^P(T_s)) < th_{BER}$
6                return ⟨ω,$T_s$,$T_e$⟩
7            else
8                return False
        //check the quality of ω
9        ⟨IsQualified,$t_{newSearchStart}$⟩ ← CHECKQUALITY(ω,P,$L_{sch}^P$,$T_s$,$T_e$)
10      if IsQualified is TRUE
11          return ⟨ω,$T_s$,$T_e$⟩
12      else
13          $t_0'$ ← $t_{newSearchStart}$

---

Figure 71:
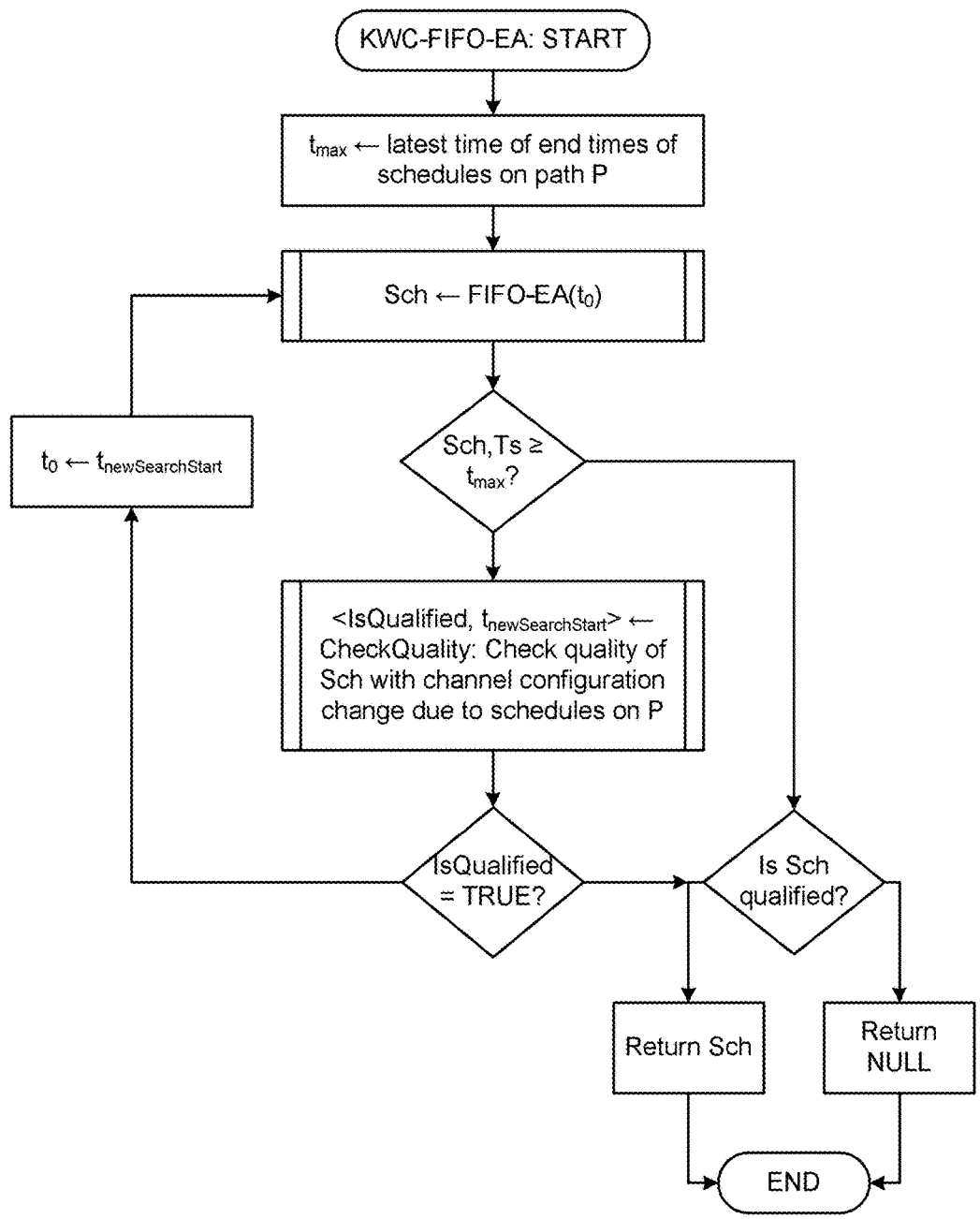
FIG. 71 is a flowchart schematically illustrating operation of the KWC-FIFO-EA, according to an embodiment of the present invention.

FIG. 71 is a flow chart for the KWC-FIFO-EA Algorithm with pseudo-code given by Algorithm 4.3.

Running Time Analysis of the KWC-FIFO-EA Algorithm

Similarly as Section 4.2.1, we consider the worst case running time in network steady state, using the average occupancies of schedule holders to calculate the effect of the length of the list of transmissions that have already been scheduled, and study the worst case where all already-scheduled transmissions overlap with the newly assigned lightpath in both transmission time and transmission path (at least one hop).

Define $R_{KWC-FIFO-EA}^X$ to be the running time of the KWC-FIFO-EA Algorithm with Architecture X. Then, for the worst case, $$R_{KWC\text{-}FIFO\text{-}EA}^X = N_{FIFO\text{-}EA}^X(R_{FIFO\text{-}EA}^X + R_{CHECKQUALITY} + \alpha) \text{ operations} \quad (4.5)$$

where α captures the running time by comparisons and value assignment operations in the while loop of Algorithm 4.3 (lines 4, 5, 10, 11, and 13) (the running time of line 1 in Algorithm 4.3 can be ignored comparing to the other operations), and α≈5. Substituting Eq. (4.3) and (4.2) into Eq. (4.5) leads to, $$R_{KWC\text{-}FIFO\text{-}EA}^X = N_{FIFO\text{-}EA}^X[R_{FIFO\text{-}EA}^X + (2\overline{H}_P S_X + 1)R_{f_{BER}} + 2(\overline{H}_P S_X + 1)\alpha] \text{operations} \quad (71)$$

With known worst case to be the case when there is zero "On" wavelength in a fiber, we can use models in Section 4 to calculate the Bit Error Rate. With EDFA ASE noise measured under different channel configurations and reported through the control plane, and known fiber loss and switch loss, the signal degradation and noise accumulated can be calculated using models in Section 2, and the BER can be then estimated using Eq. (3.4) or (3.5). Let k be the total number of amplifiers along a lightpath, using the case when lg=1 and switch loss is negligible for an example, the $f_{BER}$ can be decomposed into the following steps, each with running time estimated as the number of algebraic operations (assume shot noise and thermal noise are negligible).

1. For bit "One"

Calculate the electrical signal power at the end of the lightpath, taking running time O(1)≈3 operations.

Calculate the sig-sp noise in the detection, taking running time O(1)≈10 operations.

Calculate the sp-sp noise in the detection, taking running time O(1)≈11 operations.

Calculate the random gain intensity noise if the gain randomness is known or can be estimated, taking running time O(lnk)≈60+4 $\log_2$ k operations.

2. For bit "Zero"

Calculate the electrical signal power at the end of the lightpath, taking running time O(1)≈3 operations.

Calculate the sp-sp noise in the detection, taking running time O(1)≈11 operations.

Calculate the random gain intensity noise if the gain randomness is known or can be estimated, taking running time O(lnk)≈25+$\log_2$ k operations.

3. Calculate BER using Eq. (3.5) (assume single-threshold detection is used), taking running O(1)≈47 operations.

Therefore, the running time $R_{f_{BER}}$ can be estimated to be $R_{f_{BER}}$=170+5 $\log_2$ k operations. Since the total number of amplifiers along a lightpath can be on the orders of 10 s, we can approximate $R_{f_{BER}}$ to be 200 operations. Therefore, Eq. (4.7) can be approximated as, $$R_{KWC\text{-}FIFO\text{-}EA}^X \approx N_{FIFO\text{-}EA}^X(12SF\Lambda_0 \overline{H}_{dP}^X + 410\overline{H}_{dP}^X S_X + 210) \text{ operations} \quad (4.7)$$

4.3 Processing Power Analysis of Impairment-Aware OFS Scheduling

Because we do not have a model to determine channel quality with the case when fiber nonlinearity can not be ignored and channel quality depends on knowledge of detailed channel configuration, we do not analyze the processing power for the Algorithm IA-FIFO-EA. We focus on the processing power analysis of Algorithm KWC-FIFO-EA, the running time of which has been discussed in Section 4.2.2.

4.3.1 Processing Power Analysis of the KWC-FIFO-EA Algorithm

Similar to the analysis in Section 2.6.2, the shortest path routing algorithm is run only when there is a change in the network topology, much less frequently than the KWC-FIFO-EA algorithm. Therefore, we focus on the processing power requirements of the KWC-FIFO-EA Algorithm.

As defined in Section 2, $N_V$ is the number of nodes in the WAN, $\rho$ is the average loading factor of each link, $\Lambda$ is the average node degree in the WAN, $N_p$ is the average population size connected to one WAN node, is the request arrival rate at an end user, and $T_d$ is the average transmission time. Then the required processing power for Architecture X is $\lambda N_p N_V R_{KWC-FIFO-EA}^X$ for centralized scheduling, and $\lambda N_p R_{KWC-FIFO-EA}^X$ for distributed scheduling. Similar to the analysis in Section 2.6.2, replacing $\lambda N_p$ with $\rho \Delta F \Lambda_0/T_d$, we obtain the total processing power for Architecture X with centralized impairment-aware scheduled wavelength assignment as, $$P_{KWC-cen}^X = \frac{\rho \Delta F \Lambda_0 N_V R_{KWC-FIFO-EA}^X}{T_d}$$

and, with distributed impairment-aware scheduled wavelength assignment, $$P_{KWC-dis}^X = \frac{\rho \Delta F \Lambda_0 R_{KWC-FIFO-EA}^X}{T_d}$$

To obtain numerical values of $P_{KWC-cen}^X$ and $P_{KWC-dis}^X$ for both the average case and the case with peak traffic arrivals, similar as the analysis in Section 2.6.2, we use numerical values in Table 2.4 to calculate the processing power for both the average case ($\rho \overline{DF}\Lambda_0/T_d = 2600$) and the case of peak traffic arrivals ($\rho \overline{DF}\Lambda_0/T_d = 9000$). From FIG. 36) with these parameters, the blocking probabilities of both Architecture M and T are less than $10^{-3}$, and the schedule holder loading is $\rho_{s_M} = 2.4 \times 10^{-4}$ for Architecture M, and $\rho_{s_T} = 0.14$ for Architecture T. Therefore, the average integer values of S for Architecture M and T are both less than one, hence, S=1, $S_M=1$ and $S_T=57$. Table 4.1 summarizes the average processing power for Architecture M and T under both centralized scheduling and distributed scheduling, while Table 4.2 summarizes the peak processing power.

The worst-case processing power is higher for tunneled architecture with Algorithm KWC-FIFO-EA. This is because with Architecture T, because wavelengths are assigned to tunnels quasi-statically, there are more sessions scheduled into the future along a lightpath. Therefore, Algorithm KWC-FIFO-EA needs to check the lightpath quality at more future times when channel configuration changes. However, with distributed scheduling, Algorithm KWC-FIFO-EA can be implemented easily with both Architecture M (1 Intel i7 CPU) and Architecture T (4 Intel i7 CPUs).

TABLE 4.1

Summary of average processing power for Algorithm FIFO-EA and Algorithm KWC-FIFO-EA.

| | Average Processing Power | FIFO - EA Meshed | FIFO - EA Tunneled | KWC - FIFO - EA Meshed | KWC - FIFO - EA Tunneled |
|---|---|---|---|---|---|
| Centralized Scheduling | in terms of $N_{FIFO-EA}^X$ † | | | $N_{FIFO-EA}^M \times$ 12.27 GIPS | $N_{FIFO-EA}^T \times$ 17.61 GIPS |
| | numerical Min and Max | 10.7 GIPS | 29.1 MIPS | 12.27 GIPS to 98 GIPS | 17.61 GIPS to 9.58 TIPS |
| | in terms of Intel i7 CPUs†† | 0.06 CPUs | $1.6 \times 10^{-4}$ CPUs | 0.07 to 0.55 CPUs | 0.1 to 54 CPUs |
| Distributed Scheduling | in terms of $N_{FIFO-EA}^X$ | | | $N_{FIFO-EA}^M \times$ 0.2 GIPS | $N_{FIFO-EA}^T \times$ 0.29 GIPS |
| | numerical Min and Max | 0.18 GIPS | 0.48 MIPS | 0.2 GIPS to 1.6 GIPS | 0.29 GIPS to 157.8 GIPS |
| | in terms of Intel i7 CPUs | 0.001 CPUs | $2.7 \times 10^{-6}$ CPUs | 0.001 to 0.01 CPUs | 0.002 to 0.9 CPUs |

In the above summary, † indicates $N_{FIFO-EA}^X$ ranges from 1 to $2\overline{H}_P S_X$, which is 1 to 8 for Architecture M, and 1 to 544 for Architecture T.

In the above summary, †† indicates taking the processing power of the widely available Intel core processor for PC, i7 Extreme Edition 3960X (Hex core) as a reference, it can perform 177.73 GIPS at 3.33 GHz.

TABLE 4.2

Summary of peak processing power for Algorithm FIFO-EA and Algorithm KWC-FIFO-EA.

| | Peak Processing Power | FIFO - EA | | KWC - FIFO - EA | |
|---|---|---|---|---|---|
| | | Meshed | Tunneled | Meshed | Tunneled |
| Centralized Scheduling | in terms of $N_{FIFO-EA}^X$ † numerical Min and Max | 37.2 GIPS | 0.1 GIPS | $N_{FIFO-EA}^M \times$ 42.5 GIPS 42.5 GIPS to 340 GIPS | $N_{FIFO-EA}^T \times$ 60.9 GIPS 60.9 GIPS to 33.16 TIPS |
| | in terms of Intel i7 CPUs†† | 0.2 CPUs | $5.6 \times 10^{-4}$ CPUs | 0.24 to 1.9 CPUs | 0.34 to 187.3 CPUs |
| Distributed Scheduling | in terms of $N_{FIFO-EA}^X$ numerical Min and Max | 0.62 GIPS | 1.68 MIPS | $N_{FIFO-EA}^M \times$ 0.7 GIPS 0.7 GIPS to 5.6 GIPS | $N_{FIFO-EA}^T \times$ 1 GIPS 1 GIPS to 544 GIPS |
| | in terms of Intel i7 CPUs | 0.004 CPUs | $9.5 \times 10^{-6}$ CPUs | 0.004 to 0.03 CPUs | 0.006 to 3.1 CPUs |

In Table 4.2, † indicates, $N_{FIFO-EA}^X$ ranges from 1 to $2H_P S_X$, which is 1 to 8 for Architecture M, and 1 to 544 for Architecture T.

In Table 4.2, †† indicates taking the processing power of the widely available Intel core processor for PC, i7 Extreme Edition 3960X (Hex core) as a reference, it can perform 177.73 GIPS at 3.33 GHz.

4.4 Control Traffic Analysis of Impairment-Aware OFS Scheduling

Similar as the control traffic analysis in Section 2.7, the control traffic includes traffic for lightpath requests from users to the Scheduler, control traffic between the Scheduler and the involved switches to set up or tear down lightpaths. In Impairment-Aware OFS Scheduling, the control traffic also includes traffic on reporting the fiber impairments in the network. This EDFA-induced impairment is the same for both Meshed and Tunneled network architecture, but different with respect to whether the scheduling is centralized or distributed. This is because with centralized scheduling, all impairments needs to be reported to one central Scheduler, while with distributed scheduling, all impairments needs to be reported to all Schedulers.

We assume loss, like fiber loss or switch loss, that does not change with channel configurations is already known to the network control unit and, therefore, is not collected nor reported in the control plane. With the assumption that loss caused by fiber nonlinearity is negligible and EDFA-induced noise is the major noise source in the detection, in the control plane, EDFA ASE noise is collected and reported. Assume along one link the ASE noise from different EDFAs is approximately the same, and at the end node of the link, the node is capable of deducing the ASE noise $P_{sp}$ of one EDFA from the accumulated noise of the link (one way of estimating $P_{sp}$ at the end node of the link is to consider the noise in a wavelength that originated from the start node of that link, whose signal is only corrupted by the EDFAs on that link. Then the $P_{sp}$ can be derived using models in Chap. 3). With these assumptions, whenever a transmission starts or ends along a path, nodes along the path need to report the EDFA ASE noise after the change, and, a. if detailed channel configurations are needed to calculate BER, for each link, the ASE noise on each channel in the affected fiber needs to be reported together with the new channel configuration;

b. if worst case is considered, only number of "On" channels and one ASE noise for all channels need to be report for each affected fiber.

For case (a), we use <link ID, channel configuration, number of amplifiers, $P_{sp}$ for each wavelength> to capture the impairment. The link ID can be an ID related to the fiber which takes 8 bits. The channel configuration can be $\Lambda$ one-bit identifiers, and the number of amplifiers can be represented by an 8-bit Integer. For $P_{sp}$, we choose to use a 64-bit Long number. Define $L_{IA}$ to be total length of this impairment information with detailed channel configuration, and, $L_{IA} = 65\Lambda + 16$ bits For case (b), the impairment can be captured by <link ID, number of amplifiers, number of "On" wavelengths, $P_{sp}$>. Define $L_{KWC}$ to be total length of the impairment information for known worst case. Using an 8-bit Integer to represent the number of "On" amplifiers, then, $L_{KWC} = 88$ bits Again assume TCP/IPv6 is used to transport the impairment control traffic. Notice that the above discussed impairment information is the payload of the IPv6 control packets. Define $L_{IA}^{TCP/IP}$ or $L_{KWC}^{TCP/IP}$ to be the total control traffic in one TCP session between one node and the Scheduler for the case of full channel configuration or known worst case, respectively. Then, $L_{IA}^{TCP/IP} = L_{IA}(1+\alpha_{FEC}) + 320 \cdot 8$ bits $L_{KWC}^{TCP/IP} = L_{KMC}(1+\alpha_{FEC}) + 320 \cdot 8$ bits where $\alpha_{FEC}$ denotes the percentage of overhead from the Forward Error Correction relative to the actual length of the payload. Because both starting and ending a transmission trigger impairment reporting of all links along the path P where the transmission happens, using $L_{IA}^P$ and $L_{KWC}^P$ to represent the control traffic triggered by one transmission (both starting and ending of the transmission), then, $L_{IA}^P = 2L_{IA}^{TCP/IP} \overline{H}_P$ bits $L_{KWC}^P = 2L_{KWC}^{TCP/IP} \overline{H}_P$ bits Define $L_{cen}^Y$ to be the total control traffic with centralized scheduling, and $L_{dis}^Y$ to be the total control traffic with distributed scheduling, where Y can be IA or KWC specifying the two cases of full channel configuration or of the known worst case. Similar as the control traffic analysis in Section 5, the total control traffic can be derived from the traffic demand and the network topology, and, $$L_{cen}^Y = \frac{\rho \Delta F \Lambda N_V \overline{H}_{cp}}{T_d} \cdot L_Y^P$$

$$L_{dis}^Y = \frac{\rho \Delta F \Lambda N_V \overline{H}_{cp}}{T_d} \cdot L_Y^P \cdot N_V$$

To obtain numerical values of the control traffic, we use numerical values in Table 2.4 to calculate the control traffic for both the average case ($\rho \overline{D} F \Lambda_0 / T_d = 2600$) and the case of peak traffic arrivals ($\rho \overline{D} F \Lambda_0 / T_d = 9000$). We obtain numerical values of the additional control traffic for impairment reporting, with the case of average traffic arrivals summarized in Table 4.3 and the case of peak traffic arrivals summarized in Table 4.4.

TABLE 4.3

Average control traffic for impairment reporting for Algorithm IA - FIFO - EA and KWC - FIFO - EA with both centralized and distributed scheduling.

| Average Control Traffic | IA - FIFO - EA | KWC - FIFO - EA |
|---|---|---|
| Centralized Scheduling | 84.25 Gbps | 13.26 Gbps |
| Distributed Scheduling | 5.06 Tbps | 787.8 Gbps |

TABLE 4.4

Peak control traffic for impairment reporting for Algorithm IA - FIFO - EA and KWC - FIFO - EA with both centralized and distributed scheduling.

| Peak Control Traffic | IA - FIFO - EA | KWC - FIFO - EA |
|---|---|---|
| Centralized Scheduling | 292.8 Gbps | 45.8 Gbps |
| Distributed Scheduling | 17.5 Tbps | 2.7 Tbps |

Adding the impairment control traffic in Table 4.3 to the control traffic for requests and switch configurations in Table 2.6, we obtain the total control traffic for impairment-aware scheduling with average traffic arrivals summarized in Table 4.5. Similarly, we can obtain the total control traffic for impairment-aware scheduling with peak traffic arrivals summarized in Table 4.6.

TABLE 4.5

Summary of average control traffic for Algorithm FIFO-EA, IA-FIFO-EA, and KWC-FIFO-EA.

| Average Control Traffic | | FIFO-EA | | IA-FIFO-EA | | KWC-FIFO-EA | |
|---|---|---|---|---|---|---|---|
| | | Meshed | Tunneled | Meshed | Tunneled | Meshed | Tunneled |
| Centralized Scheduling | Total traffic | 27.68 Gbps | 12.16 Gbps | 111.93 Gbps | 96.41 Gbps | 40.94 Gbps | 25.4 Gbps |
| | Per-edge | 0.36 Gbps | 0.16 Gbps | 1.45 Gbps | 1.25 Gbps | 0.53 Gbps | 0.33 Gbps |
| | Heaviest edge | 2.66 Gbps | 1.17 Gbps | 10.76 Gbps | 9.27 Gbps | 3.94 Gbps | 2.44 Gbps |
| Distributed Scheduling | Total traffic | 312.16 Gbps | 12.16 Gbps | 5.37 Tbps | 5.07 Tbps | 1.1 Tbps | 0.8 Tbps |
| | Per-edge† | 4.05 Gbps | 0.16 Gbps | 69.7 Gbps | 65.8 Gbps | 14.39 Gbps | 10.49 Gbps |

In Table 4.5, † indicates, with distributed scheduling, since control traffic is sent to all WAN nodes and distributed to all links, the average per-edge load is approximately the heaviest edge load.

TABLE 4.6

Summary of peak control traffic for Algorithm FIFO-EA, IA-FIFO-EA, and KWC-FIFO-EA.

| Peak Control Traffic | | FIFO-EA | | IA-FIFO-EA | | KWC-FIFO-EA | |
|---|---|---|---|---|---|---|---|
| | | Meshed | Tunneled | Meshed | Tunneled | Meshed | Tunneled |
| Centralized Scheduling | Total traffic | 95.9 Gbps | 42.1 Gbps | 388.7 Gbps | 334.9 Gbps | 141.7 Gbps | 87.9 Gbps |
| | Per-edge | 1.26 Gbps | 0.54 Gbps | 5 Gbps | 4.3 Gbps | 1.84 Gbps | 1.15 Gbps |
| | Heaviest edge | 9.2 Gbps | 4.06 Gbps | 37.3 Gbps | 32 Gbps | 13.6 Gbps | 8.5 Gbps |
| Distributed Scheduling | Total traffic | 1.1 Tbps | 42.1 Gbps | 18.6 Tbps | 17.6 Tbps | 3.8 Tbps | 2.76 Tbps |
| | Per-edge† | 14 Gbps | 0.54 Gbps | 251 Gbps | 230 Gbps | 49.8 Gbps | 36.4 Gbps |

In Table 4.6, † indicates, with distributed scheduling, since control traffic is sent to all WAN nodes and distributed to all links, the average per-edge load is approximately the heaviest edge load.

Detailed channel configuration information leads to huge control traffic for link impairment reporting. With distributed scheduling, for the case of peak traffic arrivals, the per-edge control traffic is 251 Gbps for Architecture M, and 230 Gbps for Architecture T, which is huge control plane burden. However, if the network is designed to stay away from the fiber nonlinearity region (this could be achieved by lowering the input optical power, and allowing a higher BER using Forward Error Correction), with Algorithm KWC-FIFO-EA and distributed scheduling, the per-edge control traffic is reduced to manageable amount, 49.8 Gbps for Architecture M (with 72% for link impairment reporting and 28% for lightpath setup/tear-down), and 36.4 Gbps for Architecture T (with 99% for link impairment reporting and 1% for lightpath setup/tear-down).

4.5 Impairment-Compensation Network Architecture

Figure 72:
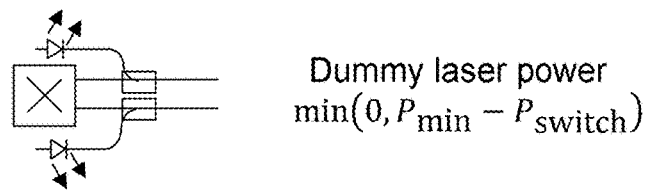
FIG. 72 is a schematic block diagram illustrating use of dummy lasers to ensure the total optical power in a fiber is maintained above a minimum value, according to an embodiment of the present invention.

In this section, we propose a new network architecture, where the network is designed such that the worst case of channel quality is when there is no "On" wavelength in a fiber (the design can limit the effect of fiber nonlinearities induced cross-channel interference so that EDFA-induced noise dominates). To ensure during the worst case when there is no other "On" wavelength the lightpath is still qualified or to increase the reach of a lightpath, a dummy laser is used to inject optical power to each fiber going out of each switch (FIG. 24). The power of the laser can be controlled in a way as shown in FIG. 72 so that the optical power in any fiber is always above a certain minimum level which ensures the worst case or the case with a longer reach is qualified. The total number of lasers equal to the number of fibers in the network, which is, $2N_E F$, where $N_E$ is the number of bidirectional edges in the network and F is the number of fibers for each edge. Note that even with this Impairment-Compensation network architecture, link impairment should still be reported.

FIG. 24 is a schematic block diagram of a new WAN architecture with a dummy laser for each fiber out of a switch, according to an embodiment of the present invention.

FIG. 72 is a schematic illustration of using dummy lasers to make sure the total optical power in a fiber is maintained above a minimum value, according to an embodiment of the present invention.

5 CONCLUSION

Here, we have addressed the network management and control aspects of flow-switched optical networks, and designed a network architecture that leads to both a scalable control plane and an efficient data plane.

Systematically, we have given an overview of the essential network management and control entities and the corresponding functionalities. We focused on the scheduling problem of OFS because its processing power and generated control traffic increase with traffic demand, network size, and are closely correlated with data network architecture, while other routine maintenance type network management and control functionalities contribute either a fixed amount or negligibly to the total efforts. We consider two possible Wide Area Network architectures: meshed or tunneled, and developed a unified model for data plane performance to provide a common platform for the performance comparison of the control plane. We have also developed a framework to analyze network management and control efforts from the perspectives of processing complexity and control traffic as functions of network architecture, traffic demand, and network resources. The presence of switching-induced physical-layer impairments in EDFA-amplified optical links creates more challenges to network management and control. To incorporate the effects of the physical-layer impairments into the scheduling algorithm to guarantee the quality of the scheduled lightpath, we have developed models for quality of EDFA-amplified optical links. We have developed impairment-aware scheduling algorithms for two cases, a) the worst case of channel quality happens when there is no "On" channel in a fiber, and b) full channel configurations of a fiber are needed to determine the quality of one channel and the worst case is not known. Finally, we have proposed an impairment-compensation network architecture which employs dummy lasers at each switch to guarantee the worst-case channel quality or to increase the reach of a lightpath.

Our analysis of the data plane performance has shown that with aggregation of at least two wavelengths of traffic and allowing about two transactions per wavelength to be scheduled into the future, the tunneled architecture provides comparable data plane performance as the meshed architecture. However, with no physical-layer impairments, the tunneled architecture reduces the processing power and the control traffic by orders of magnitude. Taking the case of peak traffic arrivals with distributed scheduling for an example, the peak processing complexity is reduced from ~0.6 GIPS to ~1.7 MIPS, and the peak control traffic per edge is reduced from ~14 Gbps to ~0.5 Gbps. With impairment-aware scheduling, our results show that if detailed channel configuration information is reported in the control plane, link impairment updates lead to huge control traffic, e.g., ~250 Gbps per-edge peak control traffic with distributed scheduling over the meshed architecture. However, if the worst case of impairment is known to be when there is no "On" channel in a fiber, using the tunneled architecture, both the processing power and the control traffic are reduced to manageable amounts. For example, the scheduling can be handled by 1 to 4 Intel i7 CPUs, and the per-edge peak control traffic is ~36 Gbps.

APPENDIX A DERIVATIONS OF EQUATIONS AND THEOREMS IN SECTION 1

A.1 Proof of Theorem 1

Proof.

By induction. For i=2, $$\rho_{s2} = (1 - P_{sl} + P_{sn}P_{sl})\rho_{s1} + P_{sn}(1 - \rho_{s1}) =$$

$$\frac{(1 - P_{sl} + P_{sn}P_{sl})P_{sn}}{P_{sn} + P_{sl} - P_{sn}P_{sl}} + \frac{P_{sn}(P_{sl} - P_{sn}P_{sl})}{P_{sn} + P_{sl} - P_{sn}P_{sl}} = \frac{P_{sn}}{P_{sn} + P_{sl} - P_{sn}P_{sl}} = \rho_s.$$

Assume $\rho_{sk} = \rho_s$, then for i=k+1, $$\rho_{s(k+1)} = (1 - P_{sl} + P_{sn}P_{sl})\rho_{sk} + P_{sn}(1 - \rho_{sk}) =$$

$$\frac{(1 - P_{sl} + P_{sn}P_{sl})P_{sn}}{P_{sn} + P_{sl} - P_{sn}P_{sl}} + \frac{P_{sn}(P_{sl} - P_{sn}P_{sl})}{P_{sn} + P_{sl} - P_{sn}P_{sl}} = \frac{P_{sn}}{P_{sn} + P_{sl} - P_{sn}P_{sl}} = \rho_s.$$

APPENDIX B DETECTION OF TWO GAUSSIAN RANDOM VARIABLES WITH NON-EQUAL MEANS AND VARIATIONS

In this appendix, we derive the optimal threshold detector for the hypothesis testing on whether the received X is "1" or "0" using techniques from [37].

1 Optimal Two-Threshold Detector

Assume under hypothesis 1, X is a Gaussian random variable with mean $\mu_s$, and variance $\sigma_s^2$, that is, $$H_1: X \sim \text{Gaussian}(\mu_s, \sigma_s^2)$$

Assume under hypothesis 0, X is a Gaussian random variable with mean $\mu_n$, and variance $\sigma_n^2$, that is, $$H_0: X \sim \text{Gaussian}(\mu_n, \sigma_n^2)$$

In addition, we assume, $$\mu_n < \mu_s$$

$$\sigma_n^2 < \sigma_s^2$$

Therefore, the distribution of X is, $$H_1: f_{x|H_1}(x) = \frac{1}{\sigma_s \sqrt{2\pi}} \exp\left[-\frac{(x-\mu_s)^2}{2\sigma_s^2}\right] \quad (B.1)$$

$$H_0: f_{x|H_0}(x) = \frac{1}{\sigma_n \sqrt{2\pi}} \exp\left[-\frac{(x-\mu_n)^2}{2\sigma_n^2}\right] \quad (B.2)$$

Figure 73:
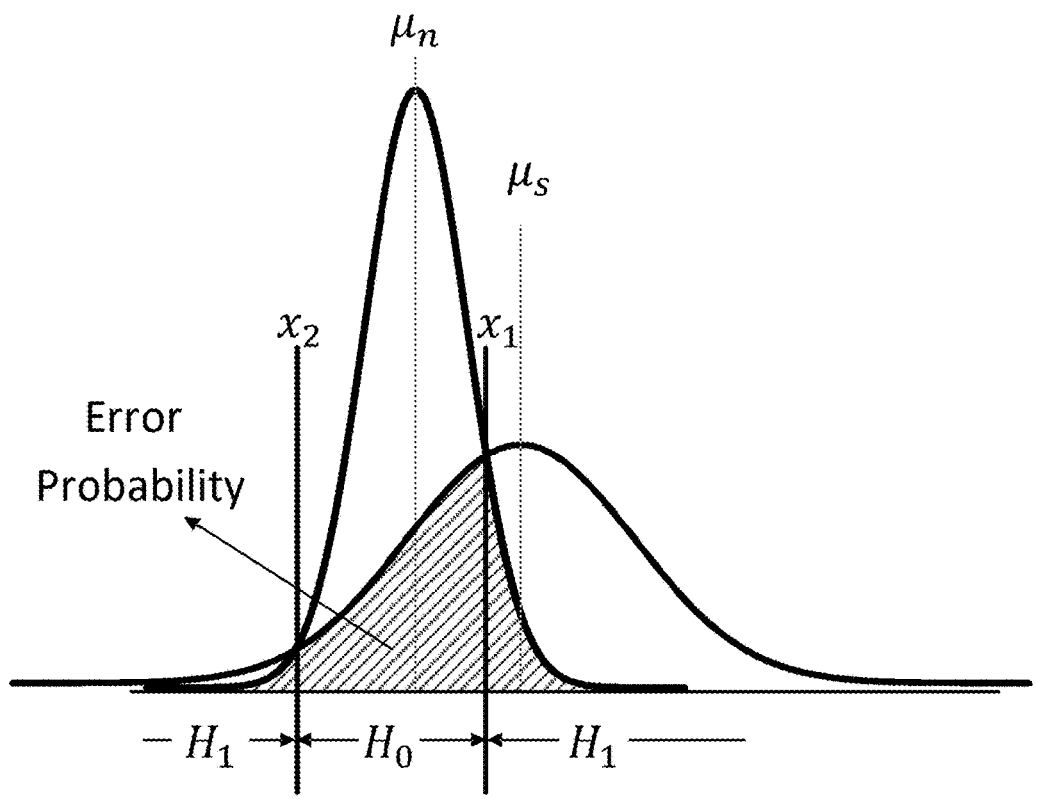
FIG. 73 is a plot of a two-threshold detection model of two Gaussian random variables with non-equal means and variances, according to an embodiment of the present invention.

Solving $f_{x|H_1}(x) = f_{x|H_0}(x)$ leads to two crossing points of the two Gaussian distributions, see FIG. 73, and, $$x_1^* = a + \sqrt{a^2 - b} \quad (B.3)$$

$$x_2^* = a - \sqrt{a^2 - b} \quad (B.4)$$

$$a = \frac{\mu_n \sigma_s^2 - \mu_s \sigma_n^2}{\sigma_s^2 - \sigma_n^2}$$

$$b = \frac{\sigma_s^2 \mu_n^2 - \sigma_n^2 \mu_s^2 + 2\sigma_s^2 \sigma_n^2 \log\left(\frac{\sigma_n}{\sigma_s}\right)}{\sigma_s^2 - \sigma_n^2}$$

The optimal threshold detector is a two-threshold detector with thresholds $x_1^*$ and $x_2^*$, and, $H_1$ is true, if $X < x_2^*$, or $X > x_1^*$
$H_0$ is true, if $x_2^* < X < x_1^*$ To see why the above is true, consider the error probability using a two-threshold detector with thresholds at $x_1$ and $x_2$, and $x_2 < \mu_n < x_1$, and, $$P_e = P(H_0)Pr\{X < x_2, \text{ or, } X > x_1 | H_0\} + P(H_1)Pr\{x_2 < X < x_1 | H_1\} \quad (B.5)$$

Since "1" and "0" bits are equally likely, $P(H_1) = P(H_0) = 0.5$. Define $\phi_i(x)$ as the cumulative probability distribution of the Gaussian random variable under hypothesis $H_i$. Then Eq. (B.5) can be re-written as, $$P_e = \frac{1}{2}(\phi_0(x_2) + 1 - \phi_0(x_1)) + \frac{1}{2}(\phi_1(x_1) - \phi_1(x_2)) =$$

$$\frac{1}{2}\underbrace{(1 - \phi_0(x_1) + \phi_1(x_1))}_{s(x_1)} + \frac{1}{2}\underbrace{(\phi_0(x_2) + \phi_1(x_2))}_{g(x_2)}$$

FIG. 73 is a plot of a two-threshold detection model of two Gaussian random variables with non-equal means and variances.

Note that as long as $x_2 < \mu_n < x_1$ is maintained, $P_e$ can be optimized by choosing the $x_1^*$ and $x_2^*$ independently. Therefore, $$\min_{x_2 < \mu_n < x_1} P_e = \min_{x_1 > \mu_n} s(x_1) + \min_{x_2 < \mu_n} g(x_2)$$

The first derivatives of $s(x_1)$ and $g(x_2)$ w.r.t. $x_1$ and $x_2$, respectively, are $$s'(x_1) = f_{x|H_1}(x_1) - f_{x|H_0}(x_1)$$

$$g'(x_2) = f_{x|H_0}(x_2) - f_{x|H_1}(x_2)$$

Setting the above first derivatives equal to zero, leads to $$f_{x|H_1}(x_1) = f_{x|H_0}(x_1)$$

$$f_{x|H_0}(x_2) = f_{x|H_1}(x_2)$$

Solving the above equations, we have obtained $x_1^*$ in Eq. (B.3) and $x_2^*$ in Eq. (B.4), and $x_2^* < \mu_n < x_1^*$.

The second derivatives of $s(x_1)$ and $g(x_2)$ w.r.t. $x_1$ and $x_2$, respectively, are $$s''(x_1) = -\frac{(x_1 - \mu_s)^3}{\sqrt{2\pi}\,\sigma_s^3} + \frac{(x_1 - \mu_n)^3}{\sqrt{2\pi}\,\sigma_n^3}$$

$$g''(x_2) = \frac{(x_2 - \mu_s)^3}{\sqrt{2\pi}\,\sigma_s^3} - \frac{(x_2 - \mu_n)^3}{\sqrt{2\pi}\,\sigma_n^3}$$

At $x_1 = x_1^*$, $$s''(x_1^*) = -\frac{(x_1^* - \mu_s)^3}{\sqrt{2\pi}\,\sigma_s^3} + \frac{(x_1^* - \mu_n)^3}{\sqrt{2\pi}\,\sigma_n^3} \quad (B.6)$$

$$= \frac{\sigma_s^3(x_1^* - \mu_n)^3 - \sigma_n^3(x_1^* - \mu_s)^3}{\sqrt{2\pi}\,\sigma_n^3 \sigma_s^3} \quad (B.7)$$

$$> \frac{\sigma_s^3[(x_1^* - \mu_n)^3 - (x_1^* - \mu_s)^3]}{\sqrt{2\pi}\,\sigma_n^3 \sigma_s^3} \quad (B.8)$$

$$> 0$$

where Eq. (B.6)⇒Eq. (B.7) because $\sigma_s^2 > \sigma_n^2$, and Eq. (B.7)⇒Eq. (B.8) because $x_1^* > \mu_n$ and $\mu_n < \mu_s$. Similarly, at $x_2 = x_2^*$, $$g''(x_2^*) > 0$$

Therefore, $$\min_{x_1 > \mu_n} s(x_1) = s(x_1^*) \quad (B.9)$$

$$\min_{x_2 > \mu_n} g(x_2) = g(x_2^*)$$

and, $$\min_{x_2 < \mu_2 < x_1} P_e = \frac{1}{2}(1 - \phi_0(x_1^*) + \phi_1(x_1^*)) + \frac{1}{2}(\phi_0(x_2^*) - \phi_1(\phi_2^*))$$

In communication systems, error probability is often expressed as functions of the Q-function. The Q-function is the tail probability of the standard normal distribution, that is, $$Q(x) = \frac{1}{\sqrt{2\pi}} \int_x^\infty \exp\left(-\frac{x^2}{2}\right) dx = \frac{1}{2}\mathrm{erfc}\left(\frac{x}{\sqrt{2}}\right) \quad \text{(B.10)}$$

Expressing Eq. (B.9) using Q-function, we obtain the minimum error probability of the optimal two-threshold detector and $$(P_e)_{min} = \quad \text{(B.11)}$$
$$\frac{1}{2}\left[Q\left(\frac{\mu_s - x_1^*}{\sigma_s}\right) + Q\left(\frac{x_1^* - \mu_n}{\sigma_n}\right)\right] - \frac{1}{2}\left[Q\left(\frac{\mu_s - x_2^*}{\sigma_s}\right) - Q\left(\frac{\mu_n - x_2^*}{\sigma_n}\right)\right]$$

B.2 Single-Threshold Detector Approximation

Figure 74:
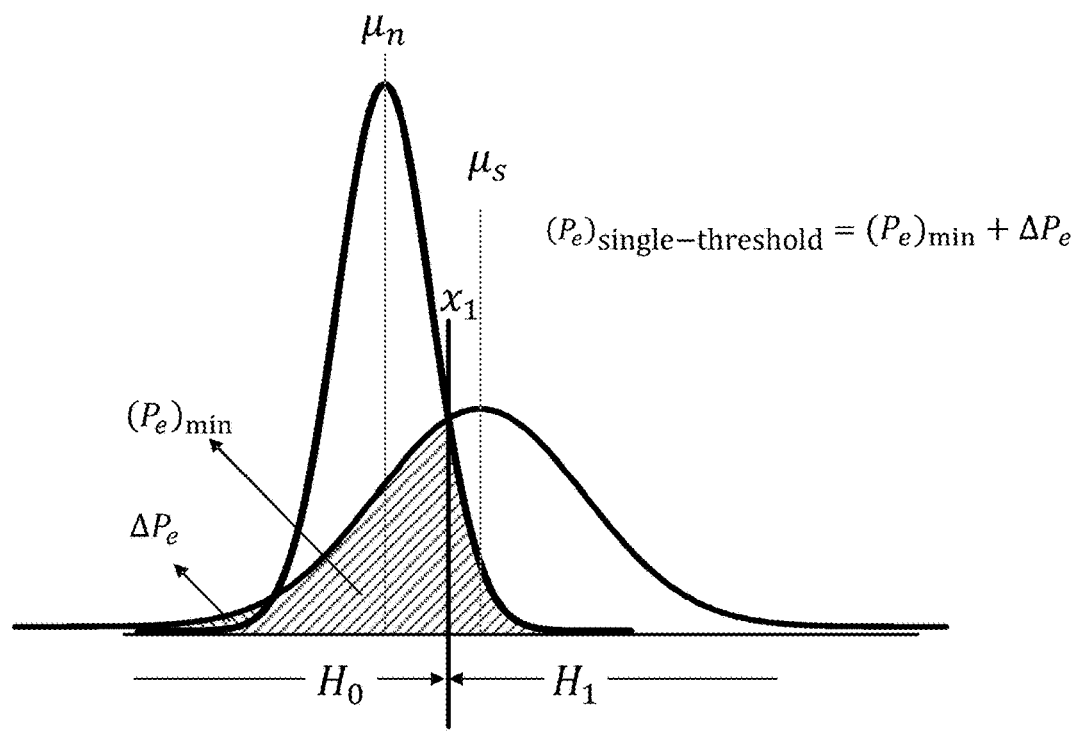
FIG. 74 is a plot of a single-threshold detection model of two Gaussian random variables with non-equal means and variances, according to an embodiment of the present invention.

Consider a single threshold detector with threshold at $x_1^*$ (see FIG. 52), and
$H_1$ is True, if $X > x_1^*$
$H_0$ is True, if $X < x_1^*$
FIG. 74 is a plot of a single-threshold detection model of two Gaussian random variables with non-equal means and variances.
Therefore, the error probability is:

$$(P_0)_{single-threshold} =$$
$$P(H_1)Pr\left(\frac{X-\mu_s}{\sigma_s} < \frac{x_1^* - \mu_s}{\sigma_s} \mid H_1\right) + P(H_0)Pr\left(\frac{X-\mu_n}{\sigma_n} > \frac{x_1^* - \mu_n}{\sigma_n} \mid H_0\right) =$$
$$\frac{1}{2}\left[Q\left(\frac{\mu_s - x_1^*}{\sigma_s}\right) + Q\left(\frac{x_1^* - \mu_n}{\sigma_n}\right)\right]$$

The difference of the error probability between the optimal two-threshold detector and the single-threshold detector is $$\Delta P_e \triangleq (P_e)_{single-threshold} - (P_e)_{min}$$
$$= \frac{1}{2}\left[Q\left(\frac{\mu_s - x_2^*}{\sigma_s}\right) - Q\left(\frac{\mu_n - x_2^*}{\sigma_n}\right)\right]$$

From [12], $$Q(x) \approx \frac{1}{12}\exp\left(-\frac{x^2}{2}\right) + \frac{1}{4}\exp\left(-\frac{2}{3}x^2\right), x > 0$$

Therefore, Q (x) decreases exponentially with increase of x, and, $$\frac{\Delta P_e}{(P_e)_{single-threshold}} = \frac{Q\left(\frac{\mu_s - x_2^*}{\sigma_s}\right) - Q\left(\frac{\mu_n - x_2^*}{\sigma_n}\right)}{Q\left(\frac{\mu_s - x_1^*}{\sigma_s}\right) + Q\left(\frac{x_1^* - \mu_n}{\sigma_n}\right)} <$$

$$\frac{Q\left(\frac{\mu_s - x_2^*}{\sigma_s}\right)}{Q\left(\frac{\mu_s - x_1^*}{\sigma_s}\right)} \approx \frac{\frac{1}{12}\exp\left(-\frac{1}{2}\left(\frac{\mu_s - x_2^*}{\sigma_s}\right)^2\right) + \frac{1}{4}\exp\left(-\frac{2}{3}\left(\frac{\mu_s - x_2^*}{\sigma_s}\right)^2\right)}{\frac{1}{12}\exp\left(-\frac{1}{2}\left(\frac{\mu_s - x_1^*}{\sigma_s}\right)^2\right) + \frac{1}{4}\exp\left(-\frac{2}{3}\left(\frac{\mu_s - x_1^*}{\sigma_s}\right)^2\right)}$$

-continued
$$\frac{\Delta P_e}{(P_e)_{min}} = \frac{1}{\frac{1}{\frac{\Delta P_e}{(P_e)_{single-threshold}}} - 1}$$

$\Delta P_e$ is negligible relative to $(P_e)_{min}$ if $x_2^* \ll x_1^2$, that is, $$(\mu_n \sigma_s^2 - \mu_s \sigma_n^2)^2 \gg \sigma_s^2 \mu_n^2 - \sigma_n^2 \mu_s^2 + 2\sigma_s^2 \sigma_n^2 \log\left(\frac{\sigma_n}{\sigma_s}\right)$$

APPENDIX C

Derivations of Equations in Chapter 3

C.1 Derivation of $\sigma_{IG_{sig}}^2$ in Eq. (3.24)

Proof.
The gain intensity noise from the signal is, $$\sigma_{IG_{sig}}^2 = \mathrm{Var}\left(\left|E_0(lg)^{\frac{k}{2}}\left(\prod_{i=1}^k \frac{G_i}{g}\right)^{1/2}\right|\right)$$

$$= P_0(lg)^k\left(E\left[\prod_{i=1}^k \frac{G_i}{g}\right] - E\left[\prod_{i=1}^k \left(\frac{G_i}{g}\right)^{1/2}\right]^2\right)$$

$$= P_0(lg)^k\left[1 - \left(\frac{E[\sqrt{G}]^2}{g}\right)^k\right]$$

$$= P_0(lg)^k\left[1 - \left(\frac{g - \mathrm{Var}(\sqrt{G})}{g}\right)^k\right]$$

$$= P_0(lg)^k\left[1 - \left(1 - \frac{\mathrm{Var}(\sqrt{G})}{g}\right)^k\right]$$

Note that in the above calculation, for simplicity reasons, real field values are considered.

C.2 Derivation of $\sigma_{IG_{sp}}^2$ in Eq. (3.25)

Proof.
The gain intensity noise from the accumulated ASE is, $$Q_{IG_{sp}}^2 =$$

$$\mathrm{Var}\left(\left|\sum_{i=1}^{k-1} E_{sp}\left(\prod_{j=i+1}^k \frac{G_j lg}{g}\right)^{\frac{1}{2}} + E_{sp}\right|\right) = \mathrm{Var}\left(\left|\sum_{i=1}^{k-1} E_{sp}\left(\prod_{j=i+1}^k \frac{G_j lg}{g}\right)^{\frac{1}{2}}\right|\right) =$$

$$P_{sp}\left\{E\left[\left|\sum_{i=1}^{k-1}\prod_{j=i+1}^k \left(\frac{G_j lg}{g}\right)^{\frac{1}{2}}\right|^2\right] - E\left[\left|\sum_{i=1}^{k-1}\prod_{j=i+1}^k \left(\frac{G_j lg}{g}\right)^{\frac{1}{2}}\right|\right]^2\right\} =$$

$$P_{sp}\left\{E\left[\sum_{i=1}^{k-1}\prod_{j=i+1}^k \frac{G_j lg}{g} + \right.\right.$$

$$\left.\left. 2\sum_{i=1}^{k-2}\sum_{m=i+1}^{k-1}\prod_{j=i+1}^k \left(\frac{G_j lg}{g}\right)^{\frac{1}{2}}\prod_{n=m+1}^k \left(\frac{G_m lg}{g}\right)^{\frac{1}{2}}\right] - \right.$$

-continued $$P_{sp}\left\{\sum_{i=1}^{k-1} E\left[\prod_{j=i+1}^{k}\left(\frac{G_j lg}{g}\right)^{\frac{1}{2}}\right]^2\right\} =$$

$$P_{sp}\left\{\sum_{i=1}^{k-1} E\left[\prod_{j=i+1}^{k} \frac{G_j lg}{g}\right] - \sum_{i=1}^{k-1} E\left[\prod_{j=i+1}^{k}\left(\frac{G_j lg}{g}\right)^{\frac{1}{2}}\right]^2\right\} =$$

$$P_{sp}\sum_{i=1}^{k-1}\left(\prod_{j=i+1}^{k}\left[\frac{G_j lg}{g}\right] - \prod_{j=i+1}^{k} E\left[\sqrt{\frac{G_j lg}{g}}\right]^2\right) =$$

$$P_{sp}\sum_{i=1}^{k-1}\left((lg)^{k-1} - \prod_{j=i+1}^{k} lg\left(1 - \frac{\text{Var}(\sqrt{G})}{g}\right)\right) =$$

$$P_{sp}\sum_{i=1}^{k-1}\left((lg)^{k-i} - \left[lg\left(1 - \frac{\text{Var}(\sqrt{G})}{g}\right)\right]^{k-i}\right) =$$

$$P_{sp}\left\{\frac{lg(1-(lg)^{k-1})}{1-lg} - \frac{\left[1-\left(lg\left(1-\frac{\text{Var}(\sqrt{G})}{g}\right)\right)^{k-1}\right] lg\left(1-\frac{\text{Var}(\sqrt{G})}{g}\right)}{lg\left(1-\frac{\text{Var}(\sqrt{G})}{g}\right)}\right\} =$$

$$\begin{cases} P_{sp}\left\{\frac{(k-1)-\frac{g}{\text{Var}(\sqrt{G})}}{\text{Var}(\sqrt{G})}\left[1-\left(1-\frac{\text{Var}(\sqrt{G})}{g}\right)^{k-1}\right]\right\} & \text{if } lg = 1 \\[2em] P_{sp}\left\{\frac{\frac{lg(1-(lg)^{k-1})}{1-lg} - \frac{lg\left(1-\frac{\text{Var}(\sqrt{G})}{g}\right)\left[1-\left(lg\left(1-\frac{\text{Var}(\sqrt{G})}{g}\right)\right)^{k-1}\right]}{1-lg\left(1-\frac{\text{Var}(\sqrt{G})}{g}\right)}}{} \right\} & \text{if } lg \neq 1, \; lg \neq \frac{1}{1-\frac{\text{Var}(\sqrt{G})}{g}} \\[2em] P_{sp}\left\{\frac{lg[(lg)^{k-1}-1]}{lg-1} - (k-1)\right\} & \text{if } lg = \frac{1}{1-\frac{\text{Var}(\sqrt{G})}{g}} \end{cases}$$

Note that in the above calculation, for simplicity reasons, real field values are considered.

C.3 Derivation of $\sigma_{IG_{sig-sig}}^2$ in Eq. (3.29)

Proof.

$$\sigma_{IG_{sig-sig}}^2 =$$

$$R^2 P_0^2 (lg)^{2k} \text{Var}\left(\prod_{i=1}^{k} \frac{G_i \beta_i}{g}\right) = R^2 P_0^2 (lg)^{2k}\left(E\left[\prod_{i=1}^{k}\left(\frac{G_i}{g}\right)^2\right] - E\left[\prod_{i=1}^{k} \frac{G_i}{g}\right]^2\right) =$$

$$R^2 P_0^2 (lg)^{2k}\left(E\left[\left(\frac{G_i}{g}\right)^2\right]^k - 1\right) =$$

$$R^2 P_0^2 (lg)^{2k}\left(\left(\frac{g^2+\sigma_G^2}{g^2}\right)^k - 1\right) = R^2 P_0^2 (lg)^{2k}\left[\left(1+\frac{\sigma_G^2}{g^2}\right)^k - 1\right]$$

C.4 Derivation of $v_{IG_{sig-sp}}^2$ in Eq. (3.30)

Proof.

Define $(\sigma_I^2)_{sig-sp,i}$ to be the intensity noise from signal beating with the ith noise term. The corresponding photocurrent is $$I_{sig-sp,i} = 2R\!\int [P_0 \cdot lG_1 \cdot lG_2 \cdots lG_i \cdot S_{sp}(lG_{i+1} \cdot lG_{i+2} \cdots lG_k)]^{1/2} d\omega_n$$

Therefore, $$(\sigma_I^2)_{sig-sp,i} = \text{Var}(I_{sig-sp,i}) =$$

$$4R^2 P_0 S_{sp} B_e \cdot \text{Var}\left(\prod_{j=1}^{i}\left(\frac{G_j lg}{g}\right)^{\frac{1}{2}} \prod_{m=i+1}^{k} \frac{G_m lg}{g}\right) = 4R^2 P_0 S_{sp} B_e (lg)^{2k-i} \cdot$$

$$\left\{E\left[\left(\prod_{j=1}^{i}\left(\frac{G_j}{g}\right)^{\frac{1}{2}} \prod_{m=i+1}^{k} \frac{G_m}{g}\right)^2\right] - E\left[\prod_{j=1}^{i}\left(\frac{G_j}{g}\right)^{\frac{1}{2}} \prod_{m=i+1}^{k} \frac{G_m}{g}\right]^2\right\} =$$

$$4R^2 P_0 S_{sp} B_e (lg)^{2k-i} \cdot \left\{E\left[\prod_{m=i+1}^{k} \frac{G_m^2}{g^2}\right] - E\left[\prod_{j=1}^{i} \sqrt{\frac{G_j}{g}}\right]^2\right\} =$$

$$4R^2 P_0 S_{sp} B_e (lg)^{2k-i} \cdot \left[\left(\frac{E[G^2]}{g^2}\right)^{k-i} - \left(\frac{E[\sqrt{G}]^2}{g}\right)^i\right]$$

Because $E[\sqrt{G}]^2 = E[G] - \text{Var}(\sqrt{G})$ and $\text{Var}\sqrt{G} \geq 0$, $E[\sqrt{G}]^2 \leq E[G] = g$. Therefore, $$\left(\frac{E[\sqrt{G}]^2}{g}\right)^i \leq 1$$

Hence, $$(\sigma_I^2)_{sig-sp,i} \geq 4R^2 P_0 S_{sp} B_e \cdot (lg)^k \cdot (lg)^{k-i}\left[\left(1+\frac{\sigma_G^2}{g^2}\right)^{k-i} - 1\right]$$

The total intensity noise from signal beating with noise $\sigma_{IG_{sig-sp}}^2$ is, $$(\sigma_I^2)_{sig-sp} \geq 4R^2 P_0 S_{sp} B_e \cdot (lg)^k \cdot \sum_{i=1}^{k}\left\{\left[\left(1+\frac{\sigma_G^2}{g^2}\right)^{k-i} - 1\right](lg)^{k-i}\right\} =$$

$$4R^2 P_0 S_{sp} B_e \cdot (lg)^k \cdot \sum_{j=0}^{k-1}\left\{\left[lg\left(1+\frac{\sigma_G^2}{g^2}\right)\right]^j - (lg)^j\right\} =$$

-continued $$\begin{cases} 4R^2 P_0 S_{sp} B_e \cdot (lg)^k \cdot \left\{ \frac{g^2}{\sigma_G^2} \left[ \left(1 + \frac{\sigma_G^2}{g^2}\right)^k - 1 \right] - k \right\} & \text{if } lg = 1 \\ 4R^2 P_0 S_{sp} B_e \cdot (lg)^k \cdot \left\{ \frac{\left[ lg\left(1 + \frac{\sigma_G^2}{g^2}\right) \right]^k - 1}{lg\left(1 + \frac{\sigma_G^2}{g^2}\right) - 1} - \frac{(lg)^k - 1}{lg - 1} \right\} & \text{otherwise} \end{cases}$$

C.5 Derivation of $\sigma_{IG_{sp-sp}}^2$ in Eq. (3.31)

Proof.

Define $(\sigma_I^2)_{sp-sp,ij}$, ($i<j$) to be the intensity noise from the ith ASE term beating with the jth ASE term. The corresponding photocurrent is $$I_{sp-sp,ij} = 2R \iint (S_{sp} \cdot lG_{i+1} \cdot lG_{i+2} \ldots lG_k)^{1/2} \cdot (S_{sp} \cdot lG_{j+1} \cdot lG_{j+2} \ldots lG_k)^{1/2} \cos\theta_2 d\omega_n dw_n'$$

Therefore, $$(\sigma_I^2)_{sp-sp,ij} =$$

$$\text{Var}(I_{sp-sp,ij}) = 4R^2 S_{sp}^2 B_0 B_e \cdot \text{Var}\left( \left(\prod_{m=i+1}^k \frac{G_m lg}{g}\right)^{\frac{1}{2}} \left(\prod_{n=j+1}^k \frac{G_n lg}{g}\right)^{\frac{1}{2}} \right) =$$

$$4R^2 S_{sp}^2 B_o B_e \cdot (lg)^{k-i}(lg)^{k-j} \cdot \text{Var}\left( \prod_{m=i+1}^j \left(\frac{G_m}{g}\right)^{\frac{1}{2}} \prod_{n=j+1}^k \frac{G_n}{g} \right) =$$

$$4R^2 S_{sp}^2 B_o B_e \cdot (lg)^{k-i}(lg)^{k-j} \cdot$$

$$\left\{ E\left[ \left( \prod_{m=i+1}^j \left(\frac{G_m}{g}\right)^{\frac{1}{2}} \prod_{n=j+1}^k \frac{G_n}{g} \right)^2 \right] - E\left[ \prod_{m=i+1}^j \left(\frac{G_m}{g}\right)^{\frac{1}{2}} \prod_{n=j+1}^k \frac{G_n}{g} \right]^2 \right\} =$$

$$4R^2 S_{sp}^2 B_o B_e \cdot (lg)^{k-i}(lg)^{k-j} \cdot \left\{ E\left[ \prod_{n=j+1}^k \frac{G_n^2}{g^2} \right] - E\left[ \prod_{m=i+1}^j \sqrt{\frac{G_m}{g}} \right]^2 \right\} =$$

$$4R^2 S_{sp}^2 B_o B_e \cdot (lg)^{k-i}(lg)^{k-j} \cdot \left[ \left(\frac{E[G^2]}{g^2}\right)^{k-j} - \left(\frac{E[\sqrt{G}]}{g}\right)^{2(j-i)} \right] \geq$$

$$4R^2 S_{sp}^2 B_o B_e \cdot (lg)^{k-i}(lg)^{k-j} \cdot \left[ \left(1 + \frac{\sigma_G^2}{g^2}\right)^{k-j} - 1 \right]$$

The total intensity noise from ASE noise beating with itself is, $$\sigma_{IG_{sp-sp}}^2 \geq \sum_{i=1}^{k-1} \sum_{j=i+1}^k (\sigma_I^2)_{sp-sp,ij} =$$

$$4R^2 S_{sp}^2 B_o B_e \cdot \sum_{i=1}^{k-1} (lg)^{k-i} \sum_{j=i+1}^k (lg)^{k-j} \left[ \left(1 + \frac{\sigma_G^2}{g^2}\right)^{k-j} - 1 \right] =$$

$$4R^2 S_{sp}^2 B_o B_e \cdot \sum_{i=1}^{k-1} (lg)^{k-i} \sum_{j=i+1}^k \left[ \left(lg\left(1 + \frac{\sigma_G^2}{g^2}\right)\right)^{k-j} - (lg)^{k-j} \right]$$

If $lg \neq 1$, $$\sigma_{IG_{sp-sp}}^2 = 4R^2 S_{sp}^2 B_o B_e \cdot \sum_{i=1}^{k-1} (lg)^{k-i} \left\{ \frac{\left[ lg\left(1 + \frac{\sigma_G^2}{g^2}\right) \right]^{k-i} - 1}{lg\left(1 + \frac{\sigma_G^2}{g^2}\right) - 1} - \frac{(lg)^{k-i} - 1}{lg - 1} \right\} =$$

$$4R^2 S_{sp}^2 B_o B_e \cdot \sum_{i=1}^{k-1} \left\{ \frac{\left[ (lg)^2 \left(1 + \frac{\sigma_G^2}{g^2}\right) \right]^{k-i} - (lg)^{k-i}}{lg\left(1 + \frac{\sigma_G^2}{g^2}\right) - 1} - \frac{(lg)^{2(k-i)} - (lg)^{k-i}}{lg - 1} \right\} =$$

$$4R^2 S_{sp}^2 B_o B_e \cdot \sum_{i=1}^{k-1} \left\{ \frac{\left[ (lg)^2 \left(1 + \frac{\sigma_G^2}{g^2}\right) \right]^{k-i} - (lg)^{k-i}}{lg\left(1 + \frac{\sigma_G^2}{g^2}\right) - 1} - \frac{(lg)^{2(k-i)}}{lg - 1} \frac{(lg)^{k-i}}{lg - 1} \right\} =$$

$$4R^2 S_{sp}^2 B_o B_e \cdot \sum_{i=1}^{k-1} \left\{ \frac{\left[ (lg)^2 \left(1 + \frac{\sigma_G^2}{g^2}\right) \right]^{k-i}}{lg\left(1 + \frac{\sigma_G^2}{g^2}\right) - 1} - \right.$$

$$\left. \frac{(lg)^{2(k-i)}}{lg - 1} + \frac{lg \frac{\sigma_G^2}{g^2}(lg)^{k-i}}{\left[ lg\left(1 + \frac{\sigma_G^2}{g^2}\right) - 1 \right](lg - 1)} \right\}$$

If $lg = 1$, $$\sigma_{IG_{sp-sp}}^2 = 4R^2 S_{sp}^2 B_o B_e \cdot \sum_{i=1}^{k-1} \sum_{j=i+1}^k \left[ \left(1 + \frac{\sigma_G^2}{g^2}\right)^{k-j} - 1 \right] =$$

$$4R^2 S_{sp}^2 B_o B_e \cdot \sum_{i=1}^{k-1} \left\{ \frac{\left(1 + \frac{\sigma_G^2}{g^2}\right)^{k-i} - 1}{\frac{\sigma_G^2}{g^2}} - (k - i) \right\} =$$

$$4R^2 S_{sp}^2 B_o B_e \cdot \sum_{n=1}^{k-1} \left\{ \frac{\left(1 + \frac{\sigma_G^2}{g^2}\right)^n - 1}{\frac{\sigma_G^2}{g^2}} - n \right\}$$

CITED REFERENCES

[1] G. P. Agrawal. *Fiber-Optic Communication Systems*. Wiley-Interscience, Rochester, N.Y., third edition edition, 2002.

[2] D. Banerjee and B. Mukherjee. A practical approach for routing and wavelength assignment in large wavelength-routed optical networks. *Selected Areas in Communications, IEEE Journal on*, 14(5):903-908, June 1996.

[3] R. Barry and P. Humblet. Models of blocking probability in all-optical networks with and without wavelength changers. s, 14(5):858-867, 1996.

[4] M. Chiani, D. Dardari, and M. K. Simon. New exponential bounds and approximations for the computation of error probability in fading channels. *Wireless Communications, IEEE Transactions on*, 2(4):840-845, July 2003.

[5] I. Chlamtac, A. Ganz, and G. Karmi. Lightnet: lightpath based solutions for wide bandwidth wans. In INFOCOM '90, Ninth Annual Joint Conference of the IEEE Computer and Communication Societies. The Multiple Facets of Integration. Proceedings, IEEE, pages 1014-1021 vol. 3, June 1990.

[6] I. Chlamtac, A. Ganz, and G. Karmi. Lightpath communications: an approach to high bandwidth optical wan's. *Communications, IEEE Transactions on,* 40(7):1171-1182, July 1992.

[7] N. Christofides. Graph Theory: An Algorithmic Approach (Computer Science and Applied Mathematics). Academic Press, Inc., Orlando, Fla., USA, 1975.

[8] T. H. Cormen, C. Stein, R. L. Rivest, and C. E. Leiserson. *Introduction to Algorithms.* McGraw-Hill Higher Education, 2nd edition, 2001.

[9] M. Gagnaire, M. Koubaa, and N. Puech. Network dimensioning under scheduled and random lightpath demands in all-optical wdm networks. *Selected Areas in Communications, IEEE Journal on,* 25(9):58-67, December 2007.

[10] M. R. Garey and D. S. Johnson. *Computers and Intractability-A Guide to the Theory of NP Completeness.* W. H. Freeman, San Franscisco, 1979.

[11] C. Henry. Theory of spontaneous emission noise in open resonators and its application to lasers and optical amplifiers. *Lightwave Technology, Journal of,* 4(3):288-297, March 1986.

[12] H. Huang and V. Chan. Transport layer protocol for optical flow-switched networks. In *International Conference on Communications (ICC 2013), 2013 IEEE,* June 2013.

[13] J. Junio, L. Zhang, and V. Chan. Design of long haul fast turn-on/off of lightpaths and induced physical layer characteristics of edfa-amplified meshed networks. In *OFC 2014. Optical Fiber Conference. Proceedings,* March 2014.

[14] R. Krishnaswamy and K. Sivarajan. Design of logical topologies: a linear formulation for wavelength-routed optical networks with no wavelength changers. *Networking, IEEE/ACM Transactions on,* 9(2):186-198, April 2001.

[15] M. Lax. Theory of laser noise. In Proc. *SPIE* 1376, volume 1376, March 1991.

[16] K. Lin, M. I. of Technology. Dept. of Electrical Engineering, and C. Science. *Green optical network design: power optimization of wide area and metropolitan area networks.* 2011.

[17] S. Pachnicke, E. Gottwald, P. Krummrich, and E. Voges. Combined impact of raman and edfa transients on long haul transmission system performance. In *Optical Communication (ECOC), 2007 33rd European Conference and Ehxibition of,* pages 1-2, September 2007.

[18] Y. Pan, D. Kilper, A. Morea, J. Junio, and V. Chan. Channel power excursions in gmpls end-to-end optical restoration with single-step wavelength tuning. In *Optical Fiber Communication Conference and Exposition (OFC/NFOEC), 2012 and the National Fiber Optic Engineers Conference,* pages 1-3, March 2012.

[19] R. Ramaswami and K. Sivarajan. Routing and wavelength assignment in all-optical networks. *Networking, IEEE/ACM Transactions on,* 3(5):489-500, October 1995.

[20] R. Ramaswami and K. Sivarajan. Design of logical topologies for wavelength-routed optical networks. *Selected Areas in Communications, IEEE Journal on,* 14(5):840-851, June 1996.

[21] A. Schrijver. In Combinatorial Optimization: Polyhedra and Efficiency, volume 1 of Algorithms and Combinatorics, page 114. Springer, 2003.

[22] J. M. Simmons. *Optical network design and planning.* Springer, New York, 2008.

[23] Y. Sun, A. Srivastava, J. Zyskind, J. Sulhoff, C. Wolf, and R. Tkach. Fast power transients in wdm optical networks with cascaded edfas. *Electronics Letters,* 33(4):313-314, February 1997.

[24] C. Tian and S. Kinoshita. Analysis and control of transient dynamics of edfa pumped by 1480- and 980-nm lasers. *Lightwave Technology, Journal of,* 21(8):1728-1734, August 2003.

[25] H. L. V. Trees. *Detection, Estimation, and Modulation Theory* Part III: Radar-Sonar Signal Processing and Gaussian Signals in Noise. Krieger Publishing Co., Inc., Melbourne, Fla., USA, 1992.

[26] G. Weichenberg, V. Chan, and M. Medard. Design and analysis of optical flow-switched networks. *Optical Communications and Networking, IEEE/OSA Journal of,* 1(3):B81-B97, August 2009.

[27] A. Yariv. *Quantum Electronics.* John Wiley & Sons, third edition, 1989.

[28] E. Yetginer, Z. Liu, and G. Rouskas. Fast exact ilp decompositions for ring rwa. *Optical Communications and Networking, IEEE/OSA Journal of,* 3(7):577-586, July 2011.

[29] S. Yoo, W. Xin, L. Garratt, J. Young, G. Ellinas, J. C. Chiao, M. Rauch, J. Baran, B. Meagher, H. Leblanc, and G.-K. Chang. Observation of prolonged power transients in a reconfigurable multiwavelength network and their suppression by gain-clamping of optical amplifiers. *Photonics Technology Letters, IEEE,* 10(11): 1659-1661, November 1998.

[30] H. Zang and J. P. Jue. A review of routing and wavelength assignment approaches for wavelength-routed optical wdm networks. *Optical Networks Magazine,* 1:47-60, 2000.

While the invention is described through the above-described exemplary embodiments, modifications to, and variations of, the illustrated embodiments may be made without departing from the inventive concepts disclosed herein. Disclosed aspects, or portions thereof, may be combined in ways not listed above and/or not explicitly claimed. Embodiments disclosed herein may be suitably practiced, absent any element that is not specifically disclosed herein. Accordingly, the invention should not be viewed as being limited to the disclosed embodiments.

While specific parameter values may be recited in relation to disclosed embodiments, within the scope of the invention, the values of all of parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as discrete components, combinatorial logic, Application Specific Integrated Circuits (ASICs), Field-Programmable Gate Arrays (FPGAs) or other hardware), firmware or combinations thereof.

Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. The processor may be a single-core or multi-core microprocessor, digital signal processor (DSP), industrial microcontroller or the like.

Instructions defining the functions of the present invention may be delivered to a processor in many forms, including, but not limited to, information permanently stored on tangible non-writable non-transitory storage media (e.g., read-only memory devices within a computer, such as ROM, or devices readable by a computer I/O attachment, such as CD-ROM or DVD disk), information alterably stored on tangible non-transitory writable storage media (ex., floppy disk, removable flash memory, recordable DVD or hard drives) or information conveyed to a computer through a communication medium, including wired or wireless computer networks.

What is claimed is:

1. A method for scheduling a data transmission via a wavelength-division multiplexed optical communication network that includes a plurality of nodes and a plurality of links interconnecting the nodes, wherein each link includes at least one link-length optical fiber and at least some of the nodes are access nodes, the method comprising:
   storing, in an electronic memory: (a) information about topology of the optical communication network and (b) information indicating: (i) which wavelengths are illuminated in ones of the link-length optical fibers, (ii) which wavelengths in ones of the link-length optical fibers are assigned to carry traffic and (iii) for each wavelength/link-length optical fiber combination that is assigned to carry traffic, a start time of an assignment and an end time of the assignment;
   receiving a first electronic signal indicating: (a) a request to transport proposed traffic over the optical communication network between a source access node and a destination access node and (b) an amount of the proposed traffic;
   using the amount of the proposed traffic to calculate an assignment duration sufficient to carry the proposed traffic;
   automatically searching the information in the electronic memory for a set of the link-length optical fibers, such that: (a) the set of link-length optical fibers extends contiguously between the source access node and the destination access node, (b) at least one wavelength in common among all the link-length optical fibers of the set is illuminated and (c) each combination of the at least one wavelength and a link-length optical fiber of the set is available to carry traffic at some common start time and thereafter for at least the calculated assignment duration; and
   if the set of link-length optical fibers is found, automatically:
      selecting a wavelength of the at least one wavelength in common;
      altering the information stored in the electronic memory so as to indicate, for each link-length optical fiber of the set, the selected wavelength is assigned to carry traffic beginning at the common start time and thereafter for the calculated assignment duration; and
      sending a second electronic signal indicating the set of link-length optical fibers, the selected wavelength and the common start time.

2. A method according to claim 1, wherein using the amount of the proposed traffic to calculate the assignment duration sufficient to carry the proposed traffic comprises calculating the assignment duration as other than an integral multiple of a fixed time slot duration.

3. A method according to claim 1, wherein automatically searching the information in the electronic memory for the set of the link-length optical fibers occurs upon receipt of the first electronic signal, without waiting for a next fixed time slot occurrence.

4. A method according to claim 1, wherein the common start time is independent of timing of a next fixed time slot occurrence.

5. A method according to claim 1, further comprising, if the set of optical fibers is not found, automatically sending a third electronic signal indicating a failure to schedule transport of the proposed traffic.

6. A method according to claim 1, wherein automatically searching the information in the electronic memory for the set of the link-length optical fibers comprises automatically:
   (a) determining a path comprising a subset of the plurality of links, such that links of the subset extend contiguously between the source access node and the destination access node;
   (b) setting a lower limit equal to an initial time;
   (c) for each link of the path, automatically determining an earliest start time, no earlier than the lower limit, at which at least one link-length optical fiber of the link is available to carry traffic, thereby in aggregate identifying at least one first possible start time;
   (d) selecting a latest one of the at least one first possible start time, thereby selecting a first candidate start time;
   (e) for each link of the path, automatically determining an earliest start time, no earlier than the first candidate start time, at which a link-length optical fiber of the link is available to carry traffic, thereby in aggregate identifying at least one second possible start time;
   (f) selecting a latest one of the at least one second possible start time, thereby selecting a second candidate start time;
   (g) comparing the first candidate start time to the second candidate start time;
   (h) if, as a result of the comparing, the first candidate start time is found to be equal to the second candidate start time:
      (i) selecting the first candidate start time as the common start time; and
      (ii) for each link of the path, selecting the link-length optical fiber of the link that is available to carry traffic, thereby in aggregate selecting the set of the link-length optical fibers;
   otherwise, if a predetermined stopping criterion is not met:
      (i) setting the lower limit equal to the second candidate start time; and
      (ii) repeating (b) to (h).

7. A method according to claim 6, wherein:
   determining an earliest start time, no earlier than the lower limit, comprises automatically determining the earliest start time without regard to timing of a next fixed time slot occurrence; and determining an earliest start time, no earlier than the first candidate start time, comprises automatically determining the earliest start time without regard to timing of a next fixed time slot occurrence.

8. A method according to claim 6, wherein:
identifying the at least one first possible start time comprises, for each link of the path, automatically determining the earliest start time, no earlier than the lower limit, at which the at least one link-length optical fiber of the link is available to carry traffic, including thereafter for at least the calculated assignment duration; and
identifying the at least one second possible start time comprises, for each link of the path, automatically determining the earliest start time, no earlier than the first candidate start time, at which the at least one link-length optical fiber of the link is available to carry traffic, including thereafter for at least the calculated assignment duration.

9. A method according to claim 6, wherein the initial time represents a current time.

10. A method according to claim 6, wherein the initial time represents a future time.

11. A method according to claim 6, wherein determining the path comprises automatically finding a lowest cost path between the source access node and the destination access node.

12. A method according to claim 11, wherein the lowest cost path comprises a path having a fewest number of links between the source access node and the destination access node.

13. A method according to claim 6, wherein:
each link of the plurality of links is associated with a respective link cost; and
determining the path comprises automatically determining a least cost path that has a lowest total link cost.

14. A method according to claim 13, wherein each link cost is based at least in part on a number of optical amplifiers disposed along the associated link.

15. A method according to claim 6, wherein determining the path comprises receiving an electronic signal from another system, wherein the electronic signal indicates the links of the path.

16. A method according to claim 6, further comprising:
for each illuminated wavelength of the path, repeating (b) to (h); wherein:
automatically determining the earliest start time comprises automatically determining an earliest start time/wavelength combination, no earlier than the lower limit or the first candidate start time as the case may be, at which at least one link-length optical fiber, with the illuminated wavelength, is available to carry traffic;
the at least one first possible start time comprises an at least one start time/wavelength combination;
the at least one second possible start time comprises an at least one start time/wavelength combination;
selecting the latest one of the at least one first possible start time comprises selecting a latest start time/wavelength combination;
the first candidate start time comprises a first candidate start time/wavelength combination;
the second candidate start time comprises a second candidate start time/wavelength combination; and
selecting the first candidate start time as the common start time comprises:
selecting the start time of the first candidate start time/wavelength combination as the common start time; and
selecting the wavelength of the first candidate start time/wavelength combination as the wavelength in common.

17. A method according to claim 1, wherein:
(a) the at least one link-length optical fiber of the plurality of links collectively form a plurality of optical fibers, (b) the wavelength-division multiplexed optical communication network includes a plurality of optical amplifiers and (c) the plurality of optical fibers interconnects the plurality of optical amplifiers; the method further comprising:
storing, in the electronic memory, information characterizing channel impairments imposed by ones of the plurality of optical amplifiers, and by ones of the plurality of optical fibers, for each wavelength of a plurality of wavelengths;
receiving a fourth electronic signal indicating a proposed route for the proposed traffic, the fourth electronic signal identifying a subset of the plurality of optical fibers through which the proposed traffic would be carried, wherein carrying the proposed traffic via the proposed route would require illuminating, in at least one optical fiber of the subset of the plurality of optical fibers, a wavelength of light not currently illuminated in the at least one optical fiber;
using the information characterizing the channel impairments and the indication of the wavelength of light not currently illuminated, automatically calculating consequential impairments of other traffic carried via other wavelengths by optical fibers and optical amplifiers that would carry the proposed traffic, wherein the consequential impairments would result from illuminating the wavelength of light not currently illuminated;
comparing the consequential impairments to a predetermined limit to determine whether the consequential impairments would exceed the predetermined limit;
if, as a result of the comparing, it is determined the consequential impairments would exceed the predetermined limits, sending a fifth electronic signal indicating rejection of the proposed route; and;
if, as a result of the comparing, it is determined the consequential impairments would not exceed the predetermined limits, sending a sixth electronic signal indicating acceptance of the proposed route.

18. A method according to claim 17, further comprising, in response to the sixth electronic signal, automatically illuminating, in at least one optical fiber of the subset of the plurality of optical fibers, the wavelength of light not currently illuminated.

19. A method according to claim 18, further comprising, in response to the sixth electronic signal, automatically carrying the proposed traffic via the proposed route.

20. A method according to claim 17, further comprising:
receiving the fifth electronic signal; and
in response to receiving the fifth electronic signal:
automatically selecting a different proposed route for the proposed traffic; and
sending another fourth electronic signal containing the different proposed route for the proposed traffic.

21. A method according to claim 1, further comprising using the selected wavelength to automatically carry the proposed traffic over the set of the link-length optical fibers, between the source access node and the destination access node, beginning at the common start time.

22. A traffic scheduler for a wavelength-division multiplexed optical communication network that includes a plurality of nodes and a plurality of links interconnecting the nodes, wherein each link includes at least one link-length optical fiber and at least some of the nodes are access nodes, the scheduler comprising:
- a database storing: (a) information about topology of the optical communication network and (b) information indicating: (i) which wavelengths are illuminated in ones of the link-length optical fibers, (ii) which wavelengths in ones of the link-length optical fibers are assigned to carry traffic and (iii) for each wavelength/link-length optical fiber combination that is assigned to carry traffic, a start time of an assignment and an end time of the assignment;
- a traffic request receiver configured to receive a first electronic signal indicating: (a) a request to transport proposed traffic over the optical communication network between a source access node and a destination access node and (b) an amount of the proposed traffic;
- a duration calculator configured to automatically calculate a calculated assignment duration based on the amount of the proposed traffic;
- a link-length optical fiber search engine configured to automatically search the information in the database for a set of the link-length optical fibers, such that: (a) the set of link-length optical fibers extends contiguously between the source access node and the destination access node, (b) at least one wavelength in common among all the link-length optical fibers of the set is illuminated and (c) each combination of the at least one wavelength and a link-length optical fiber of the set is available to carry traffic at some common start time and thereafter for at least the calculated assignment duration;
- a wavelength selector configured to, if the set of link-length optical fibers is found, automatically select a wavelength of the at least one wavelength in common;
- a database updater configured to, if the set of link-length optical fibers is found, alter the information stored in the electronic memory so as to indicate, for each link-length optical fiber of the set, the selected wavelength is assigned to carry traffic beginning at the common start time and thereafter for the calculated assignment duration; and
- a success/failure signal sender configured to, if the set of link-length optical fibers is found, send a second electronic signal indicating the set of link-length optical fibers, the selected wavelength and the common start time.

23. A traffic scheduler according to claim 22, wherein the link-length optical fiber search engine comprises:
- a path determinator configured to determine a path comprising a subset of the plurality of links, such that links of the subset extend contiguously between the source access node and the destination access node;
- a lower limit setter configured to set a lower limit equal to an initial time;
- a first earliest start time finder configured to automatically determine, for each link of the path, an earliest start time, no earlier than the lower limit, at which at least one link-length optical fiber of the link is available to carry traffic for the calculated assignment duration, thereby in aggregate identifying at least one first possible start time;
- a first candidate start time selector configured to select a latest one of the at least one first possible start time, thereby selecting a first candidate start time;
- a second earliest start time finder configured to automatically determine, for each link of the path, an earliest start time, no earlier than the first candidate start time, at which at least one link-length optical fiber of the link is available to carry traffic, thereby in aggregate identifying at least one first possible start time;
- a second candidate start time selector configured to select a latest one of the at least one second possible start time, thereby selecting a second candidate start time;
- a comparator configured to compare the first candidate start time to the second candidate start time;
- a common start time selector configured to, if the first candidate start time equals the second candidate start time, select the first candidate start time as the common start time;
- a link-length optical fiber selector configured to select, for each link of the path, the link-length optical fiber of the link that is available to carry traffic, thereby in aggregate selecting the set of the link-length optical fibers; and
- a loop controller configured to, if the first candidate start time does not equal the second candidate start time and a predetermined stopping criterion is not met, return control to the lower limit setter, which is configured to set the lower limit equal to the second candidate start time and pass control to the first earliest start time finder.

\* \* \* \* \*